United States Patent
Wu et al.

(10) Patent No.: US 11,271,261 B2
(45) Date of Patent: *Mar. 8, 2022

(54) TEMPERATURE ADJUSTMENT METHOD AND TEMPERATURE ADJUSTMENT SYSTEM FOR VEHICLE-MOUNTED BATTERY

(71) Applicant: BYD COMPANY LIMITED, Shenzhen (CN)

(72) Inventors: Xingchi Wu, Shenzhen (CN); Jigang Tan, Shenzhen (CN); Hongjun Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 25 days.

This patent is subject to a terminal disclaimer.

(21) Appl. No.: 16/651,936

(22) PCT Filed: Sep. 29, 2018

(86) PCT No.: PCT/CN2018/108732
§ 371 (c)(1),
(2) Date: Mar. 27, 2020

(87) PCT Pub. No.: WO2019/062935
PCT Pub. Date: Apr. 4, 2019

(65) Prior Publication Data
US 2020/0313255 A1    Oct. 1, 2020

(30) Foreign Application Priority Data
Sep. 30, 2017    (CN) .......................... 201710945051.5

(51) Int. Cl.
*H01M 10/625* (2014.01)
*H01M 10/613* (2014.01)
(Continued)

(52) U.S. Cl.
CPC ....... *H01M 10/625* (2015.04); *H01M 10/486* (2013.01); *H01M 10/613* (2015.04);
(Continued)

(58) Field of Classification Search
CPC   B60H 1/00278; B60H 1/32281; B60H 1/323; B60H 2001/00307; H01M 10/486;
(Continued)

(56) References Cited

U.S. PATENT DOCUMENTS 5,937,664 A    8/1999    Matsuno et al.
7,017,361 B2   3/2006    Kwon
(Continued)

FOREIGN PATENT DOCUMENTS

CN    1816271 A    8/2006
CN    1866608 A    11/2006
(Continued)

OTHER PUBLICATIONS

Machine translation CN103904382A (Year: 2014).*
(Continued)

*Primary Examiner* — Victoria H Lynch
(74) *Attorney, Agent, or Firm* — Anova Law Group, PLLC

(57) ABSTRACT

The present disclosure discloses a temperature adjustment method including: obtaining a required power for temperature adjustment on a battery; obtaining an actual power for temperature adjustment on the battery; and adjusting a temperature of the battery according to the required power for temperature adjustment and the actual power for temperature adjustment. The present disclosure may precisely control a temperature adjustment time of the battery, and the actual power for temperature adjustment on the battery is adjustable in real time, so that a heating power and a cooling power of the vehicle-mounted battery may be precisely
(Continued)

controlled according to an actual status of the vehicle-mounted battery, thereby adjusting the temperature of the vehicle-mounted battery when the temperature is excessively high or excessively low, maintaining the temperature of the vehicle-mounted battery within a preset range, and avoiding a case of affecting performance of the vehicle-mounted battery because of the temperature.

20 Claims, 30 Drawing Sheets

(51) Int. Cl.
      H01M 10/615 (2014.01)
      H01M 10/633 (2014.01)
      H01M 10/48 (2006.01)
      H01M 10/6568 (2014.01)
      H01M 10/6569 (2014.01)

(52) U.S. Cl.
      CPC ....... H01M 10/615 (2015.04); H01M 10/633 (2015.04); *H01M 10/6568* (2015.04); *H01M 10/6569* (2015.04)

(58) Field of Classification Search
      CPC ............. H01M 10/613; H01M 10/615; H01M 10/625; H01M 10/633; H01M 10/635; H01M 10/6568; H01M 10/6569; Y02E 60/10
      See application file for complete search history.

(56) References Cited

U.S. PATENT DOCUMENTS

| | | | |
|---|---|---|---|
| 9,719,702 | B2 | 8/2017 | Kuniaki et al. |
| 2006/0080986 | A1 | 4/2006 | Inoue |
| 2009/0258261 | A1 | 10/2009 | Han et al. |
| 2010/0025006 | A1 | 2/2010 | Zhou |
| 2012/0280050 | A1 | 11/2012 | Takashi et al. |
| 2016/0031289 | A1 | 2/2016 | Murata et al. |
| 2016/0082861 | A1 | 3/2016 | Gauthier |
| 2018/0141406 | A1 | 5/2018 | Neumeister et al. |

FOREIGN PATENT DOCUMENTS

| | | | |
|---|---|---|---|
| CN | 101577353 | A | 11/2009 |
| CN | 101714679 | A | 5/2010 |
| CN | 102315668 | A | 1/2012 |
| CN | 102918703 | A | 2/2013 |
| CN | 202887023 | U | 4/2013 |
| CN | 101931110 | B | 12/2013 |
| CN | 103748734 | A | 4/2014 |
| CN | 103904382 | A | 7/2014 |
| CN | 204885363 | U | 12/2015 |
| CN | 205028983 | U | 2/2016 |
| CN | 105789719 | A | 7/2016 |
| CN | 105932354 | A | 9/2016 |
| CN | 205970883 | U | 2/2017 |
| EP | 2451674 | B1 | 8/2013 |
| JP | 08148190 | A | 6/1996 |
| JP | 2006103365 | A | 4/2006 |
| JP | 2009073430 | A | 4/2009 |
| JP | 2013025926 | A | 2/2013 |
| JP | 2013048063 | A | 3/2013 |
| JP | 2013149436 | A | 8/2013 |
| JP | 2013149524 | A | 8/2013 |
| JP | 2013184528 | A | 9/2013 |
| JP | 2014160594 | A | 9/2014 |
| JP | 2015072819 | A | 4/2015 |
| KR | 20080008875 | A | 1/2008 |
| WO | 2007073452 | A1 | 6/2007 |
| WO | 2012105047 | A1 | 8/2012 |
| WO | 2016180712 | A1 | 11/2016 |

OTHER PUBLICATIONS

The World Intellectual Property Organization (WIPO) International Search Report for PCT/CN2018/108732 dated Jan. 3, 2019 6 Pages.

* cited by examiner

TEMPERATURE ADJUSTMENT METHOD AND TEMPERATURE ADJUSTMENT SYSTEM FOR VEHICLE-MOUNTED BATTERY

CROSS-REFERENCE TO RELATED APPLICATIONS

This application is a national phase entry under 35 U.S.C. § 371 of International Application No. PCT/CN2018/108732, filed on Sep. 29, 2018, which claims priority to China Patent Application No. 201710945051.5, filed on Sep. 30, 2017, content of all of which is incorporated herein by reference in its entirety.

FIELD

This application relates to the field of automobile technologies, and in particular, to a temperature adjustment method for a vehicle-mounted battery and a temperature adjustment system for a vehicle-mounted battery.

BACKGROUND

Currently, performance of a vehicle-mounted battery of an electric vehicle is affected by a climatic environment greatly, and an excessively high or excessively low ambient temperature affects the performance of the vehicle-mounted battery. Therefore, a temperature of the vehicle-mounted battery needs to be adjusted, so that the temperature of the vehicle-mounted battery is maintained within a preset range.

Currently, for a region whose climatic environment is hot, a battery cooling system needs to be added to an electric vehicle, so as to reduce a temperature of a vehicle-mounted battery when the temperature of the vehicle-mounted battery is excessively high; and for a region whose climatic environment is cold, a battery heating system needs to be added to the electric vehicle, so as to increase the temperature of the vehicle-mounted battery when the temperature of the vehicle-mounted battery is excessively low.

However, for a region that is hot in summer and cold in winter, the foregoing method cannot resolve both of problems of the excessively high temperature and the excessively low temperature of the vehicle-mounted battery, and a method for adjusting a temperature of a vehicle-mounted battery is relatively crude, and a heating power and a cooling power of the vehicle-mounted battery cannot be precisely controlled according to an actual situation of the vehicle-mounted battery. Consequently, it cannot be ensured that the temperature of the vehicle-mounted battery is maintained within a preset range.

SUMMARY

An objective of the present disclosure is to at least resolve one of the technical problems in the related art to some extent.

To this end, an objective of the present disclosure is to propose a temperature adjustment method for a vehicle-mounted battery. In the method, a temperature adjustment time of a vehicle-mounted battery may be precisely controlled according to a required power and an actual power for performing temperature adjustment on the battery, and the actual power for performing temperature adjustment on the battery is adjustable in real time, so that it may be ensured that a heating power and a cooling power of the vehicle-mounted battery are precisely controlled according to an actual status of the battery within a target time, thereby adjusting a temperature of the vehicle-mounted battery when the temperature is excessively high or excessively low, maintaining the temperature of the vehicle-mounted battery within a preset range, and avoiding a case of affecting performance of the vehicle-mounted battery because of the temperature.

Another objective of the present disclosure is to propose a temperature adjustment system for a vehicle-mounted battery.

To achieve the foregoing objective, an embodiment in an aspect of the present disclosure proposes a temperature adjustment method for a vehicle-mounted battery, including the following steps: obtaining a required power for performing temperature adjustment on a battery; obtaining an actual power for performing temperature adjustment on the battery; and adjusting a temperature of the battery according to the required power and the actual power.

In the temperature adjustment method for a vehicle-mounted battery according to this embodiment of the present disclosure, the required power for performing temperature adjustment on the battery is first obtained; then the actual power for performing temperature adjustment on the battery is obtained; and finally the temperature of the battery is adjusted according to the required power and the actual power. Therefore, in the method, a temperature adjustment time of the battery may be precisely controlled, and the actual power of the battery is adjustable in real time, so that a heating power and a cooling power of the vehicle-mounted battery may be precisely controlled according to an actual status of the vehicle-mounted battery, thereby adjusting the temperature of the vehicle-mounted battery when the temperature is excessively high or excessively low, maintaining the temperature of the vehicle-mounted battery within a preset range, and avoiding a case of affecting performance of the vehicle-mounted battery because of the temperature.

Additionally, the temperature adjustment method for a vehicle-mounted battery according to the foregoing embodiment of the present disclosure may further have the following additional technical characteristics:

According to an embodiment of the present disclosure, the adjusting a temperature of the battery according to the required power and the actual power includes: adjusting a temperature of the battery within a target time according to the required power and the actual power, to reach a target temperature.

According to an embodiment of the present disclosure, the obtaining a required power of a battery specifically includes: obtaining a first parameter when enabling temperature adjustment on the battery, and generating a first required power according to the first parameter; obtaining a second parameter when enabling temperature adjustment on the battery, and generating a second required power according to the second parameter; and generating the required power for temperature adjustment according to the first required power and the second required power.

According to an embodiment of the present disclosure, the first parameter is an initial temperature when enabling temperature adjustment on the battery, the target temperature, and the target time for reaching the target temperature from the initial temperature, and the generating a first required power according to the first parameter specifically includes: obtaining a first temperature difference between the initial temperature and the target temperature; and generating the first required power according to the first temperature difference and the target time.

According to an embodiment of the present disclosure, the first required power is generated through the following formula: $\Delta T_1 * C * M/t$, where $\Delta T_1$ is the first temperature difference between the initial temperature and the target temperature, t is the target time, C is a specific heat capacity of the battery, and M is a mass of the battery; and the second parameter is an average current of the battery within a preset time, and the second required power is generated through the following formula: $I^2 * R$, where I is the average current, and R is an internal resistance of the battery.

According to an embodiment of the present disclosure, the foregoing temperature adjustment method for a vehicle-mounted battery further includes: detecting the temperature of the battery; entering a cooling mode when the temperature of the battery is greater than a first temperature threshold; and entering a heating mode when the temperature of the battery is less than a second temperature threshold.

According to an embodiment of the present disclosure, in the cooling mode, the adjusting a temperature of the battery according to the required power and the actual power specifically includes: determining whether the required power is greater than the actual power; obtaining a power difference between the required power and the actual power if the required power is greater than the actual power, and increasing, according to the power difference, a power of a compressor used for cooling the battery; and reducing the power of the compressor or keeping the power of the compressor unchanged if the required power is less than or equal to the actual power.

According to an embodiment of the present disclosure, in the heating mode, the adjusting a temperature of the battery according to the required power and the actual power specifically includes: determining whether the required power is greater than the actual power; obtaining a temperature difference between the required power and the actual power if the required power is greater than the actual power, and increasing, according to the temperature difference, a power of a heater used for heating the battery; and keeping the power of the heater unchanged if the required power is less than or equal to the actual power.

According to an embodiment of the present disclosure, the foregoing temperature adjustment method for a vehicle-mounted battery further includes: reducing a rotational speed of a water pump if the required power is less than the actual power; and increasing the rotational speed of the water pump if the required power is greater than the actual power.

According to an embodiment of the present disclosure, the obtaining an actual power of the battery specifically includes: obtaining an inlet temperature and an outlet temperature of a flow path used for adjusting the temperature of the battery, and obtaining a flow velocity at which a cooling liquid flows into the flow path; generating a second temperature difference according to the inlet temperature and the outlet temperature; and generating the actual power according to the second temperature difference and the flow velocity.

According to an embodiment of the present disclosure, there are a plurality of compressors used for providing a refrigerant to the battery, and the method further includes: determining a quantity of to-be-started compressors according to the required power and a rated refrigerating power of each compressor; and controlling, in a cooling mode, a corresponding quantity of compressors to start.

According to an embodiment of the present disclosure, the determining a quantity of to-be-started compressors according to the required power and a rated refrigerating power of each compressor specifically includes: determining whether the required power of the battery is greater than a rated refrigerating power of a single compressor; and controlling, if the required power is greater than the rated refrigerating power of the single compressor, the plurality of compressors to start simultaneously.

To achieve the foregoing objective, an embodiment in another aspect of the present disclosure proposes a temperature adjustment system for a vehicle-mounted battery, including: a compressor; a condenser connected to the compressor; a battery cooling branch connected between the compressor and the condenser; and a battery temperature adjustment module connected to the battery cooling branch, and configured to obtain a required power and an actual power for performing temperature adjustment on a battery, and adjust a temperature of the battery according to the required power and the actual power.

The temperature adjustment system for a vehicle-mounted battery according to this embodiment of the present disclosure obtains, through the battery temperature adjustment module, the required power and the actual power for performing temperature adjustment on the battery, and adjusts the temperature of the battery according to the required power and the actual power. Therefore, the system may precisely control a temperature adjustment time of the battery, and the actual power of the battery is adjustable in real time, so that a heating power and a cooling power of the vehicle-mounted battery may be precisely controlled according to an actual status of the vehicle-mounted battery, thereby adjusting the temperature of the vehicle-mounted battery when the temperature is excessively high or excessively low, maintaining the temperature of the vehicle-mounted battery within a preset range, and avoiding a case of affecting performance of the vehicle-mounted battery because of the temperature.

Additionally, the temperature adjustment system for a vehicle-mounted battery according to the foregoing embodiment of the present disclosure may further have the following additional technical characteristics:

According to an embodiment of the present disclosure, the battery temperature adjustment module is specifically configured to: adjust a temperature of the battery within a target time according to the required power and the actual power, to reach a target temperature.

According to an embodiment of the present disclosure, the battery cooling branch includes a heat exchanger, and the heat exchanger is connected to the battery temperature adjustment module.

According to an embodiment of the present disclosure, the battery temperature adjustment module includes: a flow path for adjusting the temperature of the battery, where the flow path is disposed in the battery; and a water pump, a medium container, a heater, and a controller that are connected between the flow path and the heat exchanger, where the controller obtains the required power for performing temperature adjustment on the battery and the actual power of the battery, and adjusts the temperature of the battery according to the required power and the actual power.

According to an embodiment of the present disclosure, the battery temperature adjustment module further includes a first temperature sensor disposed on an inlet of the flow path, a second temperature sensor disposed on an outlet of the flow path, and a flow velocity sensor.

According to an embodiment of the present disclosure, the controller is configured to: obtain a first parameter when enabling temperature adjustment on the battery, and generate a first required power according to the first parameter;

obtain a second parameter when enabling temperature adjustment on the battery, and generate a second required power according to the second parameter; and generate the required power for temperature adjustment according to the first required power and the second required power.

According to an embodiment of the present disclosure, the controller is further configured to: detect the temperature of the battery; control, when the temperature of the battery is greater than a first temperature threshold, the temperature adjustment system to enter a cooling mode; and control, when the temperature of the battery is less than a second temperature threshold, the temperature adjustment system to enter a heating mode.

According to an embodiment of the present disclosure, the controller generates a second temperature difference according to an inlet temperature detected by the first temperature sensor and an outlet temperature detected by the second temperature sensor, and generates the actual power according to the second temperature difference and a flow velocity that is detected by the flow velocity sensor.

According to an embodiment of the present disclosure, there are a plurality of compressors used for providing a refrigerant to the battery, there are a plurality of intra-vehicle cooling loops and a plurality of battery cooling branches, and the controller is further configured to: determine a quantity of to-be-started compressors according to the required power and a rated refrigerating power of each compressor; and control, when the temperature adjustment system is in a cooling mode, a corresponding quantity of compressors to start.

To achieve the foregoing objective, an embodiment in still another aspect of the present disclosure proposes a vehicle, including the temperature adjustment system for a vehicle-mounted battery according to the foregoing embodiment.

The vehicle according to this embodiment of the present disclosure may precisely control a temperature adjustment time of the battery, and the actual power of the battery is adjustable in real time, so that a heating power and a cooling power of the vehicle-mounted battery may be precisely controlled according to an actual status of the vehicle-mounted battery, thereby adjusting the temperature of the vehicle-mounted battery when the temperature is excessively high or excessively low, maintaining the temperature of the vehicle-mounted battery within a preset range, and avoiding a case of affecting performance of the vehicle-mounted battery because of the temperature.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
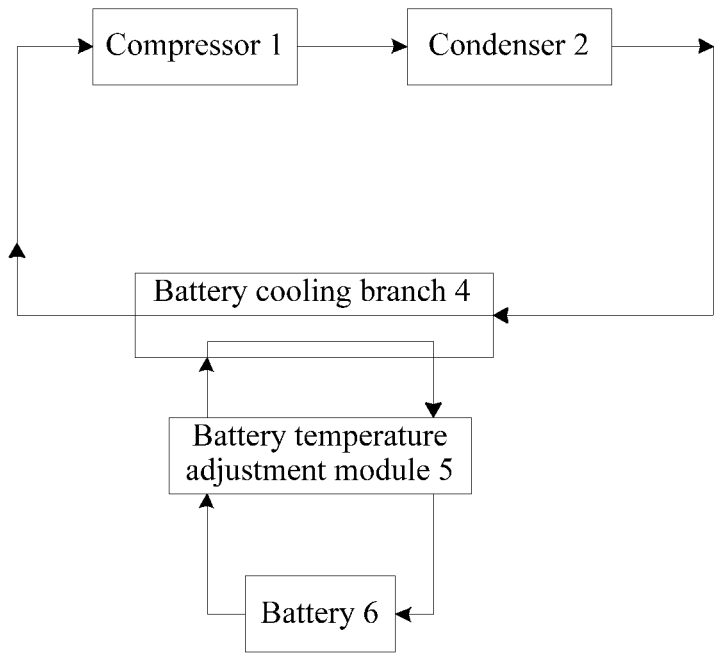
FIG. 1 is a schematic diagram 1 of a flow path structure of a temperature adjustment system for a vehicle-mounted battery according to a first embodiment of the present disclosure.

The following describes embodiments of the present disclosure in detail. Examples of the embodiments are shown in the accompanying drawings. The same or similar elements and the elements having same or similar functions are denoted by like reference numerals throughout the descriptions. The following embodiments described with reference to the accompanying drawings are exemplary, and are intended to describe the present disclosure and cannot be construed as a limitation to the present disclosure.

Figure 2:
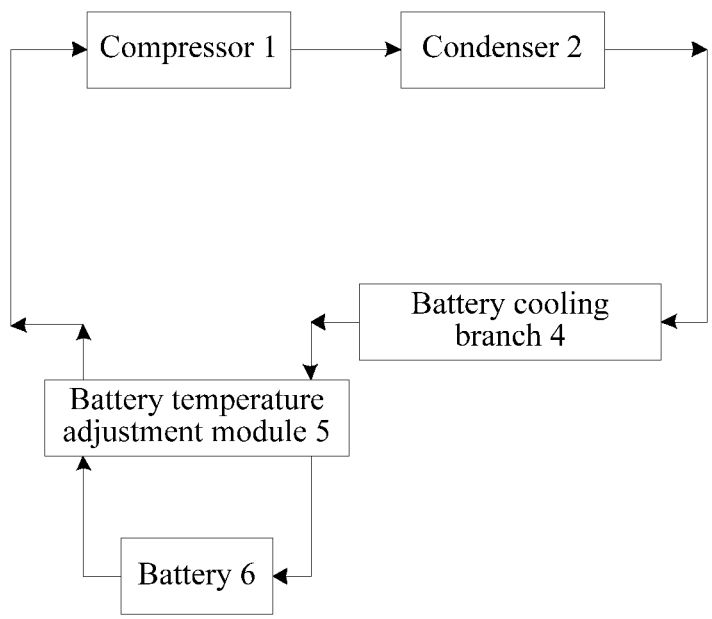
FIG. 2 is a schematic diagram 2 of a flow path structure of a temperature adjustment system for a vehicle-mounted battery according to a first embodiment of the present disclosure.

When a vehicle includes one battery, as shown in FIG. 1 and FIG. 2, a temperature adjustment system for a vehicle-mounted battery includes: a compressor 1, a condenser 2, a battery cooling branch 4, and a battery temperature adjustment module 5.

The condenser 2 is connected to the compressor 1, and the battery cooling branch 4 is connected between the compressor 1 and the condenser 2. The battery temperature adjustment module 5 is connected to the battery cooling branch 4, and configured to obtain a required power P1 and an actual power P2 for performing temperature adjustment on a battery 6, and adjust a temperature of the battery 6 according to the required power P1 and the actual power P2. The compressor 1 and the condenser 2 form a refrigerating branch.

Specifically, the required power P1 is a temperature adjustment power required by the battery when a temperature of the battery is adjusted to a target temperature. The actual power P2 is a temperature adjustment power actually obtained by the battery when temperature adjustment is currently performed on the battery. The target temperature is a set value, and may be preset according to an actual situation of the vehicle-mounted battery. For example, in winter, the outdoor ambient temperature is quite low, the battery needs to be heated, and the target temperature may be set to approximately 10° C.; in summer, the battery needs to be cooled, and the target temperature may be set to approximately 35° C. The battery temperature adjustment module 5 obtains the required power P1 of the battery 6 and the actual power P2 of the battery 6, and adjusts a power of the compressor 1 and a power of a heater according to the required power P1 and the actual power P2 to adjust the temperature of the battery 6. As shown in FIG. 1, when a cooling liquid of an air conditioner does not access the battery temperature adjustment module 5, the battery cooling branch 4 has two ducts, a first duct is in communication with the compressor 1, and a second duct is in communication with the battery temperature adjustment module 5, where the first duct and the second duct are adjacently disposed independent of each other, so that mediums (flowing mediums such as cooling mediums, water, oil, and air, or mediums such as phase change materials, or other chemical products) are independent of each other. When the temperature of the battery 6 is excessively high, a refrigerating function of the vehicle-mounted air conditioner is turned on, a battery cooling function is started, and flowing directions of the cooling liquid (for example, a cooling medium) in the first duct and the second duct are respectively: the compressor 1—the condenser 2—the battery cooling branch 4—the compressor 1; and the battery cooling branch 4—the battery temperature adjustment module 5—the battery 6—the battery temperature adjustment module 5—the battery cooling branch 4.

As shown in FIG. 2, when the cooling liquid of the air conditioner accesses the battery temperature adjustment module 5, a flowing direction of the cooling liquid is: the compressor 1—the condenser 2—the battery cooling branch 4—the battery temperature adjustment module 5—the battery 6—the battery temperature adjustment module 5—the compressor 1.

Figure 3:
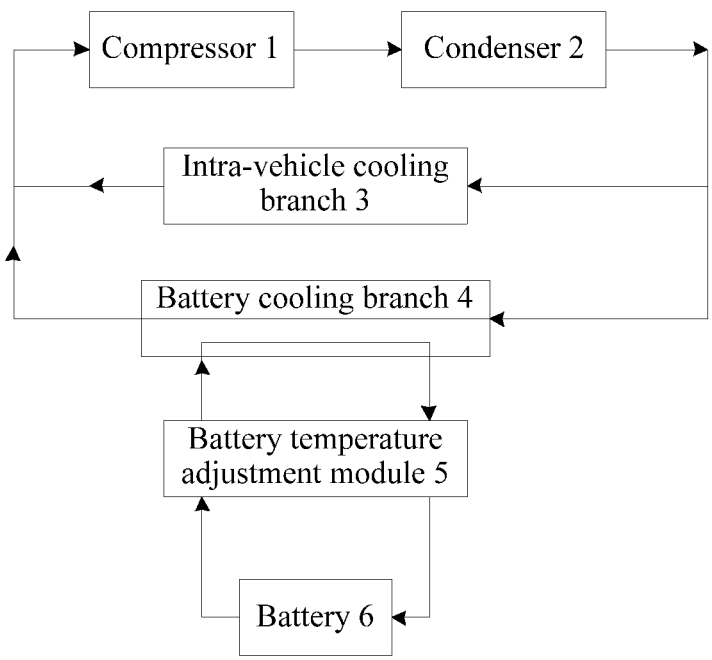
FIG. 3 is a schematic diagram of a flow path structure of a temperature adjustment system for a vehicle-mounted battery according to a second embodiment of the present disclosure.

In the foregoing two embodiments, the vehicle-mounted air conditioner is only used for cooling and heating the battery 6, and the temperature adjustment system may also cool both a compartment and the battery 6 through the vehicle-mounted air conditioner. When the system cools both the compartment and the battery 6 through the vehicle-mounted air conditioner, as shown in FIG. 3, the temperature adjustment system may further include an intra-vehicle cooling branch 3, and the intra-vehicle cooling branch 3 is connected between the compressor 1 and the condenser 2.

When the intra-vehicle temperature is excessively high, an intra-vehicle cooling function is started, a flowing direction of the cooling liquid is: the compressor 1—the condenser 2—the intra-vehicle cooling branch 3—the compressor 1. When the temperature of the battery 6 is excessively high, a battery cooling function is started, and flowing directions of the cooling liquid in the first duct and the second duct are: the compressor 1—the condenser 2—the battery cooling branch 4—the compressor 1; and the battery cooling branch 4—the battery temperature adjustment module 5—the battery 6—the battery temperature adjustment module 5—the battery cooling branch 4. Therefore, the heating power and the cooling power of the vehicle-mounted battery may be precisely controlled according to an actual status of the battery, thereby adjusting the temperature of the vehicle-mounted battery when the temperature is excessively high or excessively low, maintaining the temperature of the vehicle-mounted battery within a preset range, and avoiding a case of affecting performance of the vehicle-mounted battery because of the temperature; and when the temperature of the battery satisfies a requirement, the intra-vehicle temperature may further satisfy a requirement.

Figure 4:
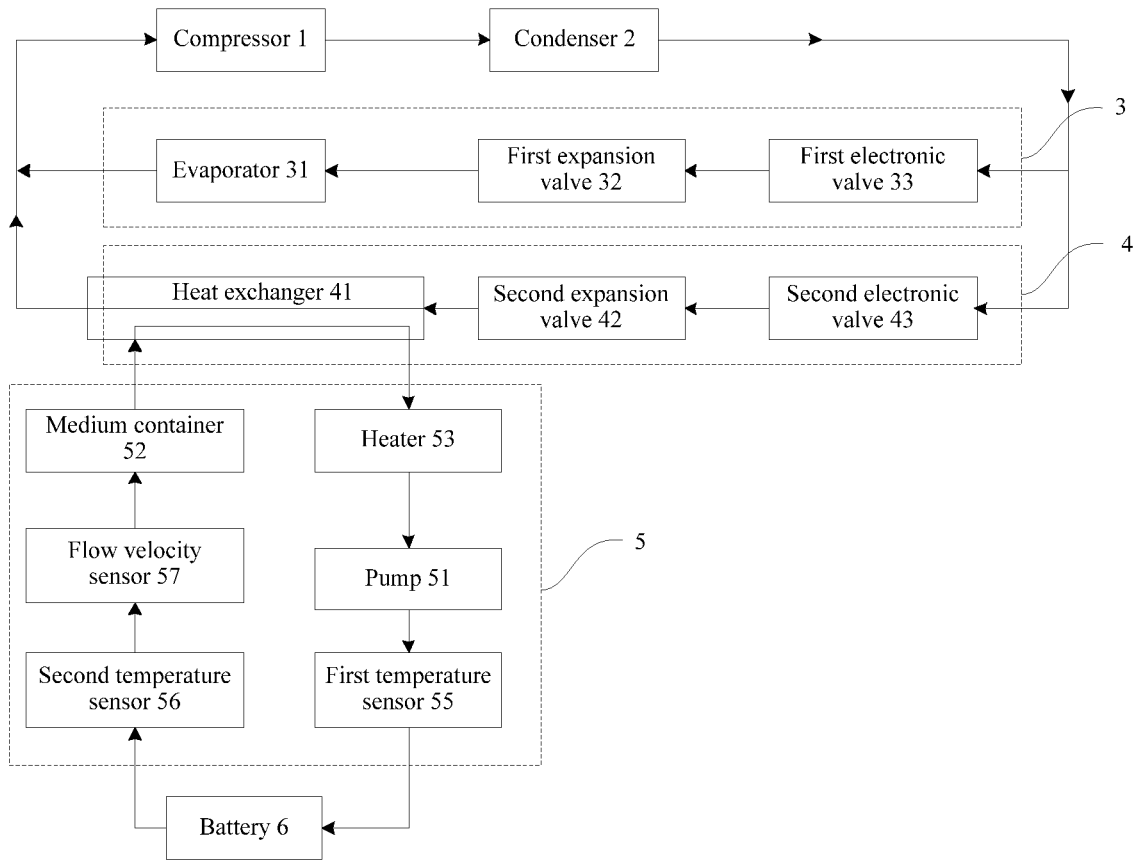
FIG. 4 is a schematic diagram of a flow path structure of a temperature adjustment system for a vehicle-mounted battery according to a third embodiment of the present disclosure.

Optionally, according to an embodiment of the present disclosure, as shown in FIG. 4, a battery cooling branch 4 may include a heat exchanger 41, the heat exchanger 41 includes a first duct and a second duct, the second duct is connected to a battery temperature adjustment module 5, and the first duct is in communication with a compressor 1, where the first duct and the second duct are adjacently disposed independent of each other. In this embodiment of the present disclosure, a physical location of the heat exchanger 41 may be on a loop in which the compressor 1 of a vehicle-mounted air conditioner is located, to facilitate pre-delivery commissioning of the vehicle-mounted air conditioner, and the vehicle-mounted air conditioner may be individually supplied and assembled. Moreover, the vehicle-mounted air conditioner only needs to be filled with a medium once in an installing process. The physical location of the heat exchanger 41 may alternatively be on a loop in which a battery 6 is located, and the physical location of the heat exchanger 41 may alternatively be disposed independent of the loop in which the compressor 1 of the vehicle-mounted air conditioner is located and the loop in which the battery 6 is located.

As shown in FIG. 4, the battery temperature adjustment module 5 may include: a flow path of adjusting the temperature of the battery (not specifically shown in the figure), where the flow path is disposed in the battery 6; and a pump 51, a medium container 52, a heater 53, and a controller (not specifically shown in the figure) that are connected between the flow path and the heat exchanger 41. The controller obtains a required power P1 and an actual power P2 for performing temperature adjustment on the battery 6, and adjusts the temperature of the battery 6 according to the required power P1 and the actual power P2. The intra-vehicle cooling branch 3 may include: an evaporator 31, a first expansion valve 32, and a first electronic valve 33. The battery cooling branch 4 may further include a second expansion valve 42 and a second electronic valve 43.

It may be understood that, the battery cooling branch 4 may alternatively be not provided with the heat exchanger 41, and a cooling medium flows in the battery cooling branch 4 without the heat exchanger 41. If the battery cooling branch 4 is provided with the heat exchanger 41, a cooling medium flows in the first duct of the battery cooling branch 4, a cooling liquid flows in the second duct, and a cooling medium flows in the intra-vehicle cooling branch 3.

According to an implementation example of the present disclosure, as shown in FIG. 4, the battery temperature adjustment module 5 further includes a first temperature sensor 55 disposed on an inlet of the flow path, a second temperature sensor 56 disposed on an outlet of the flow path, and a flow velocity sensor 57. It may be understood that, locations of the inlet and the outlet of the flow path are not absolute, but are determined according to steering of the pump 51.

Figure 5:
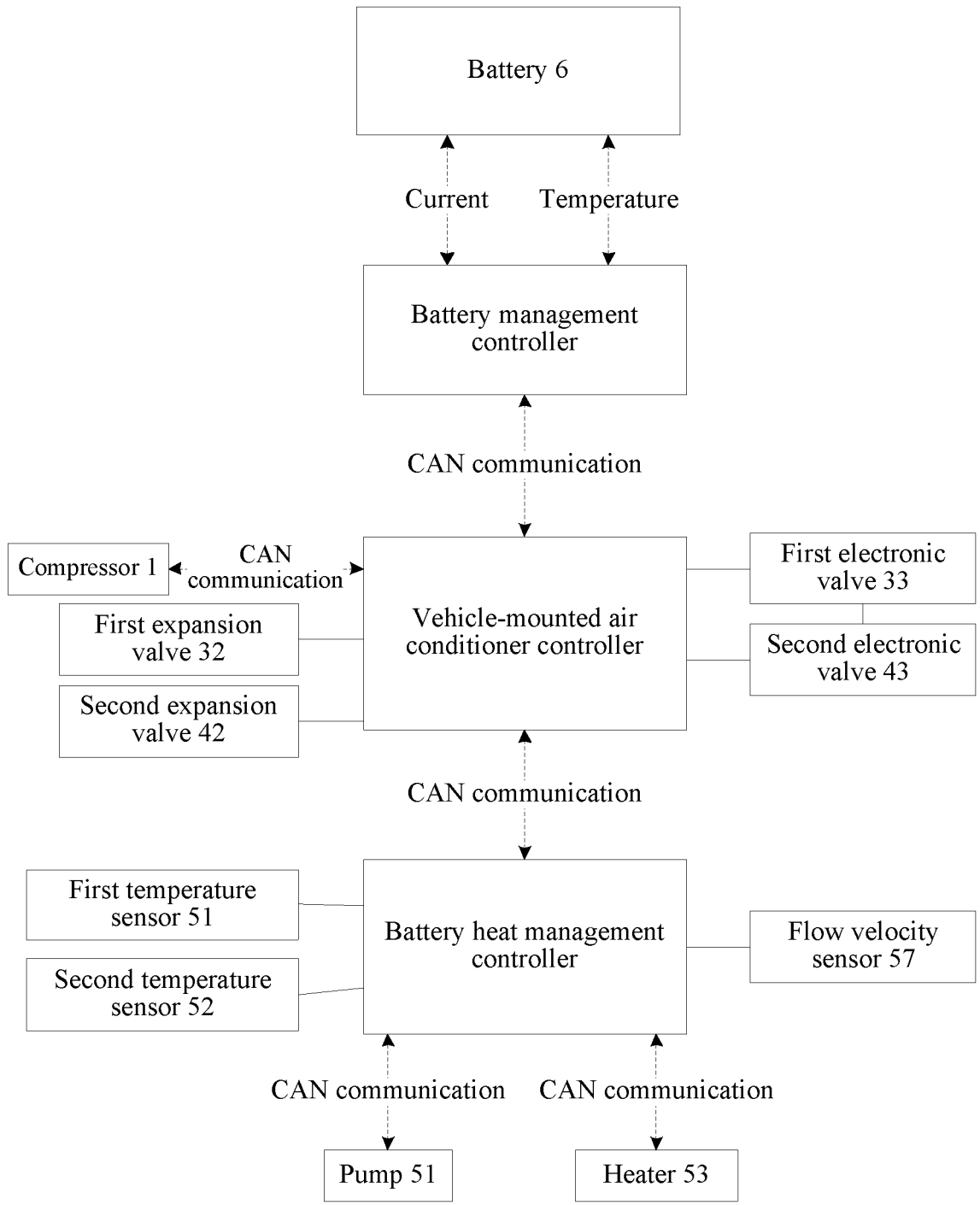
FIG. 5 is a schematic diagram of an operating principle of a controller according to an embodiment of the present disclosure.

Specifically, as shown in FIG. 5, controllers may include a battery management controller, a battery heat management controller, and a vehicle-mounted air conditioner controller. The battery heat management controller may be electrically connected to a first temperature sensor 51, a second temperature sensor 52, and a flow velocity sensor 57, and perform CAN communication with a pump 51 and a heater 53; and obtain an actual power P2 according to a specific heat capacity of a medium, a density of the medium, and a cross-sectional area of a flow path, and control a rotational speed of the pump 51 and a power of the heater 53. The battery management controller collects a current flowing through a battery and a temperature of the battery, obtains a required power P1 according to a target temperature of the battery, a target time t, a specific heat capacity C of the battery, a mass M of the battery, and an internal resistance R of the battery, and controls the vehicle-mounted air conditioner controller to start or stop operating. The vehicle-mounted air conditioner controller is electrically connected to expansion valves and electronic valves, and the vehicle-mounted air conditioner controller may perform CAN communication with the battery management controller, the battery heat management controller, and a compressor 1, to control a power P of the compressor, and on/off of the expansion valves and the electronic valves according to the required power P1 obtained by the battery management controller and the actual power P2 obtained by the battery heat management controller, thereby controlling a heat exchange amount.

It should be understood that, the battery management controller may include, for example, a DSP chip having a battery management function. The battery heat management controller may include, for example, a DSP chip having a battery heat management function. The vehicle-mounted air conditioner controller may include, for example, a vehicle-mounted air conditioner DSP chip.

The heat exchanger 41 may be a plate heat exchanger, and the plate heat exchanger may be installed in the vehicle-mounted air conditioner, so that the entire refrigerant loop is in the vehicle-mounted air conditioner, to facilitate pre-delivery commissioning of the vehicle-mounted air conditioner; and the vehicle-mounted air conditioner may be individually supplied and assembled, and moreover, the vehicle-mounted air conditioner only needs to be filled with the refrigerant once in an installing process.

The cooling liquid flows into the battery 6 from the inlet of the flow path, and flows out from the outlet of the flow path, thereby implementing heat exchange between the battery 6 and the cooling liquid.

The pump 51 is mainly used for providing power, and the medium container 52 is mainly used for storing the cooling liquid and receiving the cooling liquid added to the temperature adjustment system. When the cooling liquid in the temperature adjustment system is reduced, the cooling liquid in the medium container 52 may be automatically supplemented. The heater 53 may be a positive temperature coefficient (PTC) heater, generally referring to a semiconductor material or component whose positive temperature coefficient is quite large, may perform controller area network (CAN) communication with the controller, to provide a heating power to the temperature adjustment system for a vehicle-mounted battery, and is controlled by the controller, and the heater 53 may be disposed on any location between the medium container 52 and the first temperature sensor 55. That is to say, the heater 53 is not in direct contact with the battery 6, to have relatively high safety, reliability, and practicability.

The first temperature sensor 55 is used for detecting the temperature of the cooling liquid on the inlet of the flow path, and the second temperature sensor 56 is used for detecting the temperature of the cooling liquid on the outlet of the flow path. The flow velocity sensor 57 is used for detecting flow velocity information of the cooling liquid in the duct of the temperature adjustment system. The first electronic valve 33 is used for controlling opening and closing of the intra-vehicle cooling branch 3, and the first expansion valve 32 may be used for controlling the flow of the cooling liquid in the intra-vehicle cooling branch 3. The second electronic valve 43 is used for controlling opening and closing of the battery cooling branch 4, and the second expansion valve 42 may be used for controlling the flow of the cooling liquid in the battery cooling branch 4.

It may be understood that, as shown in FIG. 2, when the cooling liquid of the air conditioner accesses the battery temperature adjustment module 5, the heat exchanger 41, the pump 51, and the medium container 52 do not need to be disposed. Such a manner in which the loop of the vehicle-mounted air conditioner is in communication with the battery cooling branch 4 may improve cooling efficiency, to avoid a problem of incomplete heat exchange at the heat exchanger 41, that is, completely eradicate a heat exchange loss caused due to heat exchange efficiency of the heat exchanger. In the manner in which the loop of the vehicle-mounted air conditioner and the cooling liquid of the battery cooling branch are independent of each other, only after heat exchange efficiency of the heat exchanger 41 and the like is considered, the power of the compressor in the loop of the vehicle-mounted air conditioner is the actual power, of the compressor, used for cooling the battery, and the subsequently described power P of the compressor herein, used for cooling the battery (it may be understood that, a maximum (or rated) refrigerating power of the subsequently described compressor is a maximum (or rated) power of the compressor multiplied by the heat exchange efficiency). The heat exchange efficiency may be a set fixed value, and be measured after the entire system is built; or may be obtained in real time. An actual heat exchange power may be known by adding temperature sensors before and after the heat exchanger and adding a flow velocity sensor on the loop in which the heat exchanger is located, and a ratio of the actual power P2 of the battery to the actual heat exchange power is the heat exchange efficiency.

How does the battery temperature adjustment module 5 obtain the required power P1 and the actual power P2 of the battery 6 is described below with reference to specific embodiments.

According to an embodiment of the present disclosure, the controller may be configured to: obtain a first parameter when enabling temperature adjustment on the battery, and generate a first required power of the battery according to the first parameter; obtain a second parameter when enabling temperature adjustment on the battery, and generate a second required power of the battery according to the second parameter; and generate the required power P1 of the battery according to the first required power of the battery and the second required power of the battery.

Optionally, according to an embodiment of the present disclosure, the first parameter is an initial temperature when enabling temperature adjustment on the battery 6, the target temperature, and the target time t for reaching the target temperature from the initial temperature, and the controller obtains a first temperature difference $\Delta T_1$ between the initial temperature and the target temperature, and generates the first required power according to the first temperature difference $\Delta T_1$ and the target time t.

Optionally, the controller generates the first required power through the following formula (1):

$$\Delta T_1 * C * M / t \quad (1)$$

where $\Delta T_1$ is the first temperature difference between the initial temperature and the target temperature, t is the target time, C is a specific heat capacity of the battery 6, and M is a mass of the battery 6.

The second parameter is an average current I of the battery 6 within a preset time, and the controller generates the second required power through the following formula (2):

$$I^2 * R \quad (2)$$

where I is the average current, and R is an internal resistance of the battery 6.

When the battery 6 is cooled, $P1 = \Delta T_1 * C * M / t + I^2 * R$; and when the battery 6 is heated, $P1 = \Delta T_1 * C * M / t - I^2 * R$.

According to an embodiment of the present disclosure, the controller generates a second temperature difference $\Delta T_2$ according to an inlet temperature detected by the first temperature sensor 55 and an outlet temperature detected by the second temperature sensor 56, and generates the actual power P2 of each battery according to the second temperature difference $\Delta T_2$ of the battery and a flow velocity v that is detected by the flow velocity sensor 57.

Optionally, according to an embodiment of the present disclosure, the actual power P2 is generated through the following formula (3):

$$\Delta T_2 * c * m \quad (3)$$

where $\Delta T_2$ is the second temperature difference, c is a specific heat capacity of the cooling liquid in the flow path, and m is a mass of the cooling liquid flowing through a cross section of the flow path within a unit time, where $m = v * s * \rho$, s is a cross-sectional area of the flow path, v is a flow velocity of the cooling liquid, and $\rho$ is a density of the cooling liquid.

Additionally, the flow velocity sensor may alternatively be replaced with a flow sensor, where $m = Q * \rho$, and Q is a flow, measured by the flow sensor, of the cooling liquid flowing through a cross section of the flow path within a unit time.

Specifically, after the vehicle is powered on, the battery management controller determines whether temperature adjustment needs to be performed on the vehicle. If it is determined that temperature adjustment needs to be performed on the vehicle, for example, the temperature of the battery 6 is excessively high, the battery management controller sends information about enabling a temperature adjustment function to the vehicle-mounted air conditioner controller through CAN communication. After enabling the temperature adjustment function, the vehicle-mounted air conditioner controller sends heat exchange information to the battery heat management controller. Moreover, the vehicle-mounted air conditioner controller controls the second electronic valve 43 to be turned on, and the battery heat management controller controls the pump 51 to begin operating at a default rotational speed (for example, a low rotational speed).

Moreover, the battery management controller obtains the initial temperature (that is, current temperature) of the battery 6, the target temperature, and the target time t for reaching the target temperature from the initial temperature, where the target temperature and the target time t may be preset according to an actual situation, and the first required power of the battery is calculated according to the formula (1). The battery management controller further obtains the average current I of the battery 6 within the preset time, and the second required power of the battery is calculated according to the formula (2). Then, the battery management controller calculates the required power P1 (that is, the required power for adjusting the temperature of the battery 6 to the target temperature within the target time) according to the first required power and the second required power of the battery 6, where when the battery 6 is cooled, $P1=\Delta T_1*C*M/t+I^2*R$; and when the battery 6 is heated, $P1=\Delta T_1*C*M/t-I^2*R$.

Moreover, the battery heat management controller obtains temperature information detected by the first temperature sensor 55 and the second temperature sensor 56, and obtains flow velocity information detected by the flow velocity sensor 57, and the actual power P2 of the battery 6 is calculated according to the formula (3).

Finally, the vehicle-mounted air conditioner controller controls an output power of the compressor and an opening degree of the second expansion valve 42 according to the required power P1 and the actual power P2 of the battery 6, and the battery heat management controller optionally adjusts the rotational speed of the pump 51. For example, if the required power P1 is greater than the actual power P2, the power of the compressor and the opening degree of the second expansion valve 42 are increased according to a difference between the required power P1 and the actual power P2, and the rotational speed of the pump 51 is optionally increased; and if the required power P1 is less than the actual power P2, the power of the compressor and the opening degree of the second expansion valve 42 are reduced according to a difference between the required power P1 and the actual power P2, and the rotational speed of the pump 51 is optionally reduced.

For example, it can be known from the foregoing embodiment that, in different cases, the required power P1 may be calculated in different manners. When the battery 6 needs to be cooled, if the initial temperature of the battery 6 is 45° C., and the target temperature is 35° C., heat that needs to be dissipated when the battery is cooled from 45° C. to 35° C. is fixed, and may be directly calculated through the formula (1), that is, $\Delta T_1*C*M/t$, that is, the first required power. Moreover, a discharging and charging process exists in the cooling process of the battery 6, and this process generates heat. Because a discharging or charging current of the battery 6 is changed, this part of heat may alternatively be directly obtained by detecting the average current I of the battery, and the current heating power, that is, the second required power of the battery 6 is directly calculated through the formula (3), that is, $I^2*R$. A cooling completion time of the present disclosure is set based on the target time t (t may be changed according to a user requirement or an actual design situation of the vehicle). After the target time t required for cooling completion is determined, the current required power P1 required for cooling the battery 6 may be predicted, that is, $P1=\Delta T_1*C*M/t+I^2*R$. If the heating function is started, the required power $P1=\Delta T_1*C*M/t-I^2*R$, that is, when the battery 6 is in a heating process, a larger discharging or charging current of the battery 6 indicates a smaller required heating power, that is, required power P1.

How to adjust the temperature of each battery 6 according to the required power P1 and the actual power P2 of the battery 6 is described below with reference to specific embodiments.

According to an embodiment of the present disclosure, the controller is further configured to: detect the temperature of the battery; control, when the temperature of the battery is greater than a first temperature threshold, the temperature adjustment system to enter a cooling mode; and control, when the temperature of the battery is less than a second temperature threshold, the temperature adjustment system to enter a heating mode. The first temperature threshold and the second temperature threshold may be preset according to an actual situation, and the first temperature threshold is usually greater than the second temperature threshold. For example, the first temperature threshold may be 40° C., and the second temperature threshold may be 0° C.

Specifically, after the vehicle is powered on, the battery management controller detects the temperature of the battery 6 in real time, and performs determining. If the temperature of the battery 6 is higher than 40° C., it indicates that the temperature of the battery 6 is excessively high in this case. To prevent the high temperature from affecting performance of the battery 6, temperature reduction processing needs to be performed on the battery 6, the temperature adjustment system is controlled to enter a cooling mode, and information about starting the battery cooling function is sent to the vehicle-mounted air conditioner controller. After receiving the information about starting the battery cooling function, the vehicle-mounted air conditioner controller controls the second electronic valve 43 to be turned on, so that the cooling liquid performs heat exchange with the battery 6 to reduce the temperature of the battery 6. As shown in FIG. 4, when the temperature adjustment system operates in the cooling mode, flowing directions of the cooling liquid in the corresponding first duct and second duct in the loop in which the battery 6 is located are respectively: the compressor 1—the condenser 2—the second electronic valve 43—the second expansion valve 42—the heat exchanger 41—the compressor 1; and the medium container 52—the heat exchanger 41—the heater 53 (turned off)—the pump 51—the first temperature sensor 55—the battery 6—the second temperature sensor 56—the flow velocity sensor 57—the medium container 52; and cycling is performed in this way, and heat is exchanged at the heat exchanger 41, to implement temperature reduction on the battery 6.

If the temperature of the battery 6 is less than 0° C., it indicates that the temperature of the battery 6 is excessively low in this case. To prevent the low temperature from affecting performance of the battery 6, temperature increase processing needs to be performed on the battery 6, the battery management controller controls the temperature adjustment system to enter a heating mode, and sends information about starting a battery heating function to the vehicle-mounted air conditioner controller. After receiving the information about starting the battery heating function, the vehicle-mounted air conditioner controller controls the second electronic valve 43 to be turned off, and moreover the battery heat management controller controls the heater 53 to be turned on, to provide a heating power to the temperature adjustment system. When the temperature adjustment system operates in the heating mode, a flowing direction of the cooling liquid is: the medium container 52—the heat exchanger 41—the heater 53 (turned on)—the pump 51—the first temperature sensor 55—the battery 6—the second temperature sensor 56—the flow velocity sensor 57—the medium container 52; and cycling is performed in this way, to implement temperature increase on the battery 6.

According to an embodiment of the present disclosure, when the temperature adjustment system operates in the cooling mode and the required power P1 of the battery 6 is greater than the actual power P2 corresponding to the battery, the controller obtains a power difference between the required power P1 and the actual power P2 for performing temperature adjustment on the battery, and increases, according to the power difference, the power of the compressor used for cooling the battery 6 or the flow of the cooling liquid of the battery 6, to increase the cooling power of the battery 6; and when the required power P1 of the battery 6 is less than or equal to the actual power P2, the controller reduces the power of the compressor or keeps the power of the compressor unchanged, or performs adjustment to reduce the flow of the cooling liquid of the battery, to reduce the cooling power of the battery 6.

Specifically, when the temperature adjustment system operates in the cooling mode, the battery management controller obtains the required power P1 of the battery, the battery heat management controller obtains the actual power P2 of the battery, and the vehicle-mounted air conditioner controller performs determining according to the required power P1 and the actual power P2. If the required power P1 of the battery 6 is greater than the actual power P2, it indicates that the temperature reduction on the battery 6 cannot be completed within the target time according to the current refrigerating power or flow of the cooling liquid. Therefore, the vehicle-mounted air conditioner controller obtains a power difference between the required power P1 of the battery and the actual power P2, and increases, according to the power difference, the power of the compressor 1 or the flow of the cooling liquid of the battery, that is, increases the opening degree of the second expansion valve 42, to increase the cooling power of the battery, where a larger power difference between the required power P1 for temperature adjustment and the actual power P2 indicates larger increase of the power of the compressor 1 and the flow of the cooling liquid of the battery, so that the temperature of the battery is reduced to the target temperature within the preset time t. If the required power P1 for temperature adjustment on the battery 6 is less than or equal to the actual power P2, the vehicle-mounted air conditioner controller may keep the power of the compressor 1 unchanged or properly reduce the power of the compressor 1, or reduce the flow of the cooling liquid of the battery, that is, reduce the opening degree of the second expansion valve 42, to reduce the cooling power of the battery. When the temperature of the battery 6 is less than 35° C., cooling on the battery 6 is completed, the battery management controller sends information about turning off a temperature adjustment function to the vehicle-mounted air conditioner controller through CAN communication, and the vehicle-mounted air conditioner controller controls the second electronic valve 43 to be turned off. If the temperature of the battery 6 is still higher than 35° C. after the temperature adjustment system has entered the cooling mode for a relatively long time, for example, 1 hour, the vehicle-mounted air conditioner controller properly increases the power of the compressor 1, so that the battery completes temperature reduction as soon as possible.

According to an embodiment of the present disclosure, when the temperature adjustment system operates in the heating mode and the required power P1 of the battery is greater than the actual power P2, the controller obtains a power difference between the required power P1 and the actual power P2 of the battery, and increases, according to the power difference, the power of the heater 53 used for heating the battery or performs adjustment to increase the flow of the cooling liquid of the battery, to increase the heating power of the battery; and when the required power P1 of the battery is less than or equal to the actual power P2, the controller reduces the power of the heater 53 or keeps the power of the heater 53 unchanged, or performs adjustment to reduce the flow of the cooling liquid of the battery, to reduce the heating power of the battery.

Specifically, when the temperature adjustment system operates in the heating mode, the battery management controller obtains P1 of the battery, and the battery heat management controller obtains the actual power P2 of the battery. If the required power P1 of the battery 6 is greater than the actual power P2, it indicates that temperature increase on the battery 6 cannot be completed within the target time according to the current heating power or flow of the cooling liquid. Therefore, the battery heat management controller obtains a power difference between the required power P1 and the actual power P2 of the battery, and increases, according to the power difference, the power of the heater 53 used for heating the battery 6 or performs adjustment to increase the flow of the cooling liquid of the battery, for example, increases the rotational speed of the pump 51, so that temperature adjustment on the battery may be completed within the target time. A larger difference between the required power P1 and the actual power P2 indicates larger increase of the power of the heater 53 and the flow of the cooling liquid in the loop of the battery. If the required power P1 of the battery is less than or equal to the actual power P2, the battery heat management controller may properly reduce the power of the heater 53, or keep the power of the heater 53 unchanged, or perform adjustment to reduce the flow of the cooling liquid in the loop of the battery, to reduce the heating power of the battery. When the temperature of the battery 6 is higher than a preset temperature, for example, 10° C., heating on the battery 6 is completed, the battery management controller sends information about turning off a temperature adjustment function to the battery heat management controller through CAN communication, and the battery heat management controller controls the heater 53 to be turned off. If the temperature of the battery 6 is still lower than 10° C. after the temperature adjustment system has entered the heating mode for a relatively long time, for example, 1 hour, the battery heat management controller properly increases the power of the heater 53, so that the battery 6 completes temperature increase as soon as possible.

According to an embodiment of the present disclosure, the controller is further configured to reduce the rotational speed of the pump 51 or keep the rotational speed of the pump 51 unchanged when the required power P1 of the battery is less than or equal to the corresponding actual power P2, and increase the rotational speed of the pump 51 when the required power P1 of the battery is greater than the corresponding actual power P2.

Specifically, when the temperature adjustment system enters the heating mode or cooling mode, if the required power P1 of the battery 6 is less than the actual power P2, the controller controls the rotational speed of the pump 51 to be reduced, to save electric energy, or keeps the rotational speed of the pump 51 unchanged. If the required power P1 of the battery 6 is greater than the actual power P2, in addition to controlling the power of the heater 53 or the compressor 1 to be increased or the flow of the cooling liquid in the loop in which the battery is located to be increased, the controller is further configured to control the rotational speed of the pump 51 to be increased, to increase a mass of the cooling liquid flowing through a cross section of the cooling flow path within a unit time, thereby increasing the actual power P2 of the battery, to implement temperature adjustment within the target time t. If the required power P1 of the battery 6 is equal to the actual power P2, the rotational speed of the pump 51 is controlled to be kept unchanged at the current rotational speed.

In conclusion, when the temperature adjustment system operates in the cooling mode, if a sum of the required power P1 of the battery 6 and an intra-vehicle cooling required power P4 is less than a maximum refrigerating power P of the compressor, that is, P1+P4≤P, the vehicle-mounted air conditioner controller controls the compressor 1 to run according to the refrigerating power P1+P4. If P1+P4>P, the battery management controller determines whether the temperature of the battery 6 is greater than a set temperature (for example, 45° C.). If the temperature of the battery 6 is greater than 45° C., the cooling power is preferentially provided to the battery 6, the vehicle-mounted air conditioner controller controls the compressor 1 to run according to the maximum refrigerating power, and the vehicle-mounted air conditioner controller controls the opening degree of the first expansion valve 32 and the opening degree of the second expansion valve 42, so that the cooling power of the battery cooling branch 4 is equal to the required power P1 of the battery, and the power P4 of the intra-vehicle cooling branch is equal to P minus P1. If it is determined that the temperature of the battery is not greater than 45° C., and the intra-vehicle temperature has not reached the set temperature, the cooling power is preferentially provided to the inside of the vehicle, the compressor 1 is controlled to run according to the maximum refrigerating power, the cooling power of the intra-vehicle cooling branch 3 is P4, and the cooling power of the battery cooling branch 4 is P-P4. If the intra-vehicle temperature has reached the set temperature, cooling of the battery 6 is preferentially satisfied.

When P1 of the battery 6 is greater than P2, and a power of the battery 6 that needs to be adjusted is P3 (P3=P1−P2), if P1+P4+P3≤P, the compressor 1 needs to add a refrigerating power of P3, and P1 may be equal to P2 by increasing the opening degree of the second expansion valve 42 and/or increasing the rotational speed of the pump 51. If P1+P4+P3>P, the battery management controller determines whether the temperature of the battery is greater than a set temperature, for example, the set temperature may be 45° C. If the temperature of the battery is greater than 45° C., the cooling power is preferentially provided to the battery 6, the vehicle-mounted air conditioner controller controls the compressor 1 to run according to the maximum refrigerating power, to increase the cooling power of the battery cooling branch 4 by P3 by adjusting the opening degree of the first expansion valve 32 and the opening degree of the second expansion valve 42, so that P1=P2, and the cooling power of the intra-vehicle cooling branch 3 is reduced. If it is determined that the temperature of the battery is not greater than 45° C., and the intra-vehicle temperature has not reached the set temperature, the cooling power is preferentially provided to the inside of the vehicle, the compressor 1 is controlled to run according to the maximum refrigerating power, the cooling power of the intra-vehicle cooling branch 3 is P4, and the cooling power of the battery cooling branch 4 is P−P4. If the intra-vehicle temperature has reached the set temperature, cooling of the battery 6 is preferentially satisfied, and the cooling power of the battery cooling branch 4 is increased by P3.

If P1≤P2, the vehicle-mounted air conditioner controller maintains the power of the compressor unchanged, or reduces the power of the compressor, or reduces the opening degree of the second expansion valve 42, or reduces the rotational speed of the pump 51, so that the cooling power of the battery cooling branch 4 is reduced.

When the temperature adjustment system operates in the heating mode, a power difference between P1 and P2 is P3, that is, P1−P2=P3. If P1>P2, the battery heat management controller controls the heating power of the heater 53 to be increased by P3, and increases the rotational speed of the pump 51. If P1≤P2, the battery heat management controller may control the power of the heater 53 to be kept unchanged, or reduce the power of the heater 53 by P3, to save electric energy, or reduce the rotational speed of the pump 51.

If the temperature of the battery 6 is still higher than 35° C. after the cooling function has been turned on for the preset time, for example, 1 hour, the cooling power of the battery is increased. If the average temperature of the battery is still less than 10° C. after the heating function has been turned on for 1 hour, the battery heat management controller may properly increase the power of the heater 53.

If a single compressor 1 cannot satisfy the power required for cooling the battery 6, a plurality of compressors 1 may be set to provide the cooling power to the battery 6. For example, there are usually 4 compressors on a bus. In this case, the 4 compressors may be all used for providing the cooling power to the battery 6.

According to an embodiment of the present disclosure, there are a plurality of compressors 1 used for providing the refrigerant to the battery, there are a plurality of intra-vehicle cooling branches 3 and a plurality of battery cooling branches 4, and the controller is further configured to determine, according to the required power P1 of the battery and a maximum refrigerating power P of each compressor, a quantity of to-be-started compressors, and control, when the temperature adjustment system is in the cooling mode, the corresponding quantity of compressors 1 to start.

Specifically, when there are a plurality of compressors 1, correspondingly, there are a plurality of intra-vehicle cooling branches 3 and a plurality of battery cooling branches 4. For example, when there are two compressors 1 for providing the refrigerant to the battery 6, there are two intra-vehicle cooling branches 3 and two battery cooling branches 4, and the temperature adjustment system enters the cooling mode, the controller obtains the required power P1 of the battery 6. If the required power P1 of the battery 6 is less than or equal to the maximum refrigerating power of a single compressor 1, the controller controls one compressor 1 to start. If the required power P1 of the battery 6 is greater than the maximum refrigerating power of a single compressor 1, the controller controls two compressors 1 to start simultaneously and operate, to satisfy a temperature reduction refrigerating power requirement of the battery 6.

An operating principle in a case in which there are a plurality of compressors 1 is the same as the foregoing case in which there is one compressor 1. To avoid redundancy, details are not described herein again.

The temperature adjustment system for a vehicle-mounted battery according to this embodiment of the present disclosure may precisely control the heating power and the cooling power of the battery according to an actual status of the battery, and adjust the temperature of the battery when the temperature is excessively high or excessively low, so that the temperature of the battery is maintained within a preset range, to avoid a case of affecting performance of the vehicle-mounted battery because of the temperature.

Figure 6:
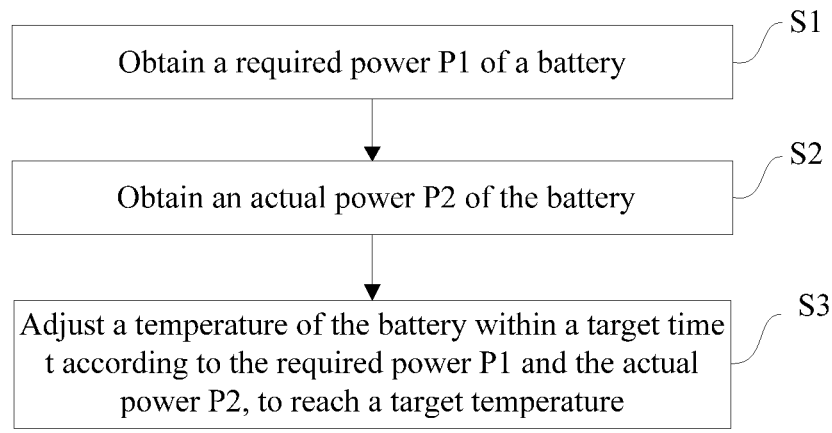
FIG. 6 is a flowchart of a temperature adjustment method for a vehicle-mounted battery according to a first embodiment of the present disclosure.

FIG. 6 is a flowchart of a temperature adjustment method for a vehicle-mounted battery according to a first embodiment of the present disclosure. As shown in FIG. 6, the temperature adjustment method for a vehicle-mounted battery includes the following steps:

S1. Obtain a required power P1 of a battery.

Figure 7:
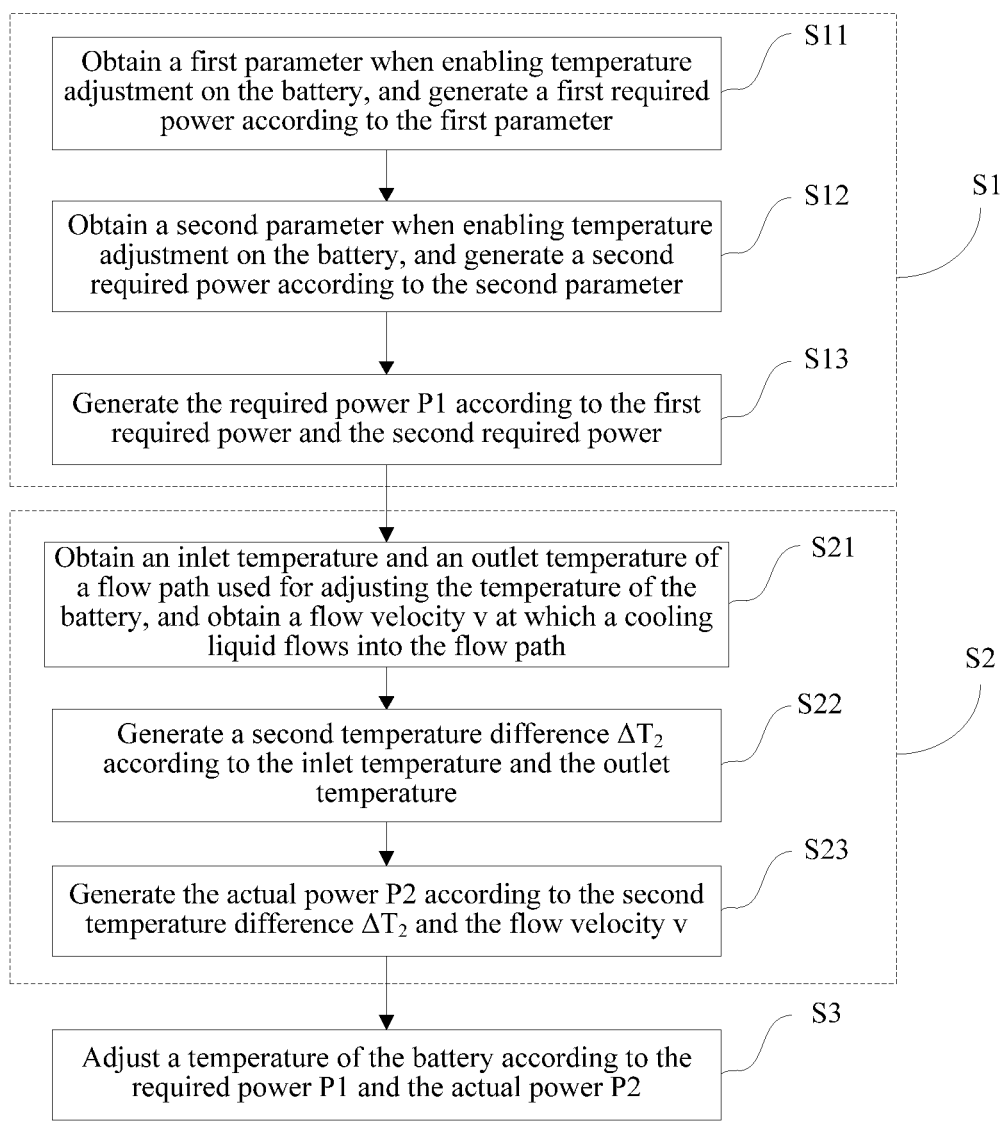
FIG. 7 is a flowchart of a temperature adjustment method for a vehicle-mounted battery according to a second embodiment of the present disclosure.

Optionally, as shown in FIG. 7, in this embodiment of the present disclosure, the obtaining a required power for performing temperature adjustment on a battery specifically includes the following steps:

S11. Obtain a first parameter when enabling temperature adjustment on the battery, and generate a first required power according to the first parameter.

S12. Obtain a second parameter when enabling temperature adjustment on the battery, and generate a second required power according to the second parameter.

S13. Generate the required power P1 according to the first required power and the second required power.

Optionally, according to an embodiment of the present disclosure, the first parameter is an initial temperature when enabling temperature adjustment on the battery, the target temperature, and a target time t for reaching the target temperature from the initial temperature, and the generating a first required power according to the first parameter specifically includes: obtaining a first temperature difference $\Delta T_1$ between the initial temperature and the target temperature; and generating the first required power P1 according to the first temperature difference $\Delta T_1$ and the target time t.

Optionally, according to an embodiment of the present disclosure, the first required power is generated through the following formula (1):

$$\Delta T_1 * C * M / t \quad (1)$$

where $\Delta T_1$ is the first temperature difference between the initial temperature and the target temperature, t is the target time, C is a specific heat capacity of the battery, and M is a mass of the battery.

According to an embodiment of the present disclosure, the second parameter is an average current I of the battery within a preset time, and the second required power is generated through the following formula (2):

$$I^2 * R \quad (2)$$

where I is the average current, and R is an internal resistance of the battery.

S2. Obtain an actual power P2 of the battery.

According to an embodiment of the present disclosure, as shown in FIG. 7, the obtaining an actual power for temperature adjustment on the battery specifically includes the following steps:

S21. Obtain an inlet temperature and an outlet temperature of a flow path used for adjusting the temperature of the battery, and obtain a flow velocity v at which a cooling liquid flows into the flow path.

S22. Generate a second temperature difference $\Delta T_2$ according to the inlet temperature and the outlet temperature.

S23. Generate the actual power P2 according to the second temperature difference $\Delta T_2$ and the flow velocity v.

Optionally, according to an embodiment of the present disclosure, the actual power P2 is generated through the following formula (3):

$$\Delta T_2 * C * m \quad (3)$$

where $\Delta T_2$ is the second temperature difference, C is a specific heat capacity of the battery, and m is a mass of the cooling liquid flowing through a cross section of the flow path within a unit time, where $m = v * \rho * s$, v is a flow velocity of the cooling liquid, $\rho$ is a density of the cooling liquid, and s is a cross-sectional area of the flow path.

Additionally, the flow velocity sensor may alternatively be replaced with a flow sensor, where $m = Q * \rho$, and Q is a flow, measured by the flow sensor, of the cooling liquid flowing through a cross section of the flow path within a unit time.

S3. Adjust a temperature of the battery according to the required power P1 and the actual power P2.

In this embodiment of the present disclosure, the temperature of the battery is adjusted within the target time according to the required power P1 and the actual power P2, to reach the target temperature.

Specifically, after the vehicle is powered on, it is determined, through a battery management controller, whether temperature adjustment needs to be performed on the battery, and when it is determined that temperature adjustment needs to be performed on the battery, the initial temperature (that is, current temperature) of the battery, the target temperature, and the target time t for reaching the target temperature from the initial temperature are obtained, where the target temperature and the target time t may be preset according to an actual situation of the vehicle-mounted battery, and then the first required power is calculated according to the formula (1). Moreover, the average current I of the battery within the preset time is obtained through the battery management controller, and the second required power is calculated according to the formula (2). Then, the required power P1 (that is, the required power for adjusting the temperature of the battery to the target temperature) is calculated according to the first required power and the second required power through the battery management controller. Moreover, an inlet temperature and an outlet temperature of the battery and flow velocity information are obtained through a battery heat management controller, and the actual power P2 is calculated according to the formula (3). Finally, a compressor is controlled according to the required power P1 and the actual power P2 through a vehicle-mounted air conditioner controller to run at a different power, or a heater is controlled through the battery heat management controller to run at a different power. Therefore, the control method may precisely control the time required for temperature adjustment on the battery, and the actual power for temperature adjustment on the battery is adjustable in real time, so that it may be ensured that the temperature adjustment on the vehicle-mounted battery is completed within the target time, thereby maintaining the temperature of the vehicle-mounted battery within a preset range, and avoiding a case of affecting performance of the vehicle-mounted battery because of the temperature.

Figure 8:
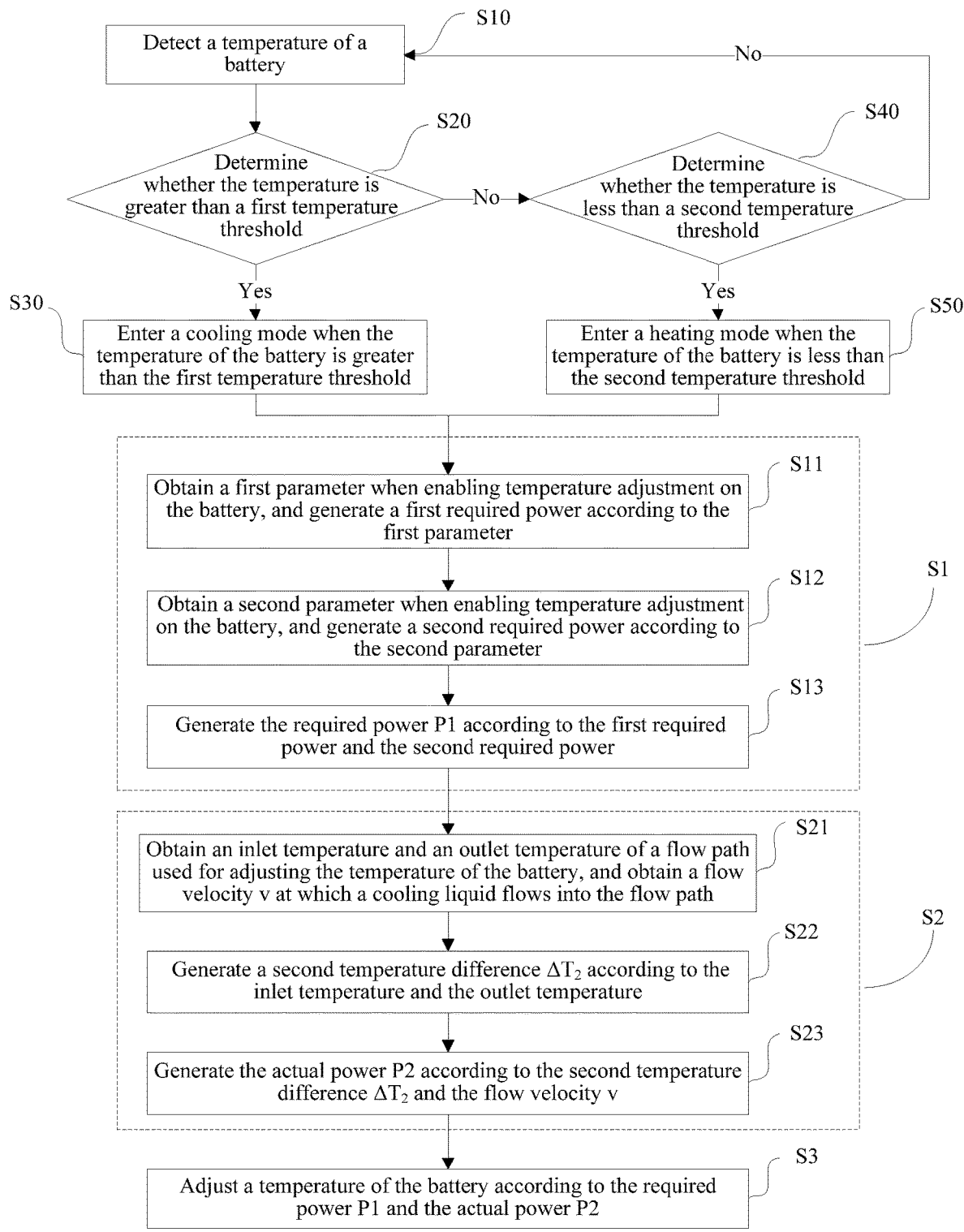
FIG. 8 is a flowchart of a temperature adjustment method for a vehicle-mounted battery according to a third embodiment of the present disclosure.

According to an embodiment of the present disclosure, as shown in FIG. 8, the foregoing temperature adjustment method for a vehicle-mounted battery may further include the following steps: Detect the temperature of the battery; and determine whether the temperature is greater than a first temperature threshold or is less than a second temperature threshold (S10 and S20). Enter a cooling mode when the temperature of the battery is greater than the first temperature threshold (S30). The first preset temperature threshold may be preset according to an actual situation, for example, may be 40° C. Further determine whether the temperature of the battery is less than the second temperature threshold when the temperature of the battery is less than or equal to the first temperature threshold; and enter a heating mode when the temperature of the battery is less than the second temperature threshold (S40 and S50). The second preset temperature threshold may be preset according to an actual situation, for example, may be 0° C.

Specifically, after the vehicle is powered on, the temperature of the battery is detected in real time and determining is performed through the battery management controller. If the temperature of the battery is higher than 40° C., it indicates that the temperature of the battery is excessively high in this case. To prevent the high temperature from affecting performance of the battery, temperature reduction processing needs to be performed on the battery, the temperature adjustment system is controlled through the battery management controller to enter the cooling mode, and the compressor is controlled through the vehicle-mounted air conditioner controller to start, so that the cooling liquid performs heat exchange with the battery to reduce the temperature of the battery. If the temperature of the battery is less than 0° C., it indicates that the temperature of the battery is excessively low in this case. To prevent the low temperature from affecting performance of the battery, temperature increase processing needs to be performed on the battery, the temperature adjustment system is controlled through the battery management controller to enter the heating mode, and the heater is controlled through the battery heat management controller to be turned on, to provide the heating power. It may be understood that, the performing temperature adjustment on the battery 6 according to the required power P1 and the actual power P2 of the battery may precisely control the time required for temperature adjustment on the battery, and P2 is adjustable in real time, so that it may be ensured that the temperature adjustment on the battery is completed within the target time t. Moreover, it is easy to obtain the required power P1 and the actual power P2.

It can be known from the foregoing embodiment that, P1 is formed by two parts. Using cooling on the battery as an example, when the battery needs to be cooled, if the initial temperature of the battery is 45° C., and the target temperature for cooling the battery is 35° C., heat that needs to be dissipated when the battery is cooled from 45° C. to 35° C. is fixed, and may be directly calculated through the formula (1), that is, $\Delta T_1 * C * M/t$, where $\Delta T_1$ is the first temperature difference between the initial temperature and the target temperature, t is the target time, C is a specific heat capacity of the battery, and M is a mass of the battery. Moreover, a discharging and charging process exists in the cooling process of the battery, and this process generates heat. This part of heat may alternatively be directly obtained by detecting the current, and the current heating power, that is, the second required power of the battery is directly calculated through the formula (3), that is, $I^2 * R$, where I is the average current, and R is an internal resistance of the battery. One of key points of the present disclosure is that the cooling time is adjustable, and a cooling completion time may be precisely determined, and is set based on the target time t (t may be changed according to a user requirement or an actual design situation of the vehicle) in the present disclosure. After the target time t required for cooling completion is determined, the current required power P1 required for cooling the battery may be predicted, that is, $P1=\Delta T_1 * C * M/t + I^2 * R$. If the heating function is started, the required power $P1=\Delta T_1 * C * M/t - I^2 * R$, that is, when the battery is in a heating process, a larger discharging or charging current of the battery indicates a smaller required heating power, that is, required power P1.

Because a discharging or charging current of the battery is changed, $I^2 * R$ is changed. Therefore, to better ensure accuracy of the cooling time, the cooling power also needs to change as the current average discharging or charging current of the battery changes. If the vehicle-mounted air conditioner cools the battery and the compartment simultaneously, when the discharging current of the battery is relatively small, $I^2 * R$ is reduced. In this case, the vehicle-mounted air conditioner may allocate more refrigerating power to the compartment, so that the compartment reaches a set air temperature more quickly. Moreover, when the discharging or charging current of the battery is relatively large, $I^2 * R$ is relatively large. In this case, the vehicle-mounted air conditioner may allocate more refrigerating power to the battery. Through such adjustment, the time required for cooling the battery is always accurate, and moreover the refrigerating power of the vehicle-mounted air conditioner may be used more efficiently and properly, so that it is unnecessary to configure an air conditioner having a relatively large cooling power, which causes waste of the refrigerating power.

The battery cooling time is affected by the cooling efficiency. The cooling efficiency is affected by an external ambient temperature and the current temperature of the battery, and efficiency of the temperature adjustment system is continuously changed in a battery cooling process. Therefore, the cooling efficiency cannot be 100%. As a result, the time required for cooling the battery cannot be accurately adjusted according to only the required power P1, and it is necessary to detect the actual power P2 of the battery. In the present disclosure, the actual power P2 of the battery may be calculated through the formula (3), that is, $\Delta T_2 * C * m$. P2 may alternatively be calculated through the actual cooling power P2 of the battery, that is, through the formula (4), that is, $\Delta T3 * C * m1$, where $\Delta T3$ is a temperature change of the battery within a period of time, C is a specific heat capacity of the battery, and m1 is a mass of the battery. However, because the mass of the battery is relatively large, a temperature change within a unit time is not evident, and a temperature difference can be detected in need of a relatively long time, which does not meet a real-time performance requirement. Therefore, the actual power P2 is usually calculated according to the formula (3).

Due to the effect of the cooling efficiency, it is quite difficult for the actual power P2 to be completely equal to the required power P1. To make the target time t for cooling the battery more accurate, adjustment needs to be performed in real time according to a power difference between the required power P1 and the actual power P2, to ensure that the required power P1 of the battery is equal to the actual power P2 of the battery.

How to adjust the temperature of the battery according to the required power P1 and the actual power P2 is described below with reference to specific embodiments.

Figure 9:
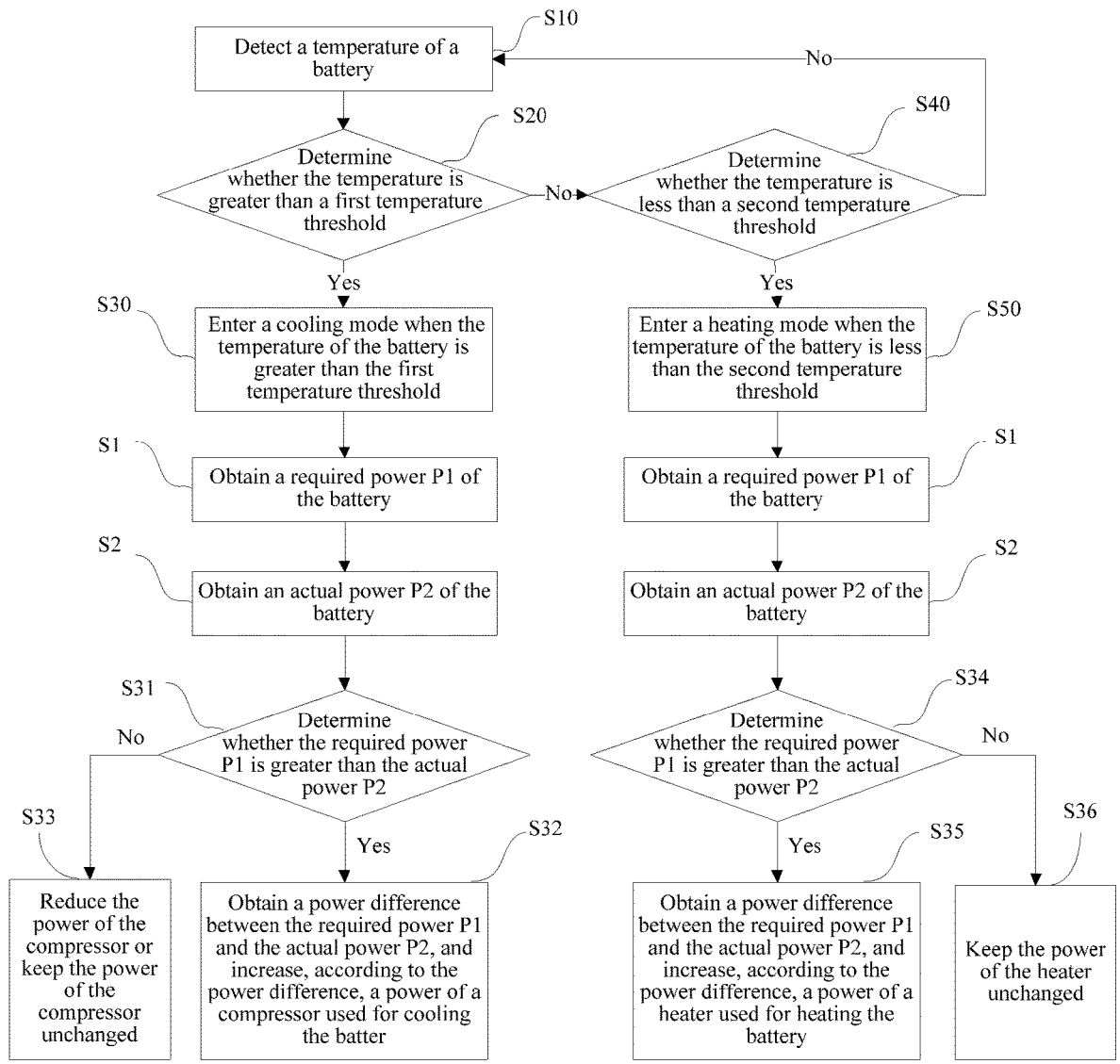
FIG. 9 is a flowchart of a temperature adjustment method for a vehicle-mounted battery according to a fourth embodiment of the present disclosure.

According to an embodiment of the present disclosure, when the temperature adjustment system enters the cooling mode, as shown in FIG. 9, the adjusting the temperature of the battery according to the required power P1 and the actual power P2 specifically includes the following steps:

S31. Determine whether the required power P1 is greater than the actual power P2.

S32. Obtain a power difference between the required power P1 and the actual power P2 if the required power P1 is greater than the actual power P2, and increase, according to the power difference, a power of a compressor used for cooling the battery.

S33. Reduce the power of the compressor or keep the power of the compressor unchanged if the required power for temperature adjustment is less than or equal to the actual power for temperature adjustment.

Specifically, when the temperature adjustment system enters the cooling mode, the power of the compressor 1 is adjusted according to the required power P1 and the actual power P2 through the vehicle-mounted air conditioner controller. If the required power P1 is greater than the actual power P2, it indicates that if the compressor runs according to the current power, the temperature of the battery cannot be reduced to the target temperature within the target time t. Therefore, a power difference between the required power P1 and the actual power P2 continues to be obtained, the power of the compressor is increased according to the power difference through the vehicle-mounted air conditioner controller, and a larger power difference between the required power P1 and the actual power P2 indicates larger increase of the power of the compressor, so that the temperature of the battery is reduced to the target temperature within the preset time. If the required power P1 is less than or equal to the actual power P2, the power of the compressor may be kept unchanged or be properly reduced. When the temperature of the battery is less than 35° C., cooling on the battery is completed, and information about turning off a temperature adjustment function is sent to the vehicle-mounted air conditioner controller through CAN communication. If the temperature of the battery is still higher than 35° C. after the temperature adjustment system has entered the cooling mode for a relatively long time, for example, 1 hour, the power of the compressor is properly increased through the vehicle-mounted air conditioner controller, so that the battery completes temperature reduction as soon as possible.

According to an embodiment of the present disclosure, as shown in FIG. 9, when the temperature adjustment system enters the heating mode, the adjusting the temperature of the battery according to the required power for temperature adjustment and the actual power for temperature adjustment specifically includes the following steps:

S34. Determine whether the required power P1 is greater than the actual power P2.

S35. Obtain a power difference between the required power P1 and the actual power P2 if the required power P1 is greater than the actual power P2, and increase, according to the power difference, a power of a heater used for heating the battery.

S36. Keep the power of the heater unchanged if the required power P1 is less than or equal to the actual power P2.

Specifically, when the temperature adjustment system enters the heating mode, the heater is controlled through the battery heat management controller to be turned on, and the power of the heater is adjusted according to the required power P1 and the actual power P2. If the required power P1 is greater than the actual power P2, it indicates that if the heater performs heating according to the current power, the temperature of the battery cannot be increased to the target temperature within the preset time. Therefore, a power difference between the required power P1 and P2 continues to be obtained, and the power of the heater is increased according to the power difference through the battery heat management controller, where a larger difference between the required power P1 and the actual power P2 indicates larger increase of the power of the heater. The power of the heater may be kept unchanged if the required power P1 is less than or equal to the actual power P2. When the temperature of the battery is higher than a preset temperature, for example, 10° C., heating on the battery is completed, and the battery management controller sends information about turning off a temperature adjustment function to the battery heat management controller through CAN communication, to control, through the battery heat management controller, the heater to be turned off. If the temperature of the battery is still lower than 10° C. after the temperature adjustment system has entered the heating mode for a relatively long time, for example, 1 hour, the power of the heater is properly increased through the battery heat management controller, so that the battery completes temperature increase as soon as possible.

Figure 10:
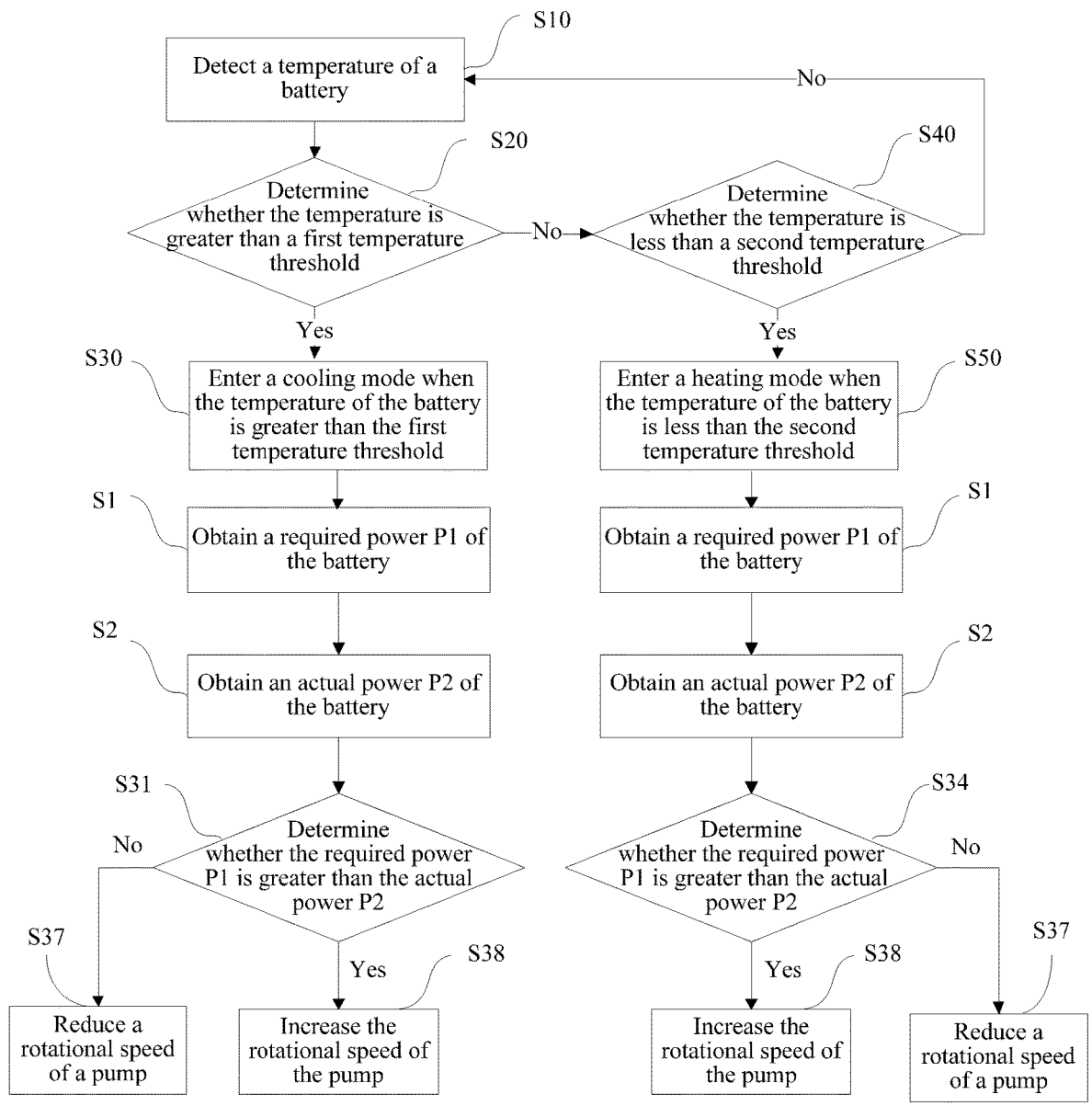
FIG. 10 is a flowchart of a temperature adjustment method for a vehicle-mounted battery according to a fifth embodiment of the present disclosure.

According to an embodiment of the present disclosure, as shown in FIG. 10, the foregoing temperature adjustment method for a vehicle-mounted battery may further include the following steps:

S37. Reduce a rotational speed of a pump or keep the rotational speed of the pump unchanged if the required power P1 is less than or equal to the actual power P2.

S38. Increase the rotational speed of the pump if the required power P1 is greater than the actual power P2.

Specifically, when the temperature adjustment system enters the heating mode or refrigerating mode, if the required power P1 is less than or equal to the actual power P2, the rotational speed of the pump is controlled, through the battery heat management controller, to be reduced, to save electric energy, or the rotational speed of the pump is kept unchanged. If the required power P1 is greater than the actual power P2, in addition to controlling, through the battery heat management controller, the heating power of the heater to be increased, or controlling, through the vehicle-mounted air conditioner controller, the power of the compressor to be increased, the rotational speed of the pump is further controlled, through the battery heat management controller, to be increased, so that a mass of the cooling liquid flowing through a cross section of the cooling flow path within a unit time may be increased, thereby increasing the actual power P2, to implement temperature adjustment on the battery within the target time.

According to an embodiment of the present disclosure, when there are a plurality of compressors used for providing a refrigerant to the battery, the foregoing method may further include: determining a quantity of to-be-started compressors according to the required power P1 and a maximum refrigerating power of each compressor; and controlling, in a cooling mode, a corresponding quantity of compressors to start.

Optionally, the determining a quantity of to-be-started compressors according to the required power P1 and a maximum refrigerating power of each compressor specifically includes: determining whether the required power P1 of the battery is greater than a maximum refrigerating power of a single compressor; and controlling, if the required power is greater than the maximum refrigerating power of the single compressor, the plurality of compressors to start simultaneously.

For example, when there are two compressors 1 for providing the refrigerant to the battery, and the temperature adjustment system enters the refrigerating mode, a quantity of to-be-started compressors is determined according to the required power P1 and the maximum refrigerating power of each compressor. If the required power P1 is less than or equal to the maximum refrigerating power of a single compressor, one compressor is controlled to start. If the required power P1 for temperature adjustment is greater than the maximum refrigerating power of a single compressor, two compressors are controlled to start simultaneously and operate, to satisfy a temperature reduction refrigerating power requirement of the battery.

It should be noted that, in this embodiment of the present disclosure, the battery may be a single battery pack (formed by a plurality of single cells), or may be formed by connecting a plurality of battery packs in series, in parallel or in series and parallel. When the battery includes a plurality of battery packs connected in parallel, temperature adjustment power allocation needs to be performed between the battery packs, and the power allocation needs to be performed through a valve.

In conclusion, when the temperature adjustment system operates in the refrigerating mode, if a sum of the required power P1 of the battery and an intra-vehicle cooling required power P4 is less than a maximum refrigerating power P of the compressor, that is, P1+P4≤P5, the vehicle-mounted air conditioner controller controls the compressor to run according to the refrigerating power P1+P4. If P1+P4>P, whether the temperature of the battery is greater than a set temperature (for example, 45° C.) is determined. If the temperature of the battery is greater than 45° C., the cooling power is preferentially provided to the battery, the compressor is controlled, through the vehicle-mounted air conditioner controller, to run according to the maximum refrigerating power, the cooling power of the battery cooling branch is equal to the required power P1 of the battery by controlling the flow of the cooling medium on the battery cooling branch and the intra-vehicle cooling branch, and the power P4 of the intra-vehicle cooling branch is equal to P minus P1. If it is determined that the temperature of the battery is not greater than 45° C., and the intra-vehicle temperature has not reached the set temperature, the cooling power is preferentially provided to the inside of the vehicle, the compressor is controlled, through the vehicle-mounted air conditioner controller, to run according to the maximum refrigerating power, the cooling power of the intra-vehicle cooling branch is P4, and the cooling power of the battery cooling branch is P−P4. If it is determined that the temperature of the battery is not greater than 45° C., and the intra-vehicle temperature has not reached the set temperature, the cooling power is preferentially provided to the inside of the vehicle, the compressor 1 is controlled, through the vehicle-mounted air conditioner controller, to run according to the maximum refrigerating power, the cooling power of the intra-vehicle cooling branch is P4, and the cooling power of the battery cooling branch is P−P4. If the intra-vehicle temperature has reached the set temperature, cooling of the battery is preferentially satisfied.

When P1 of the battery is greater than P2, and a power of the battery that needs to be adjusted is P3 (P3=P1−P2), if P1+P4+P3≤P5, the compressor 1 needs to add a refrigerating power of P3, and P1 may be equal to P2 by increasing the flow of the cooling medium on the battery cooling branch and/or increasing the rotational speed of the pump. If P1+P4+P3>P, the battery management controller determines whether the temperature of the battery is greater than a set temperature, for example, the set temperature may be 45° C. If the temperature of the battery is greater than 45° C., the cooling power is preferentially provided to the battery, the compressor is controlled, through the vehicle-mounted air conditioner controller, to run according to the maximum refrigerating power, the cooling power of the battery cooling branch is increased, and the cooling power of the intra-vehicle cooling branch is reduced. If it is determined that the temperature of the battery is not greater than 45° C., and the intra-vehicle temperature has not reached the set temperature, the cooling power is preferentially provided to the inside of the vehicle, the compressor is controlled, through the vehicle-mounted air conditioner controller, to run according to the maximum refrigerating power, the cooling power of the intra-vehicle cooling branch is P4, and the cooling power of the battery cooling branch is P−P4. If the intra-vehicle temperature has reached the set temperature, cooling of the battery is preferentially satisfied, and the cooling power of the battery cooling branch is increased by P3.

If P1≤P2, the power of the compressor is maintained unchanged, or the power of the compressor is reduced, or the flow of the cooling medium on the battery cooling branch is reduced through the vehicle-mounted air conditioner controller, or the rotational speed of the pump is reduced through the battery heat management controller, so that the cooling power of the battery cooling branch is reduced.

When the temperature adjustment system operates in the heating mode, a power difference between P1 and P2 is P3, that is, P1−P2=P3. If P1>P2, the heating power of the heater is controlled to be increased by P3, and the rotational speed of the pump is increased through the battery heat management controller. If P1≤P2, the power of the heater may be controlled to be kept unchanged, or the power of the heater may be reduced by P3, to save electric energy, or the rotational speed of the pump may be reduced through the battery heat management controller.

If the temperature of the battery is still higher than 35° C. after the cooling function has been turned on for the preset time, for example, 1 hour, the cooling power of the battery is increased. If the average temperature of the battery is still less than 10° C. after the heating function has been turned on for 1 hour, the power of the heater may be properly increased through the battery heat management controller.

In the temperature adjustment method for a vehicle-mounted battery according to this embodiment of the present disclosure, the required power for temperature adjustment on the battery is first obtained; then the actual power for temperature adjustment on the battery is obtained; and finally the temperature of the battery is adjusted within the target time according to the required power for temperature adjustment and the actual power for temperature adjustment, to reach the target temperature. Therefore, the method may precisely control a temperature adjustment time of the battery, and the actual power for temperature adjustment on the battery is adjustable in real time, so that it may be ensured that a heating power and a cooling power of the vehicle-mounted battery may be precisely controlled according to an actual status of the vehicle-mounted battery within the target time, thereby adjusting the temperature of the vehicle-mounted battery when the temperature is excessively high or excessively low, maintaining the temperature of the vehicle-mounted battery within a preset range, and avoiding a case of affecting performance of the vehicle-mounted battery because of the temperature.

Moreover, the present disclosure further proposes a non-transient computer readable storage medium, storing a computer program, where when the program is executed by a processor, the foregoing temperature adjustment method for a vehicle-mounted battery is implemented.

In the non-transient computer readable storage medium according to this embodiment of the present disclosure, a required power for temperature adjustment on a battery is first obtained; then an actual power for temperature adjustment on the battery is obtained; and finally a temperature of the battery is adjusted according to the required power for temperature adjustment and the actual power for temperature adjustment, thereby adjusting the temperature of the vehicle-mounted battery when the temperature is excessively high or excessively low, maintaining the temperature of the vehicle-mounted battery within a preset range, and avoiding a case of affecting performance of the vehicle-mounted battery because of the temperature.

Figure 11:
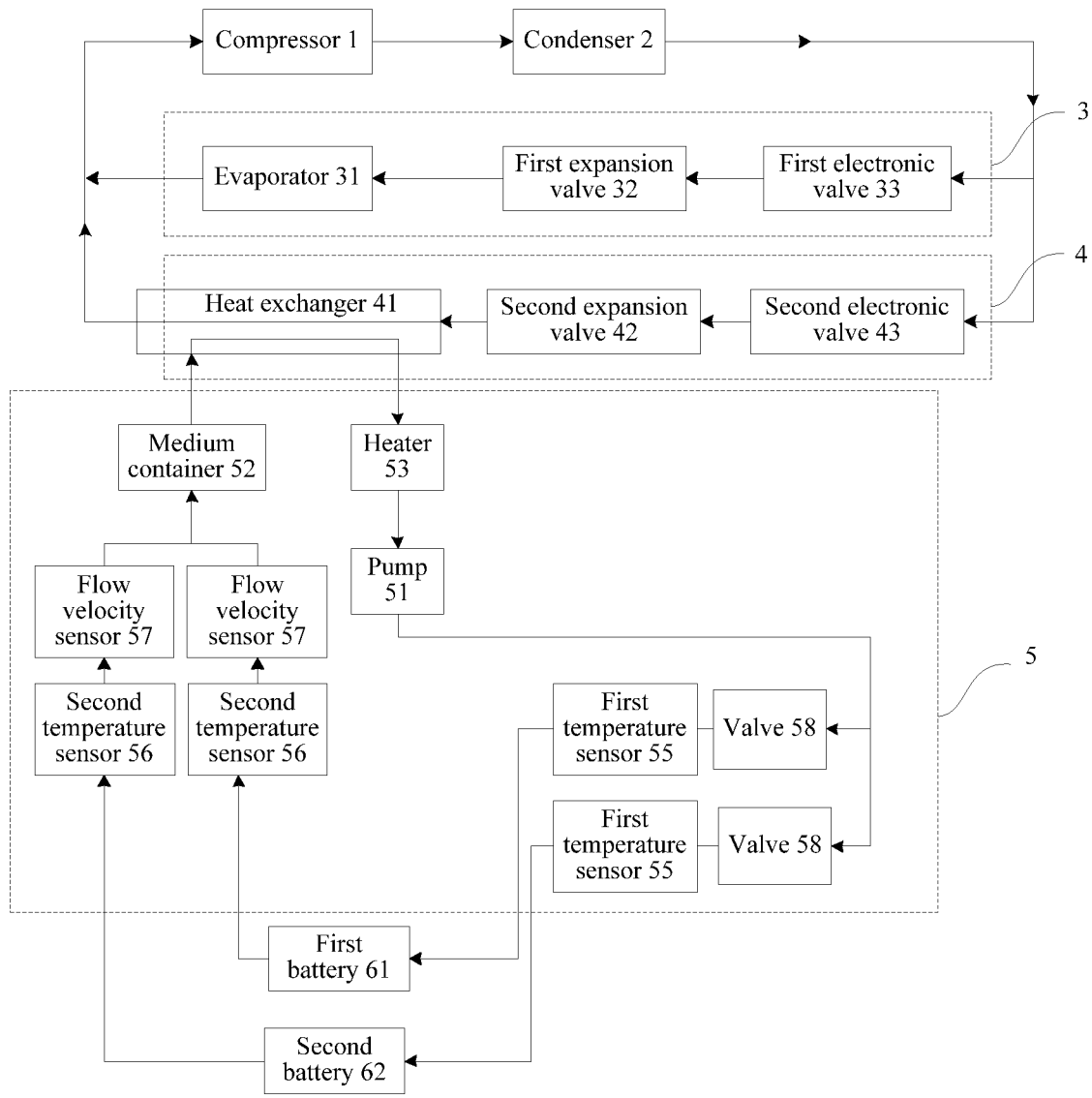
FIG. 11 is a schematic diagram of a flow path structure of a temperature adjustment system for a vehicle-mounted battery according to a fourth embodiment of the present disclosure.

When there are a plurality of batteries 6 in a vehicle, and the plurality of batteries 6 are connected in parallel, for example, there are two batteries 6 respectively being a first battery 61 and a second battery 62, as shown in FIG. 11, a temperature adjustment system for a vehicle-mounted battery includes: a compressor 1, a condenser 2, a battery cooling branch 4, and a battery temperature adjustment module 5.

The condenser 2 is connected to the compressor 1, and the battery cooling branch 4 is connected between the compressor 1 and the condenser 2. The battery temperature adjustment module 5 is connected to the plurality of batteries 6 connected in parallel and the battery cooling branch 4, obtains required powers P1 and actual powers P2 of the plurality of batteries connected in parallel, and adjusts, according to the required powers P1 and the actual powers P2 of the plurality of batteries connected in parallel, temperatures of the plurality of batteries connected in parallel respectively.

Optionally, according to an embodiment of the present disclosure, the adjusting, according to the required powers P1 and the actual powers P2 of the plurality of batteries connected in parallel, temperatures of the plurality of batteries connected in parallel respectively specifically includes: adjusting, within a target time t according to the required powers P1 and the actual powers P2 of the plurality of batteries connected in parallel, the temperatures of the plurality of batteries connected in parallel respectively, to reach a target temperature.

That is to say, when the battery temperature adjustment module 5 performs temperature adjustment on each battery 6 according to P1 and P2 of each battery, it may be ensured that a heating power and a cooling power of the vehicle-mounted battery are precisely controlled according to an actual status of each battery 6 within the target time t, thereby adjusting the temperature of the vehicle-mounted battery when the temperature is excessively high or excessively low.

When the intra-vehicle temperature is excessively high, an intra-vehicle cooling function is started, a flowing direction of the cooling liquid is: the compressor 1—the condenser 2—the intra-vehicle cooling branch 3—the compressor 1. When the temperature of the first battery 61 is excessively high, a battery cooling function is started, and flowing directions of the cooling liquid in the first duct and the second duct are: the compressor 1—the condenser 2—the battery cooling branch 4—the compressor 1; and the battery cooling branch 4—the battery temperature adjustment module 5—the first battery 61—the battery temperature adjustment module 5—the battery cooling branch 4. When the temperature of the second battery 62 is excessively high, flowing directions of the cooling liquid in the first duct and the second duct are: the compressor 1—the condenser 2—the battery cooling branch 4—the compressor 1; and the battery cooling branch 4—the battery temperature adjustment module 5—the second battery 62—the battery temperature adjustment module 5—the battery cooling branch 4.

The battery temperature adjustment module 5 has a refrigerating power provided by the vehicle-mounted air conditioner, and shares a refrigerating capacity with an intra-vehicle refrigerating system, thereby reducing the volume of the temperature adjustment system, and making allocation of the flow of the cooling liquid more flexible. Therefore, the heating power and the cooling power of each battery may be precisely controlled according to an actual status of each battery, thereby adjusting the temperature of the vehicle-mounted battery when the temperature is excessively high or excessively low, maintaining the temperature of the vehicle-mounted battery is maintained within a preset range, and avoiding a case of affecting performance of the vehicle-mounted battery because of the temperature.

Optionally, according to an embodiment of the present disclosure, as shown in FIG. 6 and FIG. 7, a battery cooling branch 4 may include a heat exchanger 41, the heat exchanger 41 includes a first duct and a second duct, the second duct is connected to a battery temperature adjustment module 5, and the first duct is in communication with a compressor 1, where the first duct and the second duct are adjacently disposed independent of each other.

The battery temperature adjustment module 5 may include: a flow path of adjusting the temperature of the battery (not specifically shown in the figure), where the flow path is disposed in the battery 6; and a pump 51, a medium container 52, a heater 53, and a controller (not specifically shown in the figure) that are connected between the flow path and the heat exchanger 41. The controller obtains required powers P1 for a plurality of batteries 6 connected in parallel and actual powers P2 of the batteries respectively, and adjusts a temperature of each battery 6 according to the required power P1 and the actual power P2 of each battery. The intra-vehicle cooling branch 3 may include: an evaporator 31, a first expansion valve 32, and a first electronic valve 33. The battery cooling branch 4 may further include a second expansion valve 42 and a second electronic valve 43.

It may be understood that, the battery cooling branch 4 may alternatively be not provided with the heat exchanger 41, and a cooling medium flows in the battery cooling branch 4 without the heat exchanger 41. If the battery cooling branch 4 is provided with the heat exchanger 41, a cooling medium flows in the first duct in the battery cooling branch 4, a cooling liquid flows in the second duct, and a cooling medium flows in the intra-vehicle cooling loop.

According to an implementation example of the present disclosure, as shown in FIG. 11, the battery temperature adjustment module 5 further includes a first temperature sensor 55 disposed on an inlet of the flow path, a second temperature sensor 56 disposed on an outlet of the flow path, and a flow velocity sensor 57. It may be understood that, locations of the inlet and the outlet of the flow path are not absolute, but are determined according to steering of the pump 51.

Specifically, controllers may include a battery management controller, a battery heat management controller, and a vehicle-mounted air conditioner controller. The battery heat management controller may be electrically connected to the pump 51, the first temperature sensor 51, the second temperature sensor 52, and the flow velocity sensor 57, and obtain actual powers P2 of a plurality of batteries connected in parallel and control the rotational speed of the pump 51 according to a specific heat capacity of a medium and a density of the medium. The battery heat management controller may further control, by control an opening degree of a valve 58, the flow of the cooling liquid in the cooling loop of the first battery 61 and the cooling loop of the second battery 62, thereby adjusting the cooling power allocation of the cooling loop of the first battery 61 and the cooling loop of the second battery 62. The battery management controller collects a current flowing through a battery and a temperature of the battery, obtains a required power P1 according to a target temperature of the battery, a target time t, a specific heat capacity C of the battery, a mass M of the battery, and an internal resistance R of the battery, and controls the vehicle-mounted air conditioner controller to start or stop operating. The vehicle-mounted air conditioner controller is electrically connected to the compressor 1, the expansion valve and the electronic valve to control the power P of the compressor and on/off of the expansion valve and the electronic valve according to the required power P1 obtained by the battery management controller and the actual power P2 obtained by the battery heat management controller, to control a heat exchange amount.

It should be understood that, the battery management controller may include, for example, a DSP chip having a battery management function. The battery heat management controller may include, for example, a DSP chip having a battery heat management function. The vehicle-mounted air conditioner controller may include, for example, a vehicle-mounted air conditioner DSP chip.

The heat exchanger 41 may be a plate heat exchanger, and the plate heat exchanger may be installed in the vehicle-mounted air conditioner, so that the entire refrigerant loop is in the vehicle-mounted air conditioner, to facilitate pre-delivery commissioning of the vehicle-mounted air conditioner; and the vehicle-mounted air conditioner may be individually supplied and assembled, and moreover, the vehicle-mounted air conditioner only needs to be filled with the refrigerant once in an installing process.

The cooling liquid flows into the battery 6 from the inlet of the flow path, and flows out from the outlet of the flow path, thereby implementing heat exchange between the battery 6 and the cooling liquid.

The pump 51 is mainly used for providing power, and the medium container 52 is mainly used for storing the cooling liquid and receiving the cooling liquid added to the temperature adjustment system. When the cooling liquid in the temperature adjustment system is reduced, the cooling liquid in the medium container 52 may be automatically supplemented. The heater 53 may be a positive temperature coefficient (PTC) heater, generally referring to a semiconductor material or component whose positive temperature coefficient is quite large, may perform controller area network (CAN) communication with the controller, to provide a heating power to the temperature adjustment system for a vehicle-mounted battery, and is controlled by the controller. That is to say, the heater 53 is not in direct contact with the battery 6, to have relatively high safety, reliability, and practicability.

The first temperature sensor 55 is used for detecting the temperature of the cooling liquid on the inlet of the flow path, and the second temperature sensor 56 is used for detecting the temperature of the cooling liquid on the outlet of the flow path. The flow velocity sensor 57 is used for detecting flow velocity information of the cooling liquid in the duct of the temperature adjustment system. The first electronic valve 33 is used for controlling opening and closing of the intra-vehicle cooling branch 3, and the first expansion valve 32 may be used for controlling the flow of the cooling liquid in the intra-vehicle cooling branch 3. The second electronic valve 43 is used for controlling opening and closing of the battery cooling branch 4, and the second expansion valve 42 may be used for controlling the flow of the cooling liquid in the battery cooling branch 4. A valve 58 is further disposed on an inlet of a flow path of each battery 6. The battery heat management controller may control, according to P1 and P2 corresponding to each battery 6 by controlling the valve 58, the flow of the cooling liquid flowing into each battery 6, thereby precisely controlling the heating power/refrigerating power of each battery 6. According to an embodiment of the present disclosure, the controller is further configured to generate a total required power Pz according to required powers P1 of a plurality of batteries connected in parallel, and determine whether the total required power Pz matches the maximum refrigerating power P of the vehicle-mounted air conditioner. If matching, the controller cools, according to the required powers P1 of the plurality of batteries connected in parallel, the plurality of batteries 6 connected in parallel. If not matching, the controller cools, according to the maximum refrigerating power P of the air conditioner and the required powers P1 of the plurality of batteries connected in parallel, the plurality of batteries 6 connected in parallel.

Specifically, as shown in FIG. 11, the controller may calculate the total required power Pz of the entire temperature adjustment system according to the required powers P1 of all of the batteries, that is, obtain the total required power Pz by adding the required powers P1 of all of the batteries. Then, whether Pz matches the maximum refrigerating power P of the vehicle-mounted air conditioner is determined according to the total required power Pz, that is, whether Pz is less than or equal to P is determined. If yes, the vehicle-mounted air conditioner controller cools each battery according to the required power P1 of each battery by controlling the power of the compressor 1, and moreover the battery heat management controller adjusts the cooling power of the first battery 61 and the cooling power of the second battery 62 according to a cooling required power of the first battery 61 and a cooling required power of the second battery 62 by controlling the opening degree of the valve 58. If Pz does not match the maximum refrigerating power P of the vehicle-mounted air conditioner, that is, Pz is greater than P, the vehicle-mounted air conditioner controls the compressor 1 to operate at the maximum refrigerating power P, and moreover the battery heat management controller allocates the flow of the cooling liquid in proportion according to the maximum refrigerating power P of the air conditioner and the required power P1 of each battery by adjusting the opening degree of the valve 58, thereby completing temperature reduction on each battery 6 at maximum efficiency.

How does the battery temperature adjustment module 5 obtain the required power P1 and the actual power P2 of each battery 6 is described below with reference to specific embodiments.

According to an embodiment of the present disclosure, the controller may be configured to: obtain a first parameter when enabling temperature adjustment on each battery, and generate a first required power of each battery according to the first parameter; obtain a second parameter when enabling temperature adjustment on each battery, and generate a second required power of each battery according to the second parameter; and generate the required power P1 of each battery according to the first required power of each battery and the second required power of each battery.

Optionally, according to an embodiment of the present disclosure, the first parameter is an initial temperature when enabling temperature adjustment on the battery 6, the target temperature, and the target time t for reaching the target temperature from the initial temperature, and the controller obtains a first temperature difference $\Delta T_1$ between the initial temperature and the target temperature, and generates the first required power according to the first temperature difference $\Delta T_1$ and the target time t.

Optionally, the controller generates the first required power through the following formula (1):

$$\Delta T_1 * C * M/t \quad (1)$$

where $\Delta T_1$ is the first temperature difference between the initial temperature and the target temperature, t is the target time, C is a specific heat capacity of the battery 6, and M is a mass of the battery 6.

The second parameter is an average current I of each battery 6 within a preset time, and the controller generates the second required power through the following formula (2):

$$I^2 * R \quad (2)$$

where I is the average current, and R is an internal resistance of the battery 6.

When the battery 6 is cooled, $P1=\Delta T_1*C*M/t+I^2*R$; and when the battery 6 is heated, $P1=\Delta T_1*C*M/t-I^2*R$.

According to an embodiment of the present disclosure, the battery heat management controller generates a second temperature difference $\Delta T_2$ according to an inlet temperature detected by the first temperature sensor 55 and an outlet temperature detected by the second temperature sensor 56, and generates the actual power P2 of each battery according to the second temperature difference $\Delta T_2$ of each battery and a flow velocity v that is detected by the flow velocity sensor 57.

Optionally, according to an embodiment of the present disclosure, the battery heat management controller generates the actual power P2 through the following formula (3):

$$\Delta T_2 * c * m \quad (3)$$

where $\Delta T_2$ is the second temperature difference, c is a specific heat capacity of the cooling liquid in the flow path, and m is a mass of the cooling liquid flowing through a cross section of the flow path within a unit time, where $m=v*\rho*s$, v is a flow velocity of the cooling liquid, $\rho$ is a density of the cooling liquid, and s is a cross-sectional area of the flow path.

Specifically, after the vehicle is powered on, the battery management controller determines whether temperature adjustment needs to be performed on the vehicle. If it is determined that temperature adjustment needs to be performed on the vehicle, for example, the temperature of the battery 6 is excessively high, the battery management controller sends information about enabling a temperature adjustment function to the vehicle-mounted air conditioner through CAN communication. After enabling the temperature adjustment function, the vehicle-mounted air conditioner controller sends heat exchange information to the battery heat management controller. Moreover, the vehicle-mounted air conditioner controller controls the second electronic valve 43 to be turned on, and the battery heat management controller controls the pump 51 to begin operating at a default rotational speed (for example, a low rotational speed).

Moreover, the battery management controller obtains the initial temperature (that is, current temperature) of each battery 6, the target temperature, and the target time t for reaching the target temperature from the initial temperature, where the target temperature and the target time t may be preset according to an actual situation, and the first required power of each battery is calculated according to the formula (1). Moreover, the battery management controller further obtains the average current I of each battery 6 within the preset time, and the second required power of each battery is calculated according to the formula (2). Then, the battery management controller calculates the required power P1 (that is, the required power for adjusting the temperature of each battery 6 to the target temperature within the target time) according to the first required power and the second required power of the battery 6, where when the battery 6 is cooled, $P1=\Delta T_1*C*M/t+I^2*R$; and when the battery 6 is heated, $P1=\Delta T_1*C*M/t-I^2*R$.

Moreover, the battery heat management controller obtains temperature information detected by the first temperature sensor 55 and the second temperature sensor 56 that are set corresponding to each battery, and obtains flow velocity information detected by each flow velocity sensor 57, and the actual power P2 of each battery 6 is calculated according to the formula (3).

Finally, the battery heat management controller controls, according to the required power P1 and the actual power P2 corresponding to each battery 6 by controlling the valve 58, the flow of the cooling liquid flowing into each battery 6, thereby precisely controlling the heating power/refrigerating power of each battery 6. For example, if the required power P1 of the first battery 61 is greater than the required power P1 of the second battery 62, the battery heat management controller may perform control to increase the opening degree of the valve 58 of the loop in which the first battery 61 is located, and reduce the opening degree of the valve 58 of the loop in which the second battery 62 is located.

If the temperature of the battery 6 is relatively low, the vehicle-mounted air conditioner controller controls the second electronic valve 43 to be turned off, the battery heat management controller controls the heater 53 to start, and the battery heat management controller controls the heating power of the heater 53 according to the required power P1 and the actual power P2, to increase the temperature of the battery 6 to the target temperature within the target time t, thereby preventing an excessively high temperature from affecting operating performance of the battery 6. Therefore, it may be ensured that the heating power and the cooling power of each battery are precisely controlled according to an actual status of each battery within the target time, thereby adjusting the temperature of the vehicle-mounted battery when the temperature is excessively high or excessively low.

Specifically, it can be known from the foregoing embodiment that, the required power P1 is formed by two parts. Using the first battery 61 as an example, when the first battery 61 needs to be cooled, if the initial temperature of the first battery 61 is 45° C., and the target temperature is 35° C., heat that needs to be dissipated when the battery is cooled from 45° C. to 35° C. is fixed, and may be directly calculated through the formula (1), that is, $\Delta T_1*C*M/t$. Moreover, a discharging and charging process exists in the cooling process of the first battery 61, and this process generates heat. This part of heat may alternatively be directly obtained by detecting the average current I of the first battery, and the current heating power, that is, the second required power of the first battery 61 is directly calculated through the formula (3), that is, $I^2*R$. A cooling completion time of the present disclosure is set based on the target time t (t may be changed according to a user requirement or an actual design situation of the vehicle). After the target time t required for cooling completion is determined, the current required power P1 required for cooling the first battery 61 may be predicted, that is, $P1=\Delta T_1 *C*M/t+I^2*R$. If the heating function is started, the required power $P1=\Delta T_1*C*M/t-I^2*R$, that is, when the first battery 61 is in a heating process, a larger discharging or charging current of the first battery 61 indicates a smaller required heating power, that is, required power P1.

Because a discharging or charging current of the first battery 61 is changed, $I^2*R$ is changed. Therefore, to better ensure accuracy of the cooling time, the cooling power also needs to change as the current average discharging or charging current of the first battery 61 changes. If the vehicle-mounted air conditioner cools the first battery 61 and the compartment simultaneously, when the discharging current of the first battery 61 is relatively small, $I^2*R$ is reduced. In this case, the vehicle-mounted air conditioner may allocate more refrigerating power to the compartment, so that the compartment reaches a set air temperature more quickly. Moreover, when the discharging or charging current of the first battery 61 is relatively large, $I^2*R$ is relatively large. In this case, the vehicle-mounted air conditioner may allocate more refrigerating power to the first battery 61. Through such adjustment, the time required for cooling the battery is always accurate, and moreover the refrigerating power of the vehicle-mounted air conditioner may be used more efficiently and properly, so that it is unnecessary to configure a vehicle-mounted air conditioner having a relatively large cooling power, which causes waste of the refrigerating power.

The battery cooling time is affected by the cooling efficiency. The cooling efficiency is affected by an external ambient temperature and the current temperature of the first battery 61, and efficiency of the temperature adjustment system is continuously changed in a battery cooling process. Therefore, the cooling efficiency cannot be 100%. As a result, the time for cooling the first battery 61 cannot be accurately adjusted according to only P1, and it is necessary to detect the actual power P2 of the first battery 61. In the present disclosure, the actual power P2 of the first battery 61 may be calculated through the formula (3), that is, $\Delta T_2*c*m$. P2 may alternatively be calculated through the actual cooling power of the battery, that is, through the formula (4), that is, $\Delta T3*C*m1$, where $\Delta T3$ is a temperature change of the first battery 61 within a period of time, C is a specific heat capacity of the first battery 61, and m1 is a mass of the first battery 61. However, because the mass of the battery is usually relatively large, a temperature change within a unit time is not evident, and a temperature difference can be detected in need of a relatively long time. Therefore, the actual power P2 is usually calculated according to the formula (3).

When temperature adjustment needs to be performed on the second battery 62, a manner of obtaining the required power P1 and the actual power P2 thereof is the same as the foregoing principle of the first battery 61, and details are not described herein again.

Due to the effect of the cooling efficiency, it is quite difficult for the actual power P2 to be completely equal to the required power P1. To make the target time t for cooling each battery 6 more accurate, adjustment needs to be performed in real time according to a power difference between the required power P1 and the actual power P2, to ensure that the required power P1 of the battery 6 is equal to the actual power P2 of the battery.

How to adjust the temperature of each battery 6 according to the required power P1 and the actual power P2 of each battery 6 is described below with reference to specific embodiments.

According to an embodiment of the present disclosure, the controller is further configured to: detect temperatures of a plurality of batteries connected in parallel; control, when a temperature of at least one of the plurality of batteries 6 connected in parallel is greater than a first temperature threshold, the temperature adjustment system to enter a cooling mode; and control, when a temperature of at least one of the plurality of batteries 6 connected in parallel is less than a second temperature threshold, the temperature adjustment system to enter a heating mode. The first temperature threshold and the second temperature threshold may be preset according to an actual situation. For example, the first temperature threshold may be 40° C., and the second temperature threshold may be 0° C.

Specifically, after the vehicle is powered on, the battery management controller detects the temperature of each battery 6 in real time, and performs determining. If a temperature of one of the batteries 6 is higher than 40° C., it indicates that the temperature of the battery 6 is excessively high in this case. To prevent the high temperature from affecting performance of the battery 6, temperature reduction processing needs to be performed on the battery 6, and the battery management controller controls the temperature adjustment system to enter the cooling mode, and sends information about starting the battery cooling function to the vehicle-mounted air conditioner controller. After receiving the information about starting the battery cooling function, the vehicle-mounted air conditioner controller controls the second electronic valve 43 to be turned on, so that the cooling liquid performs heat exchange with the battery 6 to reduce the temperature of the battery 6. As shown in FIG. 11, when the temperature adjustment system operates in the cooling mode, flowing directions of the cooling liquid in the corresponding first duct and second duct in the loop in which the first battery 61 is located are respectively: the compressor 1—the condenser 2—the second electronic valve 43—the second expansion valve 42—the heat exchanger 41—the compressor 1; and the medium container 52—the heat exchanger 41—the heater 53 (turned off)—the pump 51—the valve 58—the first temperature sensor 55—the first battery 61—the second temperature sensor 56—the flow velocity sensor 57—the medium container 52; and cycling is performed in this way, and heat is exchanged at the heat exchanger 41, to implement temperature reduction on the first battery 61. Flowing directions of the cooling liquid in the first duct and the second duct in the loop in which the second battery 62 is located are respectively: the compressor 1—the condenser 2—the second electronic valve 43—the second expansion valve 42—the heat exchanger 41—the compressor 1; and the medium container 52—the heat exchanger 41—the heater 53 (turned off)—the pump 51—the valve 58—the first temperature sensor 55—the second battery 62—the second temperature sensor 56—the flow velocity sensor 57—the medium container 52; and cycling is performed in this way, and heat is exchanged at the heat exchanger 41, to implement temperature reduction on the second battery 62.

If a temperature of a battery 6 is less than 0° C., it indicates that the temperature of the battery 6 is excessively low in this case. To prevent the low temperature from affecting performance of the battery 6, temperature increase processing needs to be performed on the battery 6, the battery management controller controls the temperature adjustment system to enter a heating mode, and sends information about starting a battery heating function to the vehicle-mounted air conditioner controller. After receiving the information about starting the battery heating function, the vehicle-mounted air conditioner controller controls the second electronic valve 43 to be turned off, and the battery heat management controller controls the heater 53 to be turned on, to provide a heating power to the temperature adjustment system. When the temperature adjustment system operates in the heating mode, flowing directions of the cooling liquid in the first battery 61 and the second battery 62 are respectively: the medium container 52—the heat exchanger 41—the heater 53 (turned on)—the pump 51—the valve 58—the first temperature sensor 55—the first battery 61—the second temperature sensor 56—the flow velocity sensor 57—the medium container 52; and the medium container 52—the heat exchanger 41—the heater 53 (turned on)—the pump 51—the first temperature sensor 55—the second battery 62—the second temperature sensor 56—the flow velocity sensor 57—the medium container 52; and cycling is performed in this way, to implement temperature increase on the battery 6. It may be understood that, the flow of the cooling liquid flowing into each battery 6 may be adjusted by adjusting the opening degree of the valve 58, thereby adjusting the heating/cooling power of each battery.

According to an embodiment of the present disclosure, when the temperature adjustment system operates in the cooling mode and a required power P1 of a battery 6 is greater than the actual power P2 corresponding to the battery, the controller obtains a power difference between the required power P1 and the actual power P2 of the battery, and increases, according to the power difference, the power of the compressor used for cooling the battery 6 or the flow of the cooling liquid of the battery 6, to increase the cooling power of the battery 6; and when a required power P1 of a battery 6 is less than or equal to the actual power P2, the controller reduces the power of the compressor or keeps the power of the compressor unchanged, or performs adjustment to reduce the flow of the cooling liquid of the battery, to reduce the cooling power of the battery 6.

Specifically, if there are a plurality of batteries 6 connected in parallel, when the temperature adjustment system operates in the cooling mode, the battery management controller obtains the required power P1 of the battery, the battery heat management controller obtains the actual power P2 of the battery, and the vehicle-mounted air conditioner controller performs determining according to the required power P1 and the actual power P2. If a required power P1 for one of the batteries 6 is greater than the actual power P2, it indicates that the temperature reduction on the battery 6 cannot be completed within the target time according to the current cooling power or flow of the cooling liquid. Therefore, the vehicle-mounted air conditioner controller obtains a power difference between the required power P1 of the battery and the actual power P2, and increases, according to the power difference, the power of the compressor 1 or the flow of the cooling liquid of the battery, that is, increases the opening degree of the second expansion valve 42, to increase the cooling power of the battery, where a larger power difference between the required power P1 for temperature adjustment and the actual power P2 indicates larger increase of the power of the compressor 1 and the flow of the cooling liquid of the battery, so that the temperature of the battery is reduced to the target temperature within the preset time t. If the required power P1 on one of the batteries 6 is less than or equal to the actual power P2, the vehicle-mounted air conditioner controller may keep the power of the compressor 1 unchanged or properly reduce the power of the compressor 1, or reduce the flow of the cooling liquid of the battery, that is, reduce the opening degree of the second expansion valve 42, to reduce the cooling power of the battery. When the temperatures of all of the batteries 6 are less than 35° C., cooling on the batteries 6 is completed, the battery management controller sends information about turning off a temperature adjustment function to the vehicle-mounted air conditioner through CAN communication, and the vehicle-mounted air conditioner controller controls the second electronic valve 43 to be turned off. If the temperature of the battery 6 is still higher than 35° C. after the temperature adjustment system has entered the cooling mode for a relatively long time, for example, 1 hour, the cooling power of the battery is properly increased, so that the battery completes temperature reduction as soon as possible.

According to an embodiment of the present disclosure, when the temperature adjustment system operates in the heating mode and a required power P1 of a battery is greater than the actual power P2, the controller obtains a power difference between the required power P1 and the actual power P2 of the battery, and increases, according to the power difference, the power of the heater 53 used for heating the battery or performs adjustment to increase the flow of the cooling liquid of the battery, to increase the heating power of the battery; and when a required power P1 of a battery is less than or equal to the actual power P2, the controller reduces the power of the heater 53 or keeps the power of the heater 53 unchanged, or performs adjustment to reduce the flow of the cooling liquid of the battery, to reduce the heating power of the battery.

Specifically, if there are a plurality of batteries connected in parallel, when the temperature adjustment system operates in the heating mode, the battery management controller obtains required powers P1 of the batteries, and the battery heat management controller obtains actual powers P2 of the batteries. If the required power P1 for one of the batteries 6 is greater than the actual power P2, it indicates that temperature increase on the battery 6 cannot be completed within the target time according to the current heating power or flow of the cooling liquid. Therefore, the battery heat management controller obtains a power difference between P1 and P2 of the battery, and increases, according to the power difference, the power of the heater 53 used for heating the battery 6 or performs adjustment to increase the flow of the cooling liquid of the battery, for example, increases the rotational speed of the pump 51, so that temperature adjustment on the battery may be completed within the target time. A larger difference between the required power P1 and the actual power P2 indicates larger increase of the power of the heater 53 and the flow of the cooling liquid in the loop of the battery. If the required power P1 of a battery is less than or equal to the actual power P2, the controller may properly reduce the power of the heater 53, or keep the power of the heater 53 unchanged, or perform adjustment to reduce the flow of the cooling liquid in the loop of the battery, to reduce the heating power of the battery. When the temperatures of all of the batteries 6 are higher than a preset temperature, for example, 10° C., heating on the batteries 6 is completed, the battery management controller sends information about turning off a temperature adjustment function to the vehicle-mounted air conditioner through CAN communication, and the battery heat management controller controls the heater 53 to be turned off. If the temperature of the battery 6 is still lower than 10° C. after the temperature adjustment system has entered the heating mode for a relatively long time, for example, 1 hour, the battery heat management controller may properly increase the power of the heater 53 and the rotational speed of the pump 51, so that the battery completes temperature increase as soon as possible.

According to an embodiment of the present disclosure, the controller is further configured to reduce the rotational speed of the pump 51 when the required power P1 of a battery is less than the corresponding actual power P2, and increase the rotational speed of the pump 51 when the required power P1 of a battery is greater than the corresponding actual power P2.

Specifically, when the temperature adjustment system enters the heating mode or cooling mode, if the required power P1 of a battery 6 is less than the actual power P2, the controller controls the rotational speed of the pump 51 to be reduced, to save electric energy. If the required power P1 of a battery 6 is greater than the actual power P2, in addition to controlling the power of the heater 53 or the compressor 1 to be increased or the flow of the cooling liquid in the loop in which the battery is located to be increased, the controller further controls the rotational speed of the pump 51 to be increased, to increase a mass of the cooling liquid flowing through a cross section of the cooling flow path within a unit time, thereby increasing the actual power P2 of the battery, to implement temperature adjustment within the target time t.

If a single compressor 1 cannot satisfy the power required for cooling a plurality of batteries 6, a plurality of compressors 1 may be set to provide the cooling power to the battery 6. For example, there are usually 4 compressors on a bus. In this case, the 4 compressors may be all used for providing the cooling power to the battery 6.

According to an embodiment of the present disclosure, there are a plurality of compressors 1 used for providing the refrigerant to the battery, and the controller is further configured to determine, according to the required power P1 of each battery and a maximum refrigerating power P of each compressor, a quantity of to-be-started compressors, and control, when the temperature adjustment system is in the cooling mode, the corresponding quantity of compressors 1 to start.

Optionally, the controller may generate the total required power Pz according to the required power P1 of each battery, and when determining that the total required power Pz is greater than the maximum refrigerating power P of a single compressor, the controller controls a plurality of compressors 1 to start simultaneously.

For example, when there are two compressors 1 for providing the refrigerant to a plurality of batteries 6, and the temperature adjustment system enters the cooling mode, the controller obtains P1 of each battery 6, and may calculate the total required power Pz of the entire temperature adjustment system by adding P1 of each battery. If Pz is less than or equal to the maximum refrigerating power of a single compressor 1, the controller controls one compressor 1 to start. If Pz is greater than the maximum refrigerating power of a single compressor 1, the controller controls two compressors 1 to start simultaneously and operate, to satisfy a temperature reduction refrigerating power requirement of the battery 6.

To make a person skilled in the art more clearly understand the present disclosure, an operating process of the temperature adjustment system for a vehicle-mounted battery shown in FIG. 11 is described below with reference to specific embodiments.

The battery 6 includes the first battery 61 and the second battery 62, Pz=P11+P12, P11 is the required power for temperature adjustment on the first battery 61, P12 is the required power for temperature adjustment on the second battery 62, and Pz is a sum of the required power for temperature adjustment on the first battery 61 and the required power for temperature adjustment on the second battery 62 (the total required power Pz). Pf=P21+P22, P21 is the actual power for temperature adjustment on the battery 61, P22 is the actual power for temperature adjustment on the battery 62, and Pf is a sum of the actual power for temperature adjustment on the first battery 61 and the actual power for temperature adjustment on the second battery 62.

When a temperature of a battery is greater than the first temperature threshold (for example, 40° C.), the temperature adjustment system for a vehicle-mounted battery operates in the cooling mode. If a sum of the total required power Pz and the intra-vehicle cooling required power P4 is less than the maximum refrigerating power P of the compressor, that is, Pz+P4≤P, the compressor 1 is controlled to run according to a refrigerating power Pz+P4. It may be understood that, in this case, Pz<P, and P4<P.

If Pz+P4>P, whether the temperature of the first battery 61 or the second battery 62 is greater than 45° C. is determined. If the temperature is greater than 45° C., the cooling power is preferentially provided for battery cooling, the controller controls the compressor 1 to run according to the maximum refrigerating power P, the cooling power of the battery cooling branch 4 is Pz, and the cooling power of the intra-vehicle cooling branch 3 is equal to P−Pz.

If it is determined that the temperature of the battery is not greater than 45° C., and the intra-vehicle temperature has not reached the set temperature, the cooling power is preferentially provided to the inside of the vehicle, the compressor 1 runs according to the maximum refrigerating power P, the cooling power of the intra-vehicle cooling branch is P4, and the cooling power of the battery cooling branch is equal to P−P4. In the cooling branch of the first battery 61 and the cooling branch of the second battery 62, the cooling power is reduced in proportion. The proportion may be: (P−P4)/(P11+P12). If the intra-vehicle temperature has reached the set temperature, the cooling power of the battery is preferentially satisfied.

A sum of the actual power for temperature adjustment on the first battery 61 and the actual power for temperature adjustment on the second battery 62 is Pf, and when Pz>Pf, the power that needs to be adjusted is Pc (Pc=Pz−Pf). If Pz+P4+Pc≤P, the refrigerating power that the compressor needs to increase is Pc, the opening degree of the second expansion valve 42 is increased, and the rotational speed of the pump 51 is increased. Moreover, processing is performed as follows:

If P11≥P21, and P11−P21=Pc1, the battery heat management controller controls the opening degree of the valve 58 of the loop in which the first battery 61 is located to be increased, so that the cooling power of the first battery 61 is increased by Pc1. If P12≥P22, and P12−P22=Pc2, the battery heat management controller controls the opening degree of the valve 58 of the loop in which the second battery 62 is located to be increased, so that the cooling power of the second battery 62 is increased by Pc2. If P11<P12, and P21−P11=Pc1, the cooling power of the first battery 61 is kept unchanged, or the opening degree of the valve 58 of the loop in which the first battery 61 is located is controlled to be reduced, so that the cooling power of the first battery 61 is reduced. If P12<P22, and P22−P12=Pc2, the cooling power of the second battery 62 is kept unchanged, or the opening degree of the valve 58 of the loop in which the second battery 62 is located is controlled to be reduced, so that the cooling power of the second battery 62 is reduced.

If Pz+P4+Pc>P (and Pz+Pc≤P), determining is performed as follows:

Whether the temperature of the first battery 61 and the temperature of the second battery 62 are greater than 45° C. is determined. If greater than 45° C., the cooling power is preferentially provided for battery cooling, and the compressor runs according to the maximum refrigerating power; and moreover, the rotational speed of the pump 51 is increased, the cooling power of the battery cooling branch is increased by Pc, and the power of the intra-vehicle cooling branch is reduced by Pc. If P11≥P21, and P11−P21=Pc1, the battery heat management controller controls the opening degree of the valve 58 of the loop in which the first battery 61 is located to be increased, so that the cooling power of the first battery 61 is increased by Pc1. If P12≥P22, and P12−P22=Pc2, the battery heat management controller controls the opening degree of the valve 58 of the loop in which the second battery 62 is located to be increased, so that the cooling power of the second battery 62 is increased by Pc2. If P11<P12, and P21−P11=Pc1, the cooling power of the first battery 61 is kept unchanged, or the opening degree of the valve 58 of the loop in which the first battery 61 is located is controlled to be reduced, so that the cooling power of the first battery 61 is reduced. If P12<P22, and P22−P12=Pc2, the cooling power of the second battery 62 is kept unchanged, or the opening degree of the valve 58 of the loop in which the second battery 62 is located is controlled to be reduced, so that the cooling power of the second battery 62 is reduced.

If the temperature of the battery is not greater than 45° C., and the intra-vehicle temperature has not reached the set temperature, the cooling power is preferentially provided to the inside of the vehicle, the compressor runs according to the maximum refrigerating power P, the rotational speed of the pump 51 is increased, the cooling power of the intra-vehicle cooling branch is P4, and the cooling power of the battery cooling branch is equal to P−P4. In the cooling branch of the first battery 61 and the cooling branch of the second battery 62, the cooling power is reduced in proportion. The proportion may be: (P−P4)/(P11+P12). The cooling power of the first battery 61 is P11*(P−P4)/(P11+P12), and the cooling power of the second battery 62 is P12*(P−P4)/(P11+P12).

If the intra-vehicle temperature has reached the set temperature, the cooling power of the battery is preferentially satisfied, the compressor runs at the maximum power P, the opening degree of the second expansion valve 42 is increased, and the rotational speed of the pump 51 is increased, so that the cooling power of the battery cooling branch is increased by Pc. Moreover, processing is performed as follows:

If P11≥P21, and P11−P21=Pc1, the battery heat management controller controls the opening degree of the valve 58 of the loop in which the first battery 61 is located to be increased, so that the cooling power of the first battery 61 is increased by Pc1. If P12≥P22, and P12−P22=Pc2, the battery heat management controller controls the opening degree of the valve 58 of the loop in which the second battery 62 is located to be increased, so that the cooling power of the second battery 62 is increased by Pc2. If P11<P12, and P21−P11=Pc1, the cooling power of the first battery 61 is kept unchanged, or the opening degree of the valve 58 of the loop in which the first battery 61 is located is controlled to be reduced, so that the cooling power of the first battery 61 is reduced. If P12<P22, and P22−P12=Pc2, the cooling power of the second battery 62 is kept unchanged, or the opening degree of the valve 58 of the loop in which the second battery 62 is located is controlled to be reduced, so that the cooling power of the second battery 62 is reduced.

When Pz≤Pf, and the power that needs to be adjusted is Pc (Pc=Pf−Pz), the vehicle-mounted air conditioner controller maintains the refrigerating power of the compressor unchanged, or reduces the refrigerating power of the compressor, or reduces the opening degree of the second expansion valve 42, or the battery heat management controller reduces the rotational speed of the pump 51. If P11≥P21, and P11−P21=Pc1, the battery heat management controller controls the opening degree of the valve 58 of the loop in which the first battery 61 is located to be increased, so that the cooling power of the first battery 61 is increased by Pc1. If P12≥P22, and P12−P22=Pc2, the battery heat management controller controls the opening degree of the valve 58 of the loop in which the second battery 62 is located to be increased, so that the cooling power of the battery 62 is increased by Pc2. If P11<P12, and P21−P11=Pc1, the cooling power of the first battery 61 is kept unchanged, or the opening degree of the valve 58 of the loop in which the first battery 61 is located is controlled to be reduced, so that the cooling power of the first battery 61 is reduced. If P12<P22, and P22−P12=Pc2, the cooling power of the second battery 62 is kept unchanged, or the opening degree of the valve 58 of the loop in which the second battery 62 is located is controlled to be reduced, so that the cooling power of the second battery 62 is reduced.

When there are a plurality of compressors 1 used for providing the refrigerating power to the battery, if a sum of maximum refrigerating powers of the plurality of compressors is P5, the cooling power of the battery may be adjusted as follows:

(1) When Pz>Pf, the power that needs to be adjusted is Pc (Pc=Pz−Pf), and if Pz+P4+Pc≤P5, the refrigerating power that the compressor needs to increase is Pc, the opening degree of the second expansion valve is increased, and the rotational speed of the pump is increased. Moreover, processing is performed as follows:

If P11≥P21, and P11−P21=Pc1, the battery heat management controller controls the opening degree of the valve 58 of the loop in which the first battery 61 is located to be increased, so that the cooling power of the first battery 61 is increased by Pc1. If P12≥P22, and P12−P22=Pc2, the battery heat management controller controls the opening degree of the valve 58 of the loop in which the second battery 62 is located to be increased, so that the cooling power of the second battery 62 is increased by Pc2. If P11<P12, and P21−P11=Pc1, the cooling power of the first battery 61 is kept unchanged, or the opening degree of the valve 58 of the loop in which the first battery 61 is located is controlled to be reduced, so that the cooling power of the first battery 61 is reduced. If P12<P22, and P22−P12=Pc2, the cooling power of the second battery 62 is kept unchanged, or the opening degree of the valve 58 of the loop in which the second battery 62 is located is controlled to be reduced, so that the cooling power of the battery 62 is reduced.

If Pz+P4+Pc>P5 (and Pz+Pc≤P5), determining is performed as follows:

Whether the temperature of the battery is greater than 45° C. is determined. If greater than 45° C., the cooling power is preferentially provided for battery cooling, and the compressor runs according to the maximum refrigerating power; and moreover, the rotational speed of the water pump is increased, the cooling power of the battery cooling branch is increased by Pc, and the power of the intra-vehicle cooling branch is reduced by Pc.

If P11≥P21, and P11−P21=Pc1, the battery heat management controller controls the opening degree of the valve 58 of the loop in which the first battery 61 is located to be increased, so that the cooling power of the battery 61 is increased by Pc1. If P12≥P22, and P12-P22=Pc2, the battery heat management controller controls the opening degree of the valve 58 of the loop in which the second battery 62 is located to be increased, so that the cooling power of the second battery 62 is increased by Pc2. If P11<P12, and P21−P11=Pc1, the cooling power of the battery 61 is kept unchanged, or the opening degree of the valve 58 of the loop in which the first battery 61 is located is controlled to be reduced, so that the cooling power of the first battery 61 is reduced. If P12<P22, and P22-P12=Pc2, the cooling power of the second battery 62 is kept unchanged, or the opening degree of the valve 58 of the loop in which the second battery 62 is located is controlled to be reduced, so that the cooling power of the second battery 62 is reduced.

If the temperature of the battery is not greater than 45° C., and the intra-vehicle temperature has not reached the set temperature, the cooling power is preferentially provided to the inside of the vehicle, all compressors run according to the maximum refrigerating power, the rotational speed of the water pump is increased, the cooling power of the intra-vehicle cooling branch is P4, and the cooling power of the battery cooling branch is equal to P5-P4. In the cooling branch of the first battery 61 and the cooling branch of the second battery 62, the cooling power is reduced in proportion. The proportion may be: (P5−P4)/(P11+P12). The cooling power of the first battery 61 is P11*(P5−P4)/(P11+P12), and the cooling power of the second battery 62 is P12*(P5−P4)/(P11+P12).

If the intra-vehicle temperature has reached the set temperature, the cooling power of the battery is preferentially satisfied, all compressors run at the maximum power, the opening degree of the second expansion valve is increased, and the rotational speed of the water pump is increased, so that the cooling power of the battery cooling branch is increased by Pc. Moreover, processing is performed as follows:

If P11≥P21, and P11−P21=Pc1, the battery heat management controller controls the opening degree of the valve 58 of the loop in which the first battery 61 is located to be increased, so that the cooling power of the first battery 61 is increased by Pc1. If P12≥P22, and P12−P22=Pc2, the battery heat management controller controls the opening degree of the valve 58 of the loop in which the second battery 62 is located to be increased, so that the cooling power of the second battery 62 is increased by Pc2. If P11<P12, and P21−P11=Pc1, the cooling power of the first battery 61 is kept unchanged, or the opening degree of the valve 58 of the loop in which the first battery 61 is located is controlled to be reduced, so that the cooling power of the first battery 61 is reduced. If P12<P22, and P22-P12=Pc2, the cooling power of the second battery 62 is kept unchanged, or the opening degree of the valve 58 of the loop in which the second battery 62 is located is controlled to be reduced, so that the cooling power of the battery 62 is reduced.

(2) When Pz≤Pf, and the power that needs to be adjusted is Pc (Pc=Pf−Pz), the refrigerating power of the compressor is maintained unchanged, or the refrigerating power of the compressor is reduced, or the opening degree of the second expansion valve 42 is reduced, or the rotational speed of the pump 51 is reduced. If P11≥P21, and P11−P21=Pc1, the battery heat management controller controls the opening degree of the valve 58 of the loop in which the first battery 61 is located to be increased, so that the cooling power of the first battery 61 is increased by Pc1. If P12≥P22, and P12-P22=Pc2, the battery heat management controller controls the opening degree of the valve 58 of the loop in which the second battery 62 is located to be increased, so that the cooling power of the battery 62 is increased by Pc2. If P11<P12, and P21−P11=Pc1, the cooling power of the first battery 61 is kept unchanged, or the opening degree of the valve 58 of the loop in which the first battery 61 is located is controlled to be reduced, so that the cooling power of the first battery 61 is reduced. If P12<P22, and P22-P12=Pc2, the cooling power of the second battery 62 is kept unchanged, or the opening degree of the valve 58 of the loop in which the second battery 62 is located is controlled to be reduced, so that the cooling power of the second battery 62 is reduced.

When the temperature of the vehicle-mounted battery is less than the second temperature threshold (for example, 0° C.), the temperature adjustment system for a vehicle-mounted battery operates in the heating mode. If Pz>Pf, and the power that needs to be adjusted is Pc (Pc=Pz−Pf), the heating power of the heater 53 is increased by Pc, and the rotational speed of the pump 51 is increased. Moreover, processing is performed as follows:

If P11≥P21, and P11−P21=Pc1, the battery heat management controller controls the opening degree of the valve 58 of the loop in which the first battery 61 is located to be increased, so that the heating power of the first battery 61 is increased by Pc1. If P12≥P22, and P12-P22=Pc2, the battery heat management controller controls the opening degree of the valve 58 of the loop in which the second battery 62 is located to be increased, so that the heating power of the second battery 62 is increased by Pc2. If P11<P12, and P21−P11=Pc1, the heating power of the first battery 61 is kept unchanged, or the opening degree of the valve 58 of the loop in which the first battery 61 is located is controlled to be reduced, so that the heating power of the first battery 61 is reduced. If P12<P22, and P22-P12=Pc2, the cooling power of the second battery 62 is kept unchanged, or the opening degree of the valve 58 of the loop in which the second battery 62 is located is controlled to be reduced, so that the heating power of the second battery 62 is reduced.

If Pz≤Pf, and the power that needs to be adjusted is Pc (Pc=Pz−Pf), the power of the heater is kept unchanged or is reduced by the heating power Pc, or the rotational speed of the pump is reduced. Moreover, processing is performed as follows:

If P11≥P21, and P11−P21=Pc1, the opening degree of the valve 58 of the loop in which the first battery 61 is located is controlled to be increased, so that the heating power of the first battery 61 is increased by Pc1. If P12≥P22, and P12-P22=Pc2, the opening degree of the valve 58 of the loop in which the second battery 62 is located is controlled to be increased, so that the heating power of the second battery 62 is increased by Pc2. If P11<P12, and P21−P11=Pc1, the cooling power of the first battery 61 is kept unchanged, or the opening degree of the valve 58 of the loop in which the first battery 61 is located is controlled to be reduced, so that the heating power of the first battery 61 is reduced. If P12<P22, and P22-P12=Pc2, the cooling power of the second battery 62 is kept unchanged, or the opening degree of the valve 58 of the loop in which the second battery 62 is located is controlled to be reduced, so that the heating power of the battery 62 is reduced.

To keep the temperature of the first battery 61 and the temperature of the second battery 62 balanced, processing may be performed as follows:

In a process of performing battery cooling, if a battery temperature difference between the temperature T61 of the first battery 61 and the temperature T62 of the second battery 62 exceeds 3° C., and the temperature value is a preset value, that is, if T61−T62>3° C., the battery heat management controller controls the opening degree of the valve 58 in the cooling branch of the first battery 61 to be increased, and controls the opening degree of the valve 58 in the cooling branch of the second battery 62 to be reduced, so that the cooling power of the first battery 61 is increased, and the cooling power of the second battery 62 is reduced, thereby implementing temperature balancing between the first battery 61 and the second battery 62. If T62−T61>3° C., the battery heat management controller controls the opening degree of the valve 58 in the cooling branch of the second battery 62 to be increased, and controls the opening degree of the valve 58 in the cooling branch of the first battery 61 to be reduced, so that the cooling power of the second battery 62 is increased, and the cooling power of the first battery 61 is reduced, thereby implementing temperature balancing between the first battery 61 and the second battery 62.

In a process of performing battery heating, if a battery temperature difference between the first battery 61 and the second battery 62 exceeds 3° C., that is, if T61−T62>3° C., the battery heat management controller controls the opening degree of the valve 58 in the cooling branch of the battery 61 to be reduced, and controls the opening degree of the valve 58 in the cooling branch of the battery 62 to be increased, so that the heating power of the first battery 61 is reduced, and the heating power of the second battery 62 is increased, thereby implementing temperature balancing between the first battery 61 and the second battery 62. If T62−T61>3° C., the battery heat management controller controls the opening degree of the valve 58 in the cooling branch of the battery 62 to be reduced, and controls the opening degree of the valve 58 in the cooling branch of the battery 61 to be increased, so that the heating power of the first battery 61 is increased, and the heating power of the second battery 62 is reduced, thereby implementing temperature balancing between the first battery 61 and the second battery 62.

The temperature adjustment system for a vehicle-mounted battery according to this embodiment of the present disclosure obtains, through the battery temperature adjustment module, the required powers and the actual powers for performing temperature adjustment on the plurality of batteries connected in parallel, and respectively adjusts, according to the required powers and the actual powers for performing temperature adjustment on the plurality of batteries connected in parallel, the temperatures of the plurality of batteries connected in parallel. Therefore, the system may precisely control the heating power and the cooling power of each battery according to an actual status of each battery, and adjust the temperature of the battery when the temperature is excessively high or excessively low, so that the temperature of the battery is maintained within a preset range, to avoid a case of affecting performance of the vehicle-mounted battery because of the temperature.

Figure 12:
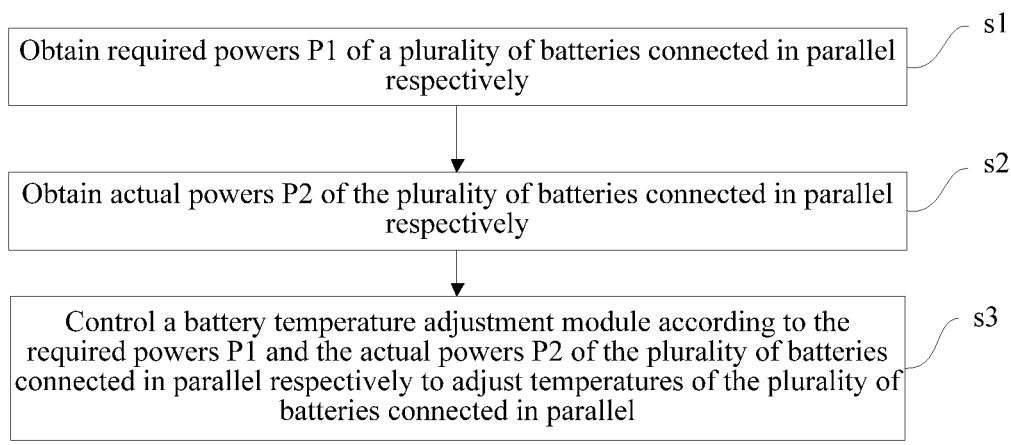
FIG. 12 is a flowchart of a temperature adjustment method for a vehicle-mounted battery according to a sixth embodiment of the present disclosure.

FIG. 12 is a flowchart of a temperature adjustment method for a vehicle-mounted battery according to a sixth embodiment of the present disclosure. The vehicle-mounted battery includes a plurality of batteries connected in parallel. As shown in FIG. 12, the temperature adjustment method for a vehicle-mounted battery includes the following steps:

s1. Obtain required powers P1 of a plurality of batteries connected in parallel respectively.

Optionally, according to an embodiment of the present disclosure, the obtaining required powers P1 of a plurality of batteries connected in parallel respectively specifically includes: obtaining a first parameter of each battery when enabling temperature adjustment, and generating a first required power of each battery according to the first parameter; obtaining a second parameter of each battery when enabling temperature adjustment, and generating a second required power of each battery according to the second parameter; and generating a required power P1 of each battery according to the first required power of each battery and the second required power of each battery.

Optionally, according to an embodiment of the present disclosure, the first parameter is an initial temperature when enabling temperature adjustment on the battery, the target temperature, and a target time t for reaching the target temperature from the initial temperature, and the generating a first required power according to the first parameter of each battery specifically includes: obtaining a first temperature difference $\Delta T_1$ between the initial temperature and the target temperature; and generating the first required power P1 according to the first temperature difference $\Delta T_1$ and the target time t.

Optionally, according to an embodiment of the present disclosure, the first required power is generated through the following formula (1):

$$\Delta T_1 * C * M / t \quad (1)$$

where $\Delta T_1$ is the first temperature difference between the initial temperature and the target temperature, t is the target time, C is a specific heat capacity of the battery, and M is a mass of the battery.

According to an embodiment of the present disclosure, the second parameter is an average current I of each battery within a preset time, and the second required power of each battery is generated through the following formula (2):

$$I^2 * R \quad (2)$$

where I is the average current, and R is an internal resistance of the battery.

s2. Obtain actual powers P2 of the plurality of batteries connected in parallel respectively.

According to an embodiment of the present disclosure, the obtaining actual powers P2 of a plurality of batteries connected in parallel respectively specifically includes: obtaining an inlet temperature and an outlet temperature of a flow path used for adjusting the temperature of each battery, and obtaining a flow velocity v at which a cooling liquid flows into the flow path; generating a second temperature difference $\Delta T_2$ according to the inlet temperature and the outlet temperature of the flow path of each battery; and generating the actual power P2 according to the second temperature difference $\Delta T_2$ of each battery and the flow velocity v.

Optionally, according to an embodiment of the present disclosure, the actual power P2 is generated through the following formula (3):

$$\Delta T_2 * c * m \quad (3)$$

where $\Delta T_2$ is the second temperature difference, c is a specific heat capacity of the cooling liquid in the flow path, and m is a mass of the cooling liquid flowing through a cross section of the flow path within a unit time, where $m = v * \rho * s$, v is a flow velocity of the cooling liquid, ρ is a density of the cooling liquid, and s is a cross-sectional area of the flow path.

s3. Adjust, according to the required powers P1 and the actual powers P2 of the plurality of batteries connected in parallel, temperatures of the plurality of batteries connected in parallel respectively.

According to an embodiment of the present disclosure, the battery temperature adjustment module is controlled according to the required power P1 and the actual power P2 to adjust the temperature of the battery within the target time t, to reach the target temperature.

Specifically, after the vehicle is powered on, it is determined, through a battery management controller, whether temperature adjustment needs to be performed on the battery, and when it is determined that temperature adjustment needs to be performed on the battery, the initial temperature (that is, current temperature) of each battery, the target temperature, and the target time t for reaching the target temperature from the initial temperature are obtained, where the target temperature and the target time t may be preset according to an actual situation, and the first required power is calculated according to the formula (1). Moreover, the average current I of each battery within the preset time is obtained through the battery management controller, and the second required power of each battery is calculated according to the formula (2). Then, the required power P1 of each battery (that is, the required power for adjusting the temperature of the battery to the target temperature) is calculated according to the first required power and the second required power of each battery. Moreover, an inlet temperature and an outlet temperature of each battery and flow velocity information are obtained through a battery heat management controller, and the actual power P2 of each battery is calculated according to the formula (3). Finally, temperature adjustment is performed on each battery according to P1 and P2 of each battery. Therefore, the control method may precisely control the heating power and the cooling power of each battery according to an actual status of each battery, and adjust the temperature of the battery when the temperature is excessively high or excessively low, so that the temperature of the battery is maintained within a preset range, to avoid a case of affecting performance of the vehicle-mounted battery because of the temperature.

How to adjust the temperature of the battery according to the required power P1 and the actual power P2 of the battery is described below with reference to specific embodiments.

When the vehicle-mounted battery includes a plurality of batteries connected in parallel, according to an embodiment of the present disclosure, as shown in FIG. 10, the controlling the battery temperature adjustment module according to the required powers P1 and the actual powers P2 of the plurality of batteries connected in parallel respectively to adjust the temperatures of the batteries may further include: generating a total required power Pz according to the required powers P1 of the plurality of batteries connected in parallel; determining whether the total required power Pz matches a maximum refrigerating power P of a vehicle-mounted air conditioner; if matching cooling, according to the required powers P1 of the plurality of batteries connected in parallel, the plurality of batteries connected in parallel; and if not matching, cooling, according to the maximum refrigerating power P of the air conditioner and the required powers P1 of the plurality of batteries connected in parallel, the plurality of batteries connected in parallel.

Specifically, the total required power Pz of the entire temperature adjustment system may be calculated according to the required powers P1 of all of the batteries, that is, the total required power Pz is obtained by adding the required powers P1 of all of the batteries. Then, whether Pz matches the maximum refrigerating power P of the vehicle-mounted air conditioner is determined according to the total required power Pz, that is, whether Pz is less than or equal to P is determined. If yes, each battery is cooled according to the required power P1 of each battery by controlling the flow of the cooling liquid flowing into each battery and controlling the power of the compressor. If Pz does not match the maximum refrigerating power P of the vehicle-mounted air conditioner, that is, Pz is greater than P, the controller allocates the flow of the cooling liquid in proportion according to the maximum refrigerating power P of the air conditioner and the required power P1 of each battery by adjusting the flow of the cooling liquid flowing into each battery, thereby completing temperature reduction on each battery at maximum efficiency.

When there are a plurality of batteries connected in parallel, according to an embodiment of the present disclosure, the battery temperature adjustment method may further include the following steps: detecting temperatures of the plurality of batteries connected in parallel; when the temperature of at least one of the plurality of batteries connected in parallel is greater than a first temperature threshold, entering a cooling mode; and when the temperature of at least one of the plurality of batteries connected in parallel is less than a second temperature threshold, entering a heating mode. The first temperature threshold and the second temperature threshold may be preset according to an actual situation. For example, the first temperature threshold may be 40° C., and the second temperature threshold may be 0° C.

Specifically, after the vehicle is powered on, the temperature of each battery is detected in real time and determining is performed through the battery management controller. If a temperature of one of the batteries is higher than 40° C., it indicates that the temperature of the battery is excessively high in this case. To prevent the high temperature from affecting performance of the battery, temperature reduction processing needs to be performed on the battery, the temperature adjustment system is controlled through the battery management controller to enter the cooling mode, and information about starting the battery cooling function is sent to the air conditioner system.

If the temperature of a battery is less than 0° C., it indicates that the temperature of the battery is excessively low in this case. To prevent the low temperature from affecting performance of the battery, temperature increase processing needs to be performed on the battery, the temperature adjustment system is controlled through the battery management controller to enter the heating mode, the battery cooling branch is controlled through the vehicle-mounted air conditioner controller to be turned off, and the heater is controlled through the battery heat management controller to be turned on, to provide the heating power to the battery.

To keep the temperature of the first battery and the temperature of the second battery balanced, processing may be performed as follows:

For example, as shown in FIG. 11, when the battery includes the first battery and the second battery, in a process of performing battery cooling, if a battery temperature difference between the temperature T61 of the first battery and the temperature T62 of the second battery exceeds 3° C., and the temperature value is a preset value, that is, if T61−T62>3° C., the battery heat management controller controls the opening degree of the adjustment valve in the cooling branch of the first battery to be increased, and controls the opening degree of the adjustment valve in the cooling branch of the second battery to be reduced, so that the cooling power of the first battery is increased, and the cooling power of the second battery is reduced, thereby implementing temperature balancing between the first battery and the second battery.

If T62−T61>3° C., through the battery heat management controller, the opening degree of the adjustment valve in the cooling branch of the second battery is controlled to be increased, and the opening degree of the adjustment valve in the cooling branch of the first battery is controlled to be reduced, so that the cooling power of the second battery is increased, and the cooling power of the first battery is reduced, thereby implementing temperature balancing between the first battery and the second battery.

In a process of performing battery heating, if a battery temperature difference between the first battery and the second battery exceeds 3° C., that is, if T61−T62>3° C., through the battery heat management controller, the opening degree of the adjustment valve in the cooling branch of the first battery is controlled to be reduced, and the opening degree of the adjustment valve in the cooling branch of the second battery is controlled to be increased, so that the heating power of the first battery is increased, and the heating power of the second battery is reduced, thereby implementing temperature balancing between the first battery and the second battery. If T62−T61>3° C., through the battery heat management controller, the opening degree of the adjustment valve in the cooling branch of the second battery is controlled to be reduced, and the opening degree of the adjustment valve in the cooling branch of the first battery is controlled to be increased, so that the heating power of the second battery is increased, and the heating power of the first battery is reduced, thereby implementing temperature balancing between the first battery and the second battery.

According to an embodiment of the present disclosure, in the cooling mode, the adjusting, according to the required powers P1 and the actual powers P2 of the plurality of batteries connected in parallel, temperatures of the plurality of batteries connected in parallel respectively specifically includes: determining whether the required power P1 of each battery is greater than the actual power P2 corresponding to each battery; if a required power P1 of a battery is greater than the actual power P2 corresponding to the battery, obtaining a power difference between the required power P1 and the actual power P2 of the battery, and increasing, according to the power difference, the power of the compressor used for cooling the battery, or performing adjustment to increase the flow of the cooling liquid of the battery, to increase the cooling power of the battery; and if a required power P1 of a battery is less than or equal to the actual power P2 corresponding to the battery, reducing the power of the compressor or keeping the power of the compressor unchanged, or performing adjustment to reduce the flow of the cooling liquid of the battery, to reduce the cooling power of the battery.

Specifically, when the temperature adjustment system enters the cooling mode, P1 and P2 of each battery are obtained through the controller, and determining is performed. If P1 for one of the batteries is greater than P2, it indicates that the temperature reduction on the battery cannot be completed within the target time according to the current refrigerating power or flow of the cooling liquid. Therefore, a power difference between P1 and P2 of the battery is obtained, and the power of the compressor 1 or the flow of the cooling liquid of the battery is increased through the vehicle-mounted air conditioner controller according to the power difference, to increase the cooling power of the battery, where a larger power difference between P1 and P2 indicates larger increase of the power of the compressor and the flow of the cooling liquid of the battery, so that the temperature of the battery is reduced to the target temperature within the preset time t. If P1 on one of the batteries is less than or equal to P2, the power of the compressor 1 may be kept unchanged or the power of the compressor may be properly reduced through the vehicle-mounted air conditioner controller, or the flow of the cooling liquid of the battery is reduced, to reduce the cooling power of the battery. When the temperatures of all of the batteries are less than 35° C., cooling on the batteries is completed, and information about turning off a temperature adjustment function is sent to the vehicle-mounted air conditioner through CAN communication, and the battery cooling branch is controlled to be turned off. If the temperature of a battery is still higher than 35° C. after the temperature adjustment system has entered the cooling mode for a relatively long time, for example, 1 hour, the cooling power of the battery is properly increased, so that the battery completes temperature reduction as soon as possible.

According to an embodiment of the present disclosure, when the temperature adjustment system enters the heating mode, the adjusting, according to the required powers P1 and the actual powers P2 of the plurality of batteries connected in parallel, temperatures of the plurality of batteries connected in parallel respectively specifically includes: determining whether the required power P1 of each battery is greater than the actual power P2 corresponding to each battery; if a required power P1 of a battery is greater than the actual power P2 corresponding to the battery, obtaining a power difference between the required power P1 and the actual power P2 of the battery, and increasing, according to the power difference, the power of the heater used for cooling the battery, or performing adjustment to increase the flow of the cooling liquid of the battery, to increase the heating power of the battery; and Specifically, when the temperature adjustment system enters the heating mode, P1 and P2 of each battery are obtained, and determining is performed. If P1 for one of the batteries is greater than P2, it indicates that temperature increase on the battery cannot be completed within the target time t according to the current heating power or flow of the cooling liquid. Therefore, a power difference between P1 and P2 of the battery is obtained, and the power of the heater used for heating the battery is increased through the battery heat management controller according to the power difference, or adjustment is performed to increase the flow of the cooling liquid of the battery, so that temperature adjustment on the battery may be completed within the target time t. A larger difference between P1 and P2 indicates larger increase of the power of the heater and the flow of the cooling liquid in the loop of the battery. If P1 of a battery is less than or equal to P2, through the battery heat management controller, the power of the heater may be properly reduced, or the power of the heater may be kept unchanged, or adjustment may be performed to reduce the flow of the cooling liquid in the loop of the battery, to reduce the heating power of the battery. When the temperatures of all of the batteries are higher than a preset temperature, for example, 10° C., heating on the batteries is completed, information about turning off a temperature adjustment function is sent to the vehicle-mounted air conditioner through CAN communication, and the heater is controlled through the battery heat management controller to be turned off. If the temperature of a battery is still lower than 10° C. after the temperature adjustment system has entered the heating mode for a relatively long time, for example, 1 hour, the power of the heater and the rotational speed of the pump are properly increased through the battery heat management controller, so that the battery completes temperature increase as soon as possible.

According to an embodiment of the present disclosure, the temperature adjustment method for a vehicle-mounted battery may further include: reducing the rotational speed of the pump if the required power P1 of a battery is less than the corresponding actual power P2; and increasing the rotational speed of the pump if the required power P1 of a battery is greater than the corresponding actual power P2.

Specifically, when the temperature adjustment system enters the heating mode or cooling mode, if P1 of a battery is less than P2, the rotational speed of the pump is controlled through the battery heat management controller to be reduced, to save electric energy. If P1 of a battery is greater than P2, in addition to controlling the power of the heater or the compressor to be increased or the flow of the cooling liquid in the loop in which the battery is located to be increased, the rotational speed of the pump is further controlled to be increased, to increase a mass of the cooling liquid flowing through a cross section of the cooling flow path within a unit time, thereby increasing the actual power P2 of the battery, to implement temperature adjustment within the target time t.

To make a person skilled in the art more clearly understand the present disclosure, the temperature adjustment method for a vehicle-mounted battery is described below with reference to specific embodiments.

As shown in FIG. 11, the battery may include the first battery and the second battery, Pz=P11+P12, P11 is the required power of the first battery, P12 is the required power of the second battery, and Pz is a sum of (the total required power Pz) of the required power of the first battery and the required power of the second battery. Pf=P21+P22, P21 is the actual power for temperature adjustment on the first battery, P22 is the actual power for temperature adjustment on the second battery, and Pf is a sum of the actual power for temperature adjustment on the first battery and the actual power for temperature adjustment on the second battery.

When a temperature of a battery is greater than the first temperature threshold (for example, 40° C.), the temperature adjustment system for a vehicle-mounted battery operates in the cooling mode. If a sum of the total battery cooling required power Pz and the intra-vehicle cooling required power P4 is less than the maximum refrigerating power P of the compressor, that is, Pz+P4≤P, the compressor 1 is controlled through the vehicle-mounted air conditioner controller to run according to a refrigerating power Pz+P4. It may be understood that, in this case, Pz<P, and P4<P.

If Pz+P4>P, whether the temperature of the first battery or the second battery is greater than 45° C. is determined. If the temperature is greater than 45° C., the cooling power is preferentially provided for battery cooling, the controller controls the compressor to run according to the maximum refrigerating power P, the cooling power of the battery cooling branch is Pz, and the cooling power of the intra-vehicle cooling branch is equal to P-Pz.

If it is determined that the temperature of the battery is not greater than 45° C., and the intra-vehicle temperature has not reached the set temperature, the cooling power is preferentially provided to the inside of the vehicle, the compressor is controlled, through the vehicle-mounted air conditioner controller, to run according to the maximum refrigerating power P, the cooling power of the intra-vehicle cooling branch is P4, and the cooling power of the battery cooling branch is equal to P-P4. In the cooling branch of the first battery and the cooling branch of the second battery, the cooling power is reduced in proportion. The proportion may be: (P-P4)/(P11+P12). If the intra-vehicle temperature has reached the set temperature, the cooling power of the battery is preferentially satisfied.

A sum of the actual power for temperature adjustment on the first battery and the actual power for temperature adjustment on the second battery is Pf, and when Pz>Pf, the power that needs to be adjusted is Pc (Pc=Pz−Pf). If Pz+P4+Pc≤P, the refrigerating power of the compressor needs to be increased through the vehicle-mounted air conditioner controller, the opening degree of the second expansion valve is increased, and the rotational speed of the pump 51 is increased through the battery heat management controller. Moreover, processing is performed as follows:

If P11≥P21, and P11−P21=Pc1, the opening degree of the valve of the loop in which the first battery is located is controlled through the battery heat management controller to be increased, so that the cooling power of the first battery 61 is increased by Pc1. If P12≥P22, and P12−P22=Pc2, the opening degree of the valve of the loop in which the second battery is located is controlled through the battery heat management controller to be increased, so that the cooling power of the second battery is increased by Pc2. If P11<P12, and P21−P11=Pc1, the cooling power of the first battery is kept unchanged, or the opening degree of the valve of the loop in which the first battery is located is controlled through the battery heat management controller to be reduced, so that the cooling power of the first battery is reduced. If P12<P22, and P22−P12=Pc2, the cooling power of the second battery is kept unchanged, or the opening degree of the valve of the loop in which the second battery is located is controlled through the battery heat management controller to be reduced, so that the cooling power of the second battery is reduced.

If Pz+P4+Pc>P (and Pz+Pc≤P), determining is performed as follows:

Whether the temperature of the first battery and the temperature of the second battery are greater than 45° C. is determined. If greater than 45° C., the cooling power is preferentially provided for battery cooling, and the compressor is controlled through the vehicle-mounted air conditioner controller to run according to the maximum refrigerating power; and moreover, the rotational speed of the pump is increased through the battery heat management controller, the cooling power of the battery cooling branch is controlled through the vehicle-mounted air conditioner controller to be increased by Pc, and the power of the intra-vehicle cooling branch is reduced by Pc. If P11≥P21, and P11−P21=Pc1, the opening degree of the valve of the loop in which the first battery is located is controlled through the battery heat management controller to be increased, so that the cooling power of the first battery is increased by Pc1. If P12≥P22, and P12−P22=Pc2, the opening degree of the valve of the loop in which the second battery is located is controlled through the battery heat management controller to be increased, so that the cooling power of the second battery is increased by Pc2. If P11<P12, and P21−P11=Pc1, through the battery heat management controller, the cooling power of the first battery is kept unchanged, or the opening degree of the valve of the loop in which the first battery is located is controlled to be reduced, so that the cooling power of the battery is reduced. If P12<P22, and P22−P12=Pc2, the cooling power of the second battery is kept unchanged, or the opening degree of the valve of the loop in which the second battery is located is controlled to be reduced, so that the cooling power of the second battery is reduced.

If the temperature of the battery is not greater than 45° C., and the intra-vehicle temperature has not reached the set temperature, the cooling power is preferentially provided to the inside of the vehicle, the compressor is controlled, through the vehicle-mounted air conditioner controller, to run according to the maximum refrigerating power P, the rotational speed of the pump is increased through the battery heat management controller, the cooling power of the intra-vehicle cooling branch is P4, and the cooling power of the battery cooling branch is equal to P−P4. In the cooling branch of the first battery 61 and the cooling branch of the second battery 62, the cooling power is reduced in proportion. The proportion may be: (P−P4)/(P11+P12). The cooling power of the first battery is P11*(P−P4)/(P11+P12), and the cooling power of the second battery is P12*(P−P4)/(P11+P12).

If the intra-vehicle temperature has reached the set temperature, the cooling power of the battery is preferentially satisfied, the compressor is controlled through the vehicle-mounted air conditioner controller to run at the maximum power P, the opening degree of the second expansion valve is increased, and the rotational speed of the pump is increased through the battery heat management controller, so that the cooling power of the battery cooling branch is increased by Pc. Moreover, processing is performed as follows:

If P11≥P21, and P11−P21=Pc1, the opening degree of the valve of the loop in which the first battery is located is controlled through the battery heat management controller to be increased, so that the cooling power of the first battery is increased by Pc1. If P12≥P22, and P12−P22=Pc2, the opening degree of the valve of the loop in which the second battery is located is controlled through the battery heat management controller to be increased, so that the cooling power of the second battery is increased by Pc2. If P11<P12, and P21−P11=Pc1, through the battery heat management controller, the cooling power of the first battery is kept unchanged, or the opening degree of the valve of the loop in which the first battery is located is controlled to be reduced, so that the cooling power of the battery is reduced. If P12<P22, and P22−P12=Pc2, the cooling power of the second battery is kept unchanged, or the opening degree of the valve of the loop in which the second battery is located is controlled to be reduced, so that the cooling power of the second battery is reduced.

When Pz≤Pf, and the power that needs to be adjusted is Pc (Pc=Pf−Pz), the refrigerating power of the compressor is maintained unchanged, or the refrigerating power of the compressor is reduced, or the opening degree of the second expansion valve is reduced through the vehicle-mounted air conditioner controller, or the rotational speed of the pump is reduced through the battery heat management controller. If P11≥P21, and P11−P21=Pc1, the opening degree of the valve of the loop in which the first battery is located is controlled through the battery heat management controller to be increased, so that the cooling power of the first battery is increased by Pc1. If P12≥P22, and P12−P22=Pc2, the opening degree of the valve 58 of the loop in which the second battery is located is controlled through the battery heat management controller to be increased, so that the cooling power of the battery is increased by Pc2. If P11<P12, and P21−P11=Pc1, through the battery heat management controller, the cooling power of the first battery 61 is kept unchanged, or the opening degree of the valve of the loop in which the first battery is located is controlled to be reduced, so that the cooling power of the first battery is reduced. If P12<P22, and P22−P12=Pc2, the cooling power of the second battery is kept unchanged through the battery heat management controller, or the opening degree of the valve of the loop in which the second battery is located is controlled to be reduced, so that the cooling power of the second battery is reduced.

When the temperature of the vehicle-mounted battery is less than the second temperature threshold (for example, 0° C.), the temperature adjustment system for a vehicle-mounted battery operates in the heating mode. If Pz>Pf, and the power that needs to be adjusted is Pc (Pc=Pz−Pf), the heating power of the heater is increased by Pc, and the rotational speed of the pump is increased. Moreover, processing is performed as follows:

If P11≥P21, and P11−P21=Pc1, the opening degree of the valve of the loop in which the first battery is located is controlled through the battery heat management controller to be increased, so that the heating power of the first battery is increased by Pc1. If P12≥P22, and P12−P22=Pc2, the opening degree of the valve of the loop in which the second battery is located is controlled through the battery heat management controller to be increased, so that the heating power of the second battery is increased by Pc2. If P11<P12, and P21−P11=Pc1, the cooling power of the first battery is kept unchanged, or the opening degree of the valve of the loop in which the first battery is located is controlled through the battery heat management controller to be reduced, so that the heating power of the first battery is reduced. If P12<P22, and P22−P12=Pc2, the cooling power of the second battery is kept unchanged through the battery heat management controller, or the opening degree of the valve of the loop in which the second battery is located is controlled to be reduced, so that the heating power of the second battery is reduced.

If Pz≤Pf, and the power that needs to be adjusted is Pc (Pc=Pz−Pf), the power of the heater is controlled through the battery heat management controller to be kept unchanged or be reduced by the heating power Pc, or the rotational speed of the pump is reduced. Moreover, processing is performed as follows:

If P11≥P21, and P11−P21=Pc1, the opening degree of the valve of the loop in which the first battery is located is controlled through the battery heat management controller to be increased, so that the heating power of the first battery is increased by Pc1. If P12≥P22, and P12−P22=Pc2, the opening degree of the valve of the loop in which the second battery is located is controlled to be increased, so that the heating power of the second battery is increased by Pc2. If P11<P12, and P21−P11=Pc1, the heating power of the first battery is kept unchanged, or the opening degree of the valve of the loop in which the first battery is located is controlled through the battery heat management controller to be reduced, so that the heating power of the first battery is reduced. If P12<P22, and P22−P12=Pc2, the cooling power of the second battery is kept unchanged, or the opening degree of the valve of the loop in which the second battery is located is controlled through the battery heat management controller to be reduced, so that the heating power of the battery is reduced.

According to an embodiment of the present disclosure, there are a plurality of compressors used for providing a refrigerant to the battery, and the battery temperature adjustment method may further include: determining a quantity of to-be-started compressors according to the required power P1 of each battery and a maximum refrigerating power of each compressor; and controlling, in a cooling mode, a corresponding quantity of compressors to start.

Optionally, the determining a quantity of to-be-started compressors according to the required power P1 of each battery and a maximum refrigerating power P of each compressor specifically includes: generating a total actual power Pz for temperature adjustment according to the required power P1 of each battery; determining whether the total required power Pz is greater than the maximum refrigerating power P of a single compressor; and controlling, if the required power is greater than the maximum refrigerating power P of the single compressor, the plurality of compressors to start simultaneously.

Specifically, when there are a plurality of compressors, correspondingly, there are a plurality of intra-vehicle cooling branches and a plurality of battery cooling branches. For example, when there are two compressors for providing the refrigerant to batteries, there are two intra-vehicle cooling branches and two battery cooling branches, and the temperature adjustment system enters the cooling mode, P1 of each battery is obtained, and the total required power Pz of the entire temperature adjustment system may be calculated by adding P1 of each battery. If Pz is less than or equal to the maximum refrigerating power P of a single compressor, one compressor is controlled to start. If Pz is greater than the maximum refrigerating power P of a single compressor, two compressors are controlled to start simultaneously and operate, to satisfy a temperature reduction refrigerating power requirement of the battery.

When there are a plurality of compressors used for providing the refrigerant to the battery, if a sum of maximum refrigerating powers of the plurality of compressors is P5, the cooling power of the battery may be adjusted as follows:

(1) When Pz>Pf, the power that needs to be adjusted is Pc (Pc=Pz−Pf), and if Pz+P4+Pc≤P5, the refrigerating power of the compressor is controlled through the vehicle-mounted air conditioner controller to be increased by Pc, the opening degree of the second expansion valve is increased, and the rotational speed of the pump is increased through the battery heat management controller. Moreover, processing is performed as follows:

If P11≥P21, and P11−P21=Pc1, the opening degree of the valve of the loop in which the first battery is located is controlled through the battery heat management controller to be increased, so that the cooling power of the first battery is increased by Pc1. If P12≥P22, and P12−P22=Pc2, the opening degree of the valve of the loop in which the second battery is located is controlled through the battery heat management controller to be increased, so that the cooling power of the second battery is increased by Pc2. If P11<P12, and P21−P11=Pc1, the cooling power of the first battery is kept unchanged, or the opening degree of the valve of the loop in which the first battery is located is controlled through the battery heat management controller to be reduced, so that the cooling power of the first battery is reduced. If P12<P22, and P22-P12=Pc2, the cooling power of the second battery is kept unchanged, or the opening degree of the valve of the loop in which the second battery is located is controlled through the battery heat management controller to be reduced, so that the cooling power of the battery is reduced.

If Pz+P4+Pc>P5 (and Pz+Pc≤P5), determining is performed as follows:

Whether the temperature of the battery is greater than 45° C. is determined. If greater than 45° C., the cooling power is preferentially provided for battery cooling, and the compressor is controlled through the vehicle-mounted air conditioner controller to run according to the maximum refrigerating power; and moreover, the rotational speed of the water pump is increased, the cooling power of the battery cooling branch is increased by Pc, and the power of the intra-vehicle cooling branch is reduced by Pc.

If P11≥P21, and P11−P21=Pc1, the opening degree of the valve 58 of the loop in which the first battery is located is controlled through the battery heat management controller to be increased, so that the cooling power of the battery is increased by Pc1. If P12≥P22, and P12−P22=Pc2, the opening degree of the valve of the loop in which the second battery is located is controlled through the battery heat management controller to be increased, so that the cooling power of the second battery is increased by Pc2. If P11<P12, and P21−P11=Pc1, the cooling power of the battery is kept unchanged, or the opening degree of the valve of the loop in which the first battery is located is controlled through the battery heat management controller to be reduced, so that the cooling power of the first battery is reduced. If P12<P22, and P22−P12=Pc2, the cooling power of the second battery is kept unchanged, or the opening degree of the valve of the loop in which the second battery is located is controlled through the battery heat management controller to be reduced, so that the cooling power of the second battery is reduced.

If the temperature of the battery is not greater than 45° C., and the intra-vehicle temperature has not reached the set temperature, the cooling power is preferentially provided to the inside of the vehicle, all compressors are controlled, through the vehicle-mounted air conditioner controller, to run according to the maximum refrigerating power, the rotational speed of the water pump is increased through the battery heat management controller, the cooling power of the intra-vehicle cooling branch is P4, and the cooling power of the battery cooling branch is equal to P5-P4. In the cooling branch of the first battery and the cooling branch of the second battery, the cooling power is reduced in proportion. The proportion may be: (P5-P4)/(P11+P12). The cooling power of the first battery 61 is P11*(P5-P4)/(P11+P12), and the cooling power of the second battery 62 is P12*(P5-P4)/(P11+P12).

If the intra-vehicle temperature has reached the set temperature, the cooling power of the battery is preferentially satisfied, all compressors are controlled through the vehicle-mounted air conditioner controller to run at the maximum power, the opening degree of the second expansion valve is increased, and the rotational speed of the water pump is increased through the battery heat management controller, so that the cooling power of the battery cooling branch is increased by Pc. Moreover, processing is performed as follows:

If P11≥P21, and P11−P21=Pc1, the opening degree of the valve 58 of the loop in which the first battery is located is controlled through the battery heat management controller to be increased, so that the cooling power of the first battery is increased by Pc1. If P12≥P22, and P12−P22=Pc2, the opening degree of the valve of the loop in which the second battery is located is controlled through the battery heat management controller to be increased, so that the cooling power of the second battery is increased by Pc2. If P11<P12, and P21−P11=Pc1, the cooling power of the first battery is kept unchanged, or the opening degree of the valve 58 of the loop in which the first battery is located is controlled through the battery heat management controller to be reduced, so that the cooling power of the first battery is reduced. If P12<P22, and P22−P12=Pc2, the cooling power of the second battery is kept unchanged, or the opening degree of the valve of the loop in which the second battery is located is controlled through the battery heat management controller to be reduced, so that the cooling power of the battery is reduced.

(2) When Pz≤Pf, and the power that needs to be adjusted is Pc (Pc=Pf−Pz), the refrigerating power of the compressor is maintained unchanged, or the refrigerating power of the compressor is reduced, or the opening degree of the second expansion valve is reduced through the battery heat management controller, or the rotational speed of the pump is reduced through the battery heat management controller. If P11≥P21, and P11−P21=Pc1, the opening degree of the valve of the loop in which the first battery is located is controlled through the battery heat management controller to be increased, so that the cooling power of the first battery is increased by Pc1. If P12≥P22, and P12−P22=Pc2, the opening degree of the valve of the loop in which the second battery is located is controlled through the battery heat management controller to be increased, so that the cooling power of the battery is increased by Pc2. If P11<P12, and P21-P11=Pc1, the cooling power of the first battery is kept unchanged, or the opening degree of the valve of the loop in which the first battery is located is controlled through the battery heat management controller to be reduced, so that the cooling power of the first battery is reduced. If P12<P22, and P22−P12=Pc2, the cooling power of the second battery is kept unchanged, or the opening degree of the valve of the loop in which the second battery is located is controlled through the battery heat management controller to be reduced, so that the cooling power of the second battery is reduced.

When the temperature of the vehicle-mounted battery is less than the second temperature threshold (for example, 0° C.), the temperature adjustment system for a vehicle-mounted battery operates in the heating mode. If Pz>Pf, and the power that needs to be adjusted is Pc (Pc=Pz−Pf), the heating power of the heater 53 is increased by Pc, and the rotational speed of the pump 51 is increased. Moreover, processing is performed as follows:

If P11≥P21, and P11−P21=Pc1, the opening degree of the valve 58 of the loop in which the first battery 61 is located is controlled through the battery heat management controller to be increased, so that the heating power of the first battery 61 is increased by Pc1. If P12≥P22, and P12−P22=Pc2, the opening degree of the valve 58 of the loop in which the second battery 62 is located is controlled through the battery heat management controller to be increased, so that the heating power of the second battery 62 is increased by Pc2. If P11<P12, and P21−P11=Pc1, the heating power of the first battery 61 is kept unchanged, or the opening degree of the valve 58 of the loop in which the first battery 61 is located is controlled through the battery heat management controller to be reduced, so that the heating power of the first battery 61 is reduced. If P12<P22, and P22−P12=Pc2, the cooling power of the second battery 62 is kept unchanged, or the opening degree of the valve 58 of the loop in which the second battery 62 is located is controlled through the battery heat management controller to be reduced, so that the heating power of the second battery 62 is reduced.

If Pz≤Pf, and the power that needs to be adjusted is Pc (Pc=Pz−Pf), the power of the heater is kept unchanged or is reduced by the heating power Pc, or the rotational speed of the pump is reduced. Moreover, processing is performed as follows:

If P11≥P21, and P11−P21=Pc1, the opening degree of the valve 58 of the loop in which the first battery 61 is located is controlled through the battery heat management controller to be increased, so that the heating power of the first battery 61 is increased by Pc1. If P12≥P22, and P12−P22=Pc2, the opening degree of the valve 58 of the loop in which the second battery 62 is located is controlled through the battery heat management controller to be increased, so that the heating power of the second battery 62 is increased by Pc2. If P11<P12, and P21−P11=Pc1, the cooling power of the first battery 61 is kept unchanged, or the opening degree of the valve 58 of the loop in which the first battery 61 is located is controlled through the battery heat management controller to be reduced, so that the heating power of the first battery 61 is reduced. If P12<P22, and P22−P12=Pc2, the cooling power of the second battery 62 is kept unchanged, or the opening degree of the valve 58 of the loop in which the second battery 62 is located is controlled through the battery heat management controller to be reduced, so that the heating power of the battery 62 is reduced.

In the temperature adjustment method for a vehicle-mounted battery according to this embodiment of the present disclosure, the required powers of the plurality of batteries connected in parallel are first obtained respectively; then the actual powers for temperature adjustment on the plurality of batteries connected in parallel are obtained respectively; and finally the temperatures of the plurality of batteries connected in parallel are respectively adjusted according to the required powers and the actual powers for temperature adjustment on the plurality of batteries connected in parallel. Therefore, the method may precisely control the heating power and the cooling power of each battery according to an actual status of each battery, and adjust the temperature of the battery when the temperature is excessively high or excessively low, so that the temperature of the battery is maintained within a preset range, to avoid a case of affecting performance of the vehicle-mounted battery because of the temperature.

When there are a plurality of vehicle-mounted batteries, and the batteries are disposed independent of each other, the present disclosure further proposes another temperature adjustment system for a vehicle-mounted battery.

Figure 13:
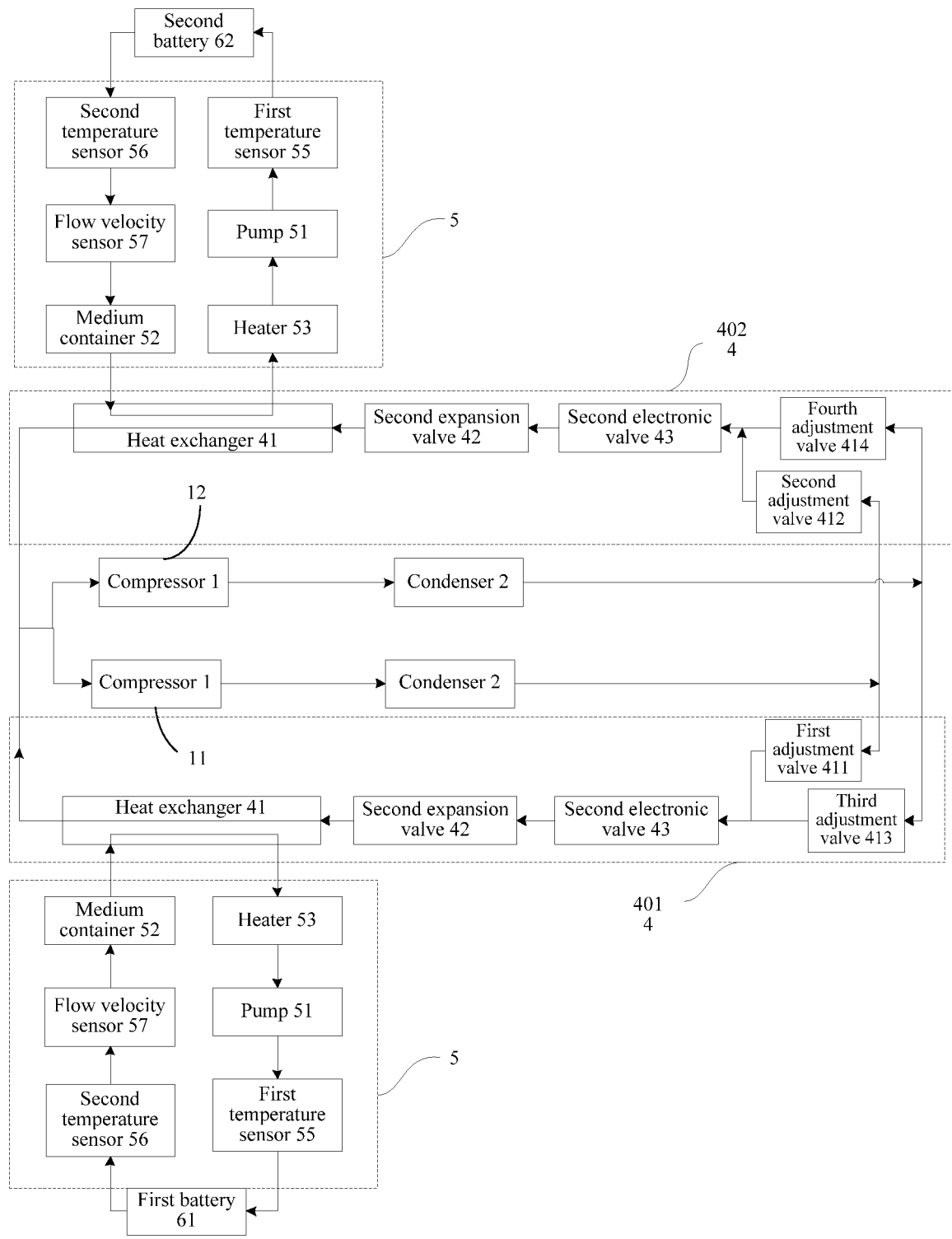
FIG. 13 is a schematic diagram 1 of a flow path structure of a temperature adjustment system for a vehicle-mounted battery according to a seventh embodiment of the present disclosure.

Specifically, as shown in FIG. 13, the temperature adjustment system includes: a plurality of compressors 1, a plurality of condensers 2, a plurality of battery cooling branches 4, and a plurality of battery temperature adjustment modules 5.

The plurality of condensers 2 are connected to the plurality of compressors 1, the plurality of battery cooling branches 4 are connected between the plurality of compressors 1 and the plurality of condensers 2, and the plurality of battery cooling branches 4 are in communication with each other. The battery temperature adjustment modules 5 are respectively connected to a plurality of batteries 6 and the plurality of battery cooling branches 4, and are used for respectively obtaining required powers P1 and actual powers P2 of the plurality of batteries, adjusting temperatures of the batteries according to the required powers P1 and the actual powers P2, and adjusting, according to the required powers P1 and the actual powers P2, opening degrees of refrigerating capacities provided by the plurality of compressors 1 to the battery cooling branches 4 corresponding to the batteries 6.

Optionally, according to an embodiment of the present disclosure, the adjusting temperatures of the batteries according to the required powers P1 for temperature adjustment and the actual powers P2 specifically includes: adjusting the temperatures of the batteries within a target time t according to the required powers P1 and the actual powers P2, to reach target temperatures.

That is to say, when the battery temperature adjustment module 5 performs temperature adjustment on each battery 6 according to the required power P1 and the actual power P2, it may be ensured that a heating power and a cooling power of the vehicle-mounted battery are precisely controlled according to an actual status of each battery 6 within the target time t, thereby adjusting the temperature of the vehicle-mounted battery when the temperature is excessively high or excessively low.

As shown in FIG. 13, using two compressors 1, two battery cooling branches 4, two battery temperature adjustment modules 5, and two batteries 6 as an example, the battery cooling branches 4 may include a first battery cooling branch 401 and a second battery cooling branch 402 that respectively correspond to a first battery 61 and a second battery 62.

When the cooling liquid of the air conditioner does not access the battery temperature adjustment module 5, the battery cooling branch 4 has two ducts, a first duct is in communication with the compressor 1, and a second duct is in communication with the battery temperature adjustment module 5, where the first duct and the second duct are adjacently disposed independent of each other. Using the first battery cooling branch 401 in which the first battery 61 is located as an example, when the temperature of the first battery 61 is excessively high, a refrigerating function of the vehicle-mounted air conditioner is turned on, a battery cooling function is started, and flowing directions of the cooling liquid (for example, a cooling medium) in the first duct and the second duct are respectively: the compressor 1—the condenser 2—the first battery cooling branch 401—the compressor 1; and the first battery cooling branch 401—the battery temperature adjustment module 5—the first battery 61—the battery temperature adjustment module 5—the first battery cooling branch 401.

It may be understood that, each battery temperature adjustment module 5 may adjust the refrigerating power/heating power of a battery according to the required power P1 and the actual power P2 of the corresponding battery by adjusting the flow of the cooling liquid flowing into the corresponding battery cooling branch 4, thereby ensuring that the temperature of the battery is adjusted within the target time t according to an actual status of each battery. Moreover, because the plurality of battery cooling branches 4 are in communication with each other, the battery temperature adjustment modules 5 may adjust the opening degrees of the refrigerating capacities of the battery cooling branches 4 corresponding to the batteries according to the temperatures of the batteries, to ensure temperature balancing between the batteries. Therefore, the temperatures may be adjusted within the target time when the temperatures of the vehicle-mounted batteries are excessively high or excessively low, thereby maintaining the temperatures of the vehicle-mounted batteries within a preset range, avoiding a case of affecting performance of the vehicle-mounted batteries because of the temperatures, and ensuring temperature balancing between the batteries.

According to an embodiment of the present disclosure, as shown in FIG. 13, a battery cooling branch 4 may include a heat exchanger 41, the heat exchanger 41 includes a first duct and a second duct, the second duct is connected to a battery temperature adjustment module 5, and the first duct is in communication with a compressor 1, where the first duct and the second duct are adjacently disposed independent of each other.

The battery temperature adjustment module 5 may include: a flow path of adjusting the temperature of the battery (not specifically shown in the figure), where the flow path is disposed in the battery 6; and a pump 51, a medium container 52, a heater 53, and a controller (not specifically shown in the figure) that are connected between the flow path and the heat exchanger 41. The controller obtains required powers P1 for a plurality of batteries 6 and actual powers P2 of the batteries, and adjusts a temperature of a battery 6 according to the required power P1 and the actual power P2 of each battery. The battery cooling branch 4 may further include a second expansion valve 42 and a second electronic valve 43.

As shown in FIG. 11, the first battery cooling branch 401 may further include a first adjustment valve 411 and a third adjustment valve 413; and the second battery cooling branch 402 may further include a second adjustment valve 412 and a fourth adjustment valve 414. For details of connection manners of the adjustment valves, refer to FIG. 13, and details are not described herein.

As shown in FIG. 13, the compressor 11 respectively controls, through the first adjustment valve 411 and the second adjustment valve 412, flows of the cooling medium flowing toward the first battery cooling branch 401 and the second battery cooling branch 402. The compressor 12 respectively controls, through the third adjustment valve 413 and the fourth adjustment valve 414, flows of the cooling medium flowing toward the first battery cooling branch 401 and the second battery cooling branch 402. The cooling power of the battery cooling branch 401 is related to the flows of the cooling medium in the first adjustment valve 411 and the third adjustment valve 413. The cooling power of the battery cooling branch 402 is related to the flows of the cooling medium in the second adjustment valve 412 and the fourth adjustment valve 414.

It may be understood that, the battery cooling branch 4 may alternatively be not provided with the heat exchanger 41, and a cooling medium flows in the battery cooling branch 4 without the heat exchanger 41. If the battery cooling branch 4 is provided with the heat exchanger 41, a cooling medium flows in the first duct in the battery cooling branch 4, and a cooling liquid flows in the second duct.

According to an implementation example of the present disclosure, as shown in FIG. 13, the battery temperature adjustment module 5 may further include a first temperature sensor 55 disposed on an inlet of the flow path, a second temperature sensor 56 disposed on an outlet of the flow path, and a flow velocity sensor 57. It may be understood that, locations of the inlet and the outlet of the flow path are not absolute, but are determined according to steering of the pump 51.

Specifically, the heat exchanger 41 may be a plate heat exchanger, and the plate heat exchanger may be installed in the vehicle-mounted air conditioner, so that the entire refrigerant loop is in the vehicle-mounted air conditioner, to facilitate pre-delivery commissioning of the vehicle-mounted air conditioner; and the vehicle-mounted air conditioner may be individually supplied and assembled, and moreover, the vehicle-mounted air conditioner only needs to be filled with the refrigerant once in an installing process. The cooling liquid flows into the battery 6 from the inlet of the flow path, and flows out from the outlet of the flow path, thereby implementing heat exchange between the battery 6 and the cooling liquid.

The pump 51 is mainly used for providing power, and the medium container 52 is mainly used for storing the cooling liquid and receiving the cooling liquid added to the temperature adjustment system. When the cooling liquid in the temperature adjustment system is reduced, the cooling liquid in the medium container 52 may be automatically supplemented. The heater 53 may be a PTC heater, may perform CAN communication with the controller, to provide a heating power to the temperature adjustment system for a vehicle-mounted battery, and is controlled by the controller. Moreover, the heater 53 is not in direct contact with the battery 6, to have relatively high safety, reliability, and practicability.

The first temperature sensor 55 is used for detecting the temperature of the cooling liquid on the inlet of the flow path, and the second temperature sensor 56 is used for detecting the temperature of the cooling liquid on the outlet of the flow path. The flow velocity sensor 57 is used for detecting flow velocity information of the cooling liquid in the corresponding duct. The second electronic valve 43 is used for controlling opening and closing of the corresponding battery cooling branch 4, and the second expansion valve 42 may be used for controlling the flow of the cooling liquid in the corresponding battery cooling branch 4. The controller may simultaneously control the flows of the cooling liquid in the two cooling branches of the first battery 61 and the second battery 62 by adjusting opening degrees of the first to the fourth adjustment valves 411 to 414, thereby balancing the temperatures of the two batteries. Moreover, the controller may further perform CAN communication with the vehicle-mounted air conditioner and the heater 53, and may control the rotational speed of the pump 51 and monitor the temperature and flow information of the cooling liquid; and may further perform management on the battery 6, detect the voltage and temperature information of the battery 6, and control on/off of the temperature adjustment system for a vehicle-mounted battery.

How does each battery temperature adjustment module 5 obtain the required power P1 and the actual power P2 for a corresponding battery 6 is described below with reference to specific embodiments.

According to an embodiment of the present disclosure, the controller may be configured to: obtain a first parameter when enabling temperature adjustment on each battery, and generate a first required power of each battery according to the first parameter; obtain a second parameter when enabling temperature adjustment on each battery, and generate a second required power of each battery according to the second parameter; and generate the required power P1 of each battery according to the first required power of each battery and the second required power of each battery.

Optionally, according to an embodiment of the present disclosure, the first parameter is an initial temperature when enabling temperature adjustment on the battery 6, the target temperature, and the target time t for reaching the target temperature from the initial temperature, and the controller obtains a first temperature difference $\Delta T_1$ between the initial temperature and the target temperature, and generates the first required power according to the first temperature difference $\Delta T_1$ and the target time t.

Optionally, the controller generates the first required power through the following formula (1):

$$\Delta T_1 * C * M / t \quad (1)$$

where $\Delta T_1$ is the first temperature difference between the initial temperature and the target temperature, t is the target time, C is a specific heat capacity of the battery 6, and M is a mass of the battery 6.

The second parameter is an average current I of each battery 6 within a preset time, and the controller generates the second required power through the following formula (2):

$$I^2 * R \quad (2)$$

where I is the average current, and R is an internal resistance of the battery 6.

When the battery 6 is cooled, $P1 = \Delta T_1 * C * M / t + I^2 * R$; and when the battery 6 is heated, $P1 = \Delta T_1 * C * M / t - I^2 * R$.

According to an embodiment of the present disclosure, the controller generates a second temperature difference $\Delta T_2$ of each battery according to an inlet temperature detected by the first temperature sensor 55 and an outlet temperature detected by the second temperature sensor 56 that are in a loop in which each battery 6 is located, and generates the actual power P2 of each battery according to the second temperature difference $\Delta T_2$ of each battery and a flow velocity v that is detected by the flow velocity sensor 57.

Optionally, according to an embodiment of the present disclosure, the actual power P2 is generated through the following formula (3):

$$\Delta T_2 * c * m \quad (3)$$

where $\Delta T_2$ is the second temperature difference, c is a specific heat capacity of the cooling liquid in the flow path, and m is a mass of the cooling liquid flowing through a cross section of the flow path within a unit time, where $m = v * \rho * s$, v is a flow velocity of the cooling liquid, $\rho$ is a density of the cooling liquid, and s is a cross-sectional area of the flow path.

Specifically, after the vehicle is powered on, the controller determines whether temperature adjustment needs to be performed on the vehicle; and if it is determined that temperature adjustment needs to be performed on the vehicle, enables a temperature adjustment function, and sends information about a low rotational speed to the pump 51, and the pump begins operating at a default rotational speed (for example, low rotational speed). Then, the controller obtains the initial temperature (that is, current temperature) of each battery 6, the target temperature, and the target time t for reaching the target temperature from the initial temperature, where the target temperature and the target time t may be preset according to an actual situation, and the first required power of each battery is calculated according to the formula (1). Moreover, the controller obtains the average current I of each battery 6 within the preset time, and the second required power of each battery is calculated according to the formula (2). Then, the controller calculates the required power P1 (that is, the required power for adjusting the temperature of each battery 6 to the target temperature within the target time) according to the first required power and the second required power of each battery 6. Moreover, the controller obtains temperature information detected by the first temperature sensor 55 and the second temperature sensor 56 that are set corresponding to each battery, and obtains flow velocity information detected by each flow velocity sensor 57, and the actual power P2 of each battery 6 is calculated according to the formula (3). Finally, the controller may adjust, according to the required power P1 and the actual power P2 of a corresponding battery, the refrigerating power of the battery by adjusting the flow of the cooling liquid flowing into the corresponding battery cooling branch 4, or adjust the heating power by adjusting the heater, thereby ensuring that the temperature of the battery is adjusted within the target time t according to an actual status of each battery.

How to adjust the temperature of each battery 6 according to the required power P1 and the actual power P2 of each battery 6 is described below with reference to specific embodiments.

According to an embodiment of the present disclosure, the controller may be used for generating the total required power Pz according to the required power P1 of each battery, generating the total maximum refrigerating power P5 of the plurality of compressors according to the maximum refrigerating powers P of the plurality of compressors, and determining whether the total required power Pz is greater than the total maximum refrigerating power P5 of the plurality of compressors, where when the total required power Pz is greater than the total maximum refrigerating power P5 of the plurality of compressors, the controller adjusts, to the maximum, the opening degrees of the refrigerating capacities provided by the plurality of compressors 1 to the battery cooling branches 4 corresponding to the batteries; and when the total required power Pz is less than or equal to the total maximum refrigerating power P5 of the plurality of compressors, the controller adjusts the opening degrees of the refrigerating capacities of the battery cooling branches 4 corresponding to the batteries 6 according to a difference between the total required power Pz and the total maximum refrigerating power P5.

Specifically, as shown in FIG. 13, when the batteries are cooled, the controller may calculate the total required power Pz of the entire temperature adjustment system according to the required powers P1 of all of the batteries, that is, obtain the total required power Pz by adding the required powers P1 of all of the batteries. Moreover, the controller calculates the total maximum refrigerating power P5 of the plurality of compressors according to the maximum refrigerating power P of each compressor 1, that is, may obtain the total maximum refrigerating power P5 by adding the maximum refrigerating power P of each compressor 1. Then, the controller determines whether Pz>P5, and if yes, the controller adjusts the opening degree of each second expansion valve 42 to the maximum, to increase the flow of the cooling liquid flowing into each battery cooling loop 4, so that the battery may complete temperature reduction within the target time. If Pz≤P5, the controller adjusts the opening degree of each second expansion valve 42 according to a difference between Pz and P5, where a larger absolute value of the difference between Pz and P5 indicates a smaller opening degree of the second expansion valve 42, to save energy sources.

According to an embodiment of the present disclosure, the controller is further configured to: detect temperatures of a plurality of batteries; control, when a temperature of any one of the plurality of batteries 6 is greater than a first temperature threshold, the temperature adjustment system to enter a cooling mode; and control, when a temperature of any one of the plurality of batteries is less than a second temperature threshold, the temperature adjustment system to enter a heating mode. The first temperature threshold and the second temperature threshold may be preset according to an actual situation. For example, the first temperature threshold may be 40° C., and the second temperature threshold may be 0° C.

Specifically, after the vehicle is powered on, the controller detects the temperature of each battery 6 in real time, and performs determining. If a temperature of one of the batteries 6 is higher than 40° C., it indicates that the temperature of the battery 6 is excessively high in this case. To prevent the high temperature from affecting performance of the battery 6, temperature reduction processing needs to be performed on the battery 6, and the controller controls the temperature adjustment system to enter the cooling mode, sends information about starting the battery cooling function to the air conditioner system, and controls the corresponding second electronic valve 43 to be turned on, so that the cooling liquid performs heat exchange with the battery 6 to reduce the temperature of the battery 6.

If a temperature of a battery 6 is less than 0° C., it indicates that the temperature of the battery 6 is excessively low in this case. To prevent the low temperature from affecting performance of the battery 6, temperature increase processing needs to be performed on the battery 6, the controller controls the temperature adjustment system to enter a heating mode, controls the second electronic valve 43 to be turned off, and controls the corresponding heater 53 to be turned on, to provide the heating power to the temperature adjustment system. When the temperature adjustment system operates in the heating mode, the heater 53 provides the heating power. Using an example of heating the first battery 61, a flowing direction of the cooling liquid in the loop in which the first battery 61 is located is: the medium container 52—the heat exchanger 41—the heater 53 (turned on)—the pump 51—the first temperature sensor 55—the first battery 61—the second temperature sensor 56—the flow velocity sensor 57—the medium container 52; and cycling is performed in this way, to implement temperature increase on the first battery 61.

According to an embodiment of the present disclosure, in the cooling mode, when a required power P1 of a battery is greater than the actual power P2 corresponding to the battery, the controller obtains a power difference between the required power P1 and the actual power P2 of the battery, and increases, according to the power difference, the power of the compressor 1 used for cooling the battery, or performs adjustment to increase the flow of the cooling liquid in the battery cooling branch 4 corresponding to the battery 6, to increase the cooling power of the battery; and when a required power P1 of a battery is less than or equal to the actual power P2 corresponding to the battery, the controller reduces the power of the compressor or keeps the power of the compressor unchanged, or performs adjustment to reduce the flow of the cooling liquid in the battery cooling branch 4 corresponding to the battery 6, to reduce the cooling power of the battery.

Specifically, when operating in the cooling mode, the controller obtains P1 and P2 of each battery 6, and performs determining. If P1 for one of the batteries 6 is greater than P2, it indicates that the temperature reduction on the battery 6 cannot be completed within the target time according to the current refrigerating power or flow of the cooling liquid. Therefore, the controller obtains a power difference between P1 and P2 of the battery, and increases, according to the power difference, the power of the compressor 1 used for cooling the battery, or increases the flow of the cooling liquid in the battery cooling branch 4 in which the battery is located, to increase the cooling power of the battery, where a larger power difference between P1 and P2 indicates larger increase of the power of the corresponding compressor 1 and the flow of the cooling liquid of the battery, so that the temperature of the battery is reduced to the target temperature within the preset time t. If P1 of one of the batteries 6 is less than or equal to P2, the power of the compressor 1 used for cooling the battery may be kept unchanged or the power of the compressor 1 is properly reduced, or the flow of the cooling liquid in the battery cooling branch 4 in which the battery is located is reduced, to reduce the cooling power of the battery. When the temperatures of all of the batteries 6 are less than 35° C., cooling on the batteries 6 is completed, the controller sends information about turning off a temperature adjustment function to the vehicle-mounted air conditioner through CAN communication, and controls all second electronic valves 43 to be turned off. If the temperature of the battery 6 is still higher than 35° C. after the temperature adjustment system has entered the cooling mode for a relatively long time, for example, 1 hour, the controller properly increases the power of the corresponding compressor 1 or the rotational speed of the pump, so that the battery completes temperature reduction as soon as possible.

According to an embodiment of the present disclosure, in the heating mode, when a required power P1 of a battery is greater than the actual power P2, the controller obtains a power difference between the required power P1 and the actual power P2 of the battery, and increases, according to the power difference, the power of the heater 53 used for heating the battery, to increase the heating power of the battery; and when a required power P1 of a battery is less than or equal to the actual power P2, the controller reduces the power of the heater 53 or keeps the power of the heater 53 unchanged.

Specifically, in the heating mode, the controller obtains P1 and P2 of each battery 6, and performs determining. If P1 for one of the batteries 6 is greater than P2, it indicates that temperature increase on the battery 6 cannot be completed within the target time according to the current heating power or flow of the cooling liquid. Therefore, the controller obtains a power difference between P1 and P2 of the battery, and increases, according to the power difference, the power of the heater 53 used for heating the battery 6, so that temperature adjustment on the battery may be completed within the target time. A larger difference between P1 and P2 indicates larger increase of the power of the heater 53. If P1 of a battery is less than or equal to P2, the controller may properly reduce the power of the heater 53, to save electric energy, or keep the power of the heater 53 unchanged. When the temperatures of all of the batteries 6 are higher than the preset temperature, for example, 10° C., heating on the batteries 6 is completed, and the controller controls the heater 53 to be turned off. If the temperature of the battery 6 is still lower than 10° C. after the temperature adjustment system has entered the heating mode for a relatively long time, for example, 1 hour, the controller properly increases the power of the heater 53, so that the battery completes temperature increase as soon as possible.

For example, as shown in FIG. 13, because heating functions of the first battery 61 and the second battery 62 are independent of each other, and the first battery 61 and the second battery 62 are each heated by using a heater, power adjustment of the battery heating function is described by using only the first battery 61 as an example. (It is assumed that P11 is the required power of the first battery 61, P21 is the actual power of the first battery 61, and a power difference between P11 and P21 is P31)

If P11>P21, and the power that needs to be adjusted is P31 (P31=P11−P21), the heating power of the heater 53 is increased by P31, and the rotational speed of the pump 51 is increased.

If P11≤P21, and the power that needs to be adjusted is P31 (P31=P11−P21), the power of the heater 53 is kept unchanged, or the power of the heater 53 is reduced by P31, or the rotational speed of the pump 51 is reduced.

According to an embodiment of the present disclosure, the controller is further configured to reduce the rotational speed of the pump 51 when the required power P1 of a battery is less than the corresponding actual power P2, and increase the rotational speed of the pump 51 when the required power P1 of a battery is greater than the corresponding actual power P2.

Specifically, when the temperature adjustment system enters the heating mode or cooling mode, if P1 of a battery 6 is less than P2, the controller controls the rotational speed of the corresponding pump 51 to be reduced, to save electric energy. If P1 of a battery 6 is greater than P2, in addition to controlling the power of the corresponding heater 53 or compressor 1 to be increased or the flow of the cooling liquid in the loop in which the battery is located to be increased, the controller further controls the rotational speed of the pump 51 to be increased, to increase a mass of the cooling liquid flowing through a cross section of the cooling flow path within a unit time, thereby increasing the actual power P2 of the battery, to implement temperature adjustment within the target time t.

According to an embodiment of the present disclosure, there are a plurality of compressors 1 used for providing the refrigerant to the battery, and the controller is further configured to determine, according to the required power P1 of each battery and a maximum refrigerating power P of each compressor, a quantity of to-be-started compressors, and control, when the temperature adjustment system is in the cooling mode, the corresponding quantity of compressors 1 to start.

Optionally, the controller may generate the total required power Pz according to the required power P1 of each battery, and when determining that the total required power Pz is greater than the maximum refrigerating power P of a single compressor, the controller controls a plurality of compressors 1 to start simultaneously.

Specifically, as shown in FIG. 13, using two compressors 1 as an example, when the temperature adjustment system enters the cooling mode, the controller obtains P1 of each battery 6, the actual power P2 of each battery, and the maximum refrigerating power P of a single compressor; and may calculate the total required power Pz of the entire temperature adjustment system by adding P1 of each battery, obtain the total actual power Pf for temperature adjustment by adding the actual power P2 of each battery, and may calculate a sum P5 of the maximum refrigerating powers of all compressors by adding the maximum refrigerating power of each compressor. The required power of the first battery 61 is P11, and the required power of the second battery 62 is P12. The actual power of the first battery 61 is P21, and the actual power of the second battery 62 is P22. The maximum refrigerating powers P of all compressors are equal.

If Pz≤P, only one compressor 1 needs to be controlled to operate, to provide the refrigerating power, and two compressors 1 may alternatively be controlled to operate together. If P<Pz≤P5, two compressors 1 need to operate together, and an initial refrigerating power of each compressor is Pz/2. If Pz≤P5, the compressor 1 is controlled through the vehicle-mounted air conditioner controller to run according to the refrigerating power Pz, and opening degrees of the first to the fourth adjustment valves are adjusted, so that the initial cooling power of the first battery cooling branch 401 performs cooling according to the refrigerating power P11, and the initial cooling power of the second battery cooling branch 402 performs cooling according to the refrigerating power P21. If Pz>P5, each compressor runs according to the maximum refrigerating power P, the initial cooling power of the first battery cooling branch 401 may perform cooling according to the refrigerating power P5*[P11/(P11+P12)], and the initial cooling power of the second battery cooling branch 402 may perform cooling according to the refrigerating power P5*[P12/(P11+P12)].

According to an embodiment of the present disclosure, the controller is further configured to: in the cooling mode, when a temperature difference between the batteries 6 exceeds a set value, increase the cooling power of the battery 6 whose temperature is relatively high, so as to reduce the temperature difference between the batteries 6; and in the heating mode, when the temperature difference between the batteries exceeds the set value, increase the heating power of the battery 6 whose temperature is relatively low.

It may be understood that, when the temperature adjustment system operates in the cooling mode, as shown in FIG. 13, the controller may respectively calculate the required power P1 of the first battery 61 and the required power P1 of the second battery 62, and then adjust the opening degree of the corresponding second expansion valve 42 according to P1 of each battery and the maximum refrigerating power P of the compressor. In the cooling process, the controller continues to adjust the opening degree of the second expansion valve 42 according to the actual power P2 of each battery. Moreover, the controller adjusts allocation of the flow of the cooling liquid in the first battery cooling branch 401 and the second battery cooling branch 402 according to a temperature situation between the first battery 61 and the second battery 62 by adjusting the opening degrees of the first to the fourth adjustment valves 411 to 414, thereby controlling temperature balancing between the first battery 61 and the second battery 62. When the temperature of the first battery 61 is higher than the temperature of the second battery 62 and a difference between them exceeds a set value, opening degrees of the first adjustment valve 411 and the third adjustment valve 413 may be increased, and opening degrees of the second adjustment valve 412 and the fourth adjustment valve 414 may be reduced, to increase the cooling power of the first battery 61; when the temperature of the first battery 61 and the temperature of the second battery 62 are equal, if two compressors 1 provide an equal cooling power, the opening degrees of the first to the fourth adjustment valves 411 to 414 may be controlled to be the same; and if two compressors 1 provide unequal cooling powers, opening degrees of the first adjustment valve 411 and the second adjustment valve 412 may be controlled to be equal, and opening degrees of the third adjustment valve 413 and the fourth adjustment valve 414 are controlled to be equal. When the temperature adjustment system operates in the heating mode, and the temperature of the first battery 61 is lower than the temperature of the second battery 62 and the difference exceeds the set value, the controller increases the heating power of the heater 53 corresponding to the first battery 61. Therefore, temperature balancing between two batteries may be kept.

Figure 14:
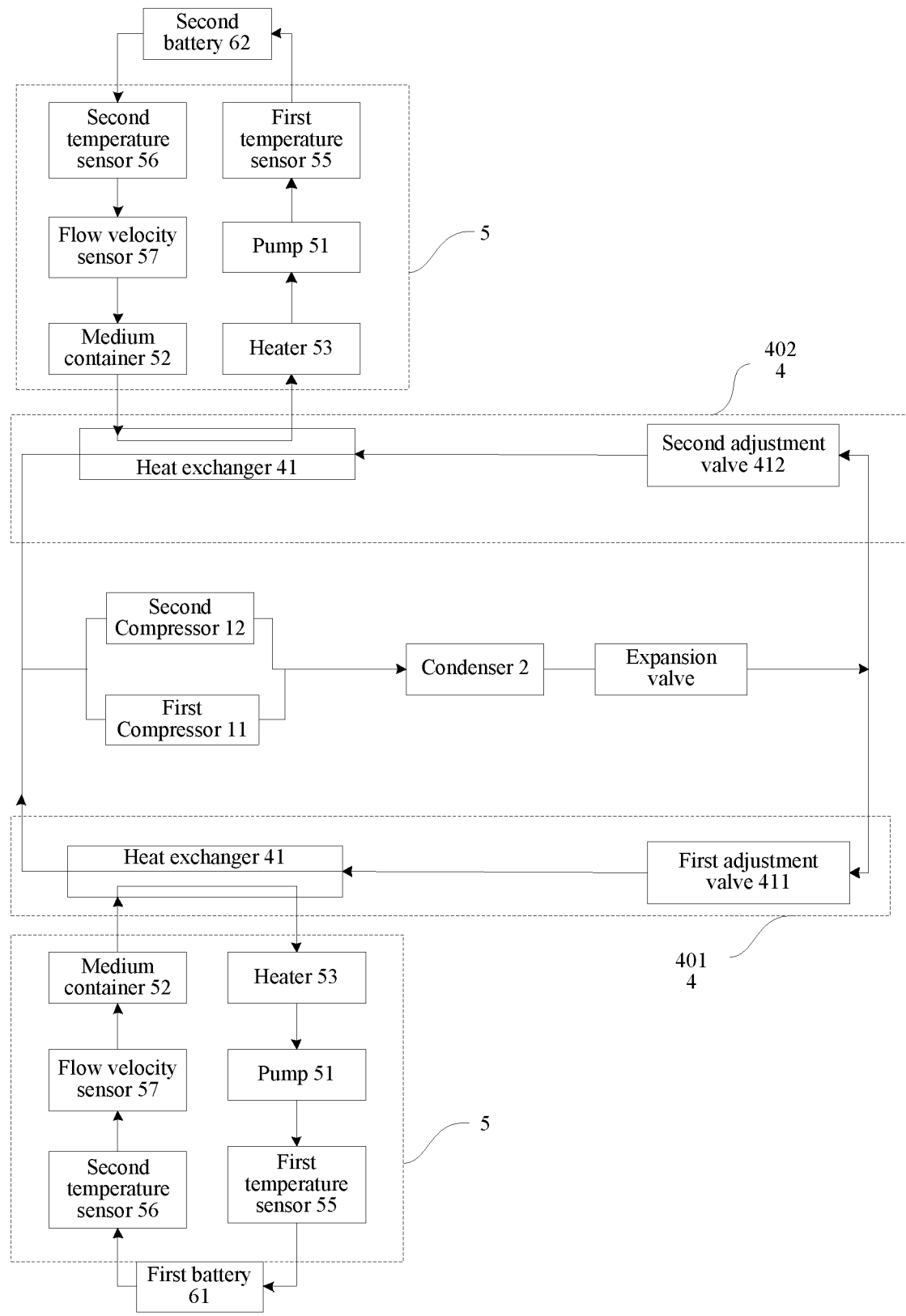
FIG. 14 is a schematic diagram 2 of a flow path structure of a temperature adjustment system for a vehicle-mounted battery according to a seventh embodiment of the present disclosure.
Figure 15:
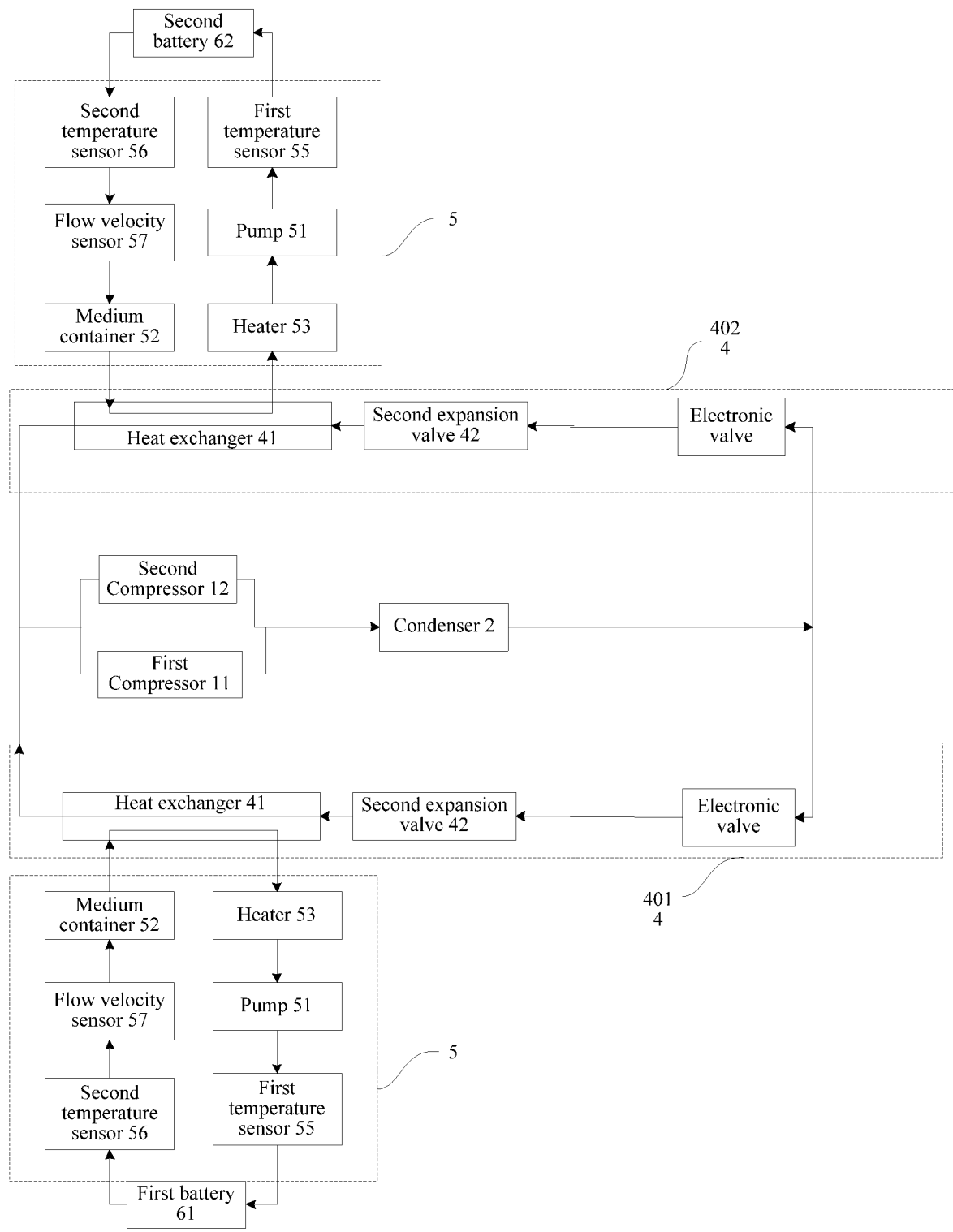
FIG. 15 is a schematic diagram 3 of a flow path structure of a temperature adjustment system for a vehicle-mounted battery according to a seventh embodiment of the present disclosure.

According to an embodiment of the present disclosure, the temperature adjustment system for a vehicle-mounted battery may be further shown in FIG. 14 and FIG. 15. In FIG. 14, a plurality of compressors (that is, a first compressor 11 and a second compressor 12 in FIG. 14) are connected in parallel and share an expansion valve, adjustment valves (that is, a first adjustment valve 411 and a second adjustment valve 412) are added to each battery cooling branch, and the flow of the cooling liquid flowing into each battery cooling branch is adjusted through the adjustment valves, to adjust the cooling power of each battery. In FIG. 15, a plurality of compressors (that is, a first compressor 11 and a second compressor 12 in FIG. 15) are connected in parallel and share a condenser 2, each battery cooling branch is provided with a second expansion valve 42 and an electronic valve, the flow of the cooling liquid flowing into each battery cooling branch is adjusted by adjusting the opening degree of the second expansion valve 42, to adjust the cooling power of each battery, and on/off of each battery cooling branch is controlled through the electronic valve.

A temperature adjustment process of the system shown in FIG. 15 is described below with reference to a specific embodiment.

As shown in FIG. 15, the battery may include the first battery and the second battery, Pz=P11+P12, P11 is the required power of the first battery, P12 is the required power of the second battery, and Pz is a sum of (the total required power Pz) of the required power of the first battery and the required power of the second battery. Pf=P21+P22, P21 is the actual power for temperature adjustment on the first battery, P22 is the actual power for temperature adjustment on the second battery, and Pf is a sum of the actual power for temperature adjustment on the first battery and the actual power for temperature adjustment on the second battery. P is the maximum refrigerating power of a compressor, P5 is a sum of the maximum refrigerating powers of all compressors, and P5=2*P.

Initial Allocation of Compressor Power:

If Pz≤P, only one compressor needs to operate, to provide the refrigerating power, or two compressors operate together; if P<Pz≤P5, two compressors need to operate together, and an initial refrigerating power of each compressor is Pz/2; and if Pz>P5, two compressors need to operate together, and each compressor is controlled through the vehicle-mounted air conditioner controller to run according to the maximum refrigerating power P.

When Pz≤P5, the compressor is controlled through the vehicle-mounted air conditioner controller to run according to the refrigerating power Pz, and the initial cooling power of the cooling branch of the first battery 61 performs cooling according to the refrigerating power P11; and the initial cooling power of the cooling branch of the second battery 62 performs cooling according to the refrigerating power P21. When Pz>P5, each compressor runs according to the maximum refrigerating power P. The initial cooling power of the cooling branch of the first battery 61 performs cooling according to the refrigerating power P5*[P11/(P11+P12)]; and the initial cooling power of the cooling branch of the second battery 62 performs cooling according to the refrigerating power P5*[P12/(P11+P12)].

In the battery cooling process, the cooling power of the battery needs to be adjusted, and details are as follows:

When Pz>Pf, the power that needs to be adjusted is Pc (Pc=Pz−Pf). If Pz+Pc≤P5, the refrigerating power that the compressor needs to increase is Pc. Moreover, processing is performed as follows:

If P11≥P21, and P11−P21=Pc1, the opening degree of the expansion valve in the loop in which the first battery 61 is located is controlled through the vehicle-mounted air conditioner controller to be increased, and the rotational speed of the pump in the loop is controlled through the battery heat management controller to be increased, so that the cooling power of the first battery 61 is increased by Pc1. If P12≥P22, and P12−P22=Pc2, the opening degree of the expansion valve in the loop in which the second battery 62 is located is controlled through the vehicle-mounted air conditioner controller to be increased, and the rotational speed of the pump in the loop is controlled through the battery heat management controller to be increased, so that the cooling power of the second battery 62 is increased by Pc2. If P11<P12, and P21−P11=Pc1, the cooling power of the first battery 61 is kept unchanged, or the opening degree of the expansion valve 8 of the loop in which the first battery 61 is located is controlled through the vehicle-mounted air conditioner controller to be reduced, and the rotational speed of the pump in the loop is controlled through the battery heat management controller to be reduced, so that the cooling power of the first battery 61 is reduced. If P12<P22, and P22−P12=Pc2, the cooling power of the second battery 62 is kept unchanged, or the opening degree of the expansion valve of the loop in which the second battery 62 is located is controlled through the vehicle-mounted air conditioner controller to be reduced, and the rotational speed of the pump in the loop is controlled through the battery heat management controller to be reduced, so that the cooling power of the second battery 62 is reduced.

If Pz+Pc>P5, each compressor runs according to the maximum refrigerating power P, to increase the rotational speed of the water pump. Moreover, processing is performed as follows:

The opening degree of the expansion valve in the cooling branch in which the first battery 61 is located is controlled through the vehicle-mounted air conditioner controller, so that the cooling power of the cooling branch of the first battery 61 performs cooling according to the refrigerating power P5*[P11/(P11+P12)]; and the opening degree of the expansion valve in the cooling branch in which the second battery 62 is located is controlled through the vehicle-mounted air conditioner controller, so that the cooling power of the cooling branch of the second battery 62 performs cooling according to the refrigerating power P5*[P12/(P11+P12)].

When Pz≤Pf, and the power that needs to be adjusted is Pc (Pc=Pf−Pz), the refrigerating power of the compressor is maintained unchanged or reduced through the vehicle-mounted air conditioner controller. Moreover, processing is performed as follows: If P11≥P21, and P11−P21=Pc1, the opening degree of the expansion valve in the loop in which the first battery 61 is located is controlled through the vehicle-mounted air conditioner controller to be increased, and the rotational speed of the pump in the loop is controlled to be increased, so that the cooling power of the first battery 61 is increased by Pc1. If P12≥P22, and P12−P22=Pc2, the opening degree of the expansion valve in the loop in which the second battery 62 is located is controlled through the vehicle-mounted air conditioner controller to be increased, and the rotational speed of the pump in the loop is controlled to be increased, so that the cooling power of the battery 62 is increased by Pc2. If P11<P12, and P21−P11=Pc1, the cooling power of the first battery 61 is kept unchanged, or the opening degree of the expansion valve of the loop in which the first battery 61 is located is controlled through the vehicle-mounted air conditioner controller to be reduced, and the rotational speed of the pump in the loop is controlled through the battery heat management controller to be reduced, so that the cooling power of the first battery 61 is reduced. If P12<P22, and P22−P12=Pc2, the cooling power of the second battery 62 is kept unchanged, or the opening degree of the expansion valve of the loop in which the second battery 62 is located is controlled through the vehicle-mounted air conditioner controller to be reduced, and the rotational speed of the pump in the loop is controlled through the battery heat management controller to be reduced, so that the cooling power of the second battery 62 is reduced.

Adjustment of the Heating Power:

Because heating functions of the first battery 61 and the second battery 62 are independent of each other, each of the first battery 61 and the second battery 62 performs heating by using a heater, P11 is the required power of the first battery 61, P21 is the actual heating power of the second battery 61, and a power difference is P31. If P11>P21, and the power that needs to be adjusted is P31 (P31=P11−P21), the heating power of the heater is increased by P31, and the rotational speed of the pump is increased. If P11≤P21, and the power that needs to be adjusted is P31 (P31=P11−P21), the power of the heater is kept unchanged or is reduced by the heating power P31, or the rotational speed of the pump is reduced.

Temperature Balancing Between Batteries:

In a process of performing battery cooling, if a battery temperature difference between the temperature T61 of the first battery 61 and the temperature T62 of the second battery 62 exceeds 3° C., and the temperature value is a preset value, that is, if T61−T62>3° C., the battery heat management controller controls the opening degree of the second expansion valve 42 in the cooling branch of the first battery 61 to be increased, or controls the rotational speed of the pump in the branch in which the first battery 61 is located to be increased; and controls the opening degree of the second expansion valve 42 in the cooling branch of the second battery 62 to be reduced, or controls the rotational speed of the pump in the branch in which the second battery 62 is located to be reduced, so that the cooling power of the first battery 61 is increased, and the cooling power of the second battery 62 is reduced, thereby implementing temperature balancing between the first battery 61 and the second battery 62.

If T62−T61>3° C., the battery heat management controller controls the opening degree of the second expansion valve 42 in the cooling branch of the second battery 62 to be increased, or controls the rotational speed of the pump in the branch in which the second battery 62 is located to be increased; and controls the opening degree of the second expansion valve 42 in the cooling branch of the first battery 61 to be reduced, or controls the rotational speed of the pump in the branch in which the first battery 61 is located to be reduced, so that the cooling power of the second battery 62 is increased, and the cooling power of the first battery 61 is reduced, thereby implementing temperature balancing between the first battery 61 and the second battery 62.

In a process of performing battery heating, if a battery temperature difference between the first battery 61 and the second battery 62 exceeds 3° C., that is, if T61−T62>3° C., the battery heat management controller controls the heating power of the heater 53 in the heating loop in which the first battery 61 is located to be reduced, and reduces the rotational speed of the pump 51 in the loop; and controls the heating power of the heater 53 in the heating loop in which the second battery 62 is located to be increased, and increases the rotational speed of the pump in the loop, so that the heating power of the first battery 61 is increased, and the heating power of the second battery 62 is reduced, thereby implementing temperature balancing between the first battery 61 and the second battery 62. If T62−T61>3° C., the battery heat management controller controls the heating power of the heater 53 in the heating loop in which the first battery 61 is located to be increased, and increases the rotational speed of the pump 51 in the loop; and controls the heating power of the heater 53 in the heating loop in which the second battery 62 is located to be reduced, and reduces the rotational speed of the pump in the loop, so that the heating power of the first battery 61 is reduced, and the heating power of the second battery 62 is increased, thereby implementing temperature balancing between the first battery 61 and the second battery 62.

It may be understood that, a difference between FIG. 14 and FIG. 15 lies in that, in FIG. 14, power adjustment is implemented by the adjustment valve through the cooling power between the first battery cooling branch 401 in which the first battery 61 is located and the second battery cooling branch 402 in which the second battery 62 is located; and in the two battery cooling branches in FIG. 15, the cooling powers of the two cooling branches are adjusted through the expansion valves. For a specific adjusting process in FIG. 14, refer to the foregoing embodiment, and details are not described herein again.

The temperature adjustment system according to this embodiment of the present disclosure may precisely control the heating power and the cooling power of each battery according to an actual status of each battery, and adjust the temperature of the battery when the temperature is excessively high or excessively low, so that the temperature of the battery is maintained within a preset range, to avoid a case of affecting performance of the vehicle-mounted battery because of the temperature. Moreover, because the plurality of battery cooling branches are in communication with each other, the battery temperature adjustment modules may adjust the opening degrees of the refrigerating capacities of the battery cooling branches corresponding to the batteries, to ensure temperature balancing between the batteries.

Figure 16:
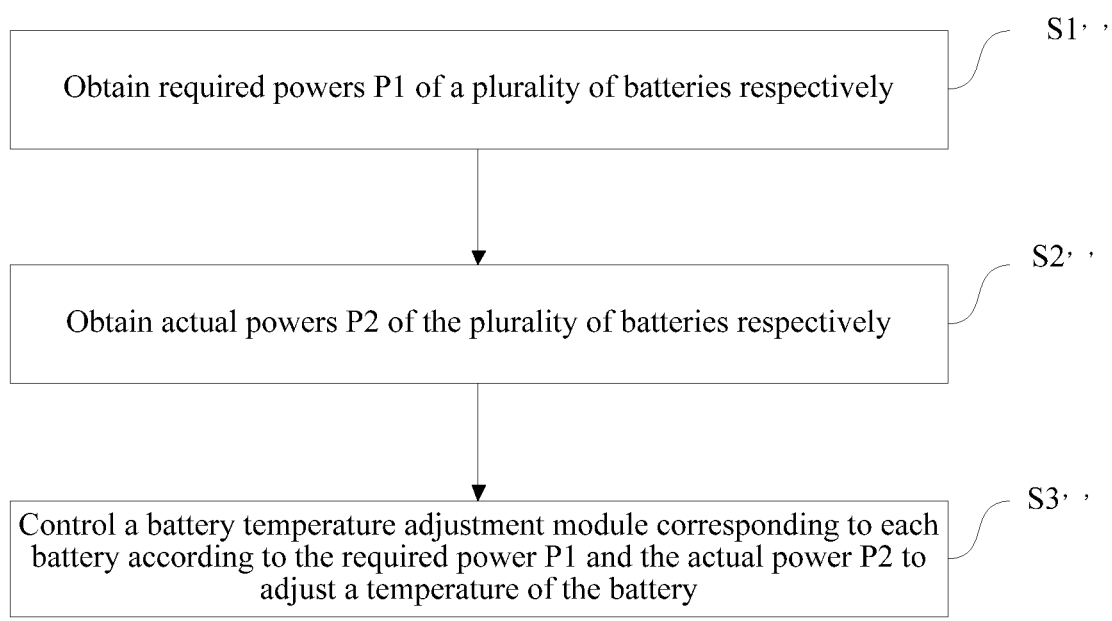
FIG. 16 is a flowchart of a temperature adjustment method for a vehicle-mounted battery according to a seventh embodiment of the present disclosure.

FIG. 16 is a flowchart of a temperature adjustment method for a vehicle-mounted battery according to a sixth embodiment of the present disclosure. The temperature adjustment system for a vehicle-mounted battery includes a plurality of compressors, a plurality of battery cooling branches corresponding to the plurality of compressors, a plurality of batteries, and a plurality of battery temperature adjustment modules connected between the plurality of batteries and the plurality of battery cooling branches. As shown in FIG. 16, the temperature adjustment method for a vehicle-mounted battery includes the following steps:

S1″. Obtain required powers P1 of a plurality of batteries respectively.

Figure 17:
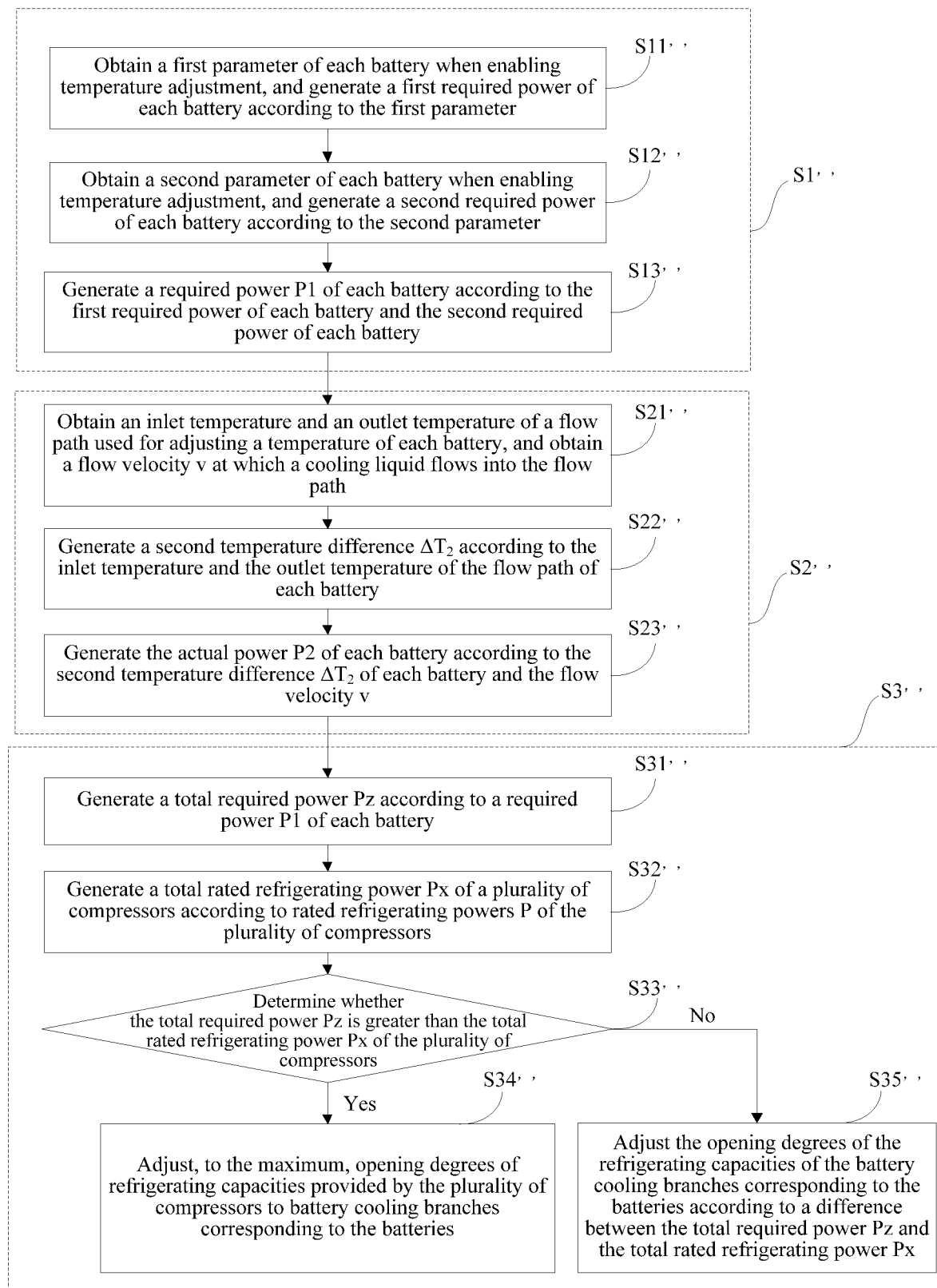
FIG. 17 is a flowchart of a temperature adjustment method for a vehicle-mounted battery according to an eighth embodiment of the present disclosure.

Optionally, according to an embodiment of the present disclosure, as shown in FIG. 17, the obtaining required powers P1 of a plurality of batteries respectively specifically includes the following steps:

S11″. Obtain a first parameter of each battery when enabling temperature adjustment, and generate a first required power of each battery according to the first parameter.

S12″. Obtain a second parameter of each battery when enabling temperature adjustment, and generate a second required power of each battery according to the second parameter.

S13″. Generate a required power P1 of each battery according to the first required power of each battery and the second required power of each battery.

Optionally, according to an embodiment of the present disclosure, the first parameter is an initial temperature when enabling temperature adjustment on the battery, the target temperature, and a target time t for reaching the target temperature from the initial temperature, and the generating a first required power according to the first parameter of each battery specifically includes: obtaining a first temperature difference $\Delta T_1$ between the initial temperature and the target temperature; and generating the first required power according to the first temperature difference $\Delta T_1$ and the target time t.

Optionally, according to an embodiment of the present disclosure, the first required power is generated through the following formula (1):

$$\Delta T_1 * C * M / t \tag{1}$$

where $\Delta T_1$ is the first temperature difference between the initial temperature and the target temperature, t is the target time, C is a specific heat capacity of the battery, and M is a mass of the battery.

According to an embodiment of the present disclosure, the second parameter is an average current I of each battery within a preset time, and the second required power of each battery is generated through the following formula (2):

$$I^2 * R \tag{2}$$

where I is the average current, and R is an internal resistance of the battery.

When the battery is cooled, $P1 = \Delta T_1 * C * M / t + I^2 * R$; and when the battery is heated, $P1 = \Delta T_1 * C * M / t - I^2 * R$.

S2″. Obtain actual powers P2 of the plurality of batteries respectively.

According to an embodiment of the present disclosure, as shown in FIG. 17, the obtaining actual powers P2 of the plurality of batteries respectively specifically includes the following steps:

S21″. Obtain an inlet temperature and an outlet temperature of a flow path used for adjusting the temperature of each battery, and obtain a flow velocity v at which a cooling liquid flows into the flow path.

S22″. Generate a second temperature difference $\Delta T_2$ according to the inlet temperature and the outlet temperature of the flow path of each battery.

S23″. Generate the actual power P2 of each battery according to the second temperature difference $\Delta T_2$ of each battery and the flow velocity v.

Optionally, according to an embodiment of the present disclosure, the actual power P2 is generated through the following formula (3):

$$\Delta T_2 * c * m \tag{3}$$

where $\Delta T_2$ is the second temperature difference, c is a specific heat capacity of the cooling liquid in the flow path, and m is a mass of the cooling liquid flowing through a cross section of the flow path within a unit time, where $m = v * \rho * s$, v is a flow velocity of the cooling liquid, $\rho$ is a density of the cooling liquid, and s is a cross-sectional area of the flow path.

S3″. Control a battery temperature adjustment module corresponding to each battery according to the required power P1 and the actual power P2 to adjust the temperature of the battery. The plurality of battery cooling branches are in communication with each other, and opening degrees of refrigerating capacities provided by the plurality of compressors to the battery cooling branches corresponding to the batteries are adjusted according to the required powers P1 and the actual powers P2 of the batteries.

In this embodiment of the present disclosure, the controlling a battery temperature adjustment module corresponding to each battery according to the required power P1 and the actual power P2 to adjust the temperature of the battery specifically includes: controlling the battery temperature adjustment module corresponding to each battery within the target time t according to the required power P1 and the actual power P2 to adjust the temperature of the battery, to reach the target temperature.

The adjusting, according to the required powers P1 and the actual powers P2 of the batteries, opening degrees of refrigerating capacities provided by the plurality of compressors to the battery cooling branches corresponding to the batteries specifically includes: determining whether the required power P1 of each battery is greater than the actual power P2 of the battery; and if the required power P1 of the battery is greater than the actual power P2 of the battery, increasing the refrigerating power of the plurality of compressors or a single compressor, or increasing an opening degree of a refrigerating capacity provided to the battery cooling branch corresponding to the battery.

Specifically, after the vehicle is powered on, it is determined, through a battery management controller, whether temperature adjustment needs to be performed on the battery, and when it is determined that temperature adjustment needs to be performed on the battery, the initial temperature (that is, current temperature) of each battery, the target temperature, and the target time t for reaching the target temperature from the initial temperature are obtained, where the target temperature and the target time t may be preset according to an actual situation, and the first required power is calculated according to the formula (1). Moreover, the average current I of each battery within the preset time is obtained through the battery management controller, and the second required power of each battery is calculated according to the formula (2). Then, the required power P1 of each battery (that is, the required power for adjusting the temperature of the battery to the target temperature) is calculated according to the first required power and the second required power of each battery. Moreover, an inlet temperature and an outlet temperature of each battery and flow velocity information are obtained through a battery heat management controller, and the actual power P2 of each battery is calculated according to the formula (3). Then, according to the required power P1 and the actual power P2 of a corresponding battery, the refrigerating power/heating power of the battery may be adjusted by adjusting the flow of the cooling liquid flowing into the corresponding battery cooling branch, or the power of the corresponding heater, thereby ensuring that the temperature of the battery is adjusted within the target time t according to an actual status of each battery. Moreover, because the plurality of battery cooling branches are in communication with each other, the opening degrees of the refrigerating capacities of the battery cooling branches corresponding to the batteries may be adjusted according to the temperatures of the batteries, to ensure temperature balancing between the batteries. Therefore, the temperatures may be adjusted within the target time when the temperatures of the vehicle-mounted batteries are excessively high or excessively low, thereby maintaining the temperatures of the vehicle-mounted batteries within a preset range, avoiding a case of affecting performance of the vehicle-mounted batteries because of the temperatures.

How to control a battery temperature adjustment module corresponding to each battery according to the required power P1 and the actual power P2 to adjust the temperature of the battery is described below with reference to a specific embodiment.

According to an embodiment of the present disclosure, as shown in FIG. 17, the temperature adjustment method for a vehicle-mounted battery may further include the following steps:

S31". Generate a total required power Pz according to a required power P1 of each battery.

S32". Generate a total maximum refrigerating power P5 of a plurality of compressors according to maximum refrigerating powers P of the plurality of compressors.

S33". Determine whether the total required power Pz is greater than the total maximum refrigerating power P5 of the plurality of compressors.

S34". If the total required power Pz is greater than the total maximum refrigerating power P5 of the plurality of compressors, adjust, to the maximum, opening degrees of refrigerating capacities provided by the plurality of compressors to the battery cooling branches corresponding to the batteries.

S35". If the total required power Pz is less than or equal to the total maximum refrigerating power P5 of the plurality of compressors, adjust the opening degrees of the refrigerating capacities of the battery cooling branches corresponding to the batteries according to a difference between the total required power Pz and the total maximum refrigerating power P5.

Specifically, the total required power Pz of the entire temperature adjustment system may be calculated according to the required powers P1 of all of the batteries, that is, the total required power Pz is obtained by adding the required powers P1 of all of the batteries. Moreover, the total maximum refrigerating power P5 of the plurality of compressors is calculated according to the maximum refrigerating power P of each compressor, that is, the total maximum refrigerating power P5 may be obtained by adding the maximum refrigerating power P of each compressor. Then, whether Pz>P5 is determined, and if yes, control is performed to adjust the opening degree of each second expansion valve to the maximum, to adjust the flow of the cooling liquid provided by the plurality of compressors to the battery cooling branch corresponding to the battery to the maximum, so that the battery may complete temperature reduction within the target time t. If Pz≤P5, the opening degree of the second expansion valve is adjusted according to a difference between Pz and P5, where a larger absolute value of the difference between Pz and P5 indicates a smaller opening degree of the second expansion valve, to save energy sources.

Figure 18:
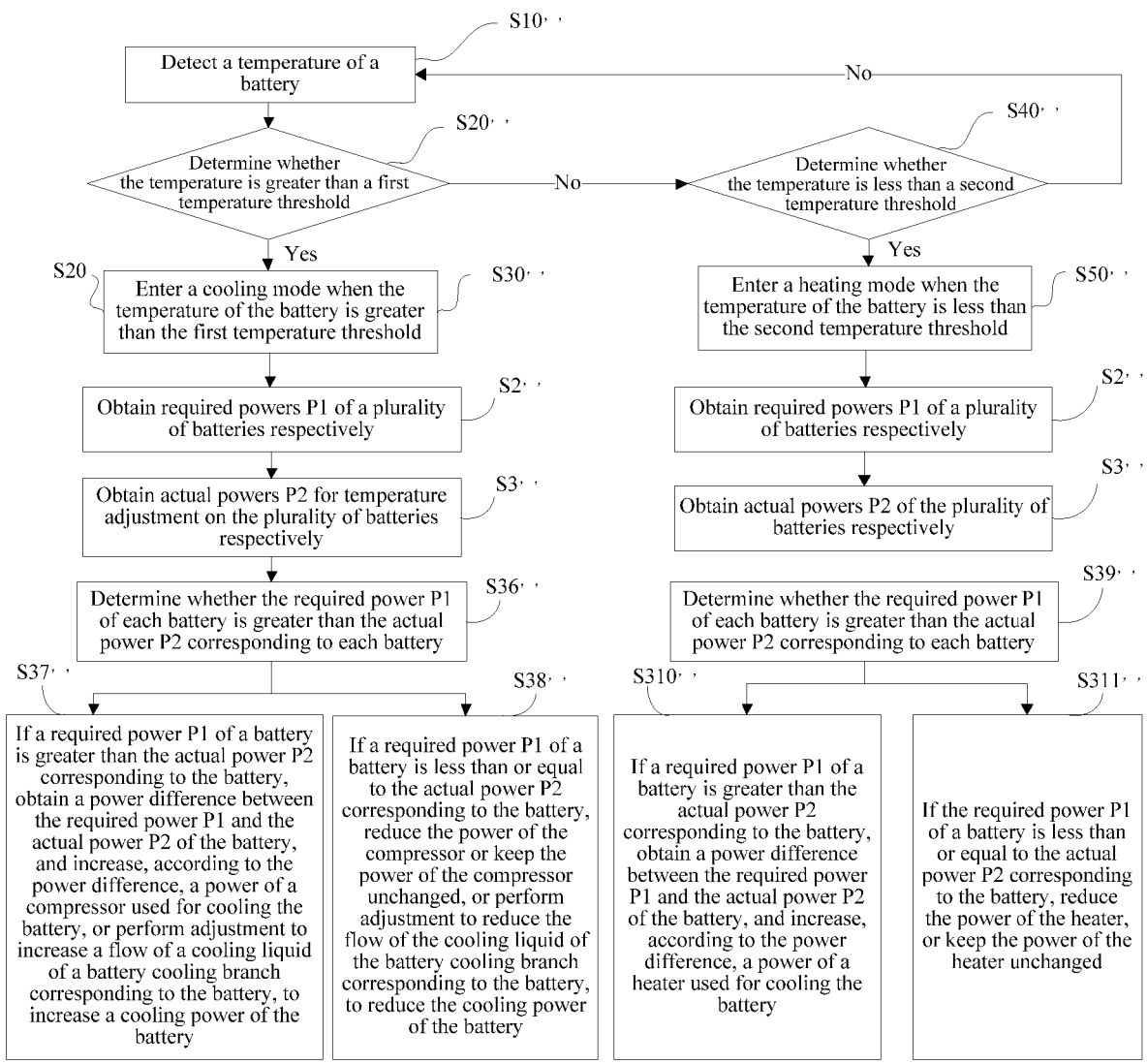
FIG. 18 is a flowchart of a temperature adjustment method for a vehicle-mounted battery according to a ninth embodiment of the present disclosure.

According to an embodiment of the present disclosure, as shown in FIG. 18, the battery temperature adjustment method may further include the following steps:

Detect the temperature of the battery; and determine whether the temperature is greater than a first temperature threshold or is less than a second temperature threshold (S10" and S20"). Enter a cooling mode when the temperature of the battery is greater than the first temperature threshold (S30"). The first preset temperature threshold may be preset according to an actual situation, for example, may be 40° C. Further determine whether the temperature of the battery is less than the second temperature threshold when the temperature of the battery is less than or equal to the first temperature threshold; and enter a heating mode when the temperature of the battery is less than the second temperature threshold (S40" and S50"). The second preset temperature threshold may be preset according to an actual situation, for example, may be 0° C.

Specifically, after the vehicle is powered on, the temperature of each battery is detected in real time and determining is performed through the battery management controller. If a temperature of one of the batteries is higher than 40° C., it indicates that the temperature of the battery is excessively high in this case. To prevent the high temperature from affecting performance of the battery, temperature reduction processing needs to be performed on the battery, the temperature adjustment system is controlled through the battery management controller to enter the cooling mode, and information about starting the battery cooling function is sent to the air conditioner system. If the temperature of a battery is less than 0° C., it indicates that the temperature of the battery is excessively low in this case. To prevent the low temperature from affecting performance of the battery, temperature increase processing needs to be performed on the battery, the temperature adjustment system is controlled through the battery management controller to enter the heating mode, the corresponding battery cooling branch is controlled to be turned off, and the heater is controlled through the battery heat management controller to be turned on, to provide the heating power to the battery.

According to an embodiment of the present disclosure, as shown in FIG. 18, in the cooling mode, the controlling a battery temperature adjustment module corresponding to each battery according to the required power P1 and the actual power P2 to adjust the temperature of the battery specifically includes:

S36". Determine whether the required power P1 of each battery is greater than the actual power P2 corresponding to each battery.

S37". If a required power P1 of a battery is greater than the actual power P2 corresponding to the battery, obtain a power difference between the required power P1 and the actual power P2 of the battery, and increase, according to the power difference, the power of the compressor used for cooling the battery, or perform adjustment to increase the flow of the cooling liquid of the battery cooling branch corresponding to the battery, to increase the cooling power of the battery.

S38". If a required power P1 of a battery is less than or equal to the actual power P2 corresponding to the battery, reduce the power of the compressor or keep the power of the compressor unchanged, or perform adjustment to reduce the flow of the cooling liquid of the battery cooling branch corresponding to the battery, to reduce the cooling power of the battery.

Specifically, when the temperature adjustment system enters the cooling mode, P1 and P2 of each battery are obtained, and determining is performed. If P1 for one of the batteries is greater than P2, it indicates that the temperature reduction on the battery cannot be completed within the target time according to the current refrigerating power or flow of the cooling liquid. Therefore, a power difference between P1 and P2 of the battery is obtained; and through the vehicle-mounted air conditioner controller, the power of the compressor used for cooling the battery is increased according to the power difference, or the flow of the cooling liquid in the battery cooling branch in which the battery is located is increased, to increase the cooling power of the battery, where a larger power difference between P1 and P2 indicates larger increase of the power of the corresponding compressor and the flow of the cooling liquid of the battery, so that the temperature of the battery is reduced to the target temperature within the preset time t. If P1 of one of the batteries is less than or equal to P2, the power of the compressor used for cooling the battery may be kept unchanged or the power of the compressor is properly reduced through the vehicle-mounted air conditioner controller, or the flow of the cooling liquid in the battery cooling branch in which the battery is located is reduced, to reduce the cooling power of the battery. When the temperatures of all of the batteries are less than 35° C., cooling on the batteries is completed, information about turning off a temperature adjustment function is sent to the vehicle-mounted air conditioner through CAN communication, and the second electronic valve is controlled through the vehicle-mounted air conditioner controller to be turned off. If the temperature of a battery is still higher than 35° C. after the temperature adjustment system has entered the cooling mode for a relatively long time, for example, 1 hour, the power of the corresponding compressor is properly increased through the vehicle-mounted air conditioner controller, so that the battery completes temperature reduction as soon as possible.

According to an embodiment of the present disclosure, as shown in FIG. 18, in the heating mode, the controlling a battery temperature adjustment module corresponding to each battery according to the required power P1 and the actual power P2 to adjust the temperature of the battery specifically includes:

S39". Determine whether the required power P1 for temperature adjustment on each battery is greater than the actual power P2 corresponding to each battery.

S310". If a required power P1 of a battery is greater than the actual power P2 corresponding to the battery, obtain a power difference between the required power P1 and the actual power P2 of the battery, and increase the power of the heater according to the power difference, to increase the heating power of the battery.

S311". If the required power P1 of a battery is less than or equal to the actual power P2 corresponding to the battery, reduce the power of the heater, or keep the power of the heater unchanged.

Specifically, when the temperature adjustment system enters the heating mode, P1 and P2 of each battery are obtained, and determining is performed. If P1 for one of the batteries is greater than P2, it indicates that temperature increase on the battery cannot be completed within the target time according to the current heating power or flow of the cooling liquid. Therefore, a power difference between P1 and P2 of the battery is obtained, and the power of the heater used for heating the battery is increased according to the power difference through the battery heat management controller, so that temperature adjustment on the battery may be completed within the target time. If P1 of a battery is less than or equal to P2, the power of the heater may be properly reduced through the battery heat management controller, to save electric energy, or the power of the heater is kept unchanged. When the temperatures of all of the batteries are higher than a preset temperature, for example, 10° C., heating on the batteries is completed, information about turning off a temperature adjustment function is sent to the vehicle-mounted air conditioner through CAN communication, and the heater is controlled through the battery heat management controller to be turned off. If the temperature of a battery is still lower than 10° C. after the temperature adjustment system has entered the heating mode for a relatively long time, for example, 1 hour, the power of the heater is properly increased through the battery heat management controller, so that the battery completes temperature increase as soon as possible.

For example, as shown in FIG. 13, because heating functions of the first battery and the second battery are independent of each other, and the first battery and the second battery are each heated by using a heater, power adjustment of the battery heating function is described by using only the first battery as an example. (It is assumed that P11 is the required power of the first battery, P21 is the actual power of the first battery, and a power difference between P11 and P21 is P31)

If P11>P21, and the power that needs to be adjusted is P31 (P31=P11−P21), the heating power of the heater is controlled through the battery heat management controller to be increased by P31, and the rotational speed of the pump is increased.

If P11≤P21, and the power that needs to be adjusted is P31 (P31=P11−P21), the power of the heater is controlled through the battery heat management controller to be kept unchanged or be reduced by P31, or the rotational speed of the pump is reduced.

According to an embodiment of the present disclosure, the temperature adjustment method for a vehicle-mounted battery may further include: reducing the rotational speed of the pump if the required power P1 of a battery is less than the corresponding actual power P2; and increasing the rotational speed of the pump if the required power P1 of a battery is greater than the corresponding actual power P2.

Specifically, when the temperature adjustment system enters the heating mode or cooling mode, if P1 of a battery is less than P2, the rotational speed of the pump is controlled through the battery heat management controller to be reduced, to save electric energy. If P1 of a battery is greater than P2, in addition to controlling, through the battery heat management controller, the heating power of the heater to be increased, controlling, through the vehicle-mounted air conditioner controller, the power of the compressor to be increased, or controlling the flow of the cooling liquid in the loop in which the battery is located to be increased, the rotational speed of the pump is further controlled, through the battery heat management controller, to be increased, so that a mass of the cooling liquid flowing through a cross section of the cooling flow path within a unit time may be increased, thereby increasing the actual power P2 of the battery, to implement temperature adjustment within the target time t.

According to an embodiment of the present disclosure, there are a plurality of compressors used for providing a refrigerant to the battery, and the battery temperature adjustment method may further include: determining a quantity of to-be-started compressors according to the required power P1 of each battery and a maximum refrigerating power of each compressor; and controlling, in a cooling mode, a corresponding quantity of compressors to start.

Optionally, the determining a quantity of to-be-started compressors according to the required power P1 of each battery and a maximum refrigerating power P of each compressor specifically includes: generating a total actual power Pz for temperature adjustment according to the required power P1 of each battery; determining whether the total required power Pz is greater than the maximum refrigerating power P of a single compressor; and controlling, if the required power is greater than the maximum refrigerating power P of the single compressor, the plurality of compressors to start simultaneously.

Specifically, when the temperature adjustment system enters the cooling mode, P1 of each battery is obtained through the battery management controller, and the total required power Pz of the entire temperature adjustment system may be calculated by adding P1 of each battery. If Pz is greater than the maximum refrigerating power of a single compressor, the plurality of compressors are controlled through the vehicle-mounted air conditioner controller to start operating simultaneously, and an opening degree of a corresponding valve is adjusted through the battery heat management controller to adjust the flow of the cooling liquid flowing into each battery cooling branch, to satisfy a temperature reduction refrigerating power requirement of the corresponding battery.

Specifically, as shown in FIG. 13, using two compressors 1 as an example, when the temperature adjustment system enters the cooling mode, the controller obtains P1 of each battery, the actual power P2 of each battery, and the maximum refrigerating power P of a single compressor; and may calculate the total required power Pz of the entire temperature adjustment system by adding P1 of each battery, obtain the total actual power Pf for temperature adjustment by adding the actual power P2 of each battery, and may calculate a sum P5 of the maximum refrigerating powers of all compressors by adding the maximum refrigerating power of each compressor. The required power of the first battery is P11, and the required power of the second battery is P12. The actual power of the first battery is P21, and the actual power of the second battery is P22. The maximum refrigerating powers P of all compressors are equal.

If Pz≤P, only one compressor needs to be controlled to operate, to provide the refrigerating power, and two compressors may alternatively be controlled to operate together. If P<Pz≤P5, two compressors need to operate together, and an initial refrigerating power of each compressor is Pz/2. If Pz≤P5, the compressor is controlled to run according to the refrigerating power Pz, and opening degrees of the first to the fourth adjustment valves are adjusted, so that the initial cooling power of the first battery cooling branch performs cooling according to the refrigerating power P11, and the initial cooling power of the second battery cooling branch performs cooling according to the refrigerating power P21. If Pz>P5, each compressor runs according to the maximum refrigerating power P, the initial cooling power of the first battery cooling branch may perform cooling according to the refrigerating power P5*[P11/(P11+P12)], and the initial cooling power of the second battery cooling branch may perform cooling according to the refrigerating power P5*[P12/(P11+P12)].

According to an embodiment of the present disclosure, in the cooling mode, when a temperature difference between the batteries exceeds a set value, the cooling power of the battery whose temperature is relatively high is increased, so as to reduce the temperature difference between the batteries; and in the heating mode, when the temperature difference between the batteries exceeds the set value, the heating power of the battery whose temperature is relatively low is increased.

It may be understood that, when the temperature adjustment system enters the cooling mode, the required power P1 of the first battery and the required power P1 of the second battery may be respectively calculated through the battery management controller, and then the opening degree of the corresponding second expansion valve is adjusted through the vehicle-mounted air conditioner controller according to P1 of each battery and the maximum refrigerating power P of the corresponding compressor. Moreover, the opening degree of the second expansion valve 42 continues to be adjusted according to the actual power P2 of each battery through the vehicle-mounted air conditioner controller. Moreover, allocation of the flow of the cooling liquid in the first battery cooling branch and the second battery cooling branch is adjusted according to a temperature situation between the first battery and the second battery by adjusting the opening degrees of the first to the fourth adjustment valves, thereby controlling temperature balancing between the first battery and the second battery. When the temperature of the first battery is higher than the temperature of the second battery and a difference between them exceeds a set value, opening degrees of the first adjustment valve and the third adjustment valve may be increased, and opening degrees of the second adjustment valve and the fourth adjustment valve may be reduced through the vehicle-mounted air conditioner controller, to increase the cooling power of the first battery; and when the temperature of the first battery and the temperature of the second battery are equal, opening degrees of the first to the fourth adjustment valves may be controlled through the vehicle-mounted air conditioner controller to be the same. When the temperature adjustment system enters the heating mode, and the temperature of the first battery is lower than the temperature of the second battery and the difference exceeds the set value, the heating power of the heater corresponding to the first battery is increased through the battery heat management controller. Therefore, temperature balancing between two batteries may be kept.

The temperature adjustment method for a vehicle-mounted battery according to this embodiment of the present disclosure may precisely control the heating power and the cooling power of each battery according to an actual status of each battery, and adjust the temperature of the battery when the temperature is excessively high or excessively low, so that the temperature of the battery is maintained within a preset range, and may ensure temperature balancing between the batteries.

Temperature adjustment on a vehicle includes temperature adjustment on a battery and temperature adjustment within a compartment. To make the intra-vehicle temperature satisfy a requirement if the temperature of the battery satisfies a requirement, the flow of the cooling liquid in the battery cooling branch and the flow of the cooling liquid in the intra-vehicle cooling branch need to be properly allocated. To this end, an embodiment of the present disclosure proposes a temperature adjustment system for a vehicle. A temperature adjustment method and a temperature adjustment system for a vehicle proposed in the embodiments of the present disclosure are described below with reference to the accompanying drawings.

FIG. 3 is a schematic block diagram of a temperature adjustment system for a vehicle according to an embodiment of the present disclosure. As shown in FIG. 3, the temperature adjustment system includes: a compressor 1, the condenser 2, an intra-vehicle cooling branch 3, a battery cooling branch 4, and a battery temperature adjustment module 5.

The condenser 2 is connected to the compressor 1, the intra-vehicle cooling branch 3 is connected between the compressor 1 and the condenser 2, and the battery cooling branch 4 is connected between the compressor 1 and the condenser 2. The battery temperature adjustment module 5 is connected to the battery cooling branch 4, and is used for obtaining a required power P1 and an actual power P2 of a battery 6, obtaining an intra-vehicle temperature T of the vehicle and an air conditioner set temperature Ts, and adjusting opening degrees of the intra-vehicle cooling branch 3 and the battery cooling branch 4 according to the required power P1, the actual power P2, the intra-vehicle temperature T, and the air conditioner set temperature Ts.

Specifically, the battery temperature adjustment module 5 obtains the required power P1 of the battery 6, the actual power P2 of the battery 6, the intra-vehicle temperature T of the vehicle, and the air conditioner set temperature Ts, and adjusts the opening degrees of the intra-vehicle cooling branch 3 and the battery cooling branch 4 according to P1, P2, T, and Ts, to allocate a refrigerating capacity. As shown in FIG. 1, when the refrigerating function of the vehicle-mounted air conditioner is turned on, a flowing direction of the cooling liquid is: the compressor 1—the condenser 2—the intra-vehicle cooling branch 3—the compressor 1. The battery cooling branch 4 has two ducts, a first duct is in communication with the compressor 1, and a second duct is in communication with the battery temperature adjustment module 5, where the first duct and the second duct are adjacently disposed independent of each other. When the temperature of the battery is excessively high, a battery cooling function is started, and flowing directions of the cooling liquid in the first duct and the second duct are respectively: the compressor 1—the condenser 2—the battery cooling branch 4—the compressor 1; and the battery cooling branch 4—the battery temperature adjustment module 5—the battery 6—the battery temperature adjustment module 5—the battery cooling branch 4. When the temperature of the battery 6 is excessively low, the battery temperature adjustment module 5 starts the battery heating function, a flowing direction of the cooling liquid in the second duct is: the battery cooling branch 4—the battery temperature adjustment module 5—the battery 6—the battery temperature adjustment module 5—the battery cooling branch 4.

It may be understood that, the battery temperature adjustment module 5 has a refrigerating power provided by the vehicle-mounted air conditioner, and shares a refrigerating capacity with an intra-vehicle refrigerating system, thereby reducing the volume of the temperature adjustment system, and making allocation of the flow of the cooling liquid more flexible. Therefore, by adjusting the opening degrees of the intra-vehicle cooling branch and the battery cooling branch, the system may quickly adjust the temperature of the vehicle-mounted battery when the temperature is excessively high or excessively low, thereby maintaining the temperature of the vehicle-mounted battery within a preset range, and avoiding a case of affecting performance of the vehicle-mounted battery because of the temperature, and may further make the intra-vehicle temperature satisfy a requirement if the temperature of the battery satisfies a requirement.

According to an embodiment of the present disclosure, the battery temperature adjustment module 5 is specifically configured to: adjust the opening degrees of the intra-vehicle cooling branch 3 and the battery cooling branch 4 according to the required power P1, the actual power P2, the intra-vehicle temperature T, and the air conditioner set temperature Ts, so that the battery 6 reaches the target temperature within the target time t.

Specifically, when the battery temperature adjustment module 5 adjusts the opening degrees of the intra-vehicle cooling branch 3 and the battery cooling branch 4 according to P1, P2, T, and Ts, it may be ensured that a heating power and a cooling power of the vehicle-mounted battery are precisely controlled according to an actual status of the battery 6 within the target time t, thereby adjusting the temperature of the vehicle-mounted battery when the temperature is excessively high or excessively low, and making the intra-vehicle temperature satisfy a requirement if the temperature of the battery satisfies a requirement.

Optionally, according to an embodiment of the present disclosure, as shown in FIG. 4, a battery cooling branch 4 includes a heat exchanger 41, the heat exchanger 41 includes a first duct and a second duct, the second duct is connected to a battery temperature adjustment module 5, and the first duct is in communication with a compressor 1, where the first duct and the second duct are adjacently disposed independent of each other. The battery temperature adjustment module 5 includes: a flow path of adjusting the temperature of the battery (not specifically shown in the figure), where the flow path is disposed in the battery 6; and a pump 51, a medium container 52, a heater 53, and a controller (not specifically shown in the figure) that are connected between the flow path and the heat exchanger 41. The controller obtains the required power P1 of the battery 6 and the actual power P2 of the battery, and adjusts the temperature of the battery 6 according to the required power P1 and the actual power P2; and the controller adjusts the opening degrees of the intra-vehicle cooling branch 3 and the battery cooling branch 4 according to the required power P1, the actual power P2, the intra-vehicle temperature T, and the air conditioner set temperature Ts, thereby making the intra-vehicle temperature satisfy a requirement if the temperature of the battery satisfies a requirement. The intra-vehicle cooling branch 3 may include: an evaporator 31, a first expansion valve 32, and a first electronic valve 33. The battery cooling branch 4 may further include a second expansion valve 42 and a second electronic valve 43.

For how to obtain the required power P1 and the actual power P2 of the battery 6, refer to the foregoing embodiment. To avoid redundancy, details are not described herein again.

How does the battery temperature adjustment module 5 adjust the opening degrees of the intra-vehicle cooling branch 3 and the battery cooling branch 4 according to P1, P2, T, and Ts, thereby making the intra-vehicle temperature satisfy a requirement if the temperature of the battery satisfies a requirement is described below with reference to a specific embodiment.

According to an embodiment of the present disclosure, in the cooling mode, the controller may reduce the opening degree of the intra-vehicle cooling branch 4 and increase the opening degree of the battery cooling branch 4 when the required power P1 is greater than the actual power P2 and the temperature of the battery is greater than a third temperature threshold T3. The third temperature threshold is greater than the first temperature threshold. For example, the third preset threshold may be 45° C.

Specifically, after the vehicle is powered on, if the temperature of the battery 6 is higher than 40° C., the controller controls the temperature adjustment system to enter the cooling mode, to cool the battery 6. In a process of cooling the battery 6, the controller obtains P1 and P2, and further determines whether the temperature of the battery is greater than 45° C. when determining that the required power P1 is greater than the actual power P2. If the temperature of the battery is greater than 45° C., it indicates that the temperature of the battery is excessively high, the vehicle-mounted air conditioner preferentially satisfies a cooling requirement of the battery 6, reduces the opening degree of the first expansion valve 32, and increases the opening degree of the second expansion valve 42, to reduce the flow of the cooling liquid of the intra-vehicle cooling branch 3 and increase the flow of the cooling liquid of the battery cooling branch 4, so that the battery 6 completes temperature reduction as soon as possible. When the temperature of the battery is reduced to 35° C., cooling of the battery 6 is completed, and the controller controls the battery cooling branch 4 to be turned off. Therefore, the intra-vehicle temperature may be made to satisfy the requirement if the temperature of the battery satisfies the requirement.

According to an embodiment of the present disclosure, the controller may be further configured to increase the opening degree of the intra-vehicle cooling branch 4 and reduce the opening degree of the battery cooling branch 3 when the temperature of the battery is less than the third temperature threshold and the intra-vehicle temperature T is greater than the air conditioner set temperature Ts.

Specifically, in a process of cooling the battery 6, the controller further determines, when determining that the temperature of the battery is less than 45° C., whether the intra-vehicle temperature T is greater than the air conditioner set temperature Ts. If T>Ts, it indicates that the intra-vehicle temperature T has not reached the set temperature, and the intra-vehicle temperature is relatively high. To prevent a user from feeling uncomfortable, the intra-vehicle refrigerating requirement is preferentially satisfied, and the controller increases the opening degree of the first expansion valve 32, and reduces the opening degree of the second expansion valve 42. If the intra-vehicle temperature T has reached the air conditioner set temperature Ts, indicating that the intra-vehicle refrigerating power has been sufficient and balanced, the controller increases the opening degree of the second expansion valve 42, to increase the cooling power of the battery 6. When the temperature of the battery is reduced to 35° C., cooling of the battery 6 is completed, and the controller controls the second electronic valve 33 to be turned off. Therefore, the intra-vehicle temperature may be made to satisfy the requirement if the temperature of the battery satisfies the requirement.

That is to say, layered processing is performed on the temperature of the battery herein, and temperature control thresholds are respectively 40° C., 45° C., and 35° C. When the temperature of the battery is higher than 40° C., the battery cooling function is started; and when the temperature of the battery is reduced to 35° C., cooling of the battery 6 is completed. When the temperature of the battery reaches 45° C., the battery cooling requirement is preferentially satisfied. Additionally, when the required power P1 is greater than the actual power P2, if the temperature of the battery does not exceed 45° C., the intra-vehicle refrigerating requirement is still preferentially satisfied; and if the intra-vehicle refrigerating power has been sufficient and balanced, the controller increases the opening degree of the battery cooling branch 4, to increase the cooling power of the battery. If the required power P1 is less than or equal to the actual power P2, the intra-vehicle refrigerating requirement may be preferentially satisfied.

According to an embodiment of the present disclosure, in the heating mode, the controller obtains a power difference between the required power P1 and the actual power P2 when the required power P1 is greater than the actual power P2, and increases, according to the power difference, the power of the heater 53 used for heating the battery 6; and keeps the power of the heater 53 unchanged when the required power P1 is less than or equal to the actual power P2.

Figure 19:
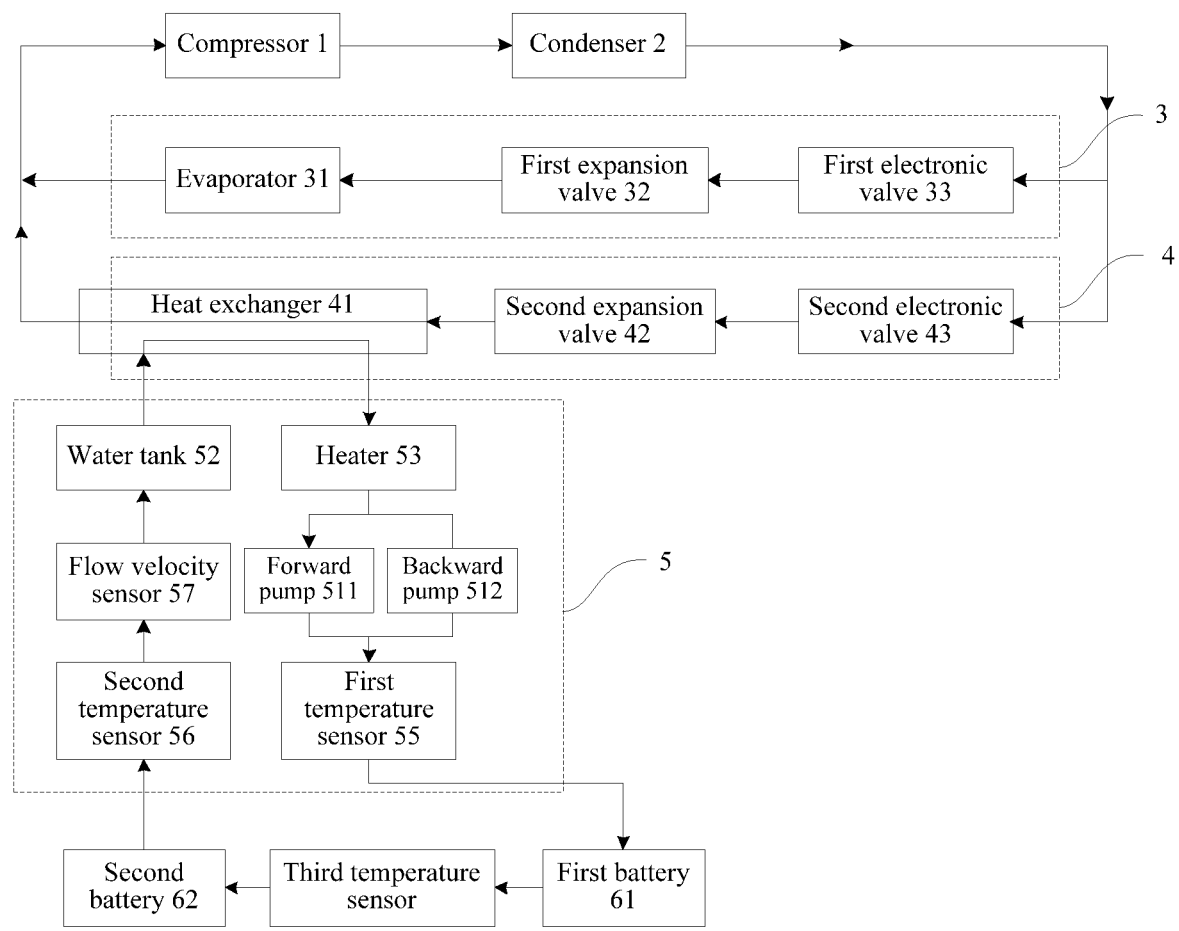
FIG. 19 is a flowchart of a temperature adjustment method for a vehicle according to a tenth embodiment of the present disclosure.
Figure 20:
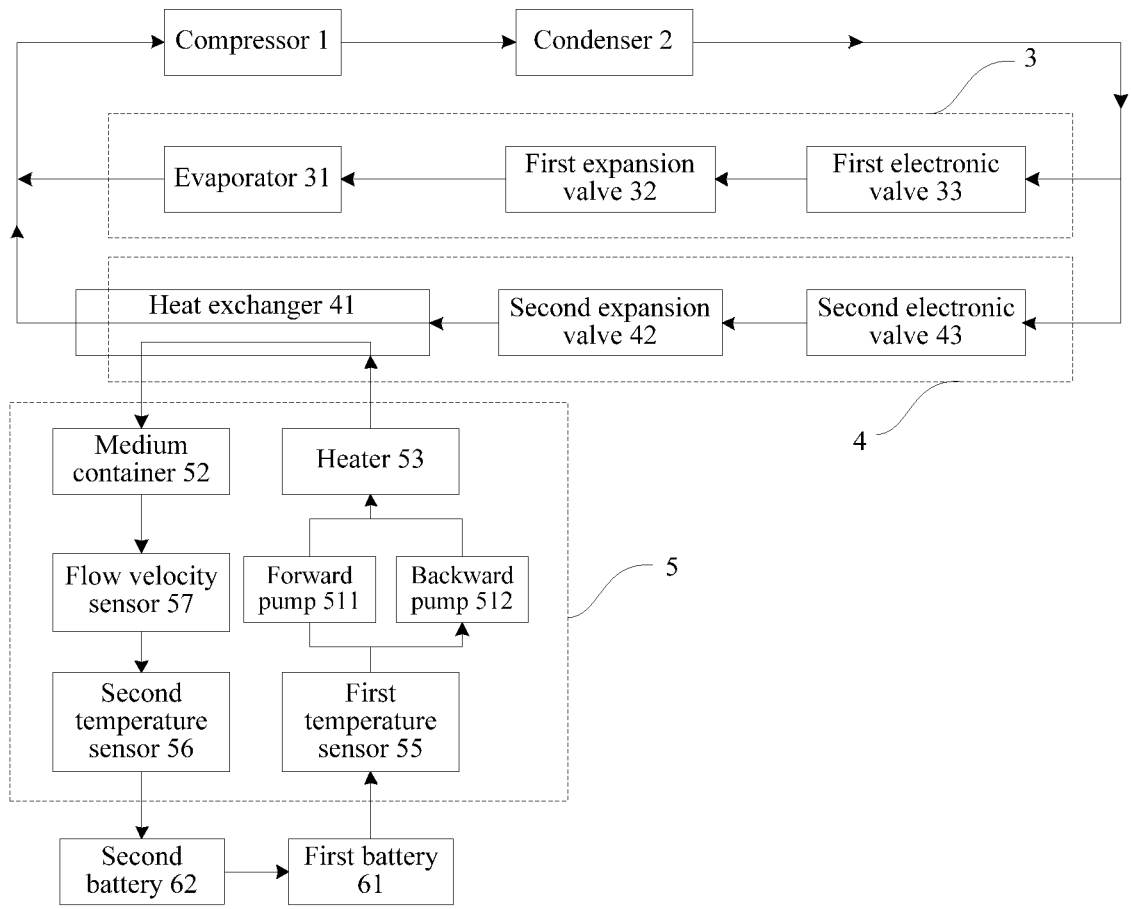
FIG. 20 is a flowchart of a temperature adjustment method for a vehicle according to an eleventh embodiment of the present disclosure.
Figure 21:
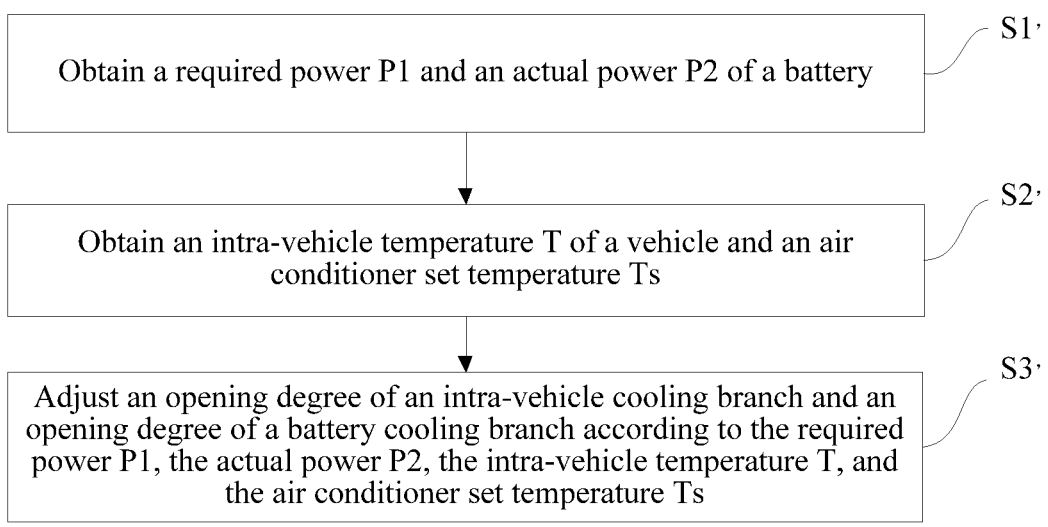
FIG. 21 is a flowchart of a temperature adjustment method for a vehicle according to a twelfth embodiment of the present disclosure.

Specifically, the vehicle may include a single battery 6, and may alternatively be formed by connecting a plurality of batteries 6 in series, in parallel or in series and parallel. As shown in FIG. 19 and FIG. 20, using two batteries as an example, when there are two batteries (a first battery 61 and a second battery 62) connected in series, there are two pumps correspondingly, one of the two pumps is a forward pump 511, and the other is a backward pump 512.

As shown in FIG. 19, when the forward pump 511 is started, the flowing direction of the cooling liquid in the second duct is: the medium container 52—the heat exchanger 41—the heater 53—the forward pump 511—the first temperature sensor 55—the first battery 61—the second battery 62—the second temperature sensor 56—the flow velocity sensor 57—the medium container 52. As shown in FIG. 20, when the backward pump 512 is started, the flowing direction of the cooling liquid in the second duct is: the medium container 52—the flow velocity sensor 57—the second temperature sensor 56—the second battery 62—the first battery 61—the first temperature sensor 55—the backward pump 512—the heater 53—the heat exchanger 41—the medium container 52.

For example, when the cooling function of the first battery 61 and the cooling function of the second battery 62 are turned on, and the temperature adjustment system enters the cooling mode, the controller obtains P1 of each battery, the actual power P2 of each battery, and the maximum refrigerating power P of a single compressor; and may calculate the total required power Pz of the entire temperature adjustment system by adding P1 of each battery, and obtain the total actual power Pf for temperature adjustment by adding the actual power P2 of each battery. The required power of the first battery is P11, and the required power of the second battery is P12. The actual power of the first battery is P21, and the actual power of the second battery is P22. The maximum refrigerating powers P of all compressors are equal.

If a sum of the total required power Pz and the intra-vehicle cooling required power P4 is less than or equal to the maximum refrigerating power P of the compressor, that is, Pz+P4≤P, the compressor runs according to the refrigerating power Pz+P4. Moreover, Pz<P, and P4<P.

If Pz+P4>P, whether the temperature of the first battery 61 or the second battery 62 is greater than 45° C. is determined. If the temperature is greater than 45° C., the cooling power is preferentially provided for battery cooling, the controller controls the compressor 1 to run according to the maximum refrigerating power P, the cooling power of the battery cooling branch 4 is Pz, and the cooling power of the intra-vehicle cooling branch 3 is equal to P-Pz.

If it is determined that the temperature of the battery is not greater than 45° C., and the intra-vehicle temperature has not reached the set temperature, the cooling power is preferentially provided to the inside of the vehicle, the compressor 1 runs according to the maximum refrigerating power P, the cooling power of the intra-vehicle cooling branch is P4, and the cooling power of the battery cooling branch is equal to P-P4.

If the intra-vehicle temperature has reached the set temperature, the cooling power of the battery is preferentially satisfied. The cooling power of the battery cooling branch is Pz.

A sum of the actual power for temperature adjustment on the first battery 61 and the actual power for temperature adjustment on the second battery 62 is Pf, and when Pz>Pf, the power that needs to be adjusted is Pc (Pc=Pz−Pf). If Pz+P4+Pc≤P, the refrigerating power that the compressor needs to increase is Pc, and the controller increases the opening degree of the second expansion valve 42, and increases the rotational speed of the pump 51. Moreover, processing is performed as follows:

If P11−P21=Pc1, P12−P22=Pc2, P11>P21, and P12>P22:

When Pc1 is greater than the set value, the controller controls the forward pump 511 to be turned on and the backward pump 512 to be turned off, so that the cooling power of the first battery 61 is increased. When Pc2 is greater than the set value, the controller controls the backward pump 512 to be turned on and the forward pump 511 to be turned off, so that the cooling power of the second battery 62 is increased. When Pc1>Pc2, the controller controls the forward pump 511 to be turned on and the backward pump 512 to be turned off, so that the cooling power of the first battery 61 is increased. When Pc1≤Pc2, the controller controls the backward pump 512 to be turned on and the forward pump 511 to be turned off, so that the cooling power of the second battery 62 is increased.

Moreover, when the temperature T61 of the first battery 61 is greater than the temperature T62 of the second battery 62, the controller controls the forward pump 511 to be turned on and the backward pump 512 to be turned off, so that the cooling power of the first battery 61 is increased. When the temperature T61 of the first battery 61 is less than or equal to the temperature T62 of the second battery 62, the controller controls the backward pump 512 to be turned on and the forward pump 511 to be turned off, so that the cooling power of the battery 62 is increased.

If P21−P11=Pc1, P22−P12=Pc2, P11≤P21, and P12≤P22, processing may be performed as follows:

When Pc1 is greater than the set value, the controller controls the forward pump 511 to be turned off and the backward pump 512 to be turned on, so that the cooling power of the first battery 61 is reduced. When Pc2 is greater than the set value, the controller controls the backward pump 512 to be turned off and the forward pump 511 to be turned on, so that the cooling power of the second battery 62 is reduced. When Pc1>Pc2, the controller controls the forward pump 511 to be turned off and the backward pump 512 to be turned on, so that the cooling power of the first battery 61 is reduced. When Pc1≤Pc2, the controller controls the backward pump 512 to be turned off and the forward pump 511 to be turned on, so that the cooling power of the second battery 62 is reduced.

Moreover, when the temperature T61 of the first battery 61 is greater than the temperature T62 of the second battery 62, the controller controls the forward pump 511 to be turned on and the backward pump 512 to be turned off, so that the cooling power of the first battery 61 is increased. When the temperature T61 of the first battery 61 is less than or equal to the temperature T62 of the second battery 62, the controller controls the backward pump 512 to be turned on and the forward pump 511 to be turned off, so that the cooling power of the battery 62 is increased. Additionally, alternatively, when the cooling function of the first battery 61 and the cooling function of the second battery 62 are started, if the temperature of the first battery 61 is higher than the temperature of the second battery 62, and a difference between them exceeds the preset value, the controller controls the forward pump 511 to operate, so that the cooling liquid first flows through the first battery 61, and then flows through the second battery 62, thereby making the first battery 61 complete temperature reduction as soon as possible. If the temperature of the second battery 62 is higher than the temperature of the first battery 61, and the difference exceeds the preset value, the controller controls the backward pump 512 to operate, so that the cooling liquid first flows through the second battery 62, and then flows through the first battery 61, thereby making the second battery 62 complete temperature reduction as soon as possible. Therefore, by changing the flow direction of the cooling liquid, the temperature difference between the first battery 61 and the second battery 62 may be reduced.

When neither the cooling function nor the heating function of the first battery 61 and the second battery 62 is started, if the temperature difference between the first battery 61 and the second battery 62 exceeds the preset value, the controller may control the forward pump 511 or the backward pump 512 to be started, so that the cooling liquid in the battery cooling branch 4 flows, thereby balancing the temperatures of the first battery 61 and the second battery 62.

When the pump 51 rotates in a forward direction and a maximum value in the temperature differences between the batteries obtained by the battery management controller exceeds the preset value, the battery management controller sends information about controlling the pump to rotate in a backward direction to the battery heat management controller, so that battery thermal management controller controls the pump to rotate in a backward direction (the flow direction of the loop is the counter-clockwise direction), and the temperature differences between the batteries connected in series are relatively small.

To sum up, the temperature adjustment system for a vehicle according to this embodiment of the present disclosure obtains, through the battery temperature adjustment module, the required power for temperature adjustment and the actual power for temperature adjustment on the battery, obtains the intra-vehicle temperature of the vehicle and the air conditioner set temperature, and adjusts the opening degrees of the intra-vehicle cooling branch and the battery cooling branch according to the required power for temperature adjustment, the actual power for temperature adjustment, the intra-vehicle temperature, and the air conditioner set temperature. Therefore, by adjusting the opening degrees of the intra-vehicle cooling branch and the battery cooling branch, the system may quickly adjust the temperature of the vehicle-mounted battery when the temperature is excessively high or excessively low, thereby maintaining the temperature of the vehicle-mounted battery within a preset range, and avoiding a case of affecting performance of the vehicle-mounted battery because of the temperature, and may further make the intra-vehicle temperature satisfy a requirement if the temperature of the battery satisfies a requirement.

Figure 31:
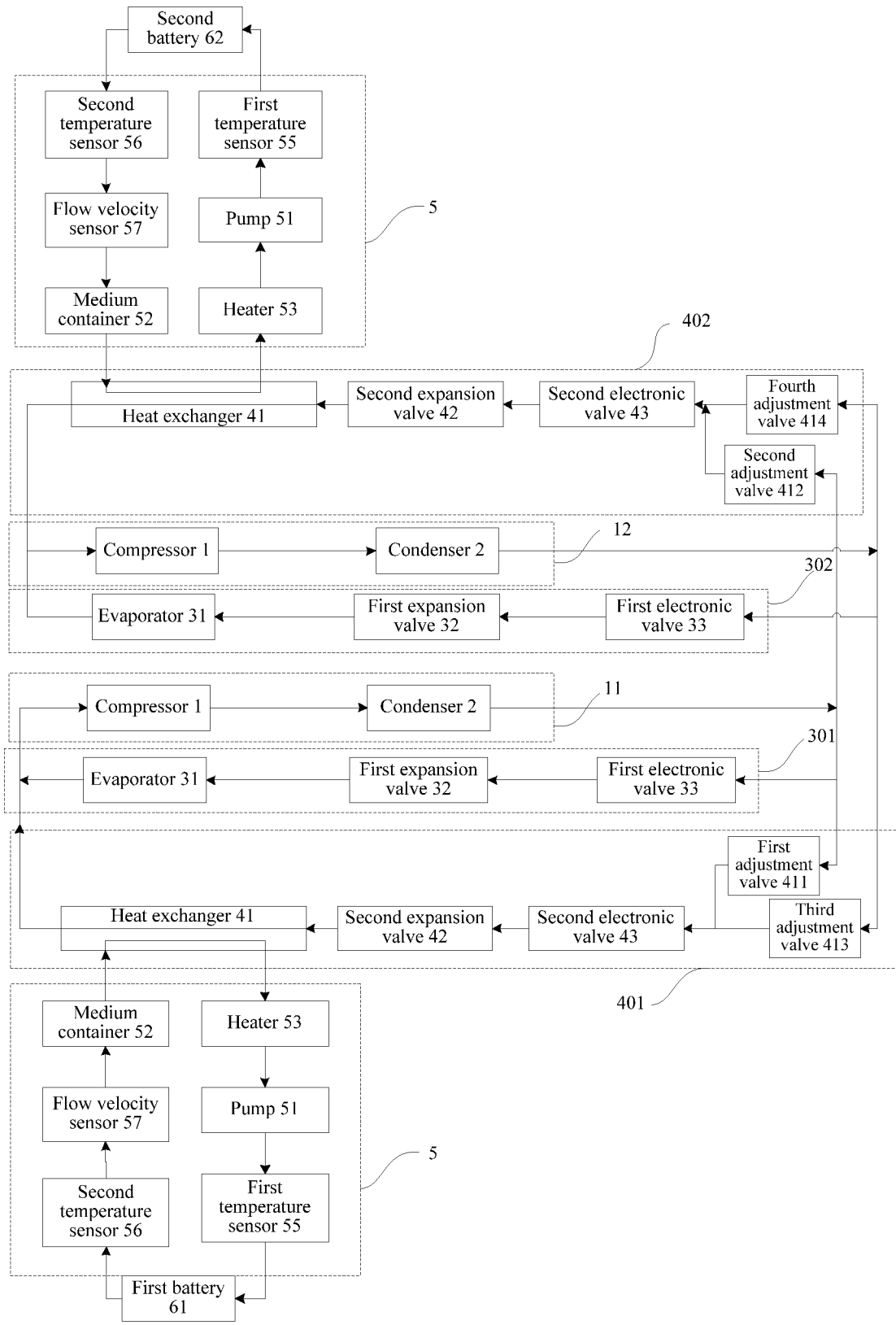
FIG. 31 is a schematic diagram of a flow path structure of a temperature adjustment system for a vehicle-mounted battery according to a tenth embodiment of the present disclosure.

FIG. 31 is a flowchart of a temperature adjustment method for a vehicle according to a first embodiment of the present disclosure. As shown in FIG. 31, the temperature adjustment method for a vehicle includes the following steps:

S1'. Obtain a required power P1 and an actual power P2 of a battery.

Figure 22:
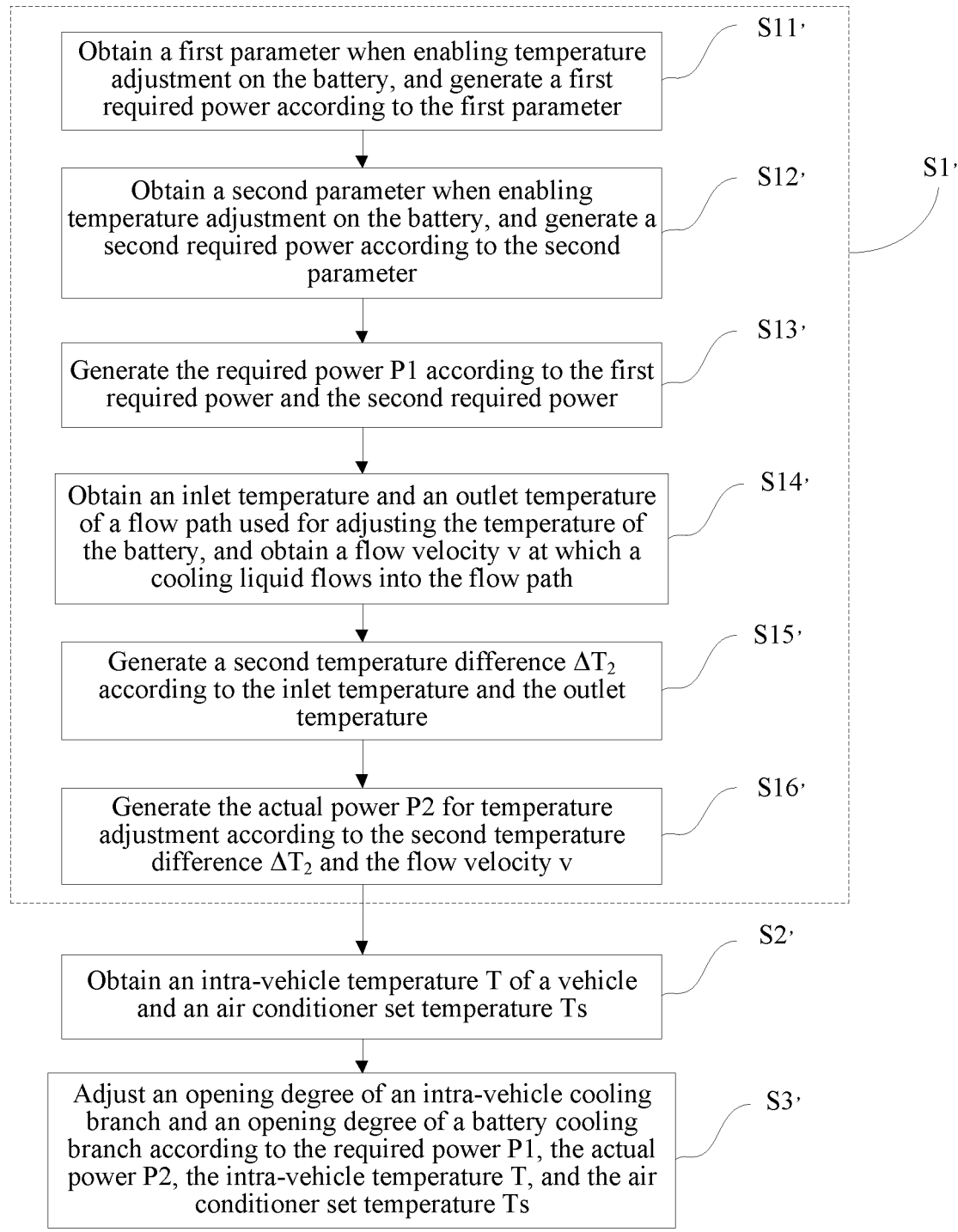
FIG. 22 is a flowchart of a temperature adjustment method for a vehicle according to a thirteenth embodiment of the present disclosure.

Optionally, as shown in FIG. 22, in this embodiment of the present disclosure, the obtaining a required power P1 of a battery specifically includes the following steps:

S11'. Obtain a first parameter when enabling temperature adjustment on the battery, and generate a first required power according to the first parameter.

S12'. Obtain a second parameter when enabling temperature adjustment on the battery, and generate a second required power according to the second parameter.

S13'. Generate the required power P1 according to the first required power and the second required power.

Optionally, according to an embodiment of the present disclosure, the first parameter is an initial temperature when enabling temperature adjustment on the battery, the target temperature, and a target time t for reaching the target temperature from the initial temperature, and the generating a first required power according to the first parameter specifically includes: obtaining a first temperature difference $\Delta T_1$ between the initial temperature and the target temperature; and generating the first required power according to the first temperature difference $\Delta T_1$ and the target time t.

Optionally, according to an embodiment of the present disclosure, the first required power is generated through the following formula (1):

$$\Delta T_1 * C * M / t \tag{1}$$

where $\Delta T_1$ is the first temperature difference between the initial temperature and the target temperature, t is the target time, C is a specific heat capacity of the battery, and M is a mass of the battery.

According to an embodiment of the present disclosure, the second parameter is an average current I of the battery within a preset time, and the second required power is generated through the following formula (2):

$$I^2 * R \tag{2}$$

where I is the average current, and R is an internal resistance of the battery.

When the battery is cooled, $P1=\Delta T_1 * C * M / t + I^2 * R$; and when the battery is heated, $P1=\Delta T_1 * C * M / t - I^2 * R$.

According to an embodiment of the present disclosure, as shown in FIG. 22, the obtaining an actual power P2 of a battery specifically includes the following steps:

S14'. Obtain an inlet temperature and an outlet temperature of a flow path used for adjusting the temperature of the battery, and obtain a flow velocity v at which a cooling liquid flows into the flow path.

S15'. Generate a second temperature difference $\Delta T_2$ according to the inlet temperature and the outlet temperature.

S16'. Generate the actual power P2 according to the second temperature difference $\Delta T_2$ and the flow velocity v.

Optionally, according to an embodiment of the present disclosure, the actual power P2 is generated through the following formula (3):

$$\Delta T_2 * c * m \tag{3}$$

where $\Delta T_2$ is the second temperature difference, c is a specific heat capacity of the cooling liquid in the flow path, and m is a mass of the cooling liquid flowing through a cross section of the flow path within a unit time, where $m = v * \rho * s$, v is a flow velocity of the cooling liquid, $\rho$ is a density of the cooling liquid, and s is a cross-sectional area of the flow path.

S2'. Obtain an intra-vehicle temperature T of the vehicle and an air conditioner set temperature Ts.

S3'. Adjust an opening degree of an intra-vehicle cooling branch and an opening degree of a battery cooling branch according to the required power P1, the actual power P2, the intra-vehicle temperature T, and the air conditioner set temperature Ts.

Optionally, according to an embodiment of the present disclosure, the adjusting an opening degree of an intra-vehicle cooling branch and an opening degree of a battery cooling branch according to the required power P1, the actual power P2, the intra-vehicle temperature T, and the air conditioner set temperature Ts includes: adjusting the opening degree of the intra-vehicle cooling branch and the opening degree of the battery cooling branch according to the required power P1, the actual power P2, the intra-vehicle temperature T, and the air conditioner set temperature Ts, so that the battery reaches the target temperature within the target time t.

Specifically, after the vehicle is powered on, it is determined, through a battery management controller, whether temperature adjustment needs to be performed on the vehicle, and when it is determined that temperature adjustment needs to be performed on the vehicle, the initial temperature (that is, current temperature) of the battery, the target temperature, and the target time t for reaching the target temperature from the initial temperature are obtained, where the target temperature and the target time t may be preset according to an actual situation, and the first required power is calculated according to the formula (1). Moreover, the average current I of the battery within the preset time is obtained through the battery heat management controller, and the second required power is calculated according to the formula (2). Then, the required power P1 (that is, the required power for adjusting the temperature of the battery to the target temperature) is calculated according to the first required power and the second required power through the battery management controller. Moreover, an inlet temperature and an outlet temperature of the battery and flow velocity information are obtained through a battery heat management controller, and the actual power P2 is calculated according to the formula (3). Moreover, the intra-vehicle temperature T and the air conditioner set temperature Ts are obtained. Finally, the opening degrees of the intra-vehicle cooling branch and the battery cooling branch are adjusted according to P1, P2, T, and Ts, so that the battery reaches the target temperature within the target time t. Therefore, by adjusting the opening degrees of the intra-vehicle cooling branch and the battery cooling branch, the method may quickly adjust the temperature of the vehicle-mounted battery when the temperature is excessively high or excessively low, thereby maintaining the temperature of the vehicle-mounted battery within a preset range, and avoiding a case of affecting performance of the vehicle-mounted battery because of the temperature, and may further make the intra-vehicle temperature satisfy a requirement if the temperature of the battery satisfies a requirement.

Figure 23:
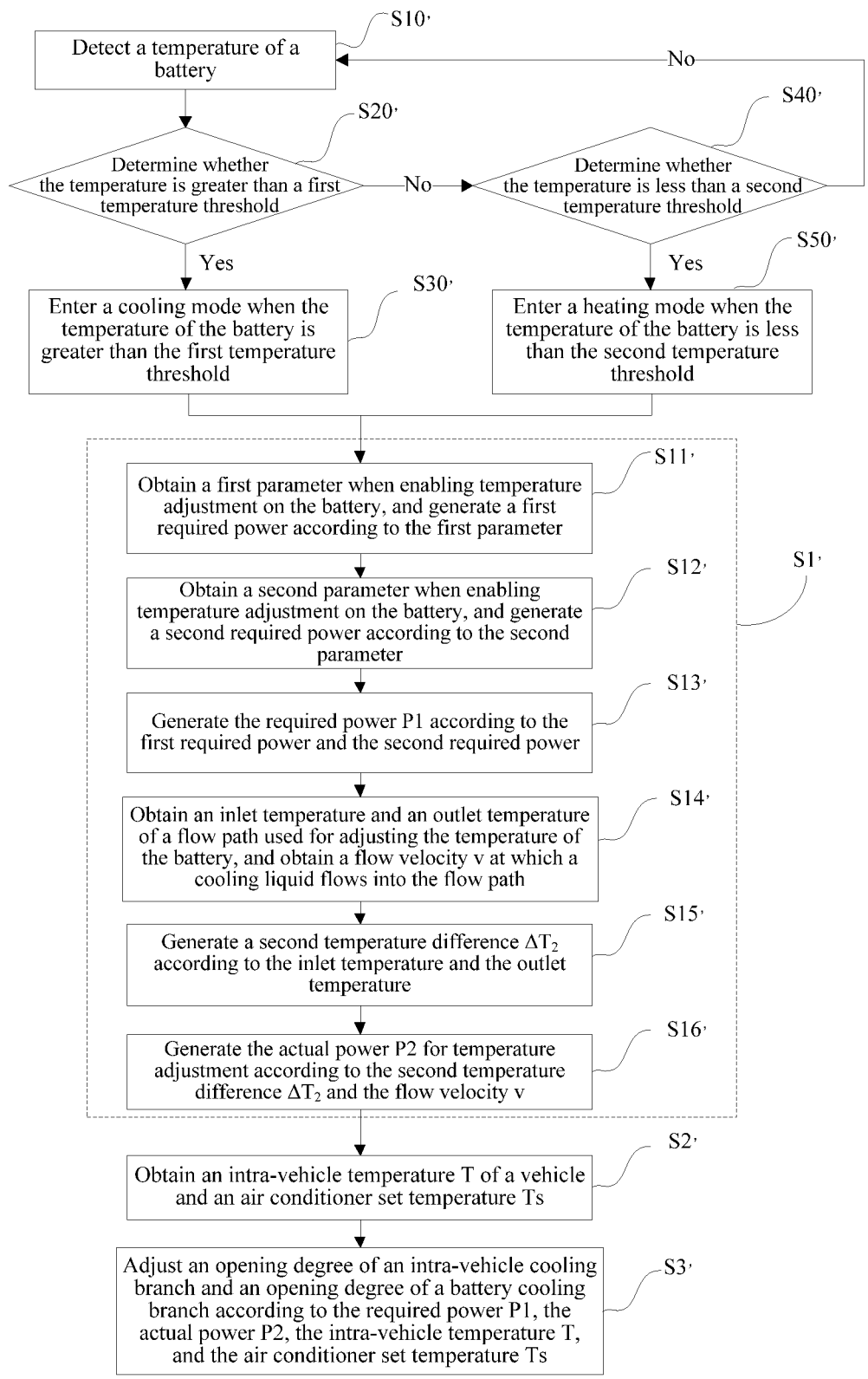
FIG. 23 is a flowchart of a temperature adjustment method for a vehicle according to a fourteenth embodiment of the present disclosure.

According to an embodiment of the present disclosure, as shown in FIG. 23, the foregoing temperature adjustment method for a vehicle may further include the following steps:

Detect the temperature of the battery; and determine whether the temperature is greater than a first temperature threshold or is less than a second temperature threshold (S10' and S20'). Enter a cooling mode when the temperature of the battery is greater than the first temperature threshold (S30'). The first preset temperature threshold may be preset according to an actual situation, for example, may be 40° C. Further determine whether the temperature of the battery is less than the second temperature threshold when the temperature of the battery is less than or equal to the first temperature threshold; and enter a heating mode when the temperature of the battery is less than the second temperature threshold (S40' and S50'). The second preset temperature threshold may be preset according to an actual situation, for example, may be 0° C.

Specifically, after the vehicle is powered on, the temperature of the battery is detected in real time and determining is performed through the battery management controller. If the temperature of the battery is higher than 40° C., it indicates that the temperature of the battery is excessively high in this case. To prevent the high temperature from affecting performance of the battery, temperature reduction processing needs to be performed on the battery, the temperature adjustment system is controlled through the battery management controller to enter the cooling mode, and the compressor is controlled through the vehicle-mounted air conditioner controller to start, so that the cooling liquid performs heat exchange with the battery to reduce the temperature of the battery. If the temperature of the battery is less than 0° C., it indicates that the temperature of the battery is excessively low in this case. To prevent the low temperature from affecting performance of the battery, temperature increase processing needs to be performed on the battery, the temperature adjustment system is controlled through the battery management controller to enter the heating mode, and the heater is controlled through the vehicle-mounted air conditioner controller to be turned on, to provide the heating power.

It may be understood that, by adjusting the opening degree of the intra-vehicle cooling branch and the opening degree of the battery cooling branch according to the required power P1 and the actual power P2 of the battery, the intra-vehicle temperature T, and the air conditioner set temperature Ts, the intra-vehicle temperature may satisfy the requirement when the battery satisfies the temperature requirement. Moreover, it is easy to obtain the required power P1 and the actual power P2.

Specifically, it can be known from the foregoing embodiment that, in different cases, the required power P1 may be calculated in different manners. Using cooling of a battery as an example, when the battery needs to be cooled, if the initial temperature of the battery is 45° C., and the battery cooling target temperature is 35° C., heat that needs to be dissipated when the battery is cooled from 45° C. to 35° C. is fixed, and may be directly calculated through the formula (1), that is, $\Delta T_1*C*M/t$, where $\Delta T_1$ is the first temperature difference between the initial temperature and the target temperature, t is the target time, C is a specific heat capacity of the battery, and M is a mass of the battery. Moreover, a discharging and charging process exists in the cooling process of the battery, and this process generates heat. This part of heat may alternatively be directly obtained by detecting the current, and the current heating power, that is, the second required power of the battery is directly calculated through the formula (3), that is, $I^2*R$, where I is the average current, and R is an internal resistance of the battery. One of key points of the present disclosure is that the cooling time is adjustable, and a cooling completion time may be precisely determined, and is set based on the target time t (t may be changed according to a user requirement or an actual design situation of the vehicle) in the present disclosure. After the target time t required for cooling completion is determined, the current required power P1 required for cooling the battery may be predicted, that is, $P1=\Delta T_1*C*M/t+I^2*R$. If the heating function is started, the required power $P1=\Delta T_1*C*M/t-I^2*R$, that is, when the battery is in a heating process, a larger discharging or charging current of the battery indicates a smaller required heating power, that is, required power P1.

Because a discharging or charging current of the battery is changed, $I^2*R$ is changed. Therefore, to better ensure accuracy of the cooling time, the cooling power also needs to change as the current average discharging or charging current of the battery changes. If the vehicle-mounted air conditioner cools the battery and the compartment simultaneously, when the discharging current of the battery is relatively small, $I^2*R$ is reduced. In this case, the vehicle-mounted air conditioner may allocate more refrigerating power to the compartment, so that the compartment reaches a set air temperature more quickly. Moreover, when the discharging or charging current of the battery is relatively large, $I^2*R$ is relatively large. In this case, the vehicle-mounted air conditioner may allocate more refrigerating power to the battery. Through such adjustment, the time required for cooling the battery is always accurate, and moreover the refrigerating power of the vehicle-mounted air conditioner may be used more efficiently and properly, so that it is unnecessary to configure an air conditioner having a relatively large cooling power, which causes waste of the refrigerating power.

The battery cooling time is affected by the cooling efficiency. The cooling efficiency is affected by an external ambient temperature and the current temperature of the battery, and efficiency of the temperature adjustment system is continuously changed in a battery cooling process. Therefore, the cooling efficiency cannot be 100%. As a result, the time for cooling the battery cannot be accurately adjusted according to only P1, and it is necessary to detect the actual power P2 of the battery. In the present disclosure, the actual power P2 of the battery may be calculated through the formula (3), that is, $\Delta T_2 * c * m$. P2 may alternatively be calculated through the actual cooling power P2 of the battery, that is, through the formula (4), that is, $\Delta T3 * C * m1$, where $\Delta T3$ is a temperature change of the battery within a period of time, C is a specific heat capacity of the battery, and m1 is a mass of the battery. However, because the mass of the battery is relatively large, a temperature change within a unit time is not evident, and a temperature difference can be detected in need of a relatively long time, which does not meet a real-time performance requirement. Therefore, the power P2 is usually calculated according to the formula (3).

Due to the effect of the cooling efficiency, it is quite difficult for P2 to be completely equal to P1. To make the target time t for cooling the battery more accurate, adjustment needs to be performed in real time according to a power difference between P1 and P2, to ensure that the required power P1 of the battery is equal to the actual power P2 of the battery. How to adjust the opening degree of the intra-vehicle cooling branch and the opening degree of the battery cooling branch according to the required power P1, the actual power P2, the intra-vehicle temperature T, and the air conditioner set temperature Ts, to adjust the temperature of the vehicle is described below with reference to a specific embodiment.

Figure 24:
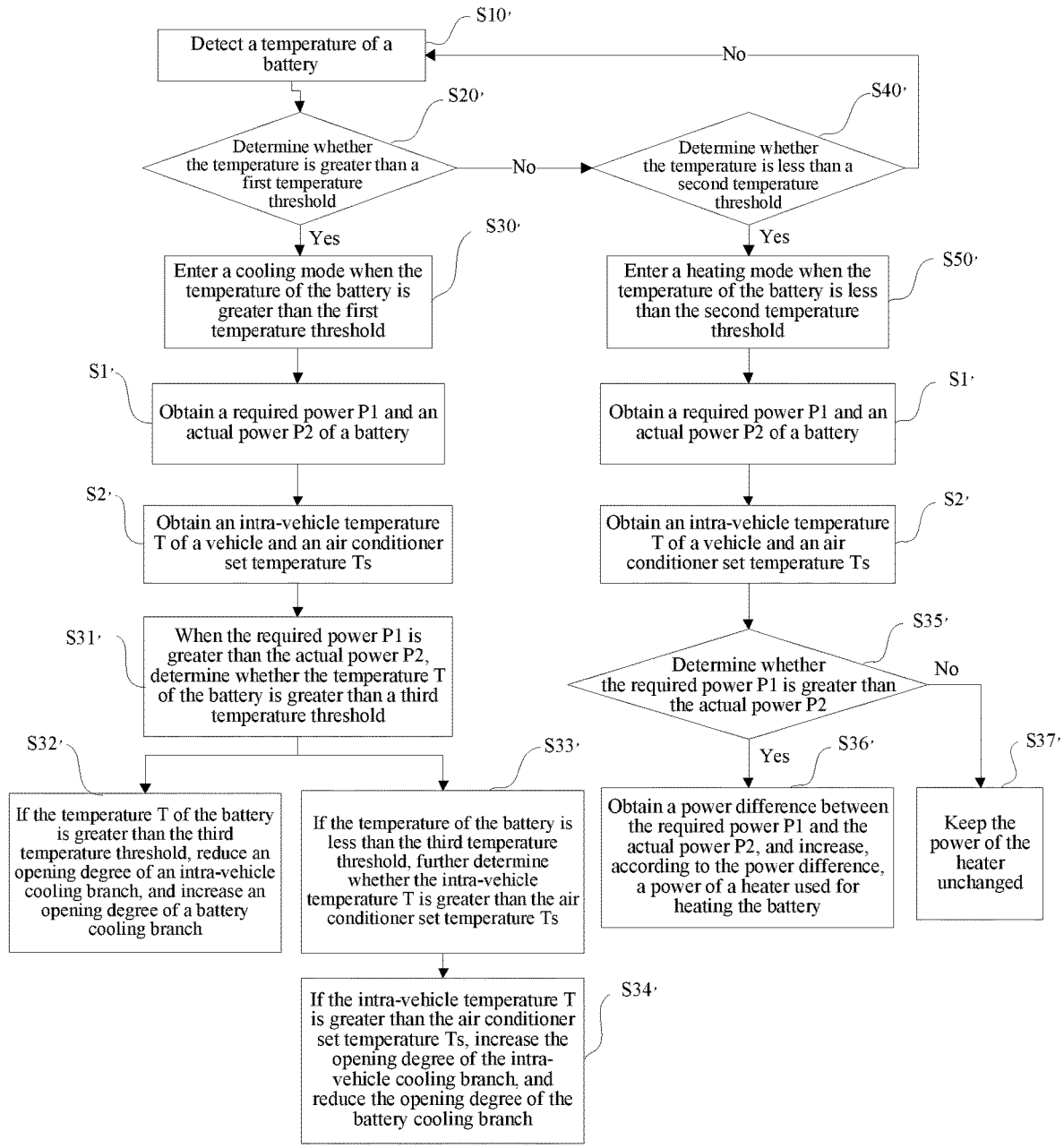
FIG. 24 is a flowchart of a temperature adjustment method for a vehicle according to a fifteenth embodiment of the present disclosure.

According to an embodiment of the present disclosure, as shown in FIG. 24, in the cooling mode, the adjusting an opening degree of an intra-vehicle cooling branch and an opening degree of a battery cooling branch according to the required power P1, the actual power P2, the intra-vehicle temperature T, and the air conditioner set temperature Ts specifically includes the following steps:

S31'. When the required power P1 is greater than the actual power P2, determine whether the temperature T of the battery is greater than a third temperature threshold. The third temperature threshold is greater than the first temperature threshold. For example, the third temperature threshold may be 45° C.

S32'. If the temperature T of the battery is greater than the third temperature threshold, reduce an opening degree of an intra-vehicle cooling branch, and increase an opening degree of a battery cooling branch.

Specifically, after the vehicle is powered on, if the temperature of the battery is higher than 40° C., the temperature adjustment system is controlled through the battery management controller to enter the cooling mode, to cool the battery. In a process of cooling the battery, P1 and P2 are obtained, and whether the temperature of the battery is greater than 45° C. is further determined when determining that the required power P1 is greater than the actual power P2. If the temperature of the battery is greater than 45° C., it indicates that the temperature of the battery is excessively high, the vehicle-mounted air conditioner preferentially satisfies the cooling requirement of the battery 6, the opening degree of the intra-vehicle cooling branch is reduced through the vehicle-mounted air conditioner controller, and the opening degree of the battery cooling branch is increased, to reduce the flow of the cooling liquid of the intra-vehicle cooling branch and increase the flow of the cooling liquid of the battery cooling branch, so that the battery completes temperature reduction as soon as possible. When the temperature of the battery is reduced to 35° C., cooling of the battery is completed, and the battery cooling branch is controlled to be turned off. Therefore, the intra-vehicle temperature may be made to satisfy the requirement if the temperature of the battery satisfies the requirement.

According to an embodiment of the present disclosure, as shown in FIG. 24, the foregoing temperature adjustment method for a vehicle may further include the following steps:

S33'. If the temperature of the battery is less than the third temperature threshold, further determine whether the intra-vehicle temperature T is greater than the air conditioner set temperature Ts.

S34'. If the intra-vehicle temperature T is greater than the air conditioner set temperature Ts, increase the opening degree of the intra-vehicle cooling branch, and reduce the opening degree of the battery cooling branch.

Specifically, in a process of cooling the battery, whether the intra-vehicle temperature T is greater than the air conditioner set temperature Ts is further determined when determining that the temperature of the battery is less than 45° C. If T>Ts, it indicates that the intra-vehicle temperature T has not reached the set temperature, and the intra-vehicle temperature is relatively high. To prevent a user from feeling uncomfortable, the intra-vehicle refrigerating requirement is preferentially satisfied, the opening degree of the intra-vehicle cooling branch is increased through the vehicle-mounted air conditioner controller, and the opening degree of the battery cooling branch is reduced. If the intra-vehicle temperature T has reached the air conditioner set temperature Ts, indicating that the intra-vehicle refrigerating power has been sufficient and balanced, the opening degree of the battery cooling branch is increased through the vehicle-mounted air conditioner controller, to increase the cooling power of the battery. When the temperature of the battery is reduced to 35° C., cooling of the battery is completed, and the battery cooling branch is controlled to be turned off. Therefore, the intra-vehicle temperature may be made to satisfy the requirement if the temperature of the battery satisfies the requirement.

That is to say, layered processing is performed on the temperature of the battery herein, and temperature control thresholds are respectively 40° C., 45° C., and 35° C. When the temperature of the battery is higher than 40° C., the battery cooling function is started; and when the temperature of the battery is reduced to 35° C., cooling of the battery is completed. When the temperature of the battery reaches 45° C., the battery cooling requirement is preferentially satisfied. Additionally, when the required power P1 is greater than the actual power P2, if the temperature of the battery is less than 45° C., the intra-vehicle refrigerating requirement is first satisfied; and if the intra-vehicle refrigerating power has been sufficient and balanced, the opening degree of the battery cooling branch is increased, to increase the cooling power of the battery. If the required power P1 is less than or equal to the actual power P2, the intra-vehicle refrigerating requirement may be preferentially satisfied.

According to an embodiment of the present disclosure, as shown in FIG. 24, in the heating mode, the adjusting a temperature of the battery according to the required power P1 and the actual power P2 specifically includes:

S35'. Determine whether the required power P1 is greater than the actual power P2.

S36'. Obtain a power difference between the required power P1 and the actual power P2 if the required power P1 is greater than the actual power P2, and increase, according to the power difference, a power of a heater used for heating the battery.

S37'. Keep the power of the heater unchanged if the required power P1 is less than or equal to the actual power P2.

Specifically, when the temperature adjustment system enters the heating mode, the heater is controlled through the battery heat management controller to be turned on, and the power of the heater is adjusted according to P1 and P2. If P1 is greater than P2, it indicates that if the heater performs heating according to the current power, the temperature of the battery cannot be increased to the target temperature within the target time t. Therefore, a power difference between P1 and P2 continues to be obtained, and the power of the heater is increased according to the power difference through the battery heat management controller, where a larger difference between P1 and P2 indicates larger increase of the power of the heater. If P1 is less than or equal to P2, the power of the heater may be kept unchanged. When the temperature of the battery is higher than a preset temperature, for example, 10° C., heating on the battery is completed, information about turning off a temperature adjustment function is sent to the vehicle-mounted air conditioner through CAN communication, and the heater is controlled through the battery heat management controller to be turned off. If the temperature of the battery is still lower than 10° C. after the temperature adjustment system has entered the heating mode for a relatively long time, for example, 1 hour, the power of the heater is properly increased through the battery heat management controller, so that the battery completes temperature increase as soon as possible. Therefore, the temperature adjustment power may be precisely controlled according to an actual status of the battery, so that the battery may complete temperature adjustment within the target time.

According to an embodiment of the present disclosure, the foregoing temperature adjustment method for a vehicle may further include: reducing the rotational speed of the pump if the required power P1 is less than the actual power P2; and increasing the rotational speed of the pump if the required power P1 is greater than the actual power P2.

Specifically, when the temperature adjustment system enters the heating mode or cooling mode, if P1 is less than P2, the rotational speed of the pump is controlled through the battery heat management controller to be reduced, to save electric energy. If P1 is greater than P2, in addition to controlling, through the battery heat management controller, the heating power of the heater to be increased, or controlling, through the vehicle-mounted air conditioner controller, the opening degree of the battery cooling branch to be increased, the rotational speed of the pump is further controlled, through the battery heat management controller, to be increased, so that a mass of the cooling liquid flowing through a cross section of the cooling flow path within a unit time may be increased, thereby increasing the actual power P2, to implement temperature adjustment on the battery within the target time t.

The vehicle may include a single battery, and may alternatively be formed by connecting a plurality of batteries in series, in parallel or in series and parallel. As shown in FIG. 19 and FIG. 20, using two batteries as an example, when there are two batteries (a first battery and a second battery), there are two pumps correspondingly, one of the two pumps is a forward pump, and the other is a backward pump.

When the temperature adjustment system enters the cooling mode, the controller obtains P1 of each battery, the actual power P2 of each battery, and the maximum refrigerating power P of a single compressor; and may calculate the total required power Pz of the entire temperature adjustment system by adding P1 of each battery, and obtain the total actual power Pf for temperature adjustment by adding the actual power P2 of each battery. The required power of the first battery is P11, and the required power of the second battery is P12. The actual power of the first battery is P21, and the actual power of the second battery is P22. The maximum refrigerating powers P of all compressors are equal.

If a sum of the total required power Pz and the intra-vehicle cooling required power P4 is less than or equal to the maximum refrigerating power P of the compressor, that is, Pz+P4≤P, the compressor runs according to the refrigerating power Pz+P4.

If Pz+P4>P, whether the temperature of the first battery or the second battery is greater than 45° C. is determined. If the temperature is greater than 45° C., the cooling power is preferentially provided for battery cooling, the controller controls the compressor 1 to run according to the maximum refrigerating power P, the cooling power of the battery cooling branch 4 is Pz, and the cooling power of the intra-vehicle cooling branch 3 is equal to P-Pz.

If it is determined that the temperature of the battery is not greater than 45° C., and the intra-vehicle temperature has not reached the set temperature, the cooling power is preferentially provided to the inside of the vehicle, the compressor 1 runs according to the maximum refrigerating power P, the cooling power of the intra-vehicle cooling branch is P4, and the cooling power of the battery cooling branch is equal to P-P4.

If the intra-vehicle temperature has reached the set temperature, the cooling power of the battery is preferentially satisfied. The cooling power of the battery cooling branch is Pz.

A sum of the actual power for temperature adjustment on the first battery and the actual power for temperature adjustment on the second battery is Pf, and when Pz>Pf, the power that needs to be adjusted is Pc (Pc=Pz-Pf). If Pz+P4+Pc≤P, the refrigerating power that the compressor needs to increase is Pc, the opening degree of the second expansion valve is increased, and the rotational speed of the pump is increased. Moreover, processing is performed as follows:

If P11-P21=Pc1, P12-P22=Pc2, P11>P21, and P12>P22:

When Pc1 is greater than the set value, the controller controls the forward pump to be turned on and the backward pump to be turned off, so that the cooling power of the first battery is increased. When Pc2 is greater than the set value, the controller controls the backward pump to be turned on and the forward pump to be turned off, so that the cooling power of the second battery is increased. When Pc1>Pc2, the controller controls the forward pump to be turned on and the backward pump to be turned off, so that the cooling power of the first battery is increased. When Pc1≤Pc2, the controller controls the backward pump to be turned on and the forward pump to be turned off, so that the cooling power of the second battery is increased.

Moreover, when the temperature T61 of the first battery is greater than the temperature T62 of the second battery, the controller controls the forward pump to be turned on and the backward pump to be turned off, so that the cooling power of the first battery is increased. When the temperature T61 of the first battery is less than or equal to the temperature T62 of the second battery, the controller controls the backward pump to be turned on and the forward pump to be turned off, so that the cooling power of the battery is increased.

If P21−P11=Pc1, P22−P12=Pc2, P11≤P21, and P12≤P22, processing may be performed as follows:

When Pc1 is greater than the set value, the controller controls the forward pump to be turned off and the backward pump to be turned on, so that the cooling power of the first battery is reduced. When Pc2 is greater than the set value, the controller controls the backward pump to be turned off and the forward pump to be turned on, so that the cooling power of the second battery is reduced. When Pc1>Pc2, the controller controls the forward pump to be turned off and the backward pump to be turned on, so that the cooling power of the first battery is reduced. When Pc1≤Pc2, the controller controls the backward pump to be turned off and the forward pump to be turned on, so that the cooling power of the second battery is reduced.

Moreover, when the temperature T61 of the first battery is greater than the temperature T62 of the second battery, the controller controls the forward pump to be turned on and the backward pump to be turned off, so that the cooling power of the first battery is increased. When the temperature T61 of the first battery is less than or equal to the temperature T62 of the second battery, the controller controls the backward pump to be turned on and the forward pump to be turned off, so that the cooling power of the battery is increased.

Additionally, alternatively, when the cooling function of the first battery and the cooling function of the second battery are started, if the temperature of the first battery is higher than the temperature of the second battery, and a difference between them exceeds the preset value, the forward pump is controlled to operate, so that the cooling liquid first flows through the first battery, and then flows through the second battery, thereby making the first battery complete temperature reduction as soon as possible. If the temperature of the second battery is higher than the temperature of the first battery, and the difference exceeds the preset value, the backward pump is controlled to operate, so that the cooling liquid first flows through the second battery, and then flows through the first battery, thereby making the second battery complete temperature reduction as soon as possible. Therefore, by changing the flow direction of the cooling liquid, the temperature difference between the first battery and the second battery may be reduced.

When neither the cooling function nor the heating function of the first battery and the second battery is started, if the temperature difference between the first battery and the second battery exceeds the preset value, the forward pump or the backward pump may be controlled to be started, so that the cooling liquid in the battery cooling branch flows, thereby balancing the temperatures of the first battery and the second battery.

In the temperature adjustment method for a vehicle according to this embodiment of the present disclosure, the required power for temperature adjustment on the battery is first obtained; then the actual power for temperature adjustment on the battery is obtained; and finally the opening degrees of the intra-vehicle cooling branch and the battery cooling branch are adjusted according to the required power for temperature adjustment, the actual power for temperature adjustment, the intra-vehicle temperature, and the air conditioner set temperature. Therefore, by adjusting the opening degrees of the intra-vehicle cooling branch and the battery cooling branch, the method may quickly adjust the temperature of the vehicle-mounted battery when the temperature is excessively high or excessively low, thereby maintaining the temperature of the vehicle-mounted battery within a preset range, and avoiding a case of affecting performance of the vehicle-mounted battery because of the temperature, and may further make the intra-vehicle temperature satisfy a requirement if the temperature of the battery satisfies a requirement.

When there are a plurality of batteries, a plurality of refrigerating branches, a plurality of intra-vehicle cooling branches, and a plurality of battery cooling branches, the temperature adjustment system for a vehicle-mounted battery includes: the plurality of refrigerating branches, the plurality of intra-vehicle cooling branches, the plurality of battery cooling branches, and a battery temperature adjustment module.

Each refrigerating branch includes a compressor 1, and a condenser 2 connected to the compressor 1. The plurality of intra-vehicle cooling branches are respectively connected to the plurality of refrigerating branches. The battery temperature adjustment module 5 is connected to a battery cooling branch, and is used for obtaining a required power P1 and an actual power P2, obtaining area temperatures Tq of a plurality of areas in the vehicle and an air conditioner set temperature Ts, and adjusting opening degrees of the plurality of intra-vehicle cooling branches, the plurality of battery cooling branches and the plurality of refrigerating branches according to the required power P1, the actual power P2, the plurality of area temperatures Tq, and the air conditioner set temperature Ts.

During implementation of the present disclosure, the battery may be a battery pack or a battery module. Each battery cooling branch corresponds to a plurality of batteries connected in parallel or connected in series.

Optionally, according to an embodiment of the present disclosure, the battery temperature adjustment module 5 adjusts the opening degrees of the plurality of intra-vehicle cooling branches, the plurality of battery cooling branches and the plurality of refrigerating branches within the target time t according to the required power P1, the actual power P2, the plurality of area temperatures Tq, and the air conditioner set temperature Ts, to reach the target temperature.

Figure 25:
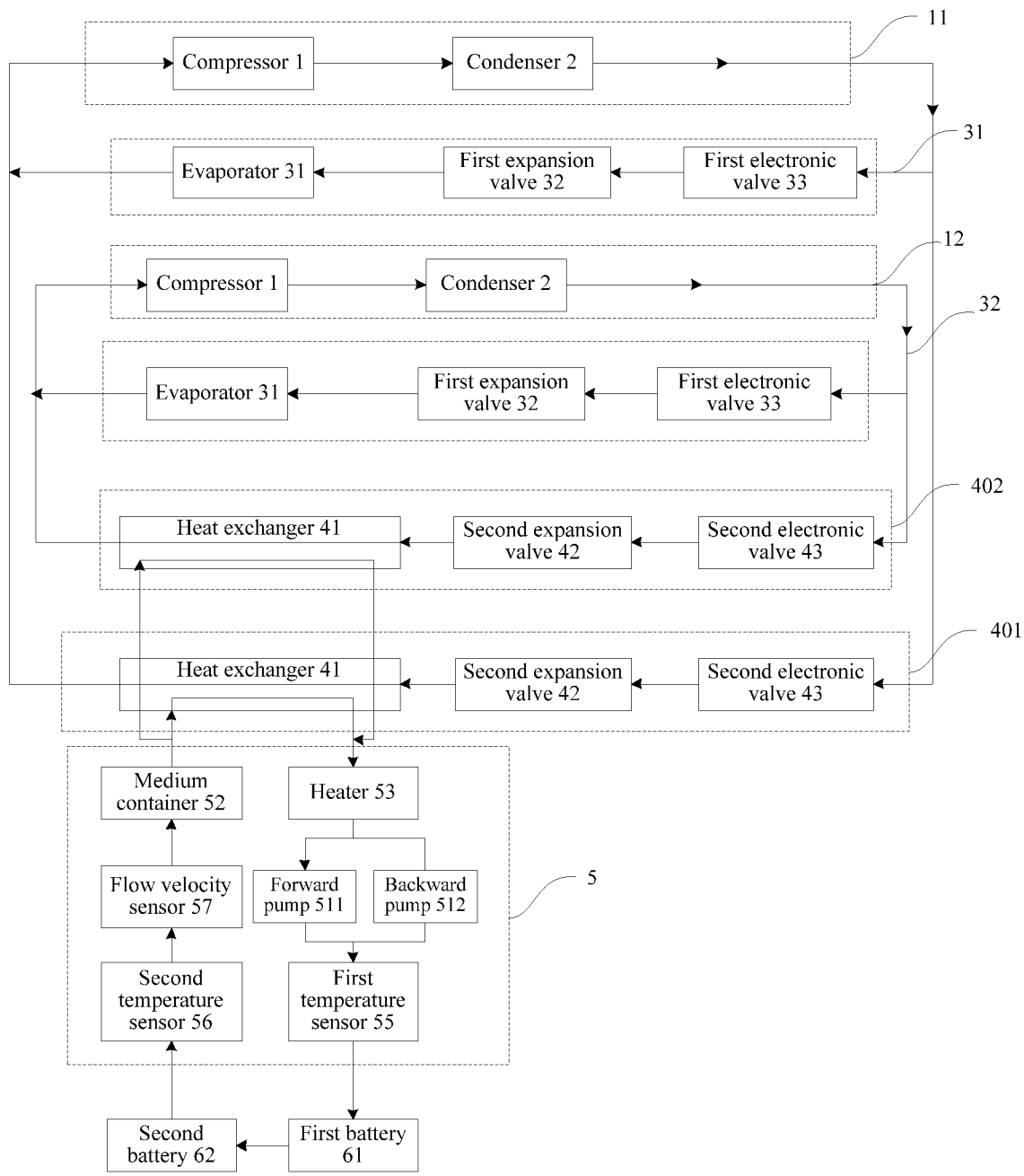
FIG. 25 is a schematic diagram 1 of a flow path structure of a temperature adjustment system for a vehicle-mounted battery according to an eighth embodiment of the present disclosure.
Figure 26:
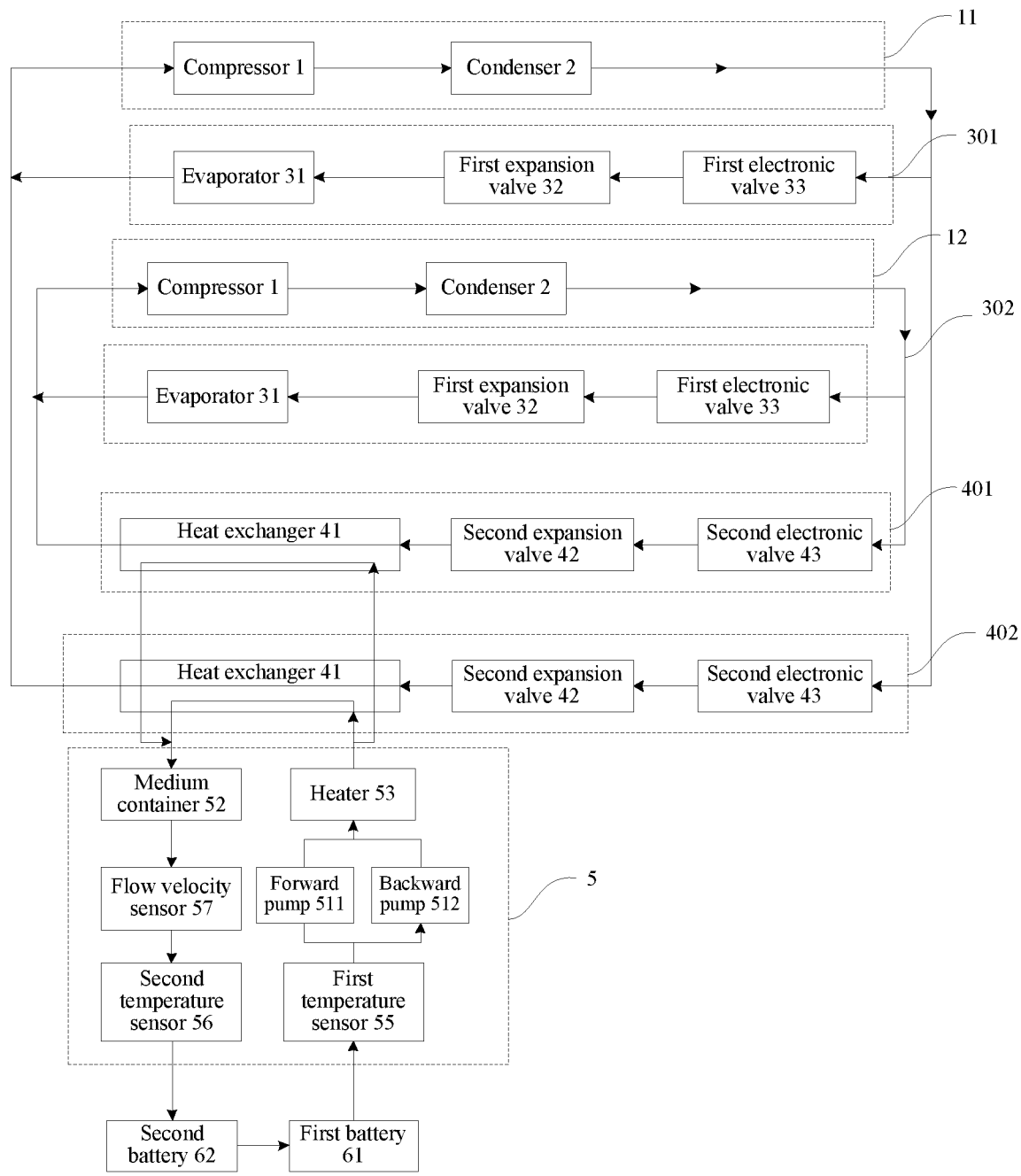
FIG. 26 is a schematic diagram 2 of a flow path structure of a temperature adjustment system for a vehicle-mounted battery according to an eighth embodiment of the present disclosure.
Figure 27:
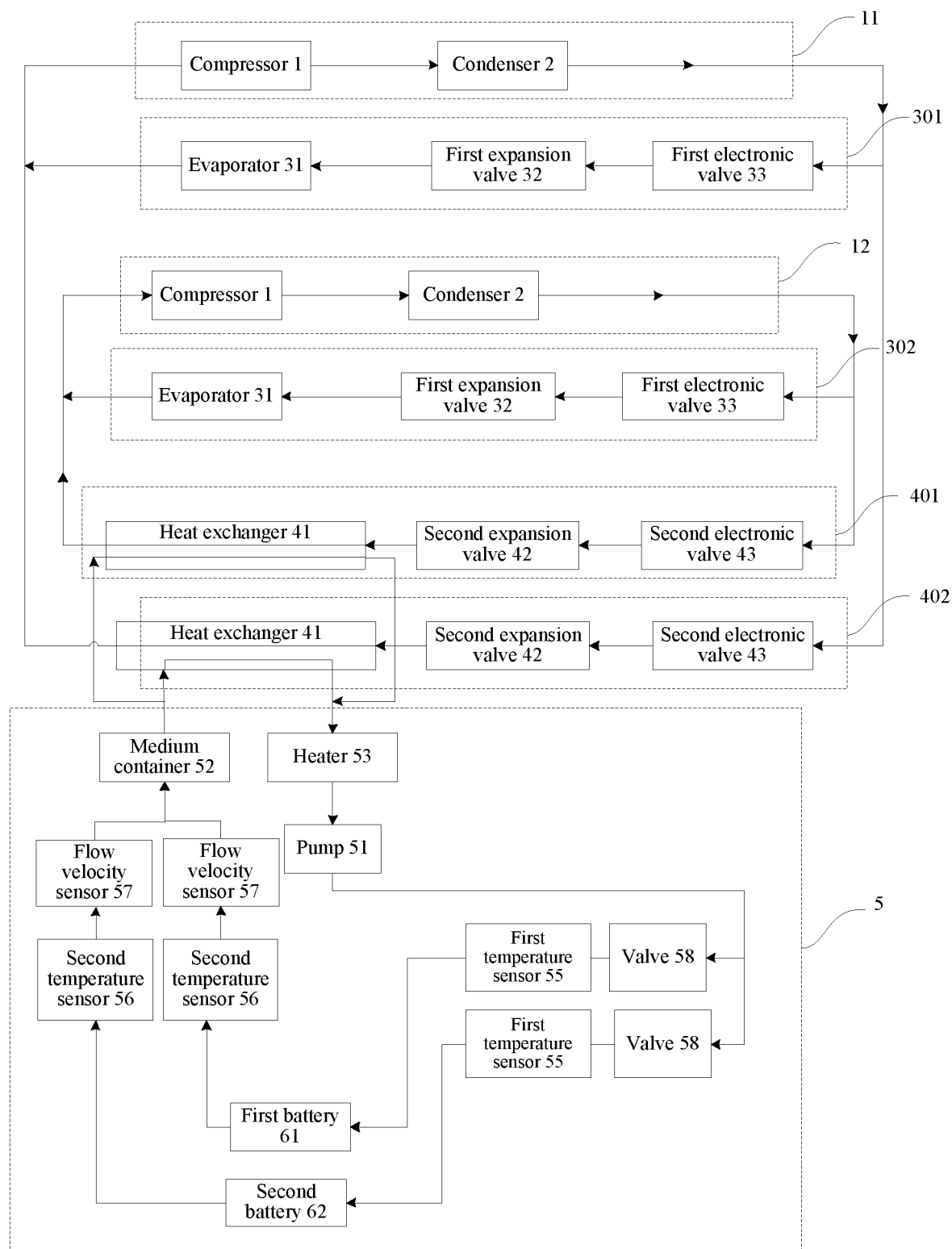
FIG. 27 is a schematic diagram of a flow path structure of a temperature adjustment system for a vehicle-mounted battery according to a ninth embodiment of the present disclosure.

For example, as shown in FIG. 25 to FIG. 27, using two refrigerating branches, two battery cooling branches, two intra-vehicle cooling branches and two batteries as an example, the batteries are respectively a first battery 61 and a second battery 62, the refrigerating branches are respectively a first refrigerating branch 11 and a second refrigerating branch 12, the battery cooling branches are respectively a first battery cooling branch 401 and a second battery cooling branch 402, and the intra-vehicle cooling branches are respectively a first intra-vehicle cooling branch 301 and a second intra-vehicle cooling branch 302. FIG. 25 and FIG. 26 show batteries connected in series, and FIG. 27 shows batteries connected in parallel. When the temperature of the first battery 61 and/or the second battery 62 is excessively high/excessively low, temperature adjustment needs to be performed on the first battery 61 and/or the second battery 62. The battery temperature adjustment module 5 obtains the required power P1 and the actual power P2, and adjusts opening degrees of the plurality of battery cooling branches according to P1 and P2, to adjust the cooling power of the battery; and the battery temperature adjustment module 5 obtains the plurality of area temperatures Tq and the air conditioner set temperature Ts, and controls the opening degree of each battery cooling branch according to Tq and Ts. For example, if Tq of an area is relatively high and greatly different from Tq of another area, the battery temperature adjustment module 5 controls the opening degree of the intra-vehicle cooling branch for cooling the area to be increased, and moreover controls the opening degree of the corresponding battery cooling branch to be reduced. Moreover, to ensure that the cooling power of the battery is unchanged, the battery temperature adjustment module 5 controls the opening degree of another intra-vehicle cooling branch to be reduced, and moreover controls the opening degree of the corresponding battery cooling branch to be increased. Therefore, the system allocates refrigerating capacities to a battery and the areas in the compartment according to an actual status of each battery, the plurality of area temperatures in the compartment, and the air conditioner set temperature, thereby not only adjusting the temperature of the battery when the temperature is excessively high or excessively low, to maintain the temperature of the battery within a preset range, but also balancing the temperatures of the areas in the compartment.

It may be understood that, the battery temperature adjustment module 5 has a refrigerating power provided by the vehicle-mounted air conditioner, and shares a refrigerating capacity with an intra-vehicle refrigerating system, thereby reducing the volume of the temperature adjustment system, and making allocation of the flow of the cooling liquid more flexible.

According to an embodiment of the present disclosure, the battery cooling branch may include a heat exchanger 41, and the heat exchanger 41 is connected to the battery temperature adjustment module 5. The heat exchanger 41 may include a first duct and a second duct, the second duct is connected to a battery temperature adjustment module 5, and the first duct is in communication with a compressor 1, where the first duct and the second duct are adjacently disposed independent of each other. The battery temperature adjustment module 5 includes: a flow path of adjusting the temperature of the battery (not specifically shown in the figure), where the flow path is disposed in the battery; and a pump 51, a medium container 52, a heater 53, and a controller (not specifically shown in the figure) that are connected between the flow path and the heat exchanger 41. The controller obtains a required power P1 of a battery and an actual power P2 of the battery, and adjusts a temperature of the battery according to the required power P1 and the actual power P2. The intra-vehicle cooling branch may include: an evaporator 31, a first expansion valve 32, and a first electronic valve 33. The battery cooling branch 4 may further include a second expansion valve 42 and a second electronic valve 43.

As shown in FIG. 27, when there are a plurality of batteries connected in parallel, an inlet of a flow path of each battery is further provided with a valve 58. The controller may control, according to P1 and P2 corresponding to each battery by controlling the valve 58, the flow of the cooling liquid flowing into each battery, thereby precisely controlling the heating power/refrigerating power of each battery.

According to an embodiment of the present disclosure, as shown in FIG. 19 and FIG. 20, when there are a plurality of batteries, and the flow paths are connected in series, the plurality of batteries correspond to a plurality of pumps for adjusting flows of the cooling liquid of the batteries, and the pumps are bidirectional pumps.

As shown in FIG. 25 to FIG. 27, using two batteries as an example, when there are two batteries (a first battery 61 and a second battery 62) connected in series, there are two pumps correspondingly, one of the two pumps is a forward pump 511, and the other is a backward pump 512.

As shown in FIG. 25, when the forward pump 511 is started, the flowing direction of the cooling liquid in the second duct is: the medium container 52—the heat exchanger 41—the heater 53—the forward pump 511—the first temperature sensor 55—the first battery 61—the second battery 62—the second temperature sensor 56—the flow velocity sensor 57—the medium container 52. As shown in FIG. 26, when the backward pump 512 is started, the flowing direction of the cooling liquid in the second duct is: the medium container 52—the flow velocity sensor 57—the second temperature sensor 56—the second battery 62—the first battery 61—the first temperature sensor 55—the backward pump 512—the heater 53—the heat exchanger 41—the medium container 52.

Additionally, when the cooling function of the first battery 61 and the cooling function of the second battery 62 are started, if the temperature of the first battery 61 is higher than the temperature of the second battery 62, and a difference between them exceeds the preset value, the controller controls the forward pump 511 to operate, so that the cooling liquid first flows through the first battery 61, and then flows through the second battery 62, thereby making the first battery 61 complete temperature reduction as soon as possible. If the temperature of the second battery 62 is higher than the temperature of the first battery 61, and the difference exceeds the preset value, the controller controls the backward pump 512 to operate, so that the cooling liquid first flows through the second battery 62, and then flows through the first battery 61, thereby making the second battery 62 complete temperature reduction as soon as possible. Therefore, by changing the flow direction of the cooling liquid, the temperature difference between the first battery 61 and the second battery 62 may be reduced. When neither the cooling function nor the heating function of the first battery 61 and the second battery 62 is started, if the temperature difference between the first battery 61 and the second battery 62 exceeds the preset value, the controller may control the forward pump 511 to be started, so that the cooling liquid in the battery cooling branch 4 flows, thereby balancing the temperatures of the first battery 61 and the second battery 62.

How to obtain the required power P1 and the actual power P2 is described below with reference to a specific embodiment.

According to an embodiment of the present disclosure, the controller may be configured to: obtain a first parameter when enabling temperature adjustment on each battery, and generate a first required power of each battery according to the first parameter; obtain a second parameter when enabling temperature adjustment on each battery, and generate a second required power of each battery according to the second parameter; and generate the required power P1 of each battery according to the first required power of each battery and the second required power of each battery.

Optionally, according to an embodiment of the present disclosure, the first parameter is an initial temperature when enabling temperature adjustment on the battery, the target temperature, and the target time t for reaching the target temperature from the initial temperature, and the controller obtains a first temperature difference $\Delta T_1$ between the initial temperature and the target temperature, and generates the first required power according to the first temperature difference $\Delta T_1$ and the target time t.

Optionally, the controller generates the first required power through the following formula (1):

$$\Delta T_1 * C * M / t \qquad (1)$$

where $\Delta T_1$ is the first temperature difference between the initial temperature and the target temperature, t is the target time, C is a specific heat capacity of the battery 6, and M is a mass of the battery.

The second parameter is an average current I of each battery within a preset time, and the controller generates the second required power through the following formula (2):

$$I^2 * R \qquad (2)$$

where I is the average current, and R is an internal resistance of the battery.

When the battery is cooled, $P1=\Delta T_1*C*M/t+I^2*R$; and when the battery is heated, $P1=\Delta T_1*C*M/t-I^2*R$.

According to an embodiment of the present disclosure, the controller generates a second temperature difference $\Delta T_2$ of each battery according to an inlet temperature detected by the first temperature sensor 55 and an outlet temperature detected by the second temperature sensor 56 that are in a loop in which each battery is located, and generates the actual power P2 of each battery according to the second temperature difference $\Delta T_2$ of each battery and a flow velocity v that is detected by the flow velocity sensor 57.

Optionally, according to an embodiment of the present disclosure, the actual power P2 is generated through the following formula (3):

$$\Delta T_2 * c * m \qquad (3)$$

where $\Delta T_2$ is the second temperature difference, c is a specific heat capacity of the cooling liquid in the flow path, and m is a mass of the cooling liquid flowing through a cross section of the flow path within a unit time, where $m=v*\rho*s$, v is a flow velocity of the cooling liquid, $\rho$ is a density of the cooling liquid, and s is a cross-sectional area of the flow path.

Specifically, as shown in FIG. 19 and FIG. 20, after the vehicle is powered on, the controller determines whether temperature adjustment needs to be performed on the vehicle; and if it is determined that temperature adjustment needs to be performed on the vehicle, enables a temperature adjustment function, and sends information about a low rotational speed to the pump 51, and the pump begins operating at a default rotational speed (for example, low rotational speed). The controller may obtain the initial temperature (that is, current temperature) of each battery, the target temperature, and the target time t for reaching the target temperature from the initial temperature, where the target temperature and the target time t may be preset according to an actual situation, and the first required power of each battery is calculated according to the formula (1). Moreover, the controller obtains the average current I of each battery within the preset time, and the second required power of each battery is calculated according to the formula (2). Then, the controller calculates the required power P1 according to the first required power and the second required power of each battery. Moreover, as shown in FIG. 19 and FIG. 20, when the batteries are connected in series, the controller obtains temperature information detected by the first temperature sensor 55 and the second temperature sensor 56, and obtains flow velocity information detected by the flow velocity sensor, and the actual power P2 of the battery is calculated according to the formula (3). As shown in FIG. 27, when the batteries are connected in parallel, the controller obtains temperature information detected by the first temperature sensor 55 and the second temperature sensor 56 that are set corresponding to each battery, and obtains flow velocity information detected by each flow velocity sensor 57, and the actual power P2 of each battery 6 is calculated according to the formula (3).

How to adjust the opening degrees of the plurality of intra-vehicle cooling branches (30 and 30), the plurality of battery cooling branches (401 and 402) and the plurality of refrigerating branches (11 and 12) according to the required power P1, the actual power P2, the plurality of area temperatures Tq and the air conditioner set temperature Ts is described below with reference to a specific embodiment.

According to an embodiment of the present disclosure, the controller is further configured to generate a total required power Pz according to required powers P1 of a plurality of batteries, and determine whether the total required power Pz matches the maximum refrigerating power P of the vehicle-mounted air conditioner. If matching, the controller cools the batteries according to the total required power P1 of the plurality of batteries connected in parallel. If not matching, the controller cools the batteries according to the maximum refrigerating power P of the compressor and the required power P1 of the plurality of battery cooling branches.

Specifically, as shown in FIG. 27, when the battery cooling function is turned on, the controller may calculate the total required power Pz of the entire temperature adjustment system according to the required powers P1 of all of the batteries, that is, obtain the total required power Pz by adding the required powers P1 of all of the batteries. Then, whether Pz matches the maximum refrigerating power P of the vehicle-mounted air conditioner is determined, that is, whether Pz is less than or equal to P is determined according to the total required power Pz. If yes, the controller cools each battery according to the required power P1 of each battery by controlling the valve 58. If Pz does not match the maximum refrigerating power P of the vehicle-mounted air conditioner, that is, Pz is greater than P, the controller allocates the flow of the cooling liquid in proportion according to the maximum refrigerating power P of the air conditioner and the required power P1 of each battery by adjusting the opening degree of the valve 58, thereby completing temperature reduction on each battery at maximum efficiency.

According to an embodiment of the present disclosure, the plurality of refrigerating branches respectively correspond to a plurality of air outlets, and the plurality of area temperatures are temperatures of the plurality of air outlets.

Figure 28:
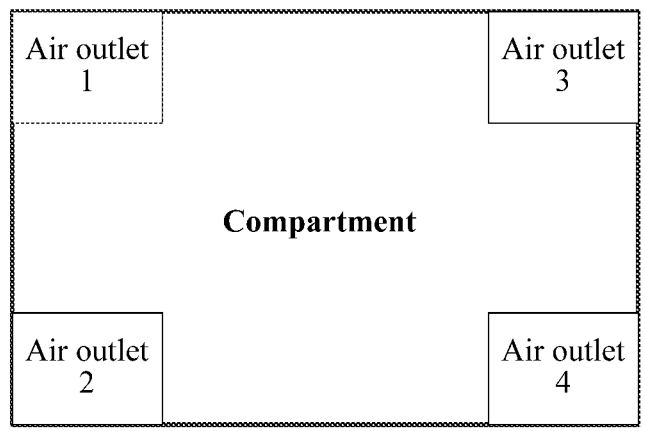
FIG. 28 is a schematic diagram of distribution locations of air outlets according to an embodiment of the present disclosure.

For example, as shown in FIG. 28, 4 air outlets may be disposed in the compartment, and are respectively an air outlet 1 to an air outlet 4. A corresponding area temperature Tq is detected by detecting an air outlet temperature Tc. It is assumed that the air outlet 1 and the air outlet 2 are provided with a refrigerating power by the first refrigerating branch 11, and the air outlet 3 and the air outlet 4 are provided with a refrigerating power by the second refrigerating branch 12.

According to an embodiment of the present disclosure, the controller is further configured to: detect temperatures of a plurality of batteries; control, when a temperature of any one of the plurality of batteries connected in parallel is greater than a first temperature threshold, the temperature adjustment system to enter a cooling mode; and control, when a temperature of any one of the plurality of batteries is less than a second temperature threshold, the temperature adjustment system to enter a heating mode. The first temperature threshold and the second temperature threshold may be preset according to an actual situation. For example, the first temperature threshold may be 40° C., and the second temperature threshold may be 0° C.

Specifically, after the vehicle is powered on, the controller detects the temperature of each battery in real time, and performs determining. If a temperature of one of the batteries is higher than 40° C., it indicates that the temperature of the battery is excessively high in this case. To prevent the high temperature from affecting performance of the battery, temperature reduction processing needs to be performed on the battery, and the controller controls the temperature adjustment system to enter the cooling mode, sends information about starting the battery cooling function to the air conditioner system, and controls the second electronic valve 43 to be turned on, so that the cooling liquid performs heat exchange with the battery to reduce the temperature of the battery.

If a temperature of a battery is less than 0° C., it indicates that the temperature of the battery is excessively low in this case. To prevent the low temperature from affecting performance of the battery, temperature increase processing needs to be performed on the battery, the controller controls the temperature adjustment system to enter a heating mode, controls the second electronic valve 43 to be turned off, and controls the heater 53 to be turned on, to provide the heating power to the temperature adjustment system.

According to an embodiment of the present disclosure, in the cooling mode, the controller is further configured to determine, when the required power P1 of the battery cooling branch is greater than the actual power P2, whether the temperature of the battery is greater than the third temperature threshold. If the temperature of the battery is greater than the third temperature threshold, the controller reduces opening degrees of the plurality of intra-vehicle cooling branches, and increases opening degrees of the plurality of battery cooling branches, where the opening degrees of the plurality of battery cooling branches are respectively controlled through corresponding valves (that is, the second expansion valves 42). The third temperature threshold is greater than the first temperature threshold. For example, the third temperature threshold may be 45° C.

Specifically, in the cooling mode, if P1 is greater than P2, the controller determines whether the temperature of the battery is greater than 45° C. If the temperature of any battery is greater than 45° C., it indicates that the temperature of the current battery is excessively high, the controller reduces the opening degree of the first expansion valve 32, to reduce the flow of the cooling liquid of the intra-vehicle cooling branch, and moreover increases the opening degree of the second expansion valve 42, to increase the flow of the cooling liquid of the battery cooling branch. Therefore, by adjusting allocation of the refrigerating capacities of the intra-vehicle cooling branch and the battery cooling branch, temperature adjustment on the battery may be completed within the target time when the temperature of the battery is excessively high.

According to an embodiment of the present disclosure, in the cooling mode, when a required power P1 of a battery is greater than the actual power P2 of the battery, the controller is further configured to: obtain a power difference between the required power P1 and the actual power P2 of the battery, and increase, according to the power difference, the power of the compressor 1 used for cooling the battery, or perform adjustment to increase the flow of the cooling liquid in the cycling branch of the battery, to increase the cooling power of the battery; or when a required power P1 of a battery is less than or equal to the actual power P2 of the battery, reduce the power of the compressor or keep the power of the compressor unchanged, or perform adjustment to reduce the flow of the cooling liquid in the cycling branch of the battery, to reduce the cooling power of the battery.

Specifically, when operating in the cooling mode, if there are a plurality of batteries, the controller obtains P1 and P2 of each battery, and performs determining. If P1 for one of the batteries is greater than P2, it indicates that the temperature reduction on the battery cannot be completed within the target time according to the current refrigerating power or flow of the cooling liquid. Therefore, the controller obtains a power difference between P1 and P2 of the battery, and increases the power of the compressor 1 or increases the flow of the cooling liquid of the cycling branch of the battery according to the power difference, to increase the cooling power of the battery, where a larger power difference between P1 and P2 indicates larger increase of the power of the compressor 1 and the flow of the cooling liquid of the battery, so that the temperature of the battery is reduced to the target temperature within the preset time t. If P1 on one of the batteries is less than or equal to P2, the power of the compressor 1 may be kept unchanged or the power of the compressor 1 may be properly reduced, or the flow of the cooling liquid of the cycling branch of the battery is reduced, to reduce the cooling power of the battery. When the temperatures of all of the batteries are less than 35° C., cooling on the batteries is completed, the controller sends information about turning off a temperature adjustment function to the vehicle-mounted air conditioner through CAN communication, and controls the second electronic valves 43 to be turned off. If the temperature of a battery is still higher than 35° C. after the temperature adjustment system has entered the cooling mode for a relatively long time, for example, 1 hour, the controller properly increases the power of the compressor, so that the battery completes temperature reduction as soon as possible.

According to an embodiment of the present disclosure, the controller is further configured to reduce the opening degrees of the plurality of intra-vehicle cooling branches and increase the opening degrees of the plurality of battery cooling branches when the temperature of a battery is less than the third temperature threshold and the intra-vehicle temperature is equal to the air conditioner set temperature Ts.

Specifically, in the cooling mode, if the temperature of each battery is less than 45° C., the controller determines whether the intra-vehicle temperature reaches the air conditioner set temperature Ts. If yes, the controller reduces the opening degree of the first expansion valve 32, and increases the opening degree of the second expansion valve 42, to increase the flow of the cooling liquid of the battery cooling branch, reduce the flow of the cooling liquid of the intra-vehicle cooling branch, and complete the temperature reduction of the battery as soon as possible. If the intra-vehicle temperature has not reached the air conditioner set temperature Ts, the intra-vehicle refrigerating requirement is preferentially satisfied, and the controller increases the opening degree of the first expansion valve 32, and reduces the opening degree of the second expansion valve 42.

Moreover, layered processing is further performed on the temperature of the battery, and temperature control thresholds are respectively 40° C., 45° C., and 35° C. When the temperature of the battery is higher than 40° C., the battery cooling function is started; and when the temperature of the battery is reduced to 35° C., cooling of the battery is completed. When the temperature of the battery reaches 45° C., the battery cooling requirement is preferentially satisfied. Additionally, when the required power P1 is greater than the actual power P2, if the temperature of the battery does not exceed 45° C., the intra-vehicle refrigerating requirement is still preferentially satisfied; and if the intra-vehicle refrigerating power has been sufficient and balanced, the controller increases the opening degree of the battery cooling branch, to increase the cooling power of the battery. If the required power P1 is less than or equal to the actual power P2, the intra-vehicle refrigerating requirement may be preferentially satisfied.

According to an embodiment of the present disclosure, the controller is further configured to: obtain a temperature difference between the plurality of area temperatures; and when the temperature difference is greater than the fourth temperature threshold, increase the opening degree of the intra-vehicle cooling branch corresponding to the refrigerating branch in which the air outlet with a high temperature is located, and reduce the opening degree of the battery cooling branch corresponding to the refrigerating branch in which the air outlet with a high temperature is located. The fourth temperature threshold may be preset according to an actual situation, for example, may be 3° C.

Optionally, according to an embodiment of the present disclosure, the controller is further configured to reduce the opening degree of the intra-vehicle cooling branch corresponding to the refrigerating branch in which the air outlet with a low temperature is located, and increase the opening degree of the battery cooling branch corresponding to the refrigerating branch in which the air outlet with a low temperature is located.

Specifically, in a battery cooling process, if the air conditioner needs to be turned on in the vehicle, the ambient temperature in the compartment needs to be monitored and controlled, so that ambient temperatures at places in the vehicle are kept balanced, and moreover the battery cooling requirement can be satisfied. As shown in FIG. 28, when it is detected that the area temperature Tq at the air outlet 1 and the air outlet 2 is higher than the area temperature Tq at places near the air outlet 3 and the air outlet 4 by more than 3° C., the controller controls the opening degree of the first expansion valve 32 in the first intra-vehicle cooling branch 301 to be increased, and moreover controls the opening degree of the second expansion valve 42 in the first battery cooling branch 401 to be reduced, so that the cooling power in the first intra-vehicle cooling branch 301 is increased. The controller further controls the opening degree of the first expansion valve 32 in the second intra-vehicle cooling branch 302 to be reduced, and the opening degree of the second expansion valve 42 in the second battery cooling branch 402 to be increased, so that the cooling power in the second intra-vehicle cooling branch 302 is relatively small. Therefore, the cooling power of the first battery cooling branch 301 and the cooling power of the second battery cooling branch 302 may be kept unchanged, and moreover area air temperatures near the air outlets in the vehicle are kept balanced. When the vehicle-mounted air conditioner detects that a difference between the area air temperature Tq near the air outlet 1 and the air outlet 2 and the area air temperature Tq near the air outlet 3 and the air outlet 4 is within 3° C., the controller controls the opening degrees of the first expansion valves 32 in the first intra-vehicle cooling branch 301 and the second intra-vehicle cooling branch 302 to be the same, to ensure that the cooling power of the first intra-vehicle cooling branch 301 and the cooling power of the second intra-vehicle cooling branch 302 are the same.

According to an embodiment of the present disclosure, in the heating mode, when a required power P1 of a battery is greater than the actual power P2 of the battery, the controller obtains a power difference between the required power P1 and the actual power P2 of the battery, and increase, according to the power difference, the power of the heater used for heating the battery, or perform adjustment to increase the flow of the cooling liquid in the cycling branch of the battery, to increase the heating power of the battery; and when a required power P1 of a battery is less than or equal to the actual power P2 of the battery, the controller reduces the power of the heater or keeps the power of the heater unchanged, or performs adjustment to reduce the flow of the cooling liquid in the cycling branch of the battery, to reduce the heating power of the battery.

Specifically, when the temperature adjustment system enters the heating mode, the controller obtains P1 and P2 of each battery, and performs determining. If P1 for one of the batteries is greater than P2, it indicates that temperature increase on the battery cannot be completed within the target time according to the current heating power or flow of the cooling liquid. Therefore, the controller obtains a power difference between P1 and P2 of the battery, and increases, according to the power difference, the power of the heater 53 used for heating the battery, or performs adjustment to increase the rotational speed of the corresponding pump 51, to increase the flow of the cooling liquid of the cycling branch of the battery, so that temperature adjustment on the battery may be completed within the target time t. A larger difference between P1 and P2 indicates larger increase of the power of the heater 53. If P1 of a battery is less than or equal to P2, the controller may properly reduce the power of the heater 53, to save electric energy, or perform adjustment to reduce the rotational speed of the corresponding pump 51 to reduce the flow of the cooling liquid of the cycling branch of the battery, to reduce the heating power, or keep the power of the heater 53 unchanged. When the temperatures of all of the batteries are higher than a preset temperature, for example, 10° C., heating on the batteries is completed, the controller sends information about turning off a temperature adjustment function to the vehicle-mounted air conditioner through CAN communication, and controls the heater 53 to be turned off. If the temperature of a battery is still lower than 10° C. after the temperature adjustment system has entered the heating mode for a relatively long time, for example, 1 hour, the controller properly increases the power of the heater 53, so that the battery completes temperature increase as soon as possible.

According to an embodiment of the present disclosure, the controller is further configured to reduce the rotational speed of the pump 51 when the required power P1 of a battery is less than the corresponding actual power P2, and increase the rotational speed of the pump 51 when the required power P1 of a battery is greater than the corresponding actual power P2.

Specifically, when the temperature adjustment system enters the heating mode or cooling mode, if P1 of a battery is less than P2, the controller controls the rotational speed of the corresponding pump 51 to be reduced, to save electric energy. If P1 of a battery 6 is greater than P2, in addition to controlling the power of the corresponding heater 53 or compressor 1 to be increased or the flow of the cooling liquid in the loop in which the battery is located to be increased, the controller further controls the rotational speed of the pump 51 to be increased, to increase a mass of the cooling liquid flowing through a cross section of the cooling flow path within a unit time, thereby increasing the actual power P2 of the battery, to implement temperature adjustment within the target time t.

According to an embodiment of the present disclosure, as shown in FIG. 27, the plurality of batteries are connected in parallel, and the controller is further configured to: in the cooling mode, when a temperature difference between the batteries exceeds a set value, increase the cooling power of the battery whose temperature is relatively high; and in the heating mode, when the temperature difference between the batteries exceeds the set value, increase the heating power of the battery whose temperature is relatively low is increased. The set value may be 3° C.

Specifically, as shown in FIG. 27, when the batteries are connected in parallel, an inlet of a flow path of each battery is further provided with a valve 58. In the cooling mode, when the temperature difference between the batteries exceeds 3° C., the controller increases the opening degree of the valve 58 in the battery cooling branch in which the battery with a relatively high temperature is located, to increase the cooling power of the battery with a relatively high temperature. When the temperature adjustment system enters the heating mode, and the temperature difference between the batteries exceeds 3° C., the controller increases the opening degree of the valve 58 in the battery cooling branch in which the battery with a relatively low temperature is located, to increase the heating power of the battery with a relatively low temperature.

According to an embodiment of the present disclosure, as shown in FIG. 27, the plurality of batteries are connected in parallel. In the cooling mode, the controller individually controls the flow of the cooling liquid of the flow path of each branch, and may adjust the flow of the cooling liquid of the flow path of each battery according to the required power for temperature adjustment on each battery, so that the actual power for temperature adjustment and the required power for temperature adjustment on each battery are equal.

Specifically, as shown in FIG. 27, in the cooling mode, the controller may respectively control the flow of the cooling liquid of the first battery cooling branch 401 and the flow of the cooling liquid of the second battery cooling branch 402 by controlling the opening degree of the second expansion valve 42, and may respectively control, by controlling the opening degree of the valve 58, the flows of the cooling liquid flowing into the flow paths of the first battery 61 and the second battery 62, so that the required power P1 for temperature adjustment and the required power P2 for temperature adjustment on each battery are equal, to complete the temperature adjustment on the battery as soon as possible.

According to an embodiment of the present disclosure, as shown in FIG. 19 and FIG. 20, when there are a plurality of batteries, and the flow paths are connected in series, the plurality of batteries correspond to a plurality of pumps for adjusting flows of the cooling liquid of the batteries, and the pumps are bidirectional pumps.

To make a person skilled in the art more clearly understand the present disclosure, an operating process of the temperature adjustment system for a vehicle-mounted battery is described below with reference to specific examples.

Main differences between FIG. 25 and FIG. 19 are addition of a compressor refrigerating loop, and addition of problems of temperature balancing between air outlets of an intra-vehicle air conditioner and power adjustment between compressors. Only the differences are listed below, and the rest is not described.

As shown in FIG. 19, when there are a plurality of batteries, and the temperature adjustment system enters the cooling mode, the controller obtains P1 of each battery 6, the actual power P2 of each battery, and the maximum refrigerating power P of a single compressor; and may calculate the total required power Pz of the entire temperature adjustment system by adding P1 of each battery, obtain the total actual power Pf for temperature adjustment by adding the actual power P2 of each battery, and may calculate a sum P5 of the maximum refrigerating powers of all compressors by adding the maximum refrigerating power of each compressor. P51 is the maximum refrigerating power of the compressor 11, P52 is the maximum refrigerating power of the compressor 12, P5 is the sum of the maximum refrigerating powers of all of the compressors, and P5=P51+P52. The required power of the first battery 61 is P11, and the required power of the second battery 62 is P12. The actual power of the first battery 61 is P21, and the actual power of the second battery 62 is P22.

If $Pz \leq P51$, only one compressor 1 needs to be controlled to operate, to provide the refrigerating power, and two compressors 1 may alternatively be controlled to operate together. If $P51<Pz \leq P5$, two compressors need to operate together, and an initial refrigerating power of each compressor may be Pz/2, or be of another power combination form, so that a sum of the refrigerating powers of the two compressors is Pz. If $Pz>P5$, two compressors 1 need to operate together, and each compressor runs according to the maximum refrigerating power. The required power for temperature adjustment on the intra-vehicle cooling branch is P4, that is, P4 is a power required for adjusting the intra-vehicle temperature to the set temperature.

When intra-vehicle cooling and battery cooling are both turned on, it is assumed that the area temperature of the air outlet 1 and the air outlet 2 is T51, and the area temperature of the air outlet 3 and the air outlet 4 is T52.

If $T51-T52 \geq Tc$, and Tc is 3° C., processing is performed as follows:

If $Pz+P4 \leq P5$, the controller controls the refrigerating power of the first compressor 11 to be increased, or controls the opening degree of the expansion valve of the battery cooling branch in the refrigerating loop of the first compressor 11 to be reduced, and controls the opening degree of the expansion valve of the intra-vehicle cooling loop to be increased; or controls the opening degree of the expansion valve of the battery cooling branch in the refrigerating loop of the second compressor 12 to be increased, and controls the opening degree of the expansion valve of the intra-vehicle cooling loop to be reduced, so that the temperature T51 is reduced quickly, and moreover the cooling power requirement of the battery is satisfied, to achieve a balanced intra-vehicle ambient temperature.

If $Pz+P4>P5$, the controller controls the first compressor 11 and the second compressor 12 to run at the maximum refrigerating power, or controls the opening degree of the expansion valve of the battery cooling branch in the refrigerating loop of the first compressor 11 to be reduced, and controls the opening degree of the expansion valve of the intra-vehicle cooling loop to be increased; or controls the opening degree of the expansion valve of the battery cooling branch in the refrigerating loop of the second compressor 12 to be increased, and controls the opening degree of the expansion valve of the intra-vehicle cooling loop to be reduced, so that the temperature T51 is reduced quickly, and moreover the cooling power requirement of the battery is satisfied, to achieve a balanced intra-vehicle ambient temperature.

If $T51-T52 \geq Tc$, and Tc is 3° C., processing may also be performed as follows:

The controller controls the battery cooling branch in the refrigerating loop of the first compressor 11 to be turned off, and controls the opening degree of the expansion valve of the intra-vehicle cooling loop to be increased, so that all of the refrigerating power of the first compressor 11 is used for intra-vehicle cooling. Moreover, the controller controls the opening degree of the expansion valve of the battery cooling branch in the refrigerating loop of the second compressor 12 to be increased, and controls the opening degree of the expansion valve of the intra-vehicle cooling loop to be reduced, to increase the battery cooling power, so that the temperature T51 is reduced quickly, and moreover the cooling power requirement of the battery is satisfied, to achieve a balanced intra-vehicle ambient temperature.

Main differences between FIG. 27 and FIG. 11 are addition of a compressor refrigerating loop, and addition of problems of temperature balancing between air outlets of an intra-vehicle air conditioner and power adjustment between compressors. Only the differences are listed below, and the rest is not described.

As shown in FIG. 27, when there are a plurality of batteries, and the temperature adjustment system enters the cooling mode, the controller obtains P1 of each battery 6, the actual power P2 of each battery, and the maximum refrigerating power P of a single compressor; and may calculate the total required power Pz of the entire temperature adjustment system by adding P1 of each battery, obtain the total actual power Pf for temperature adjustment by adding the actual power P2 of each battery, and may calculate a sum P5 of the maximum refrigerating powers of all compressors by adding the maximum refrigerating power of each compressor. P51 is the maximum refrigerating power of the compressor 11, P52 is the maximum refrigerating power of the compressor 12, P5 is the sum of the maximum refrigerating powers of all of the compressors, and P5=P51+P52. The required power of the first battery 61 is P11, and the required power of the second battery 62 is P12. The actual power of the first battery 61 is P21, and the actual power of the second battery 62 is P22.

If Pz≤P51, only one compressor 1 needs to be controlled to operate, to provide the refrigerating power, and two compressors 1 may alternatively be controlled to operate together. If P51<Pz≤P5, two compressors need to operate together, and an initial refrigerating power of each compressor may be Pz/2, or be of another power combination form, so that a sum of the refrigerating powers of the two compressors is Pz. If Pz>P5, two compressors 1 need to operate together, and each compressor runs according to the maximum refrigerating power. The required power for temperature adjustment on the intra-vehicle cooling branch is P4, that is, P4 is a power required for adjusting the intra-vehicle temperature to the set temperature.

When intra-vehicle cooling and battery cooling are both turned on, it is assumed that the area temperature of the air outlet 1 and the air outlet 2 is T51, and the area temperature of the air outlet 3 and the air outlet 4 is T52.

If T51−T52≥Tc, and Tc is 3° C., processing is performed as follows:

If Pz+P4≤P5, the controller controls the refrigerating power of the first compressor 11 to be increased, or controls the opening degree of the expansion valve of the battery cooling branch in the refrigerating loop of the first compressor 11 to be reduced, and controls the opening degree of the expansion valve of the intra-vehicle cooling loop to be increased; or controls the opening degree of the expansion valve of the battery cooling branch in the refrigerating loop of the second compressor 12 to be increased, and controls the opening degree of the expansion valve of the intra-vehicle cooling loop to be reduced, so that the temperature T51 is reduced quickly, and moreover the cooling power requirement of the battery is satisfied, to achieve a balanced intra-vehicle ambient temperature.

If Pz+P4>P5, the controller controls the first compressor 11 and the second compressor 12 to run at the maximum refrigerating power, or controls the opening degree of the expansion valve of the battery cooling branch in the refrigerating loop of the first compressor 11 to be reduced, and controls the opening degree of the expansion valve of the intra-vehicle cooling loop to be increased; or controls the opening degree of the expansion valve of the battery cooling branch in the refrigerating loop of the second compressor 12 to be increased, and controls the opening degree of the expansion valve of the intra-vehicle cooling loop to be reduced, so that the temperature T51 is reduced quickly, and moreover the cooling power requirement of the battery is satisfied, to achieve a balanced intra-vehicle ambient temperature.

If T51−T52≥Tc, and Tc is 3° C., processing may also be performed as follows:

The controller controls the battery cooling branch in the refrigerating loop of the first compressor 11 to be turned off, and controls the opening degree of the expansion valve of the intra-vehicle cooling loop to be increased, so that all of the refrigerating power of the first compressor 11 is used for intra-vehicle cooling. Moreover, the controller controls the opening degree of the expansion valve of the battery cooling branch in the refrigerating loop of the second compressor 12 to be increased, and controls the opening degree of the expansion valve of the intra-vehicle cooling loop to be reduced, to increase the battery cooling power, so that the temperature T51 is reduced quickly, and moreover the cooling power requirement of the battery is satisfied, to achieve a balanced intra-vehicle ambient temperature. The temperature adjustment system for a vehicle-mounted battery according to this embodiment of the present disclosure may allocate refrigerating capacities to a battery and the areas in the compartment according to an actual status of each battery, the plurality of area temperatures in the compartment, and the air conditioner set temperature, thereby not only adjusting the temperature of the battery when the temperature is excessively high or excessively low, to maintain the temperature of the battery within a preset range, but also balancing the temperatures of the areas in the compartment.

Figure 29:
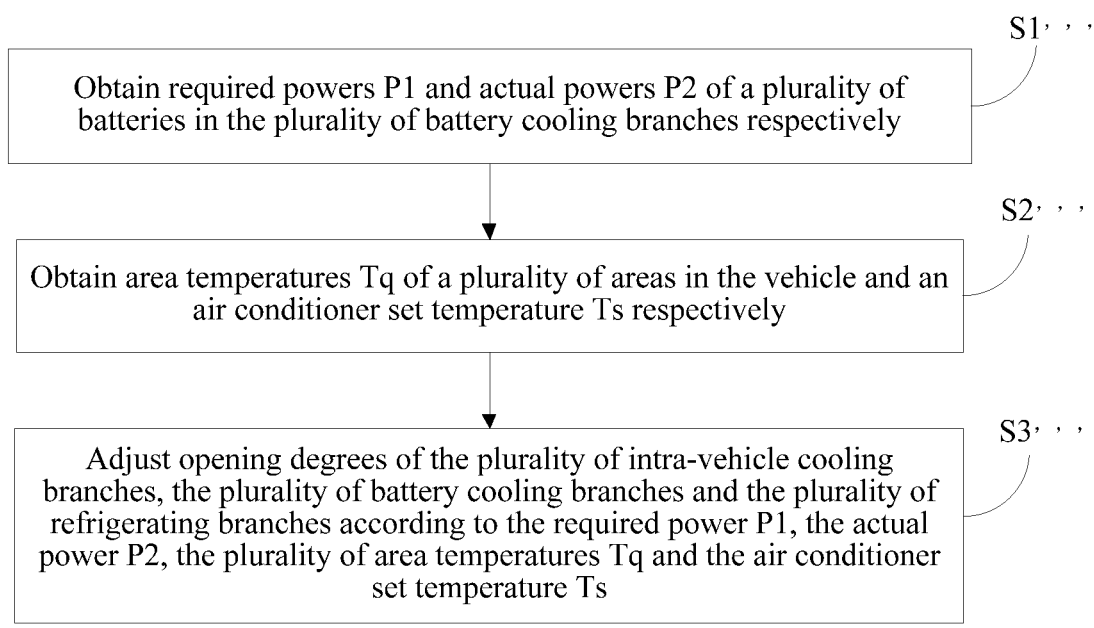
FIG. 29 is a flowchart of a temperature adjustment method for a vehicle-mounted battery according to a sixteenth embodiment of the present disclosure.

When the temperature adjustment system for a vehicle-mounted battery includes a plurality of battery cooling branches, a plurality of intra-vehicle cooling branches and a plurality of refrigerating branches, as shown in FIG. 29, the temperature adjustment method for a vehicle-mounted battery includes the following steps:

S1'''. Obtain required powers P1 and actual powers P2 of a plurality of batteries in the plurality of battery cooling branches respectively. A battery cooling branch is used for performing temperature adjustment on a corresponding battery.

Figure 30:
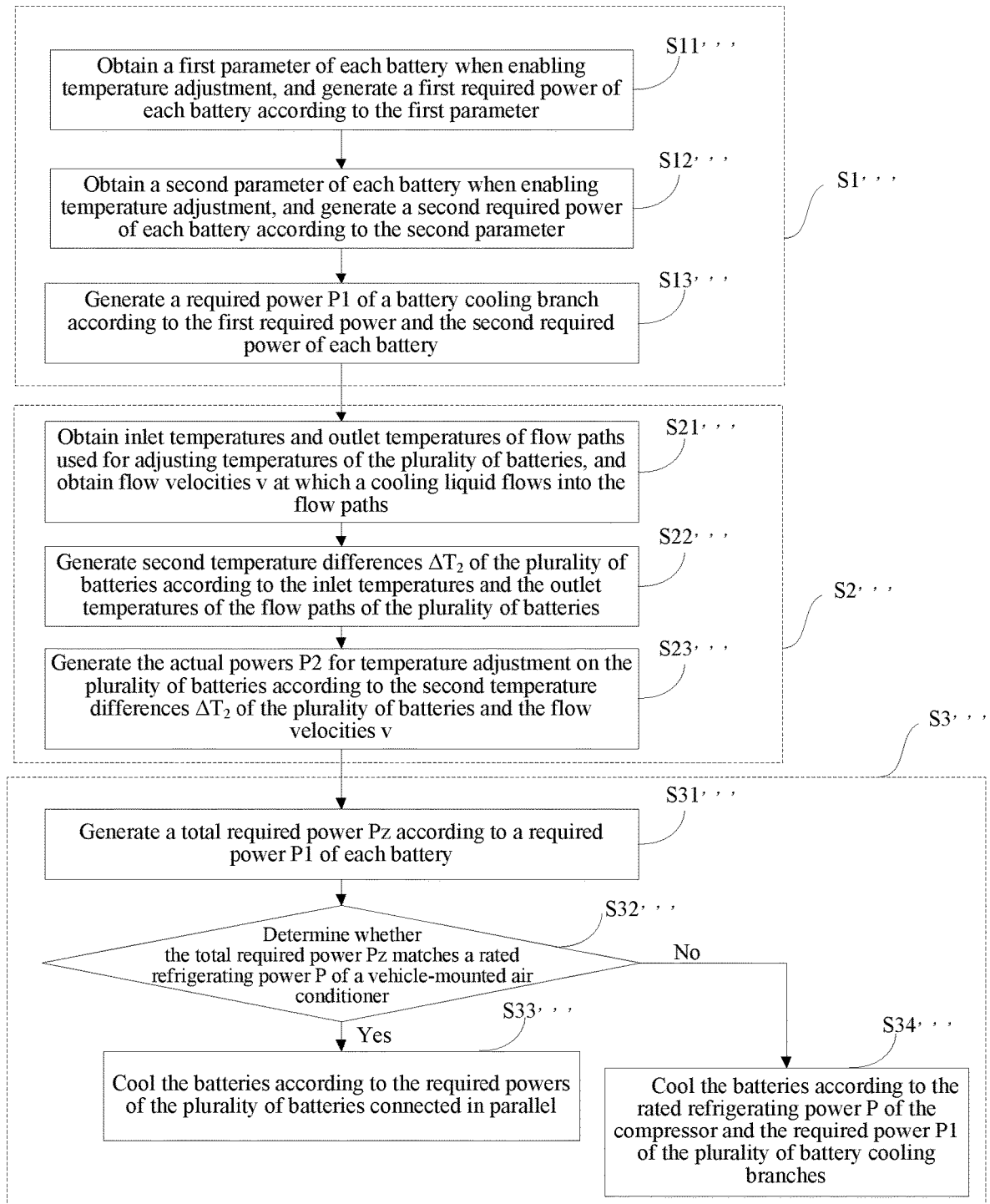
FIG. 30 is a flowchart of a temperature adjustment method for a vehicle-mounted battery according to a seventeenth embodiment of the present disclosure.

According to an embodiment of the present disclosure, as shown in FIG. 30, the obtaining required powers for temperature adjustment on a plurality of batteries respectively specifically includes the following steps:

S11'''. Obtain a first parameter of each battery when enabling temperature adjustment, and generate a first required power of each battery according to the first parameter.

S12'''. Obtain a second parameter of each battery when enabling temperature adjustment, and generate a second required power of each battery according to the second parameter.

S13''''. Generate a required power P1 of a battery cooling branch according to the first required power and the second required power of each battery.

Optionally, according to an embodiment of the present disclosure, the first parameter is an initial temperature when enabling temperature adjustment on the battery, the target temperature, and a target time t for reaching the target temperature from the initial temperature, and the generating a first required power according to the first parameter specifically includes: obtaining a first temperature difference $\Delta T_1$ between the initial temperature and the target temperature; and generating the first required power according to the first temperature difference $\Delta T_1$ and the target time t.

Optionally, according to an embodiment of the present disclosure, the first required power is generated through the following formula (1):

$$\Delta T_1 * C * M/t \quad (1)$$

where $\Delta T_1$ is the first temperature difference between the initial temperature and the target temperature, t is the target time, C is a specific heat capacity of the battery, and M is a mass of the battery.

According to an embodiment of the present disclosure, the second parameter is an average current I of the battery within a preset time, and the second required power is generated through the following formula (2):

$$I^2 * R \quad (2)$$

where I is the average current, and R is an internal resistance of the battery.

When the battery is cooled, $P1 = \Delta T_1 * C * M/t + I^2 * R$; and when the battery is heated, $P1 = \Delta T_1 * C * M/t - I^2 * R$.

According to an embodiment of the present disclosure, as shown in FIG. 30, the obtaining actual powers P2 of a plurality of batteries specifically includes the following steps:

S14''''. Obtain inlet temperatures and outlet temperatures of flow paths used for adjusting temperatures of the plurality of batteries, and obtain flow velocities v at which a cooling liquid flows into the flow paths.

S15'. Generate second temperature differences $\Delta T_2$ of the plurality of batteries according to the inlet temperatures and the outlet temperatures of the flow paths of the plurality of batteries.

S16'. Generate the actual powers P2 of the plurality of batteries according to the second temperature differences $\Delta T_2$ of the plurality of batteries and the flow velocities v.

Optionally, according to an embodiment of the present disclosure, the actual power P2 is generated through the following formula (3):

$$\Delta T_2 * c * m \quad (3)$$

where $\Delta T_2$ is the second temperature difference, c is a specific heat capacity of the cooling liquid in the flow path, and m is a mass of the cooling liquid flowing through a cross section of the flow path within a unit time, where $m = v * \rho * s$, v is a flow velocity of the cooling liquid, $\rho$ is a density of the cooling liquid, and s is a cross-sectional area of the flow path.

S2''''. Obtain area temperatures Tq of a plurality of areas in the vehicle and an air conditioner set temperature Ts respectively.

S3''''. Adjust opening degrees of the plurality of intra-vehicle cooling branches, the plurality of battery cooling branches and the plurality of refrigerating branches according to the required power P1, the actual power P2, the plurality of area temperatures Tq and the air conditioner set temperature Ts.

Optionally, according to an embodiment of the present disclosure, the opening degrees of the plurality of intra-vehicle cooling branches, the plurality of battery cooling branches and the plurality of refrigerating branches are adjusted within the target time t according to the required power P1, the actual power P2, the plurality of area temperatures Tq, and the air conditioner set temperature Ts, to reach the target temperature.

As shown in FIG. 19 and FIG. 20, each battery cooling branch corresponds to a plurality of batteries connected in parallel or connected in series.

Specifically, using two refrigerating branches, two battery cooling branches, two intra-vehicle cooling branches and two batteries as an example, the batteries are respectively a first battery and a second battery, the refrigerating branches are respectively a first refrigerating branch and a second refrigerating branch, the battery cooling branches are respectively a first battery cooling branch and a second battery cooling branch, and the intra-vehicle cooling branches are respectively a first intra-vehicle cooling branch and a second intra-vehicle cooling branch. When the temperature of the first battery and/or the second battery is excessively high/excessively low, temperature adjustment needs to be performed on the first battery and/or the second battery. The required power P1 and the actual power P2 are obtained, and opening degrees of the plurality of battery cooling branches are adjusted according to P1 and P2, to adjust the cooling power of the battery; and the plurality of area temperatures Tq and the air conditioner set temperature Ts are obtained, and the opening degree of each battery cooling branch is controlled according to Tq and Ts. For example, if Tq of an area is relatively high and greatly different from Tq of another area, the opening degree of the intra-vehicle cooling branch for cooling the area is controlled to be increased, and moreover the opening degree of the corresponding battery cooling branch is controlled to be reduced. Moreover, to ensure that the cooling power of the battery is unchanged, the opening degree of another intra-vehicle cooling branch is controlled to be reduced, and moreover the opening degree of the corresponding battery cooling branch is controlled to be increased. Therefore, the method allocates refrigerating capacities to a battery and the areas in the compartment according to an actual status of each battery, the plurality of area temperatures in the compartment, and the air conditioner set temperature, thereby not only adjusting the temperature of the battery when the temperature is excessively high or excessively low, to maintain the temperature of the battery within a preset range, but also balancing the temperatures of the areas in the compartment.

How to adjust opening degrees of the plurality of intra-vehicle cooling branches, the plurality of battery cooling branches and the plurality of refrigerating branches according to the required power P1, the actual power P2, the plurality of area temperatures Tq and the air conditioner set temperature Ts is described below with reference to a specific embodiment.

According to an embodiment of the present disclosure, as shown in FIG. 30, when there are a plurality of vehicle-mounted batteries, and there are a plurality of intra-vehicle cooling branches, a plurality of battery cooling branches and a plurality of refrigerating branches, the foregoing temperature adjustment method for a vehicle-mounted battery may further include:

S31''''. Generate a total required power Pz according to a required power P1 of each battery.

S32'''. Determine whether the total required power Pz matches a maximum refrigerating power P of a vehicle-mounted air conditioner.

S33'''. If matching, cool the batteries according to the required powers for temperature adjustment on the plurality of batteries.

S34'''. If not matching, cool the batteries according to the maximum refrigerating power P of the compressor and the required power P1 of the plurality of battery cooling branches.

Specifically, when there are a plurality of batteries connected in parallel, the total required power Pz of the entire temperature adjustment system may be calculated according to the required powers P1 of all of the batteries, that is, the total required power Pz is obtained by adding the required powers P1 of all of the batteries. Then, whether Pz matches the maximum refrigerating power P of the vehicle-mounted air conditioner is determined, that is, whether Pz is less than or equal to P is determined according to the total required power Pz. If yes, each battery is cooled according to the required power P1 of each battery by controlling a valve in a battery cooling branch. If Pz does not match the maximum refrigerating power P of the vehicle-mounted air conditioner, that is, Pz is greater than P, the flow of the cooling liquid is allocated in proportion according to the maximum refrigerating power P of the air conditioner and the required power P1 of each battery by adjusting the opening degree of the valve in the battery cooling branch, thereby completing temperature reduction on each battery at maximum efficiency.

According to an embodiment of the present disclosure, the battery temperature adjustment method may further include the following steps: detecting temperatures of a plurality of batteries; when the temperature of any one of the plurality of batteries is greater than a first temperature threshold, entering a cooling mode; and when the temperature of any one of the plurality of batteries is less than a second temperature threshold, entering a heating mode. The first temperature threshold and the second temperature threshold may be preset according to an actual situation. For example, the first temperature threshold may be 40° C., and the second temperature threshold may be 0° C.

Specifically, after the vehicle is powered on, the temperature of each battery is detected in real time and determining is performed through the battery management controller. If a temperature of one of the batteries is higher than 40° C., it indicates that the temperature of the battery is excessively high in this case. To prevent the high temperature from affecting performance of the battery, temperature reduction processing needs to be performed on the battery, the temperature adjustment system is controlled through the battery management controller to enter the cooling mode, and information about starting the battery cooling function is sent to the air conditioner system. If the temperature of a battery is less than 0° C., it indicates that the temperature of the battery is excessively low in this case. To prevent the low temperature from affecting performance of the battery, temperature increase processing needs to be performed on the battery, the temperature adjustment system is controlled through the battery management controller to enter the heating mode, the corresponding battery cooling branch is controlled through the vehicle-mounted air conditioner controller to be turned off, and the heater is controlled through the battery heat management controller to be turned on, to provide the heating power to the battery.

According to an embodiment of the present disclosure, as shown in FIG. 28, the plurality of refrigerating branches respectively correspond to a plurality of air outlets, and the plurality of area temperatures are temperatures of the plurality of air outlets.

For example, as shown in FIG. 28, 4 air outlets may be disposed in the compartment, and are respectively an air outlet 1 to an air outlet 4. A corresponding area temperature Tq is detected by detecting an air outlet temperature Tc. It is assumed that the air outlet 1 and the air outlet 2 are provided with a refrigerating power by the first refrigerating branch 11, and the air outlet 3 and the air outlet 4 are provided with a refrigerating power by the second refrigerating branch 12.

According to an embodiment of the present disclosure, in the cooling mode, the adjusting opening degrees of the plurality of intra-vehicle cooling branches, the plurality of battery cooling branches and the plurality of refrigerating branches according to the required power P1, the actual power P2, the plurality of area temperatures Tq and the air conditioner set temperature Ts specifically includes: when the required power P1 of the battery cooling branch is greater than the actual power P2, determining whether the temperature of the battery is greater than a third temperature threshold, where the third temperature threshold is greater than the first temperature threshold, for example, the third temperature threshold may be 45° C.; and if the temperature of the battery is greater than the third temperature threshold, reducing the opening degrees of the plurality of intra-vehicle cooling branches, and increasing the opening degrees of the plurality of battery cooling branches, where the opening degrees of the plurality of battery cooling branches are respectively controlled through corresponding valves.

Specifically, when the temperature adjustment system enters the cooling mode, if P1 is greater than P2, whether the temperature of the battery is greater than 45° C. is determined. If the temperature of any battery is greater than 45° C., it indicates that the temperature of the current battery is excessively high, the opening degree of the first expansion valve 32 is reduced, to reduce the flow of the cooling liquid of the intra-vehicle cooling branch, and moreover the opening degree of the second expansion valve 42 is increased, to increase the flow of the cooling liquid of the battery cooling branch. Therefore, by adjusting allocation of the refrigerating capacities of the intra-vehicle cooling branch and the battery cooling branch, temperature adjustment on the battery may be completed within the target time when the temperature of the battery is excessively high.

According to an embodiment of the present disclosure, in the cooling mode, the adjusting opening degrees of the plurality of intra-vehicle cooling branches, the plurality of battery cooling branches and the plurality of refrigerating branches according to the required power P1, the actual power P2, the plurality of area temperatures Tq and the air conditioner set temperature Ts further includes: determining whether the required power P1 of each battery is greater than the actual power P2 of the battery; and if a required power P1 of a battery is greater than the actual power P2 of the battery, obtaining a power difference between the required power P1 and the actual power P2 of the battery, and increasing, according to the power difference, the power of the compressor used for cooling the battery, or performing adjustment to increase the flow of the cooling liquid of the cycling branch of the battery, to increase the cooling power of the battery; and if a required power P1 of a battery is less than or equal to the actual power P2 of the battery, reducing the power of the compressor or keeping the power of the compressor unchanged, or performing adjustment to reduce the flow of the cooling liquid of the cycling branch of the battery, to reduce the cooling power of the battery.

Specifically, when the temperature adjustment system enters the cooling mode, if there are a plurality of batteries, P1 and P2 of each battery are obtained, and determining is performed. If P1 for one of the batteries is greater than P2, it indicates that the temperature reduction on the battery cannot be completed within the target time according to the current refrigerating power or flow of the cooling liquid. Therefore, a power difference between P1 and P2 of the battery is obtained through the vehicle-mounted air conditioner controller, and the power of the compressor 1 is increased or the flow of the cooling liquid of the cycling branch of the battery is increased according to the power difference, to increase the cooling power of the battery, where a larger power difference between P1 and P2 indicates larger increase of the power of the compressor and the flow of the cooling liquid of the battery, so that the temperature of the battery is reduced to the target temperature within the preset time t. If P1 on one of the batteries is less than or equal to P2, the power of the compressor may be kept unchanged or the power of the compressor may be properly reduced, or the flow of the cooling liquid of the cycling branch of the battery is reduced, to reduce the cooling power of the battery. When the temperatures of all of the batteries are less than 35° C., cooling on the batteries is completed, information about turning off a temperature adjustment function is sent to the vehicle-mounted air conditioner through CAN communication, and the second electronic valve is controlled through the vehicle-mounted air conditioner controller to be turned off. If the temperature of a battery is still higher than 35° C. after the temperature adjustment system has entered the cooling mode for a relatively long time, for example, 1 hour, the power of the compressor is properly increased through the vehicle-mounted air conditioner controller, so that the battery completes temperature reduction as soon as possible.

According to an embodiment of the present disclosure, if the temperature of the battery is less than the third temperature threshold, whether the intra-vehicle temperature is equal to the air conditioner set temperature Ts is further determined; and if the intra-vehicle temperature is equal to the air conditioner set temperature Ts, the opening degrees of the plurality of intra-vehicle cooling branches are reduced, and the opening degrees of the plurality of battery cooling branches are increased.

Specifically, when the temperature adjustment system enters the cooling mode, if the temperature of each battery is less than 45° C., the controller determines whether the intra-vehicle temperature reaches the air conditioner set temperature Ts. If yes, the controller increases the flow of the cooling liquid of the battery cooling branch, and reduces the flow of the cooling liquid of the intra-vehicle cooling branch, to complete the temperature reduction of the battery as soon as possible. If the intra-vehicle temperature has not reached the air conditioner set temperature Ts, the intra-vehicle refrigerating requirement is preferentially satisfied, and the controller increases the flow of the cooling liquid of the intra-vehicle cooling branch, and reduces the flow of the cooling liquid of the battery cooling branch.

Moreover, layered processing is further performed on the temperature of the battery, and temperature control thresholds are respectively 40° C., 45° C., and 35° C. When the temperature of the battery is higher than 40° C., the battery cooling function is started; and when the temperature of the battery is reduced to 35° C., cooling of the battery is completed. When the temperature of the battery reaches 45° C., the battery cooling requirement is preferentially satisfied. Additionally, when the required power P1 is greater than the actual power P2, if the temperature of the battery does not exceed 45° C., the intra-vehicle refrigerating requirement is still preferentially satisfied; and if the intra-vehicle refrigerating power has been sufficient and balanced, the opening degree of the battery cooling branch is increased, to increase the cooling power of the battery. If the required power P1 is less than or equal to the actual power P2, the intra-vehicle refrigerating requirement may be preferentially satisfied.

According to an embodiment of the present disclosure, the reducing opening degrees of the plurality of intra-vehicle cooling branches specifically includes: obtaining a temperature difference between the plurality of area temperatures; determining whether the temperature difference is greater than the fourth temperature threshold; and when the temperature difference is greater than the fourth temperature threshold, increasing the opening degree of the intra-vehicle cooling branch corresponding to the refrigerating branch in which the air outlet with a high temperature is located, and optionally reducing the opening degree of the battery cooling branch corresponding to the refrigerating branch in which the air outlet with a high temperature is located. The fourth temperature threshold may be preset according to an actual situation, for example, may be 3° C.

Optionally, according to an embodiment of the present disclosure, the temperature adjustment method for a vehicle-mounted battery further includes: reducing the opening degree of the intra-vehicle cooling branch corresponding to the refrigerating branch in which the air outlet with a low temperature is located, and increasing the opening degree of the battery cooling branch corresponding to the refrigerating branch in which the air outlet with a low temperature is located.

Specifically, in a battery cooling process, if the air conditioner needs to be turned on in the vehicle, the ambient temperature in the compartment needs to be monitored and controlled, so that ambient temperatures at places in the vehicle are kept balanced, and moreover the battery cooling requirement can be satisfied. As shown in FIG. 28, when it is detected that the area temperature Tq at the air outlet 1 and the air outlet 2 is higher than the area temperature Tq at places near the air outlet 3 and the air outlet 4 by more than 3° C., the opening degree in the first intra-vehicle cooling branch is increased, and the opening degree in the first battery cooling branch is reduced, so that the cooling power in the first intra-vehicle cooling branch is relatively large. Optionally, the cooling opening degree in the second intra-vehicle cooling branch is reduced, and the opening degree of the second battery cooling branch is increased, so that the cooling power in the second intra-vehicle cooling branch is relatively small. Therefore, the cooling power of the first battery cooling branch and the cooling power of the second battery cooling branch may be kept unchanged, and moreover area air temperatures near the air outlets in the vehicle are kept balanced. When the vehicle-mounted air conditioner detects that a difference between the area air temperature Tq near the air outlet 1 and the air outlet 2 and the area air temperature Tq near the air outlet 3 and the air outlet 4 is within 3° C., the opening degrees of the first expansion valves in the first intra-vehicle cooling branch and the second intra-vehicle cooling branch are controlled to be the same, to ensure that the cooling power of the first intra-vehicle cooling branch and the cooling power of the second intra-vehicle cooling branch are the same.

According to an embodiment of the present disclosure, in the heating mode, the method further includes: determining whether the required power P1 of a battery is greater than the actual power P2 of the battery; if a required power P1 of a battery is greater than the actual power P2 corresponding to the battery, obtaining a power difference between the required power P1 and the actual power P2 of the battery, and increasing, according to the power difference, the power of the heater used for cooling the battery, or performing adjustment to increase the flow of the cooling liquid of the cycling branch of the battery, to increase the heating power of the battery; and if a required power P1 of a battery is less than or equal to the actual power P2 corresponding to the battery, reducing the power of the heater or keeping the power of the heater unchanged, or performing adjustment to reduce the flow of the cooling liquid of the cycling branch of the battery, to reduce the heating power of the battery.

Specifically, when the temperature adjustment system enters the heating mode, P1 and P2 of each battery are obtained, and determining is performed. If P1 for one of the batteries is greater than P2, it indicates that temperature increase on the battery cannot be completed within the target time according to the current heating power or flow of the cooling liquid. Therefore, a power difference between P1 and P2 of the battery is obtained, and the power of the heater used for heating the battery is increased according to the power difference, or adjustment is performed to increase the rotational speed of the corresponding pump, to increase the flow of the cooling liquid of the cycling branch of the battery, so that temperature adjustment on the battery may be completed within the target time t. A larger difference between P1 and P2 indicates larger increase of the power of the heater. If P1 of a battery is less than or equal to P2, the power of the heater may be properly reduced, to save electric energy, or adjustment is performed to reduce the rotational speed of the corresponding pump to reduce the flow of the cooling liquid of the cycling branch of the battery, to reduce the heating power, or the power of the heater is kept unchanged. When the temperatures of all of the batteries are higher than a preset temperature, for example, 10° C., heating on the batteries is completed, information about turning off a temperature adjustment function is sent to the vehicle-mounted air conditioner through CAN communication, and the heater is controlled to be turned off. If the temperature of a battery is still lower than 10° C. after the temperature adjustment system has entered the heating mode for a relatively long time, for example, 1 hour, the power of the heater is properly increased, so that the battery completes temperature increase as soon as possible.

According to an embodiment of the present disclosure, the temperature adjustment method for a vehicle-mounted battery may further include: reducing, if the required power P1 of a battery is less than the corresponding actual power P2, the rotational speed of the pump in the flow path of the battery; and increasing, if the required power P1 of a battery is greater than the corresponding actual power P2, the rotational speed of the pump in the flow path of the battery.

Specifically, when the temperature adjustment system enters the heating mode or cooling mode, if P1 of a battery is less than P2, the controller controls the rotational speed of the corresponding pump to be reduced, to save electric energy. If P1 of a battery is greater than P2, in addition to controlling the power of the corresponding heater or compressor to be increased or the flow of the cooling liquid in the loop in which the battery is located to be increased, the controller further controls the rotational speed of the pump to be increased, to increase a mass of the cooling liquid flowing through a cross section of the cooling flow path within a unit time, thereby increasing the actual power P2 of the battery, to implement temperature adjustment within the target time t.

According to an embodiment of the present disclosure, when there are a plurality of batteries, and the flow paths are connected in series, the plurality of batteries correspond to a plurality of pumps for adjusting flows of the cooling liquid of the batteries, and the pumps are bidirectional pumps.

As shown in FIG. 19 and FIG. 20, using two batteries as an example, when there are two batteries (a first battery and a second battery) connected in series, there are two pumps correspondingly, one of the two pumps is a forward pump, and the other is a backward pump.

As shown in FIG. 25, when the forward pump is started, the flowing direction of the cooling liquid in the second duct is: the medium container—the heat exchanger—the heater—the forward pump—the first temperature sensor—the first battery—the second battery—the second temperature sensor—the flow velocity sensor—the medium container. As shown in FIG. 26, when the backward pump is started, the flowing direction of the cooling liquid in the second duct is: the medium container—the flow velocity sensor—the second temperature sensor—the second battery—the first battery—the first temperature sensor—backward pump—the heater—the heat exchanger—the medium container.

When the cooling function of the first battery and the cooling function of the second battery are started, if the temperature of the first battery is higher than the temperature of the second battery, and a difference between them exceeds the preset value, the forward pump is controlled to operate, so that the cooling liquid first flows through the first battery, and then flows through the second battery, thereby making the first battery complete temperature reduction as soon as possible. If the temperature of the second battery is higher than the temperature of the first battery, and the difference exceeds the preset value, the backward pump is controlled to operate, so that the cooling liquid first flows through the second battery, and then flows through the first battery, thereby making the second battery complete temperature reduction as soon as possible. Therefore, by changing the flow direction of the cooling liquid, the temperature difference between the first battery and the second battery may be reduced. When neither the cooling function nor the heating function of the first battery and the second battery is started, if the temperature difference between the first battery and the second battery exceeds the preset value, the forward pump or the backward pump may be controlled to be started, so that the cooling liquid in the battery cooling branch flows, thereby balancing the temperatures of the first battery and the second battery.

To make a person skilled in the art more clearly understand the present disclosure, an operating process of the temperature adjustment system for a vehicle-mounted battery is described below with reference to specific examples.

Main differences between FIG. 19 and FIG. 19 are addition of a compressor refrigerating loop, and addition of problems of temperature balancing between air outlets of an intra-vehicle air conditioner and power adjustment between compressors. Only the differences are listed below, and the rest is not described.

As shown in FIG. 19, when there are a plurality of batteries, and the temperature adjustment system enters the cooling mode, the controller obtains P1 of each battery, the actual power P2 of each battery, and the maximum refrigerating power P of a single compressor; and may calculate the total required power Pz of the entire temperature adjustment system by adding P1 of each battery, obtain the total actual power Pf for temperature adjustment by adding the actual power P2 of each battery, and may calculate a sum P5 of the maximum refrigerating powers of all compressors by adding the maximum refrigerating power of each compressor. P51 is the maximum refrigerating power of the compressor 11, P52 is the maximum refrigerating power of the compressor 12, P5 is the sum of the maximum refrigerating powers of all of the compressors, and P5=P51+P52. The required power of the first battery is P11, and the required power of the second battery is P12. The actual power for temperature adjustment on the first battery 61 is P21, and the actual power for temperature adjustment on the second battery 62 is P22.

If Pz≤P51, only one compressor needs to be controlled to operate, to provide the refrigerating power, and two compressors may alternatively be controlled to operate together. If P51<Pz≤P5, two compressors need to operate together, and an initial refrigerating power of each compressor may be Pz/2, or be of another power combination form, so that a sum of the refrigerating powers of the two compressors is Pz. If Pz>P5, two compressors 1 need to operate together, and each compressor runs according to the maximum refrigerating power. The required power for temperature adjustment on the intra-vehicle cooling branch is P4, that is, P4 is a power required for adjusting the intra-vehicle temperature to the set temperature.

When intra-vehicle cooling and battery cooling are both turned on, it is assumed that the area temperature of the air outlet 1 and the air outlet 2 is T51, and the area temperature of the air outlet 3 and the air outlet 4 is T52.

If T51−T52≥Tc, and Tc is 3° C., processing is performed as follows:

If Pz+P4≤P5, the controller controls the refrigerating power of the first compressor 11 to be increased, or controls the opening degree of the expansion valve of the battery cooling branch in the refrigerating loop of the first compressor to be reduced, and controls the opening degree of the expansion valve of the intra-vehicle cooling loop to be increased; or controls the opening degree of the expansion valve of the battery cooling branch in the refrigerating loop of the second compressor to be increased, and controls the opening degree of the expansion valve of the intra-vehicle cooling loop to be reduced, so that the temperature T51 is reduced quickly, and moreover the cooling power requirement of the battery is satisfied, to achieve a balanced intra-vehicle ambient temperature.

If Pz+P4>P5, the controller controls the first compressor and the second compressor to run at the maximum refrigerating power, or controls the opening degree of the expansion valve of the battery cooling branch in the refrigerating loop of the first compressor to be reduced, and controls the opening degree of the expansion valve of the intra-vehicle cooling loop to be increased; or controls the opening degree of the expansion valve of the battery cooling branch in the refrigerating loop of the second compressor to be increased, and controls the opening degree of the expansion valve of the intra-vehicle cooling loop to be reduced, so that the temperature T51 is reduced quickly, and moreover the cooling power requirement of the battery is satisfied, to achieve a balanced intra-vehicle ambient temperature.

If T51−T52≥Tc, and Tc is 3° C., processing may also be performed as follows:

The controller controls the battery cooling branch in the refrigerating loop of the first compressor to be turned off, and controls the opening degree of the expansion valve of the intra-vehicle cooling loop to be increased, so that all of the refrigerating power of the first compressor is used for intra-vehicle cooling. Moreover, the controller controls the opening degree of the expansion valve of the battery cooling branch in the refrigerating loop of the second compressor to be increased, and controls the opening degree of the expansion valve of the intra-vehicle cooling loop to be reduced, to increase the battery cooling power, so that the temperature T51 is reduced quickly, and moreover the cooling power requirement of the battery is satisfied, to achieve a balanced intra-vehicle ambient temperature.

Main differences between FIG. 27 and FIG. 11 are addition of a compressor refrigerating loop, and addition of problems of temperature balancing between air outlets of an intra-vehicle air conditioner and power adjustment between compressors. Only the differences are listed below, and the rest is not described.

As shown in FIG. 27, when there are a plurality of batteries, and the temperature adjustment system enters the cooling mode, the controller obtains P1 of each battery 6, the actual power P2 of each battery, and the maximum refrigerating power P of a single compressor; and may calculate the total required power Pz of the entire temperature adjustment system by adding P1 of each battery, obtain the total actual power Pf for temperature adjustment by adding the actual power P2 of each battery, and may calculate a sum P5 of the maximum refrigerating powers of all compressors by adding the maximum refrigerating power of each compressor. P51 is the maximum refrigerating power of the compressor 11, P52 is the maximum refrigerating power of the compressor 12, P5 is the sum of the maximum refrigerating powers of all of the compressors, and P5=P51+P52. The required power of the first battery 61 is P11, and the required power of the second battery 62 is P12. The actual power of the first battery 61 is P21, and the actual power of the second battery 62 is P22.

If Pz≤P51, only one compressor 1 needs to be controlled to operate, to provide the refrigerating power, and two compressors 1 may alternatively be controlled to operate together. If P51≤Pz≤P5, two compressors need to operate together, and an initial refrigerating power of each compressor may be Pz/2, or be of another power combination form, so that a sum of the refrigerating powers of the two compressors is Pz. If Pz>P5, two compressors 1 need to operate together, and each compressor runs according to the maximum refrigerating power. The required power for temperature adjustment on the intra-vehicle cooling branch is P4, that is, P4 is a power required for adjusting the intra-vehicle temperature to the set temperature.

When intra-vehicle cooling and battery cooling are both turned on, it is assumed that the area temperature of the air outlet 1 and the air outlet 2 is T51, and the area temperature of the air outlet 3 and the air outlet 4 is T52.

If T51−T52≥Tc, and Tc is 3° C., processing is performed as follows:

If Pz+P4≤P5, the controller controls the refrigerating power of the first compressor 11 to be increased, or controls the opening degree of the expansion valve of the battery cooling branch in the refrigerating loop of the first compressor 11 to be reduced, and controls the opening degree of the expansion valve of the intra-vehicle cooling loop to be increased; or controls the opening degree of the expansion valve of the battery cooling branch in the refrigerating loop of the second compressor 12 to be increased, and controls the opening degree of the expansion valve of the intra-vehicle cooling loop to be reduced, so that the temperature T51 is reduced quickly, and moreover the cooling power requirement of the battery is satisfied, to achieve a balanced intra-vehicle ambient temperature.

If Pz+P4>P5, the controller controls the first compressor 11 and the second compressor 12 to run at the maximum refrigerating power, or controls the opening degree of the expansion valve of the battery cooling branch in the refrigerating loop of the first compressor 11 to be reduced, and controls the opening degree of the expansion valve of the intra-vehicle cooling loop to be increased; or controls the opening degree of the expansion valve of the battery cooling branch in the refrigerating loop of the second compressor 12 to be increased, and controls the opening degree of the expansion valve of the intra-vehicle cooling loop to be reduced, so that the temperature T51 is reduced quickly, and moreover the cooling power requirement of the battery is satisfied, to achieve a balanced intra-vehicle ambient temperature.

If T51−T52≥Tc, and Tc is 3° C., processing may also be performed as follows:

The controller controls the battery cooling branch in the refrigerating loop of the first compressor 11 to be turned off, and controls the opening degree of the expansion valve of the intra-vehicle cooling loop to be increased, so that all of the refrigerating power of the first compressor 11 is used for intra-vehicle cooling. Moreover, the controller controls the opening degree of the expansion valve of the battery cooling branch in the refrigerating loop of the second compressor 12 to be increased, and controls the opening degree of the expansion valve of the intra-vehicle cooling loop to be reduced, to increase the battery cooling power, so that the temperature T51 is reduced quickly, and moreover the cooling power requirement of the battery is satisfied, to achieve a balanced intra-vehicle ambient temperature.

In the temperature adjustment method for a vehicle-mounted battery according to this embodiment of the present disclosure, first, the required powers for temperature adjustment on the plurality of batteries in the plurality of battery cooling branches are respectively obtained; then, the area temperatures of the plurality of areas in the vehicle and the air conditioner set temperature are obtained respectively; and then the opening degrees of the plurality of intra-vehicle cooling branches, the plurality of battery cooling branches and the plurality of refrigerating branches are adjusted according to the required powers for temperature adjustment, the actual powers for temperature adjustment, the plurality of area temperatures and the air conditioner set temperature. Therefore, the method allocates refrigerating capacities to a battery and the areas in the compartment according to an actual status of each battery, the plurality of area temperatures in the compartment, and the air conditioner set temperature, thereby not only adjusting the temperature of the battery when the temperature is excessively high or excessively low, to maintain the temperature of the battery within a preset range, but also balancing the temperatures of the areas in the compartment.

When there are a plurality of batteries, and the plurality of batteries are independently disposed, as shown in FIG. 31, a temperature adjustment system for a vehicle-mounted battery includes: a plurality of refrigerating branches, a plurality of intra-vehicle cooling branches, a plurality of battery cooling branches and a plurality of battery temperature adjustment modules 5.

Each refrigerating branch includes a compressor 1, and a condenser 2 connected to the compressor 1. The plurality of intra-vehicle cooling branches are respectively connected to the plurality of refrigerating branches. The plurality of battery cooling branches are connected to the plurality of refrigerating branches, and the plurality of battery cooling branches are in communication with each other. The battery temperature adjustment modules 5 are respectively connected to the plurality of batteries and the plurality of battery cooling branches, and are used for obtaining required powers P1 and actual powers P2, obtaining area temperatures Tq of a plurality of areas in the vehicle and an air conditioner set temperature Ts, and adjusting opening degrees of the plurality of intra-vehicle cooling branches, the plurality of battery cooling branches and the plurality of refrigerating branches according to the required powers P1, the actual powers P2, the plurality of area temperatures Tq, and the air conditioner set temperature Ts; and adjusting, according to the required powers P1 and the actual powers P2 of the batteries, opening degrees of refrigerating capacities provided by the plurality of compressors 1 to the battery cooling branches corresponding to the batteries.

The battery may be a battery pack or a battery module.

Optionally, according to an embodiment of the present disclosure, the battery temperature adjustment module 5 adjusts the opening degrees of the plurality of intra-vehicle cooling branches, the plurality of battery cooling branches and the plurality of refrigerating branches within the target time t according to the required power P1, the actual power P2, the plurality of area temperatures Tq, and the air conditioner set temperature Ts, to reach the target temperature.

For example, as shown in FIG. 31, using two refrigerating branches, two battery cooling branches, two intra-vehicle cooling branches and two batteries as an example, the batteries are respectively a first battery 61 and a second battery 62, and the first battery 61 and the second battery 62 are disposed independent of each other. The refrigerating branches are respectively a first refrigerating branch 11 and a second refrigerating branch 12, the battery cooling branches are respectively a first battery cooling branch 401 and a second battery cooling branch 402, and the intra-vehicle cooling branches are respectively a first intra-vehicle cooling branch 301 and a second intra-vehicle cooling branch 302.

When the temperature of the first battery 61 and/or the second battery 62 is excessively high/excessively low, temperature adjustment needs to be performed on the first battery 61 and/or the second battery 62. The battery temperature adjustment module 5 obtains the required power P1 and the actual power P2, and adjusts opening degrees of the plurality of battery cooling branches according to P1 and P2, to adjust the cooling power of the battery; and the battery temperature adjustment module 5 obtains the plurality of area temperatures Tq and the air conditioner set temperature Ts, and controls the opening degree of each battery cooling branch according to Tq and Ts. For example, if Tq of an area is relatively high and greatly different from Tq of another area, the battery temperature adjustment module 5 controls the opening degree of the intra-vehicle cooling branch for cooling the area to be increased, and moreover controls the opening degree of the corresponding battery cooling branch to be reduced. Moreover, to ensure that the cooling power of the battery is unchanged, the battery temperature adjustment module 5 controls the opening degree of another intra-vehicle cooling branch to be reduced. Therefore, the system allocates refrigerating capacities to a battery and the areas in the compartment according to an actual status of each battery, the plurality of area temperatures in the compartment, and the air conditioner set temperature, thereby not only adjusting the temperature of the battery when the temperature is excessively high or excessively low, to maintain the temperature of the battery within a preset range, but also balancing the temperatures of the areas in the compartment. Moreover, because the plurality of battery cooling branches are in communication with each other, the battery temperature adjustment modules 5 may adjust the opening degrees of the refrigerating capacities of the battery cooling branches corresponding to the batteries according to the temperatures of the batteries, to ensure temperature balancing between the batteries.

It may be understood that, the battery temperature adjustment module 5 has a refrigerating power provided by the vehicle-mounted air conditioner, and shares a refrigerating capacity with an intra-vehicle refrigerating system, thereby reducing the volume of the temperature adjustment system, and making allocation of the flow of the cooling liquid more flexible.

According to an embodiment of the present disclosure, as shown in FIG. 31, a battery cooling branch may include a heat exchanger 41, the heat exchanger 41 includes a first duct and a second duct, the second duct is connected to a battery temperature adjustment module 5, and the first duct is in communication with a compressor 1, where the first duct and the second duct are adjacently disposed independent of each other.

The battery temperature adjustment module 5 includes: a flow path of adjusting the temperature of the battery (not specifically shown in the figure), where the flow path is disposed in the battery; and a pump 51, a medium container 52, a heater 53, and a controller (not specifically shown in the figure) that are connected between the flow path and the heat exchanger 41. The controller obtains a required power P1 of a battery and an actual power P2 of the battery, and adjusts a temperature of the battery according to the required power P1 and the actual power P2. The intra-vehicle cooling branch may include: an evaporator 31, a first expansion valve 32, and a first electronic valve 33. The battery cooling branch 4 may further include a second expansion valve 42 and a second electronic valve 43.

As shown in FIG. 31, the first battery cooling branch 401 may further include a first adjustment valve 411 and a third adjustment valve 413; and the second battery cooling branch 402 may further include a second adjustment valve 412 and a fourth adjustment valve 414. For details of connection manners of the adjustment valves, refer to FIG. 24, and details are not described herein. As shown in FIG. 24, the refrigerating capacity of each compressor 1 may be allocated to the first battery cooling branch 401 or the second battery cooling branch 402 by adjusting the first to the fourth adjustment valves 411 to 414. For example, the compressor 1 of the first refrigerating branch 11 may allocate the cooling medium to the first battery cooling branch 401 through the first adjustment valve 411, and allocate the cooling medium to the second battery cooling branch 402 through the second adjustment valve 412. The compressor 1 of the second refrigerating branch 12 may allocate the cooling medium to the first battery cooling branch 401 through the third adjustment valve 413, and allocate the cooling medium to the second battery cooling branch 402 through the fourth adjustment valve 414.

According to an implementation example of the present disclosure, as shown in FIG. 31, the battery temperature adjustment module 5 may further include a first temperature sensor 55 disposed on an inlet of the flow path, a second temperature sensor 56 disposed on an outlet of the flow path, and a flow velocity sensor 57. It may be understood that, locations of the inlet and the outlet of the flow path are not absolute, but are determined according to steering of the pump 51.

Specifically, the heat exchanger 41 may be a plate heat exchanger, and the plate heat exchanger may be installed in the vehicle-mounted air conditioner, so that the entire refrigerant loop is in the vehicle-mounted air conditioner, to facilitate pre-delivery commissioning of the vehicle-mounted air conditioner; and the vehicle-mounted air conditioner may be individually supplied and assembled, and moreover, the vehicle-mounted air conditioner only needs to be filled with the refrigerant once in an installing process. The cooling liquid flows into the battery from the inlet of the flow path, and flows out from the outlet of the flow path, thereby implementing heat exchange between the battery and the cooling liquid.

The pump 51 is mainly used for providing power, and the medium container 52 is mainly used for storing the cooling liquid and receiving the cooling liquid added to the temperature adjustment system. When the cooling liquid in the temperature adjustment system is reduced, the cooling liquid in the medium container 52 may be automatically supplemented. The heater 53 may be a PTC heater, may perform CAN communication with the controller, to provide a heating power to the temperature adjustment system for a vehicle-mounted battery, and is controlled by the controller. Moreover, the heater 53 is not in direct contact with the battery 6, to have relatively high safety, reliability, and practicability.

The first temperature sensor 55 is used for detecting the temperature of the cooling liquid on the inlet of the flow path, and the second temperature sensor 56 is used for detecting the temperature of the cooling liquid on the outlet of the flow path. The flow velocity sensor 57 is used for detecting flow velocity information of the cooling liquid in the corresponding duct. The second electronic valve 43 is used for controlling opening and closing of the corresponding battery cooling branch 4, and the second expansion valve 42 may be used for controlling the flow of the cooling liquid in the corresponding battery cooling branch 4. The controller may simultaneously control the flows of the cooling liquid in the two cooling branches of the first battery 61 and the second battery 62 by adjusting opening degrees of the first to the fourth adjustment valves 411 to 414, thereby balancing the temperatures of the two batteries. Moreover, the controller may further perform CAN communication with the vehicle-mounted air conditioner and the heater 53, and may control the rotational speed of the pump 51 and monitor the temperature and flow information of the cooling liquid; and may further perform management on the battery, detect the voltage and temperature information of the battery, and control on/off of the temperature adjustment system for a vehicle-mounted battery, and the controllers may communicate with each other.

How does each battery temperature adjustment module 5 obtain the required power P1 and the actual power P2 for a corresponding battery 6 is described below with reference to specific embodiments.

According to an embodiment of the present disclosure, the controller may be configured to: obtain a first parameter when enabling temperature adjustment on each battery, and generate a first required power of each battery according to the first parameter; obtain a second parameter when enabling temperature adjustment on each battery, and generate a second required power of each battery according to the second parameter; and generate the required power P1 of each battery according to the first required power of each battery and the second required power of each battery.

Optionally, according to an embodiment of the present disclosure, the first parameter is an initial temperature when enabling temperature adjustment on the battery, the target temperature, and the target time t for reaching the target temperature from the initial temperature, and the controller obtains a first temperature difference $\Delta T_1$ between the initial temperature and the target temperature, and generates the first required power according to the first temperature difference $\Delta T_1$ and the target time t.

Optionally, the controller generates the first required power through the following formula (1):

$$\Delta T_1 * C * M / t \quad (1)$$

where $\Delta T_1$ is the first temperature difference between the initial temperature and the target temperature, t is the target time, C is a specific heat capacity of the battery, and M is a mass of the battery.

The second parameter is an average current I of each battery within a preset time, and the controller generates the second required power through the following formula (2):

$$I^2 * R \quad (2)$$

where I is the average current, and R is an internal resistance of the battery.

When the battery is cooled, $P1=\Delta T_1 * C * M / t + I^2 * R$; and when the battery is heated, $P1=\Delta T_1 * C * M / t - I^2 * R$.

According to an embodiment of the present disclosure, the controller generates a second temperature difference $\Delta T_2$ of each battery according to an inlet temperature detected by the first temperature sensor 55 and an outlet temperature detected by the second temperature sensor 56 that are in a loop in which each battery is located, and generates the actual power P2 of each battery according to the second temperature difference $\Delta T_2$ of each battery and a flow velocity v that is detected by the flow velocity sensor 57.

Optionally, according to an embodiment of the present disclosure, the actual power P2 is generated through the following formula (3):

$$\Delta T_2 * c * m \quad (3)$$

where $\Delta T_2$ is the second temperature difference, c is a specific heat capacity of the cooling liquid in the flow path, and m is a mass of the cooling liquid flowing through a cross section of the flow path within a unit time, where $m = v * \rho * s$, v is a flow velocity of the cooling liquid, $\rho$ is a density of the cooling liquid, and s is a cross-sectional area of the flow path.

Specifically, after the vehicle is powered on, the controller determines whether temperature adjustment needs to be performed on the vehicle; and if it is determined that temperature adjustment needs to be performed on the vehicle, enables a temperature adjustment function, and sends information about a low rotational speed to the pump 51, and the pump begins operating at a default rotational speed (for example, low rotational speed). Then, the controller obtains the initial temperature (that is, current temperature) of each battery, the target temperature, and the target time t for reaching the target temperature from the initial temperature, where the target temperature and the target time t may be preset according to an actual situation, and the first required power of each battery is calculated according to the formula (1). Moreover, the controller obtains the average current I of each battery within the preset time, and the second required power of each battery is calculated according to the formula (2). Then, the controller calculates the required power P1 (that is, the required power for adjusting the temperature of each battery to the target temperature within the target time) according to the first required power and the second required power of each battery 6. Moreover, the controller obtains temperature information detected by the first temperature sensor 55 and the second temperature sensor 56 that are set corresponding to each battery, and obtains flow velocity information detected by each flow velocity sensor 57, and the actual power P2 of each battery is calculated according to the formula (3).

How to adjust the opening degrees of the plurality of intra-vehicle cooling branches (30 and 30), the plurality of battery cooling branches (401 and 402) and the plurality of refrigerating branches (11 and 12) according to the required power P1, the actual power P2, the plurality of area temperatures Tq and the air conditioner set temperature Ts is described below with reference to a specific embodiment.

According to an embodiment of the present disclosure, the controller may be configured to generate a total required power Pz according to a required power P1 of each battery, and determine whether the total required power Pz is greater than the total maximum refrigerating power P5 of the plurality of compressors, where when the total required power Pz is greater than the total maximum refrigerating power P5 of the plurality of compressors, the controller adjusts, to the maximum, the opening degrees of the refrigerating capacities provided by the plurality of compressors 1 to the battery cooling branches 4 corresponding to the batteries; and when the total required power Pz is less than or equal to the total maximum refrigerating power P5 of the plurality of compressors, the controller adjusts the opening degrees of the refrigerating capacities of the battery cooling branches 4 corresponding to the batteries 6 according to a difference between the total required power Pz and the total maximum refrigerating power P5.

Specifically, as shown in FIG. 31, when the batteries are cooled, the controller may calculate the total required power Pz of the entire temperature adjustment system according to the required powers P1 of all of the batteries, that is, obtain the total required power Pz by adding the required powers P1 of all of the batteries. Moreover, the controller calculates the total maximum refrigerating power P5 of the plurality of compressors according to the maximum refrigerating power P of each compressor 1, that is, may obtain the total maximum refrigerating power P5 by adding the maximum refrigerating power P of each compressor 1. Then, the controller determines whether Pz>P5, and if yes, the controller adjusts the opening degree of each second expansion valve 42 to the maximum, to increase the flow of the cooling liquid flowing into each battery cooling loop 4, so that the battery may complete temperature reduction within the target time. If Pz≤P5, two compressors need to operate together, and an initial refrigerating power of each compressor may be Pz/2, or be of another power combination form, so that a sum of the refrigerating powers of the two compressors is Pz; and the opening degree of each second expansion valve 42 is adjusted according to a difference between Pz and P5, where a larger absolute value of the difference between Pz and P5 indicates a smaller opening degree of the second expansion valve 42, to save energy sources.

According to an embodiment of the present disclosure, as shown in FIG. 31, the controller is further configured to: detect temperatures of a plurality of batteries; control, when a temperature of any one of the plurality of batteries 6 is greater than a first temperature threshold, the temperature adjustment system to enter a cooling mode; and control, when a temperature of any one of the plurality of batteries is less than a second temperature threshold, the temperature adjustment system to enter a heating mode. The first temperature threshold and the second temperature threshold may be preset according to an actual situation. For example, the first temperature threshold may be 40° C., and the second temperature threshold may be 0° C.

Specifically, after the vehicle is powered on, the controller detects the temperature of each battery in real time, and performs determining. If a temperature of one of the batteries is higher than 40° C., it indicates that the temperature of the battery is excessively high in this case. To prevent the high temperature from affecting performance of the battery, temperature reduction processing needs to be performed on the battery, and the controller controls the temperature adjustment system to enter the cooling mode, sends information about starting the battery cooling function to the air conditioner system, and controls the corresponding second electronic valve 43 to be turned on, so that the cooling liquid performs heat exchange with the battery to reduce the temperature of the battery. If a temperature of a battery is less than 0° C., it indicates that the temperature of the battery is excessively low in this case. To prevent the low temperature from affecting performance of the battery, temperature increase processing needs to be performed on the battery, the controller controls the temperature adjustment system to enter a heating mode, controls the second electronic valve 43 to be turned off, and controls the corresponding heater 53 to be turned on, to provide the heating power to the temperature adjustment system. When the temperature adjustment system operates in the heating mode, the heater 53 provides the heating power. Using an example of heating the first battery 61, a flowing direction of the cooling liquid in the loop in which the first battery 61 is located is: the medium container 52—the heat exchanger 41—the heater 53 (turned on)—the pump 51—the first temperature sensor 55—the first battery 61—the second temperature sensor 56—the flow velocity sensor 57—the medium container 52; and cycling is performed in this way, to implement temperature increase on the first battery 61.

According to an embodiment of the present disclosure, as shown in FIG. 31, in the cooling mode, the controller is further configured to determine, when the required power P1 of the battery cooling branch is greater than the actual power P2, whether the temperature of the battery is greater than the third temperature threshold. If the temperature of the battery is greater than the third temperature threshold, the controller increases the opening degrees of the corresponding battery cooling branches, where the opening degrees of the battery cooling branches are respectively controlled through corresponding valves (that is, the second expansion valves 42). The third temperature threshold is greater than the first temperature threshold. For example, the third temperature threshold may be 45° C.

Specifically, in the cooling mode, if P1 is greater than P2, the controller determines whether the temperature of the battery is greater than 45° C. If the temperature of any battery is greater than 45° C., it indicates that the temperature of the current battery is excessively high, the controller reduces the opening degree of the corresponding first expansion valve 32, to reduce the flow of the cooling liquid of the intra-vehicle cooling branch, and moreover increases the opening degree of the second expansion valve 42, to increase the flow of the cooling liquid of the battery cooling branch. Therefore, by adjusting allocation of the refrigerating capacities of the intra-vehicle cooling branch and the battery cooling branch, temperature adjustment on the battery may be completed within the target time when the temperature of the battery is excessively high.

According to an embodiment of the present disclosure, as shown in FIG. 31, in the cooling mode, when a required power P1 of a battery is greater than the actual power P2 of the battery, the controller is further configured to: obtain a power difference between the required power P1 and the actual power P2 of the battery, and increase, according to the power difference, the power of the compressor 1 used for cooling the battery, or perform adjustment to increase the flow of the cooling liquid in the cycling branch of the battery, to increase the cooling power of the battery; or when a required power P1 of a battery is less than or equal to the actual power P2 of the battery, reduce the power of the compressor or keep the power of the compressor unchanged, or perform adjustment to reduce the flow of the cooling liquid in the cycling branch of the battery, to reduce the cooling power of the battery.

Specifically, when operating in the cooling mode, if there are a plurality of batteries, the controller obtains P1 and P2 of each battery, and performs determining. If P1 for one of the batteries is greater than P2, it indicates that the temperature reduction on the battery cannot be completed within the target time according to the current refrigerating power or flow of the cooling liquid. Therefore, the controller obtains a power difference between P1 and P2 of the battery, and increases the power of the compressor 1 or increases the flow of the cooling liquid of the cycling branch of the battery according to the power difference, to increase the cooling power of the battery, where a larger power difference between P1 and P2 indicates larger increase of the power of the compressor 1 and the flow of the cooling liquid of the battery, so that the temperature of the battery is reduced to the target temperature within the preset time t. If P1 on one of the batteries is less than or equal to P2, the power of the compressor 1 may be kept unchanged or the power of the compressor 1 may be properly reduced, or the flow of the cooling liquid of the cycling branch of the battery is reduced, to reduce the cooling power of the battery. When the temperatures of all of the batteries are less than 35° C., cooling on the batteries is completed, the controller sends information about turning off a temperature adjustment function to the vehicle-mounted air conditioner through CAN communication, and controls the second electronic valves 43 to be turned off. If the temperature of a battery is still higher than 35° C. after the temperature adjustment system has entered the cooling mode for a relatively long time, for example, 1 hour, the controller properly increases the power of the compressor, so that the battery completes temperature reduction as soon as possible.

According to an embodiment of the present disclosure, as shown in FIG. 31, the controller is further configured to reduce the opening degrees of the plurality of intra-vehicle cooling branches and increase the opening degrees of the plurality of battery cooling branches when the temperature of a battery is less than the third temperature threshold and the intra-vehicle temperature is equal to the air conditioner set temperature Ts.

Specifically, in the cooling mode, if the temperature of each battery is less than 45° C., the controller determines whether the intra-vehicle temperature reaches the air conditioner set temperature Ts. If yes, the controller reduces the opening degree of the first expansion valve 32, and increases the opening degree of the second expansion valve 42, to increase the flow of the cooling liquid of the battery cooling branch, reduce the flow of the cooling liquid of the intra-vehicle cooling branch, and complete the temperature reduction of the battery as soon as possible. If the intra-vehicle temperature has not reached the air conditioner set temperature Ts, the intra-vehicle refrigerating requirement is preferentially satisfied, and the controller increases the opening degree of the first expansion valve 32, and reduces the opening degree of the second expansion valve 42.

Moreover, layered processing is further performed on the temperature of the battery, and temperature control thresholds are respectively 40° C., 45° C., and 35° C. When the temperature of the battery is higher than 40° C., the battery cooling function is started; and when the temperature of the battery is reduced to 35° C., cooling of the battery is completed. When the temperature of the battery reaches 45° C., the battery cooling requirement is preferentially satisfied. Additionally, when the required power P1 is greater than the actual power P2, if the temperature of the battery does not exceed 45° C., the intra-vehicle refrigerating requirement is still preferentially satisfied; and if the intra-vehicle refrigerating power has been sufficient and balanced, the controller increases the opening degree of the battery cooling branch, to increase the cooling power of the battery. If the required power P1 is less than or equal to the actual power P2, the intra-vehicle refrigerating requirement may be preferentially satisfied.

In an embodiment of the present disclosure, the plurality of refrigerating branches respectively correspond to a plurality of air outlets, and the plurality of area temperatures are temperatures of the plurality of air outlets.

For example, as shown in FIG. 28, 4 air outlets may be disposed in the compartment, and are respectively an air outlet 1 to an air outlet 4. A corresponding area temperature Tq is detected by detecting an air outlet temperature Tc. It is assumed that the air outlet 1 and the air outlet 2 are provided with a refrigerating power by the first refrigerating branch 11, and the air outlet 3 and the air outlet 4 are provided with a refrigerating power by the second refrigerating branch 12.

According to an embodiment of the present disclosure, as shown in FIG. 31, the controller is further configured to: obtain a temperature difference between the plurality of area temperatures; and when the temperature difference is greater than the fourth temperature threshold, increase the opening degree of the intra-vehicle cooling branch corresponding to the refrigerating branch in which the air outlet with a high temperature is located, and reduce the opening degree of the battery cooling branch corresponding to the refrigerating branch in which the air outlet with a high temperature is located. The fourth temperature threshold may be preset according to an actual situation, for example, may be 3° C.

Optionally, according to an embodiment of the present disclosure, the controller is further configured to reduce the opening degree of the intra-vehicle cooling branch corresponding to the refrigerating branch in which the air outlet with a low temperature is located, and increase the opening degree of the battery cooling branch corresponding to the refrigerating branch in which the air outlet with a low temperature is located.

Specifically, in a battery cooling process, if the air conditioner needs to be turned on in the vehicle, the ambient temperature in the compartment needs to be monitored and controlled, so that ambient temperatures at places in the vehicle are kept balanced, and moreover the battery cooling requirement can be satisfied. As shown in FIG. 28, when it is detected that the area temperature Tq at the air outlet 1 and the air outlet 2 is higher than the area temperature Tq at places near the air outlet 3 and the air outlet 4 by more than 3° C., the opening degree of the first expansion valve 32 in the first intra-vehicle cooling branch 301 is controlled to be increased, and moreover the opening degree of the second expansion valve 42 in the first battery cooling branch 401 is controlled to be reduced, so that the cooling power in the first intra-vehicle cooling branch 301 is increased. The controller further controls the opening degree of the first expansion valve 32 in the second intra-vehicle cooling branch 302 to be reduced, and the opening degree of the second expansion valve 42 in the second battery cooling branch 402 to be increased, so that the cooling power in the second intra-vehicle cooling branch 302 is relatively small. Therefore, the cooling power of the first battery cooling branch 301 and the cooling power of the second battery cooling branch 302 may be kept unchanged, and moreover area air temperatures near the air outlets in the vehicle are kept balanced. When the vehicle-mounted air conditioner detects that a difference between the area air temperature Tq near the air outlet 1 and the air outlet 2 and the area air temperature Tq near the air outlet 3 and the air outlet 4 is within 3° C., the controller controls the opening degrees of the first expansion valves 32 in the first intra-vehicle cooling branch 301 and the second intra-vehicle cooling branch 302 to be the same, to ensure that the cooling power of the first intra-vehicle cooling branch 301 and the cooling power of the second intra-vehicle cooling branch 302 are the same.

According to an embodiment of the present disclosure, in the heating mode, when a required power P1 of a battery is greater than the actual power P2 of the battery, the controller obtains a power difference between the required power P1 and the actual power P2 of the battery, and increase, according to the power difference, the power of the heater used for heating the battery, or perform adjustment to increase the flow of the cooling liquid in the cycling branch of the battery, to increase the heating power of the battery; and when a required power P1 of a battery is less than or equal to the actual power P2 of the battery, the controller reduces the power of the heater or keeps the power of the heater unchanged, or performs adjustment to reduce the flow of the cooling liquid in the cycling branch of the battery, to reduce the heating power of the battery.

Specifically, when the temperature adjustment system enters the heating mode, the controller obtains P1 and P2 of each battery, and performs determining. If P1 for one of the batteries is greater than P2, it indicates that temperature increase on the battery cannot be completed within the target time according to the current heating power or flow of the cooling liquid. Therefore, the controller obtains a power difference between P1 and P2 of the battery, and increases, according to the power difference, the power of the heater 53 used for heating the battery, or performs adjustment to increase the rotational speed of the corresponding pump 51, to increase the flow of the cooling liquid of the cycling branch of the battery, so that temperature adjustment on the battery may be completed within the target time t. A larger difference between P1 and P2 indicates larger increase of the power of the heater 53. If P1 of a battery is less than or equal to P2, the controller may properly reduce the power of the heater 53, to save electric energy, or perform adjustment to reduce the rotational speed of the corresponding pump 51 to reduce the flow of the cooling liquid of the cycling branch of the battery, to reduce the heating power, or keep the power of the heater 53 unchanged. When the temperatures of all of the batteries are higher than a preset temperature, for example, 10° C., heating on the batteries is completed, the controller sends information about turning off a temperature adjustment function to the vehicle-mounted air conditioner through CAN communication, and controls the heater 53 to be turned off. If the temperature of a battery is still lower than 10° C. after the temperature adjustment system has entered the heating mode for a relatively long time, for example, 1 hour, the controller properly increases the power of the heater 53, so that the battery completes temperature increase as soon as possible.

According to an embodiment of the present disclosure, the controller is further configured to reduce the rotational speed of the pump 51 in the flow path of the battery when the required power P1 of a battery is less than the corresponding actual power P2, and increase the rotational speed of the pump 51 in the flow path of the battery when the required power P1 of a battery is greater than the corresponding actual power P2.

Specifically, when the temperature adjustment system enters the heating mode or cooling mode, if P1 of a battery is less than P2, the controller controls the rotational speed of the corresponding pump 51 to be reduced, to save electric energy. If P1 of a battery is greater than P2, in addition to controlling the power of the corresponding heater 53 or compressor 1 to be increased or the flow of the cooling liquid in the loop in which the battery is located to be increased, the controller further controls the rotational speed of the pump 51 to be increased, to increase a mass of the cooling liquid flowing through a cross section of the cooling flow path within a unit time, thereby increasing the actual power P2 of the battery, to implement temperature adjustment within the target time t.

It may be understood that, when the temperature adjustment system operates in the cooling mode, as shown in FIG. 31, the controller may respectively calculate the required power P1 of the first battery 61 and the required power P1 of the second battery 62, and then adjust the opening degree of the corresponding second expansion valve 42 according to P1 of each battery and the maximum refrigerating power P of the corresponding compressor. In the cooling process, the controller further continues to adjust the opening degree of the second expansion valve 42 according to the actual power P2 of each battery. Moreover, the controller adjusts allocation of the flow of the cooling liquid in the first battery cooling branch 401 and the second battery cooling branch 402 according to a temperature situation between the first battery 61 and the second battery 62 by adjusting the opening degrees of the first to the fourth adjustment valves 411 to 414, thereby controlling temperature balancing between the first battery 61 and the second battery 62. When the temperature of the first battery 61 is higher than the temperature of the second battery 62 and a difference between them exceeds a set value, opening degrees of the first adjustment valve 411 and the third adjustment valve 413 may be increased, and opening degrees of the second adjustment valve 412 and the fourth adjustment valve 414 may be reduced, to increase the cooling power of the first battery 61; when the temperature of the first battery 61 and the temperature of the second battery 62 are equal, opening degrees of the first to the fourth adjustment valves 411 to 414 may be controlled to be the same. When the temperature adjustment system operates in the heating mode, and the temperature of the first battery 61 is lower than the temperature of the second battery 62 and the difference exceeds the set value, the controller increases the heating power of the heater 53 corresponding to the first battery 61. Therefore, temperature balancing between two batteries may be kept.

To make a person skilled in the art more clearly understand the present disclosure, an operating process of the temperature adjustment system for a vehicle-mounted battery is described below with reference to specific examples.

Compared with the temperature adjustment systems shown in FIG. 13 and FIG. 14, an intra-vehicle cooling loop is added to FIG. 31. Only the differences are listed below, and the rest is not described.

As shown in FIG. 31, when there are a plurality of batteries, a plurality of intra-vehicle cooling loops 3, and a plurality of battery cooling branches 4, the plurality of batteries are disposed independently, and the temperature adjustment system enters the cooling mode, the controller obtains P1 of each battery 6, the actual power P2 of each battery, and the maximum refrigerating power P of a single compressor; and may calculate the total required power Pz of the entire temperature adjustment system by adding P1 of each battery, obtain the total actual power Pf for temperature adjustment by adding the actual power P2 of each battery, and may calculate a sum P5 of the maximum refrigerating powers of all compressors by adding the maximum refrigerating power of each compressor. The required power of the first battery 61 is P11, and the required power of the second battery 62 is P12. The actual power of the first battery 61 is P21, and the actual power of the second battery 62 is P22. P51 is the maximum refrigerating power of the first compressor 11, and P52 is the maximum refrigerating power of the second compressor 12.

If Pz≤P51, only one compressor 1 needs to be controlled to operate, to provide the refrigerating power, and two compressors 1 may alternatively be controlled to operate together. If P51<Pz≤P5, two compressors 1 need to operate together, and an initial refrigerating power of each compressor is Pz/2, or be of another power combination form, so that a sum of the refrigerating powers of the two compressors is Pz. If Pz>P5, each compressor runs according to the maximum refrigerating power.

When intra-vehicle cooling and battery cooling are both turned on, if the area temperature of the air outlet 1 and the air outlet 2 is T51, and the area temperature of the air outlet 3 and the air outlet 4 is T52, determining is performed as follows:

If T51−T52≥Tc, and Tc is 3° C., processing is performed as follows:

If Pz+P4≤P5, the controller controls the refrigerating power of the first compressor 11 to be increased, or controls the opening degree of the expansion valve of the battery cooling branch in the refrigerating loop of the first compressor 11 to be reduced, and controls the opening degree of the expansion valve of the intra-vehicle cooling loop to be increased; or controls the opening degree of the expansion valve of the battery cooling branch in the refrigerating loop of the second compressor 12 to be increased, and controls the opening degree of the expansion valve of the intra-vehicle cooling loop to be reduced, so that the temperature T51 is reduced quickly, and moreover the cooling power requirement of the battery is satisfied, to achieve a balanced intra-vehicle ambient temperature.

If Pz+P4>P5, the controller controls the first compressor 11 and the second compressor 12 to run at the maximum refrigerating power, or controls the opening degree of the expansion valve of the battery cooling branch in the refrigerating loop of the first compressor 11 to be reduced, and controls the opening degree of the expansion valve of the intra-vehicle cooling loop to be increased; or controls the opening degree of the expansion valve of the battery cooling branch in the refrigerating loop of the second compressor 12 to be increased, and controls the opening degree of the expansion valve of the intra-vehicle cooling loop to be reduced, so that the temperature T51 is reduced quickly, and moreover the cooling power requirement of the battery is satisfied, to achieve a balanced intra-vehicle ambient temperature.

If T51−T52≥Tc, and Tc is 3° C., processing may also be performed as follows:

The controller controls the battery cooling branch in the refrigerating loop of the first compressor 11 to be turned off, and controls the opening degree of the expansion valve of the intra-vehicle cooling loop to be increased, so that all of the refrigerating power of the first compressor 11 is used for intra-vehicle cooling. Moreover, the controller controls the opening degree of the expansion valve of the battery cooling branch in the refrigerating loop of the second compressor 12 to be increased, and controls the opening degree of the expansion valve of the intra-vehicle cooling loop to be reduced, to increase the battery cooling power, so that the temperature T51 is reduced quickly, and moreover the cooling power requirement of the battery is satisfied, to achieve a balanced intra-vehicle ambient temperature.

To sum up, the temperature adjustment system for a vehicle-mounted battery according to this embodiment of the present disclosure obtains the required power for temperature adjustment and the actual power for temperature adjustment through the battery temperature adjustment module, and obtains the area temperatures of the plurality of areas in the vehicle and the air conditioner set temperature; adjusts the opening degrees of the plurality of intra-vehicle cooling branches, the plurality of battery cooling branches and the plurality of refrigerating branches are adjusted according to the required powers for temperature adjustment, the actual powers for temperature adjustment, the plurality of area temperatures and the air conditioner set temperature; and adjusts, according to the required powers for temperature adjustment and the actual powers for temperature adjustment on the batteries, opening degrees of refrigerating capacities provided by the plurality of compressors to the battery cooling branches corresponding to the batteries. Therefore, the system allocates refrigerating capacities to a battery and the areas in the compartment according to an actual status of each battery, the plurality of area temperatures in the compartment, and the air conditioner set temperature, thereby not only adjusting the temperature of the battery when the temperature is excessively high or excessively low, to maintain the temperature of the battery within a preset range, but also balancing the temperatures of the areas in the compartment and the temperatures between the batteries.

Figure 32:
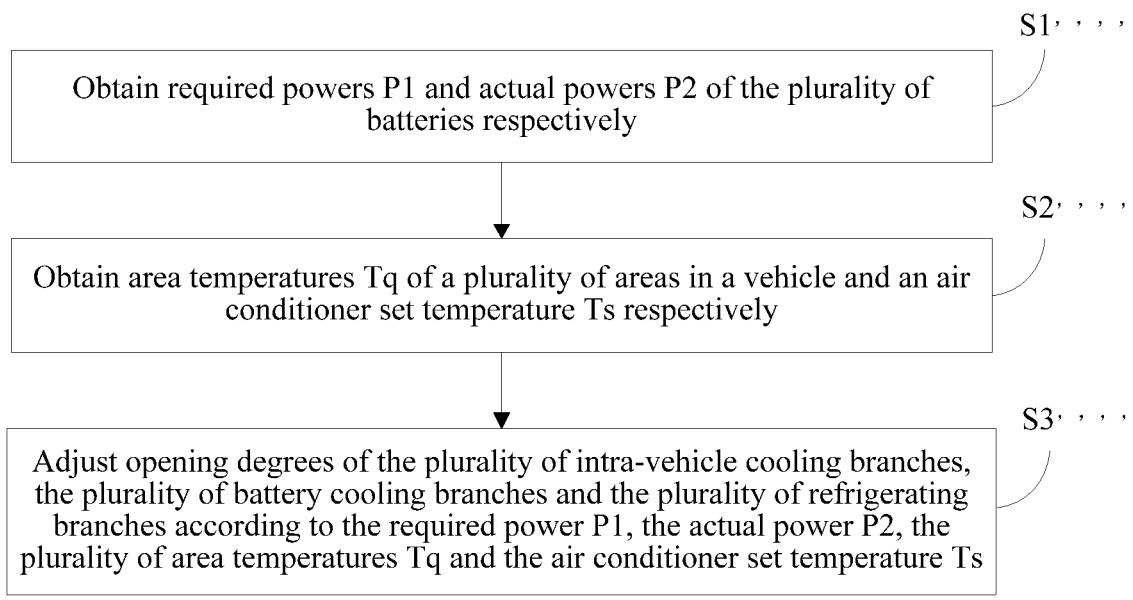
FIG. 32 is a flowchart of a temperature adjustment method for a vehicle-mounted battery according to an eighteenth embodiment of the present disclosure.

When the temperature adjustment system for a vehicle-mounted battery includes a plurality of refrigerating branches, a plurality of battery cooling branches corresponding to the plurality of refrigerating branches, a plurality of intra-vehicle cooling branches, a plurality of batteries and a plurality of battery temperature adjustment modules connected between the plurality of batteries and the plurality of battery cooling branches, as shown in FIG. 32, the temperature adjustment method for a vehicle-mounted battery includes the following steps:

S1"". Obtain required powers P1 and actual powers P2 of the plurality of batteries respectively.

According to an embodiment of the present disclosure, the obtaining required powers for temperature adjustment on a plurality of batteries respectively specifically includes the following steps: obtaining a first parameter of each battery when enabling temperature adjustment, and generating a first required power of each battery according to the first parameter; obtaining a second parameter of each battery when enabling temperature adjustment, and generating a second required power of each battery according to the second parameter; and generating a required power P1 of a battery cooling branch according to the first required power and the second required power of each battery.

Optionally, according to an embodiment of the present disclosure, the first parameter is an initial temperature when enabling temperature adjustment on the battery, the target temperature, and a target time t for reaching the target temperature from the initial temperature, and the generating a first required power according to the first parameter specifically includes: obtaining a first temperature difference $\Delta T_1$ between the initial temperature and the target temperature; and generating the first required power according to the first temperature difference $\Delta T_1$ and the target time t.

Optionally, according to an embodiment of the present disclosure, the first required power is generated through the following formula (1):

$$\Delta T_1 * C * M / t \tag{1}$$

where $\Delta T_1$ is the first temperature difference between the initial temperature and the target temperature, t is the target time, C is a specific heat capacity of the battery, and M is a mass of the battery.

According to an embodiment of the present disclosure, the second parameter is an average current I of the battery within a preset time, and the second required power is generated through the following formula (2):

$$I^2 * R \tag{2}$$

where I is the average current, and R is an internal resistance of the battery.

When the battery is cooled, $P1=\Delta T_1*C*M/t+I^2*R$; and when the battery is heated, $P1=\Delta T_1*C*M/t-I^2*R$.

According to an embodiment of the present disclosure, the obtaining actual powers P2 of a plurality of batteries specifically includes: obtaining inlet temperatures and outlet temperatures of flow paths used for adjusting temperatures of the plurality of batteries, and obtaining flow velocities v at which a cooling liquid flows into the flow paths; generating second temperature differences $\Delta T_2$ of the plurality of batteries according to the inlet temperatures and the outlet temperatures of the flow paths of the plurality of batteries; and generating the actual powers P2 of the plurality of batteries according to the second temperature differences $\Delta T_2$ of the plurality of batteries and the flow velocities v.

Optionally, according to an embodiment of the present disclosure, the actual power P2 is generated through the following formula (3):

$$\Delta T_2 * c * m \tag{3}$$

where $\Delta T_2$ is the second temperature difference, c is a specific heat capacity of the cooling liquid in the flow path, and m is a mass of the cooling liquid flowing through a cross section of the flow path within a unit time, where $m=v*\rho*s$, v is a flow velocity of the cooling liquid, and $\rho$ is a density of the cooling liquid.

S2"". Obtain area temperatures Tq of a plurality of areas in the vehicle and an air conditioner set temperature Ts respectively.

S3"". Adjust opening degrees of the plurality of intra-vehicle cooling branches, the plurality of battery cooling branches and the plurality of refrigerating branches according to the required power P1, the actual power P2, the plurality of area temperatures Tq and the air conditioner set temperature Ts. The plurality of battery cooling branches are in communication with each other, and opening degrees of refrigerating capacities provided by the plurality of compressors to the battery cooling branches corresponding to the batteries are adjusted according to the required powers P1 and the actual powers P2 of the batteries.

Optionally, according to an embodiment of the present disclosure, the opening degrees of the plurality of intra-vehicle cooling branches, the plurality of battery cooling branches and the plurality of refrigerating branches are adjusted within the target time t according to the required power P1, the actual power P2, the plurality of area temperatures Tq, and the air conditioner set temperature Ts, to reach the target temperature.

The battery may be a battery pack or a battery module. The batteries are disposed independent of each other.

Specifically, using two refrigerating branches, two battery cooling branches, two intra-vehicle cooling branches and two batteries as an example, the batteries are respectively a first battery and a second battery, the refrigerating branches are respectively a first refrigerating branch and a second refrigerating branch, the battery cooling branches are respectively a first battery cooling branch and a second battery cooling branch, and the intra-vehicle cooling branches are respectively a first intra-vehicle cooling branch and a second intra-vehicle cooling branch.

When the temperature of the first battery and/or the second battery is excessively high/excessively low, temperature adjustment needs to be performed on the first battery and/or the second battery. The required power P1 and the actual power P2 are obtained, and opening degrees of the plurality of battery cooling branches are adjusted according to P1 and P2, to adjust the cooling power of the battery; and the plurality of area temperatures Tq and the air conditioner set temperature Ts are obtained, and the opening degree of each battery cooling branch is controlled according to Tq and Ts. For example, if Tq of an area is relatively high and greatly different from Tq of another area, the opening degree of the intra-vehicle cooling branch for cooling the area is controlled to be increased, and moreover the opening degree of the corresponding battery cooling branch is controlled to be reduced. Moreover, to ensure that the cooling power of the battery is unchanged, the opening degree of another intra-vehicle cooling branch is controlled to be reduced, and moreover the opening degree of the corresponding battery cooling branch is controlled to be increased. Therefore, the method allocates refrigerating capacities to a battery and the areas in the compartment according to an actual status of each battery, the plurality of area temperatures in the compartment, and the air conditioner set temperature, thereby not only adjusting the temperature of the battery when the temperature is excessively high or excessively low, to maintain the temperature of the battery within a preset range, but also balancing the temperatures of the areas in the compartment. Moreover, because the plurality of battery cooling branches are in communication with each other, the opening degrees of the refrigerating capacities of the battery cooling branches 4 corresponding to the batteries may be adjusted according to the temperatures of the batteries, to ensure temperature balancing between the batteries.

How to adjust opening degrees of the plurality of intra-vehicle cooling branches, the plurality of battery cooling branches and the plurality of refrigerating branches according to the required power P1, the actual power P2, the plurality of area temperatures Tq and the air conditioner set temperature Ts is described below with reference to a specific embodiment.

According to an embodiment of the present disclosure, when there are a plurality of vehicle-mounted batteries disposed independently, and there are a plurality of intra-vehicle cooling branches, a plurality of battery cooling branches and a plurality of refrigerating branches, the foregoing temperature adjustment method for a vehicle-mounted battery may further include: generating a total required power Pz according to a required power P1 of each battery; generating a total maximum refrigerating power P5 of a plurality of compressors according to maximum refrigerating powers P of the plurality of compressors; determining whether the total required power Pz is greater than the total maximum refrigerating power P5 of the plurality of compressors; if the total required power Pz is greater than the total maximum refrigerating power P5 of the plurality of compressors, adjusting, to the maximum, opening degrees of refrigerating capacities provided by the plurality of compressors to the battery cooling branches corresponding to the batteries; and if the total required power Pz is less than or equal to the total maximum refrigerating power P5 of the plurality of compressors, adjusting the opening degrees of the refrigerating capacities of the battery cooling branches corresponding to the batteries according to a difference between the total required power Pz and the total maximum refrigerating power P5.

Specifically, the total required power Pz of the entire temperature adjustment system may be calculated according to the required powers P1 of all of the batteries, that is, the total required power Pz is obtained by adding the required powers P1 of all of the batteries. Moreover, the total maximum refrigerating power P5 of the plurality of compressors is calculated according to the maximum refrigerating power P of each compressor, that is, the total maximum refrigerating power P5 may be obtained by adding the maximum refrigerating power P of each compressor. Then, whether Pz>P5 is determined, and if yes, control is performed to adjust the opening degree of each second expansion valve to the maximum, to adjust the flow of the cooling liquid provided by the plurality of compressors to the battery cooling branch corresponding to the battery to the maximum, so that the battery may complete temperature reduction within the target time t. If Pz≤P5, the opening degree of the second expansion valve is adjusted according to a difference between Pz and P5, where a larger absolute value of the difference between Pz and P5 indicates a smaller opening degree of the second expansion valve, to save energy sources.

According to an embodiment of the present disclosure, the battery temperature adjustment method may further include the following steps: detecting temperatures of a plurality of batteries; when the temperature of any one of the plurality of batteries is greater than a first temperature threshold, entering a cooling mode; and when the temperature of any one of the plurality of batteries is less than a second temperature threshold, entering a heating mode. The first temperature threshold and the second temperature threshold may be preset according to an actual situation. For example, the first temperature threshold may be 40° C., and the second temperature threshold may be 0° C.

Specifically, after the vehicle is powered on, the temperature of each battery is detected in real time and determining is performed through the battery management controller. If a temperature of one of the batteries is higher than 40° C., it indicates that the temperature of the battery is excessively high in this case. To prevent the high temperature from affecting performance of the battery, temperature reduction processing needs to be performed on the battery, the temperature adjustment system is controlled through the controller to enter the cooling mode, and information about starting the battery cooling function is sent to the air conditioner system. If a temperature of a battery is less than 0° C., it indicates that the temperature of the battery is excessively low in this case. To prevent the low temperature from affecting performance of the battery, temperature increase processing needs to be performed on the battery, the heating mode is entered, the corresponding battery cooling branch is controlled to be turned off, and the heater is controlled to be turned on, to provide the heating power to the battery.

According to an embodiment of the present disclosure, in the cooling mode, the adjusting opening degrees of the plurality of intra-vehicle cooling branches, the plurality of battery cooling branches and the plurality of refrigerating branches according to the required power P1, the actual power P2, the plurality of area temperatures Tq and the air conditioner set temperature Ts specifically includes: when the required power P1 of the battery cooling branch is greater than the actual power P2, determining whether the temperature of the battery is greater than a third temperature threshold. If the temperature of the battery is greater than the third temperature threshold, the controller reduces opening degrees of the plurality of intra-vehicle cooling branches, and increases opening degrees of the plurality of battery cooling branches, where the opening degrees of the plurality of battery cooling branches are respectively controlled through corresponding valves (that is, the second expansion valves 42). The third temperature threshold is greater than the first temperature threshold. For example, the third temperature threshold may be 45° C.

Specifically, when the temperature adjustment system enters the cooling mode, if P1 is greater than P2, whether the temperature of the battery is greater than 45° C. is determined. If the temperature of any battery is greater than 45° C., it indicates that the temperature of the current battery is excessively high, the opening degree of the first expansion valve 32 is reduced through the vehicle-mounted air conditioner controller, to reduce the flow of the cooling liquid of the intra-vehicle cooling branch, and moreover the opening degree of the second expansion valve 42 is increased, to increase the flow of the cooling liquid of the battery cooling branch. Therefore, by adjusting allocation of the refrigerating capacities of the intra-vehicle cooling branch and the battery cooling branch, temperature adjustment on the battery may be completed within the target time when the temperature of the battery is excessively high.

According to an embodiment of the present disclosure, in the cooling mode, the battery temperature adjustment method further includes: determining whether the required power P1 of each battery is greater than the actual power P2 corresponding to each battery; if a required power P1 of a battery is greater than the actual power P2 of the battery, obtaining a power difference between the required power P1 and the actual power P2 of the battery, and increasing, according to the power difference, the power of the compressor used for cooling the battery, or performing adjustment to increase the flow of the cooling liquid of the cycling branch of the battery, to increase the cooling power of the battery; and if a required power P1 of a battery is less than or equal to the actual power P2 of the battery, reducing the power of the compressor or keeping the power of the compressor unchanged, or performing adjustment to reduce the flow of the cooling liquid of the cycling branch of the battery, to reduce the cooling power of the battery.

Specifically, when the temperature adjustment system enters the cooling mode, if there are a plurality of batteries, P1 and P2 of each battery are obtained, and determining is performed. If P1 for one of the batteries is greater than P2, it indicates that the temperature reduction on the battery cannot be completed within the target time according to the current refrigerating power or flow of the cooling liquid. Therefore, a power difference between P1 and P2 of the battery is obtained, and the power of the compressor is increased or the flow of the cooling liquid of the cycling branch of the battery is increased through the vehicle-mounted air conditioner controller according to the power difference, to increase the cooling power of the battery, where a larger power difference between P1 and P2 indicates larger increase of the power of the compressor and the flow of the cooling liquid of the battery, so that the temperature of the battery is reduced to the target temperature within the preset time t. If P1 on one of the batteries is less than or equal to P2, the power of the compressor may be kept unchanged or the power of the compressor may be properly reduced through the vehicle-mounted air conditioner controller, or the flow of the cooling liquid of the cycling branch of the battery is reduced, to reduce the cooling power of the battery. When the temperatures of all of the batteries are less than 35° C., cooling on the batteries is completed, information about turning off a temperature adjustment function is sent to the vehicle-mounted air conditioner through CAN communication, and the second electronic valve is controlled through the vehicle-mounted air conditioner controller to be turned off. If the temperature of a battery is still higher than 35° C. after the temperature adjustment system has entered the cooling mode for a relatively long time, for example, 1 hour, the power of the compressor is properly increased through the vehicle-mounted air conditioner controller, so that the battery completes temperature reduction as soon as possible.

According to an embodiment of the present disclosure, if the temperature of the battery is less than the third temperature threshold, whether the intra-vehicle temperature is equal to the air conditioner set temperature Ts is further determined; and if the intra-vehicle temperature is equal to the air conditioner set temperature Ts, the opening degrees of the plurality of intra-vehicle cooling branches are reduced, and the opening degrees of the plurality of battery cooling branches are increased.

Specifically, when the temperature adjustment system enters the cooling mode, if the temperature of each battery is less than 45° C., the controller determines whether the intra-vehicle temperature reaches the air conditioner set temperature Ts. If yes, the flow of the cooling liquid of the battery cooling branch is increased through the controller, and the flow of the cooling liquid of the intra-vehicle cooling branch is reduced, to complete the temperature reduction of the battery as soon as possible. If the intra-vehicle temperature has not reached the air conditioner set temperature Ts, the intra-vehicle refrigerating requirement is preferentially satisfied, and the controller increases the flow of the cooling liquid of the intra-vehicle cooling branch, and reduces the flow of the cooling liquid of the battery cooling branch.

Moreover, layered processing is further performed on the temperature of the battery, and temperature control thresholds are respectively 40° C., 45° C., and 35° C. When the temperature of the battery is higher than 40° C., the battery cooling function is started; and when the temperature of the battery is reduced to 35° C., cooling of the battery is completed. When the temperature of the battery reaches 45° C., the battery cooling requirement is preferentially satisfied. Additionally, when the required power P1 is greater than the actual power P2, if the temperature of the battery does not exceed 45° C., the intra-vehicle refrigerating requirement is still preferentially satisfied; and if the intra-vehicle refrigerating power has been sufficient and balanced, the opening degree of the battery cooling branch is increased, to increase the cooling power of the battery. If the required power P1 is less than or equal to the actual power P2, the intra-vehicle refrigerating requirement may be preferentially satisfied.

According to an embodiment of the present disclosure, the reducing opening degrees of the plurality of intra-vehicle cooling branches specifically includes: obtaining a temperature difference between the plurality of area temperatures; determining whether the temperature difference is greater than the fourth temperature threshold; and when the temperature difference is greater than the fourth temperature threshold, increasing the opening degree of the intra-vehicle cooling branch corresponding to the refrigerating branch in which the air outlet with a high temperature is located, and reducing the opening degree of the battery cooling branch corresponding to the refrigerating branch in which the air outlet with a high temperature is located. The fourth temperature threshold may be preset according to an actual situation, for example, may be 3° C.

Optionally, according to an embodiment of the present disclosure, the temperature adjustment method for a vehicle-mounted battery further includes: reducing the opening degree of the intra-vehicle cooling branch corresponding to the refrigerating branch in which the air outlet with a low temperature is located, and increasing the opening degree of the battery cooling branch corresponding to the refrigerating branch in which the air outlet with a low temperature is located.

Specifically, in a battery cooling process, if the air conditioner needs to be turned on in the vehicle, the ambient temperature in the compartment needs to be monitored and controlled, so that ambient temperatures at places in the vehicle are kept balanced, and moreover the battery cooling requirement can be satisfied. As shown in FIG. 28, when it is detected that the area temperature Tq at the air outlet 1 and the air outlet 2 is higher than the area temperature Tq at places near the air outlet 3 and the air outlet 4 by more than 3° C., the opening degree in the first intra-vehicle cooling branch is increased, and the opening degree in the first battery cooling branch is reduced, so that the cooling power in the first intra-vehicle cooling branch is relatively large. The cooling opening degree in the second intra-vehicle cooling branch is further reduced, and the opening degree of the second battery cooling branch is increased, so that the cooling power in the second intra-vehicle cooling branch is relatively small. Therefore, the cooling power of the first battery cooling branch and the cooling power of the second battery cooling branch may be kept unchanged, and moreover area air temperatures near the air outlets in the vehicle are kept balanced. When the vehicle-mounted air conditioner detects that a difference between the area air temperature Tq near the air outlet 1 and the air outlet 2 and the area air temperature Tq near the air outlet 3 and the air outlet 4 is within 3° C., the opening degrees of the first expansion valves in the first intra-vehicle cooling branch and the second intra-vehicle cooling branch are controlled to be the same, to ensure that the cooling power of the first intra-vehicle cooling branch and the cooling power of the second intra-vehicle cooling branch are the same.

According to an embodiment of the present disclosure, in the heating mode, the method further includes: determining whether the required power P1 of a battery is greater than the actual power P2 of the battery; if a required power P1 of a battery is greater than the actual power P2 corresponding to the battery, obtaining a power difference between the required power P1 and the actual power P2 of the battery, and increasing, according to the power difference, the power of the heater used for cooling the battery, or performing adjustment to increase the flow of the cooling liquid of the cycling branch of the battery, to increase the heating power of the battery; and if a required power P1 of a battery is less than or equal to the actual power P2 corresponding to the battery, reducing the power of the heater or keeping the power of the heater unchanged, or performing adjustment to reduce the flow of the cooling liquid of the cycling branch of the battery, to reduce the heating power of the battery.

Specifically, when the temperature adjustment system enters the heating mode, P1 and P2 of each battery are obtained, and determining is performed. If P1 for one of the batteries is greater than P2, it indicates that temperature increase on the battery cannot be completed within the target time according to the current heating power or flow of the cooling liquid. Therefore, a power difference between P1 and P2 of the battery is obtained, and the power of the heater used for heating the battery is increased according to the power difference, or adjustment is performed to increase the rotational speed of the corresponding pump, to increase the flow of the cooling liquid of the cycling branch of the battery, so that temperature adjustment on the battery may be completed within the target time t. A larger difference between P1 and P2 indicates larger increase of the power of the heater. If P1 of a battery is less than or equal to P2, the power of the heater may be properly reduced, to save electric energy, or adjustment is performed to reduce the rotational speed of the corresponding pump to reduce the flow of the cooling liquid of the cycling branch of the battery, to reduce the heating power, or the power of the heater is kept unchanged. When the temperatures of all of the batteries are higher than a preset temperature, for example, 10° C., heating on the batteries is completed, information about turning off a temperature adjustment function is sent to the vehicle-mounted air conditioner through CAN communication, and the heater is controlled through the battery heat management controller to be turned off. If the temperature of a battery is still lower than 10° C. after the temperature adjustment system has entered the heating mode for a relatively long time, for example, 1 hour, the power of the heater is properly increased through the battery heat management controller, so that the battery completes temperature increase as soon as possible.

According to an embodiment of the present disclosure, the temperature adjustment method for a vehicle-mounted battery may further include: reducing, if the required power P1 of a battery is less than the corresponding actual power P2, the rotational speed of the pump in the flow path of the battery; and increasing, if the required power P1 of a battery is greater than the corresponding actual power P2, the rotational speed of the pump in the flow path of the battery.

Specifically, when the temperature adjustment system enters the heating mode or cooling mode, if P1 of a battery is less than P2, the rotational speed of the corresponding pump is controlled to be reduced, to save electric energy. If P1 of a battery is greater than P2, in addition to controlling the power of the corresponding heater or compressor to be increased or the flow of the cooling liquid in the loop in which the battery is located to be increased, the controller further controls the rotational speed of the pump to be increased, to increase a mass of the cooling liquid flowing through a cross section of the cooling flow path within a unit time, thereby increasing the actual power P2 of the battery, to implement temperature adjustment within the target time t.

Compared with the temperature adjustment systems shown in FIG. 13 and FIG. 14, an intra-vehicle cooling loop is added to FIG. 31. Only the differences are listed below, and the rest is not described.

As shown in FIG. 31, when there are a plurality of batteries, a plurality of intra-vehicle cooling loops, and a plurality of battery cooling branches, the plurality of batteries are disposed independently, and the temperature adjustment system enters the cooling mode, the controller obtains P1 of each battery, the actual power P2 of each battery, and the maximum refrigerating power P of a single compressor; and may calculate the total required power Pz of the entire temperature adjustment system by adding P1 of each battery, obtain the total actual power Pf for temperature adjustment by adding the actual power P2 of each battery, and may calculate a sum P5 of the maximum refrigerating powers of all compressors by adding the maximum refrigerating power of each compressor. The required power of the first battery is P11, and the required power of the second battery is P12. The actual power of the first battery is P21, and the actual power of the second battery is P22. P51 is the maximum refrigerating power of the first compressor 11, and P52 is the maximum refrigerating power of the second compressor.

If Pz≤P51, only one compressor needs to be controlled to operate, to provide the refrigerating power, and two compressors may alternatively be controlled to operate together. If P51<Pz≤P5, two compressors need to operate together, and an initial refrigerating power of each compressor is Pz/2, or be of another power combination form, so that a sum of the refrigerating powers of the two compressors is Pz. If Pz>P5, each compressor runs according to the maximum refrigerating power.

When intra-vehicle cooling and battery cooling are both turned on, if the area temperature of the air outlet 1 and the air outlet 2 is T51, and the area temperature of the air outlet 3 and the air outlet 4 is T52, determining is performed as follows:

If T51−T52≥Tc, and Tc is 3° C., processing is performed as follows:

If Pz+P4≤P5, the controller controls the refrigerating power of the first compressor to be increased, or controls the opening degree of the expansion valve of the battery cooling branch in the refrigerating loop of the first compressor to be reduced, and controls the opening degree of the expansion valve of the intra-vehicle cooling loop to be increased; or controls the opening degree of the expansion valve of the battery cooling branch in the refrigerating loop of the second compressor to be increased, and controls the opening degree of the expansion valve of the intra-vehicle cooling loop to be reduced, so that the temperature T51 is reduced quickly, and moreover the cooling power requirement of the battery is satisfied, to achieve a balanced intra-vehicle ambient temperature.

If Pz+P4>P5, the controller controls the first compressor 11 and the second compressor 12 to run at the maximum refrigerating power, or controls the opening degree of the expansion valve of the battery cooling branch in the refrigerating loop of the first compressor 11 to be reduced, and controls the opening degree of the expansion valve of the intra-vehicle cooling loop to be increased; or controls the opening degree of the expansion valve of the battery cooling branch in the refrigerating loop of the second compressor to be increased, and controls the opening degree of the expansion valve of the intra-vehicle cooling loop to be reduced, so that the temperature T51 is reduced quickly, and moreover the cooling power requirement of the battery is satisfied, to achieve a balanced intra-vehicle ambient temperature.

If T51−T52≥Tc, and Tc is 3° C., processing may also be performed as follows:

The controller controls the battery cooling branch in the refrigerating loop of the first compressor to be turned off, and controls the opening degree of the expansion valve of the intra-vehicle cooling loop to be increased, so that all of the refrigerating power of the first compressor is used for intra-vehicle cooling. Moreover, the controller controls the opening degree of the expansion valve of the battery cooling branch in the refrigerating loop of the second compressor to be increased, and controls the opening degree of the expansion valve of the intra-vehicle cooling loop to be reduced, to increase the battery cooling power, so that the temperature T51 is reduced quickly, and moreover the cooling power requirement of the battery is satisfied, to achieve a balanced intra-vehicle ambient temperature.

In the temperature adjustment method for a vehicle-mounted battery according to this embodiment of the present disclosure, first, the required powers for temperature adjustment and the actual powers for temperature adjustment on the plurality of batteries are obtained respectively; then, the area temperatures of the plurality of areas in the vehicle and the air conditioner set temperature are obtained respectively; and then the opening degrees of the plurality of intra-vehicle cooling branches, the plurality of battery cooling branches and the plurality of refrigerating branches are adjusted according to the required powers for temperature adjustment, the actual powers for temperature adjustment, the plurality of area temperatures and the air conditioner set temperature. Therefore, the method allocates refrigerating capacities to a battery and the areas in the compartment according to an actual status of each battery, the plurality of area temperatures in the compartment, and the air conditioner set temperature, thereby not only adjusting the temperature of the battery when the temperature is excessively high or excessively low, to maintain the temperature of the battery within a preset range, but also balancing the temperatures of the areas in the compartment and the temperatures between the batteries.

When there are one battery, a plurality of refrigerating branches, a plurality of intra-vehicle cooling branches, and a plurality of battery cooling branches, the temperature adjustment system for a vehicle-mounted battery includes: the plurality of refrigerating branches, the plurality of intra-vehicle cooling branches, the plurality of battery cooling branches, and a battery temperature adjustment module 5.

Figure 33:
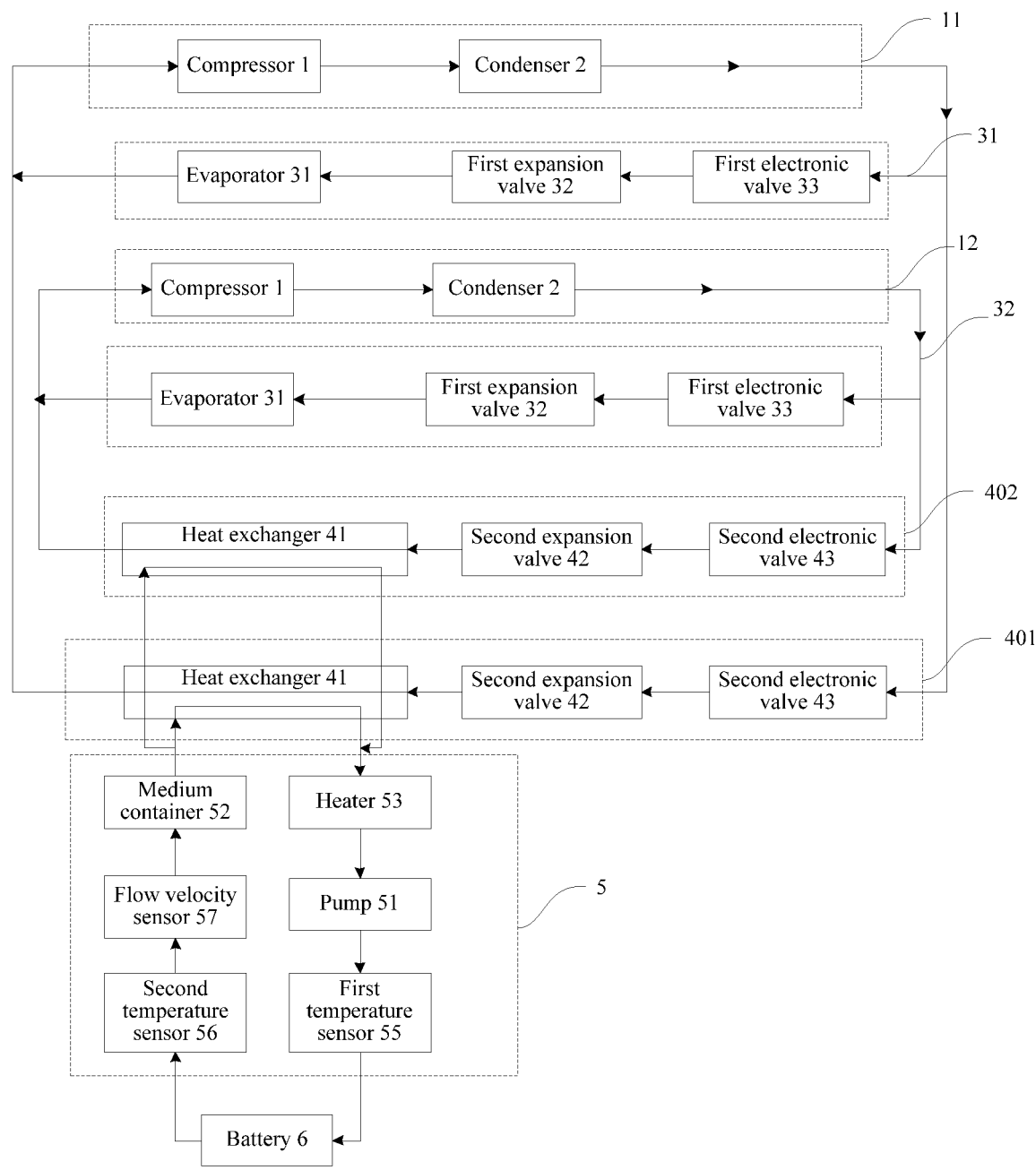
FIG. 33 is a schematic diagram 1 of a flow path structure of a temperature adjustment system for a vehicle-mounted battery according to an eleventh embodiment of the present disclosure.
Figure 34:
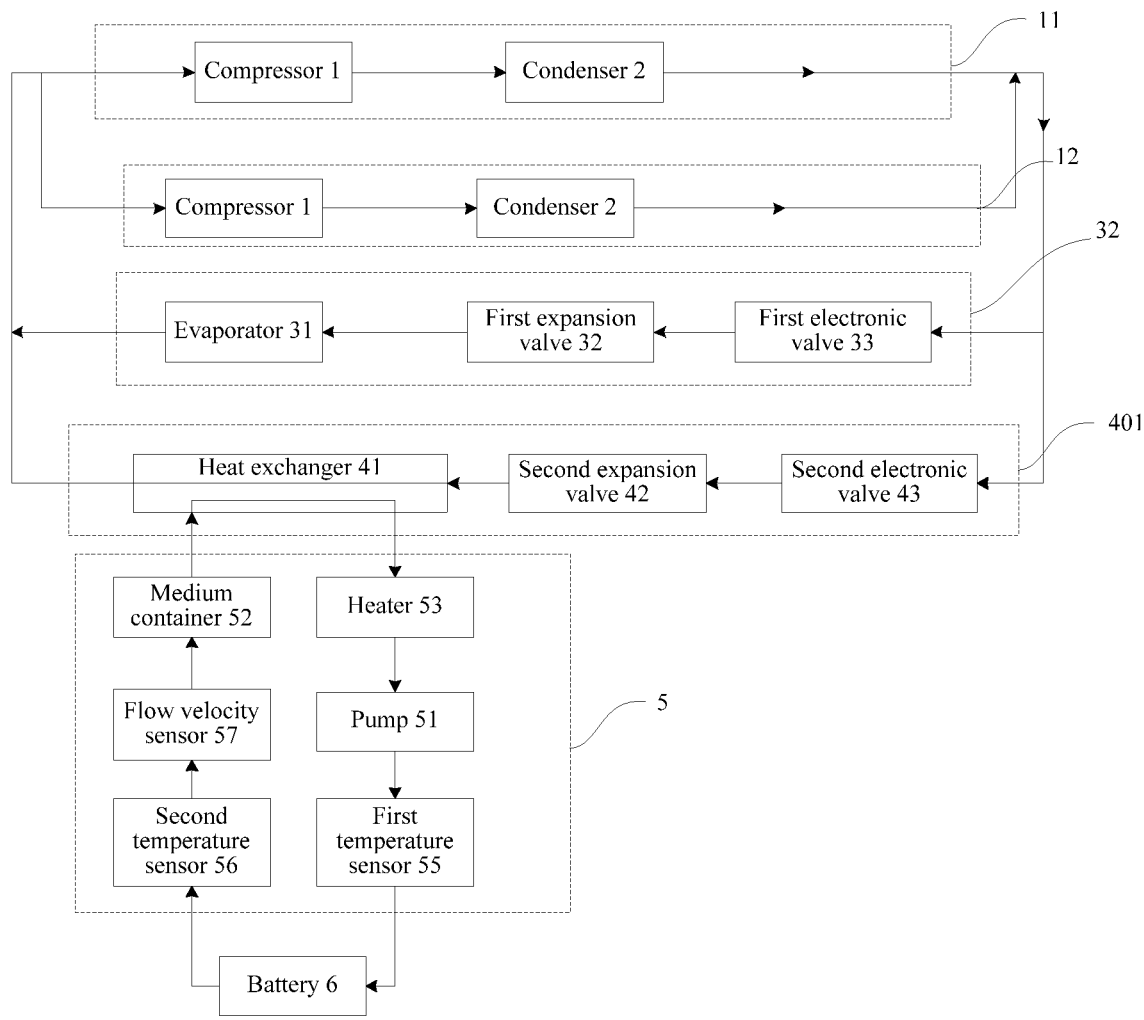
FIG. 34 is a schematic diagram 2 of a flow path structure of a temperature adjustment system for a vehicle-mounted battery according to an eleventh embodiment of the present disclosure.
Figure 35:
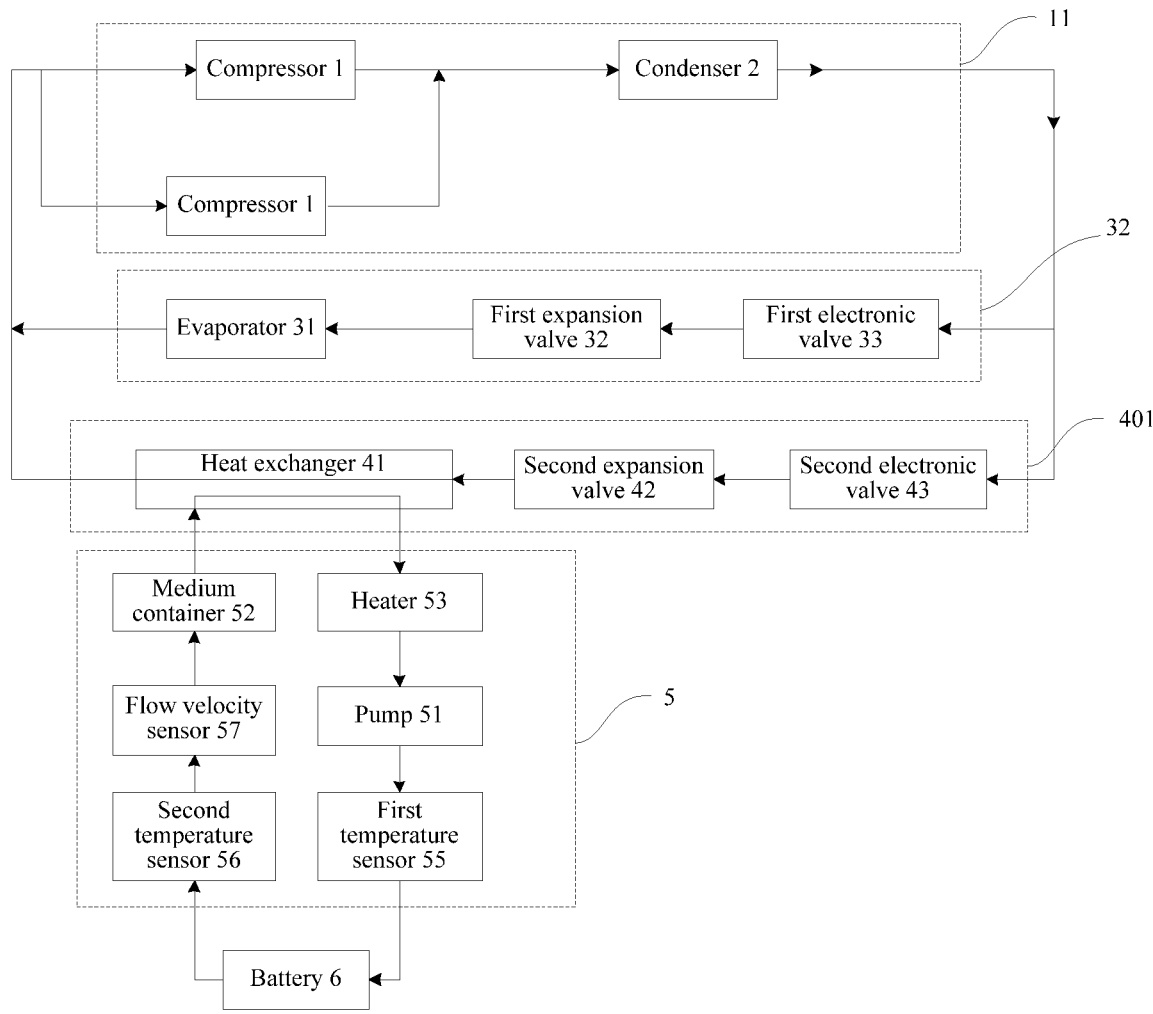
FIG. 35 is a schematic diagram 3 of a flow path structure of a temperature adjustment system for a vehicle-mounted battery according to an eleventh embodiment of the present disclosure.

As shown in FIG. 33, each refrigerating branch includes a compressor 1, and a condenser 2 connected to the compressor 1. The plurality of intra-vehicle cooling branches are respectively connected to the plurality of refrigerating branches. The battery temperature adjustment module 5 is connected to the battery 6 and a battery cooling branch, and is used for obtaining a required power P1 and an actual power P2, obtaining area temperatures Tq of a plurality of areas in the vehicle and an air conditioner set temperature Ts, and adjusting powers of the plurality of intra-vehicle cooling branches, the plurality of battery cooling branches and the plurality of refrigerating branches according to the required power P1, the actual power P2, the plurality of area temperatures Tq, and the air conditioner set temperature Ts.

The battery may be a battery pack or a battery module.

Optionally, according to an embodiment of the present disclosure, the battery temperature adjustment module 5 adjusts the powers of the plurality of intra-vehicle cooling branches, the plurality of battery cooling branches and the plurality of refrigerating branches within the target time t according to the required power P1, the actual power P2, the plurality of area temperatures Tq, and the air conditioner set temperature Ts, to reach the target temperature. When the temperature of the battery is excessively high or excessively low, temperature adjustment on the battery needs to be performed. The battery temperature adjustment module 5 obtains the required power P1 and the actual power P2 of the battery 6, and adjusts opening degrees of the plurality of battery cooling branches according to P1 and P2, to adjust the cooling power of the battery; and the battery temperature adjustment module 5 obtains the plurality of area temperatures Tq and the air conditioner set temperature Ts, and controls the opening degree of each battery cooling branch according to Tq and Ts. For example, if Tq of an area is relatively high and greatly different from Tq of another area, the battery temperature adjustment module 5 controls the opening degree of the intra-vehicle cooling branch for cooling the area to be increased, and moreover controls the opening degree of the corresponding battery cooling branch to be reduced. Moreover, to ensure that the cooling power of the battery is unchanged, the battery temperature adjustment module 5 controls the opening degree of another intra-vehicle cooling branch to be reduced, and moreover controls the opening degree of the corresponding battery cooling branch to be increased. Therefore, the system allocates refrigerating capacities to a battery and the areas in the compartment according to an actual status of the battery, the plurality of area temperatures in the compartment, and the air conditioner set temperature, thereby not only adjusting the temperature of the battery when the temperature is excessively high or excessively low, to maintain the temperature of the battery within a preset range, but also balancing the temperatures of the areas in the compartment.

It may be understood that, the battery temperature adjustment module 5 has a refrigerating power provided by the vehicle-mounted air conditioner, and shares a refrigerating capacity with an intra-vehicle refrigerating system, thereby reducing the volume of the temperature adjustment system, and making allocation of the flow of the cooling liquid more flexible.

According to an embodiment of the present disclosure, the battery cooling branch may include a heat exchanger 41, and the heat exchanger 41 is connected to the battery temperature adjustment module 5. The heat exchanger 41 may include a first duct and a second duct, the second duct is connected to a battery temperature adjustment module 5, and the first duct is in communication with a compressor 1, where the first duct and the second duct are adjacently disposed independent of each other. The battery temperature adjustment module 5 includes: a flow path of adjusting the temperature of the battery (not specifically shown in the figure), where the flow path is disposed in the battery; and a pump 51, a medium container 52, a heater 53, and a controller (not specifically shown in the figure) that are connected between the flow path and the heat exchanger 41. The controller obtains a required power P1 of a battery and an actual power P2 of the battery, and adjusts a temperature of the battery according to the required power P1 and the actual power P2. The intra-vehicle cooling branch may include: an evaporator 31, a first expansion valve 32, and a first electronic valve 33. The battery cooling branch 4 may further include a second expansion valve 42 and a second electronic valve 43.

Specifically, the heat exchanger 41 may be a plate heat exchanger, and the plate heat exchanger may be installed in the vehicle-mounted air conditioner, so that the entire refrigerant loop is in the vehicle-mounted air conditioner, to facilitate pre-delivery commissioning of the vehicle-mounted air conditioner; and the vehicle-mounted air conditioner may be individually supplied and assembled, and moreover, the vehicle-mounted air conditioner only needs to be filled with the refrigerant once in an installing process. The cooling liquid flows into the battery from the inlet of the flow path, and flows out from the outlet of the flow path, thereby implementing heat exchange between the battery and the cooling liquid.

The pump 51 is mainly used for providing power, and the medium container 52 is mainly used for storing the cooling liquid and receiving the cooling liquid added to the temperature adjustment system. When the cooling liquid in the temperature adjustment system is reduced, the cooling liquid in the medium container 52 may be automatically supplemented. The heater 53 may be a PTC heater, may perform CAN communication with the controller, to provide a heating power to the temperature adjustment system for a vehicle-mounted battery, and is controlled by the controller. Moreover, the heater 53 is not in direct contact with the battery 6, to have relatively high safety, reliability, and practicability.

The first temperature sensor 55 is used for detecting the temperature of the cooling liquid on the inlet of the flow path, and the second temperature sensor 56 is used for detecting the temperature of the cooling liquid on the outlet of the flow path. The flow velocity sensor 57 is used for detecting flow velocity information of the cooling liquid in the corresponding duct. The second electronic valve 43 is used for controlling opening and closing of the corresponding battery cooling branch, and the second expansion valve 42 may be used for controlling the flow of the cooling liquid in the corresponding battery cooling branch.

How to obtain the required power P1 and the actual power P2 is described below with reference to a specific embodiment.

According to an embodiment of the present disclosure, the controller may be configured to: obtain a first parameter when enabling temperature adjustment on the battery, and generate a first required power of the battery according to the first parameter; obtain a second parameter when enabling temperature adjustment on the battery, and generate a second required power of the battery according to the second parameter; and generate the required power P1 of the battery according to the first required power of the battery and the second required power of the battery.

Optionally, according to an embodiment of the present disclosure, the first parameter is an initial temperature when enabling temperature adjustment on the battery, the target temperature, and the target time t for reaching the target temperature from the initial temperature, and the controller obtains a first temperature difference $\Delta T_1$ between the initial temperature and the target temperature, and generates the first required power according to the first temperature difference $\Delta T_1$ and the target time t.

Optionally, the controller generates the first required power through the following formula (1):

$$\Delta T_1 * C * M / t \tag{1}$$

where $\Delta T_1$ is the first temperature difference between the initial temperature and the target temperature, t is the target time, C is a specific heat capacity of the battery 6, and M is a mass of the battery.

The second parameter is an average current I of the battery within a preset time, and the controller generates the second required power through the following formula (2):

$$I^2 * R \tag{2}$$

where I is the average current, and R is an internal resistance of the battery 6.

When the battery 6 is cooled, $P1=\Delta T_1 *C*M/t+I^2*R$; and when the battery 6 is heated, $P1=\Delta T_1 *C*M/t-I^2*R$.

According to an embodiment of the present disclosure, the controller generates a second temperature difference $\Delta T_2$ of the battery according to an inlet temperature detected by the first temperature sensor 55 and an outlet temperature detected by the second temperature sensor 56, and generates the actual power P2 of the battery according to the second temperature difference $\Delta T_2$ of the battery and a flow velocity v that is detected by the flow velocity sensor 57.

Optionally, according to an embodiment of the present disclosure, the actual power P2 is generated through the following formula (3):

$$\Delta T_2 *c*m \qquad (3)$$

where $\Delta T_2$ is the second temperature difference, c is a specific heat capacity of the cooling liquid in the flow path, and m is a mass of the cooling liquid flowing through a cross section of the flow path within a unit time, where $m=v*\rho*s$, v is a flow velocity of the cooling liquid, and $\rho$ is a density of the cooling liquid.

Specifically, as shown in FIG. 33, after the vehicle is powered on, the controller determines whether temperature adjustment needs to be performed on the battery 6; and if it is determined that temperature adjustment needs to be performed on the battery 6, enables a temperature adjustment function, and sends information about a low rotational speed to the pump 51, and the pump begins operating at a default rotational speed (for example, low rotational speed). The controller may obtain the initial temperature (that is, current temperature) of the battery 6, the target temperature, and the target time t for reaching the target temperature from the initial temperature, where the target temperature and the target time t may be preset according to an actual situation, and the first required power of the battery 6 is calculated according to the formula (1). Moreover, the controller obtains the average current I of the battery 6 within the preset time, and the second required power of the battery 6 is calculated according to the formula (2). Then, the controller calculates the required power P1 according to the first required power and the second required power of the battery. Moreover, the controller obtains temperature information detected by the first temperature sensor 55 and the second temperature sensor 56, and obtains flow velocity information detected by the flow velocity sensor, and the actual power P2 of the battery is calculated according to the formula (3).

How to adjust the opening degrees of the plurality of intra-vehicle cooling branches (30 and 30), the plurality of battery cooling branches (401 and 402) and the plurality of refrigerating branches (11 and 12) according to the required power P1, the actual power P2, the plurality of area temperatures Tq and the air conditioner set temperature Ts is described below with reference to a specific embodiment.

According to an embodiment of the present disclosure, the controller is further configured to: generate a total maximum refrigerating power P5 of a plurality of compressors according to maximum refrigerating powers P of the plurality of compressors; and determine whether the required power P1 is greater than the total maximum refrigerating power P5 of the plurality of compressors, where when the required power P1 is greater than the total maximum refrigerating power P5 of the plurality of compressors, the controller adjusts, to the maximum, the opening degrees of the refrigerating capacities of the plurality of battery cooling branches; and when the required power P1 is less than or equal to the total maximum refrigerating power P5 of the plurality of compressors, the controller adjusts the opening degrees of the refrigerating capacities of the battery cooling branches according to a difference between the required power P1 and the total maximum refrigerating power P5.

Specifically, as shown in FIG. 33, the controller may calculate the total maximum refrigerating power P5 of the plurality of compressors according to the maximum refrigerating power P of each compressor, that is, obtain the total maximum refrigerating power P5 by adding the maximum refrigerating power P of each compressor. Then, the controller determines whether P1>P5, and if yes, the controller adjusts the opening degree of each second expansion valve 42 to the maximum, to adjust the flow of the cooling liquid provided by the plurality of compressors 1 to the battery cooling branch corresponding to the battery to the maximum, so that the battery 6 may complete temperature reduction within the target time t. If P1≤P5, the controller adjusts the opening degree of the second expansion valve 42 according to a difference between P1 and P5, where a larger absolute value of the difference between P1 and P5 indicates a smaller opening degree of the second expansion valve 42, to save energy sources.

According to an embodiment of the present disclosure, the controller is further configured to: detect the temperature of the battery; control, when the temperature of the battery is greater than a first temperature threshold, the temperature adjustment system to enter a cooling mode; and control, when the temperature of the battery is less than a second temperature threshold, the temperature adjustment system to enter a heating mode. The first temperature threshold and the second temperature threshold may be preset according to an actual situation. For example, the first temperature threshold may be 40° C., and the second temperature threshold may be 0° C.

Specifically, after the vehicle is powered on, the controller detects the temperature of the battery in real time, and performs determining. If the temperature of the battery is higher than 40° C., it indicates that the temperature of the battery 6 is excessively high in this case. To prevent the high temperature from affecting performance of the battery 6, temperature reduction processing needs to be performed on the battery 6, and the controller controls the temperature adjustment system to enter the cooling mode, sends information about starting the battery cooling function to the air conditioner system, and controls the second electronic valve 43 to be turned on, so that the cooling liquid performs heat exchange with the battery to reduce the temperature of the battery.

If the temperature of the battery is less than 0° C., it indicates that the temperature of the battery 6 is excessively low in this case. To prevent the low temperature from affecting performance of the battery, temperature increase processing needs to be performed on the battery 6, the controller controls the temperature adjustment system to enter a heating mode, controls the second electronic valve 43 to be turned off, and controls the heater 53 to be turned on, to provide the heating power to the temperature adjustment system.

According to an embodiment of the present disclosure, in the cooling mode, the controller is further configured to determine, when the required power P1 of the battery cooling branch is greater than the actual power P2, whether the temperature of the battery is greater than the third temperature threshold. If the temperature of the battery is greater than the third temperature threshold, the controller reduces opening degrees of the plurality of intra-vehicle cooling branches, and increases opening degrees of the plurality of battery cooling branches, where the opening degrees of the battery cooling branches are respectively controlled through corresponding valves (that is, the second expansion valves 42). The third temperature threshold is greater than the first temperature threshold. For example, the third temperature threshold may be 45° C.

Specifically, when the temperature adjustment system enters the cooling mode, if P1 is greater than P2, the controller determines whether the temperature of the battery is greater than 45° C. If the temperature of the battery is greater than 45° C., it indicates that the temperature of the current battery 6 is excessively high, the controller reduces the opening degree of the first expansion valve 32, to reduce the flow of the cooling liquid of the intra-vehicle cooling branch, and moreover increases the opening degree of the second expansion valve 42, to increase the flow of the cooling liquid of the battery cooling branch. Therefore, by adjusting allocation of the refrigerating capacities of the intra-vehicle cooling branch and the battery cooling branch, temperature adjustment on the battery may be completed within the target time when the temperature of the battery is excessively high.

According to an embodiment of the present disclosure, in the cooling mode, when the required power P1 of the battery is greater than the actual power P2 of the battery, the controller is further configured to: obtain a power difference between the required power P1 and the actual power P2 of the battery, and increase, according to the power difference, the power of the compressor 1 used for cooling the battery, or perform adjustment to increase the flow of the cooling liquid in the cycling branch of the battery, to increase the cooling power of the battery; or when the required power P1 of the battery is less than or equal to the actual power P2 of the battery, reduce the power of the compressor or keep the power of the compressor unchanged, or perform adjustment to reduce the flow of the cooling liquid in the cycling branch of the battery, to reduce the cooling power of the battery.

Specifically, when the temperature adjustment system enters the cooling mode, the controller obtains P1 and P2 of the battery 6, and performs determining. If P1 is greater than P2, it indicates that the temperature reduction on the battery 6 cannot be completed within the target time according to the current refrigerating power or flow of the cooling liquid. Therefore, the controller obtains a power difference between P1 and P2 of the battery 6, and increases the power of the compressor 1 or increases the flow of the cooling liquid of the cycling branch of the battery according to the power difference, to increase the cooling power of the battery, where a larger power difference between P1 and P2 indicates larger increase of the power of the compressor and the flow of the cooling liquid of the battery, so that the temperature of the battery is reduced to the target temperature within the preset time t. If P1 of the battery 6 is less than or equal to P2, the power of the compressor may be kept unchanged or the power of the compressor may be properly reduced, or the flow of the cooling liquid of the cycling branch of the battery is reduced, to reduce the cooling power of the battery. When the temperature of the battery is less than 35° C., cooling on the battery is completed, the controller sends information about turning off a temperature adjustment function to the vehicle-mounted air conditioner through CAN communication, and controls the second electronic valves 43 to be turned off. If the temperature of the battery is still higher than 35° C. after the temperature adjustment system has entered the cooling mode for a relatively long time, for example, 1 hour, the controller properly increases the power of the compressor, so that the battery 6 completes temperature reduction as soon as possible.

According to an embodiment of the present disclosure, the controller is further configured to reduce the opening degrees of the plurality of intra-vehicle cooling branches and increase the opening degrees of the plurality of battery cooling branches when the temperature of the battery is less than the third temperature threshold and the intra-vehicle temperature is equal to the air conditioner set temperature Ts.

Specifically, when the temperature adjustment system enters the cooling mode, if the temperature of the battery is less than 45° C., the controller determines whether the intra-vehicle temperature reaches the air conditioner set temperature Ts. If yes, the controller reduces the opening degree of the first expansion valve 32, and increases the opening degree of the second expansion valve 42, to increase the flow of the cooling liquid of the battery cooling branch, reduce the flow of the cooling liquid of the intra-vehicle cooling branch, and complete the temperature reduction of the battery as soon as possible. If the intra-vehicle temperature has not reached the air conditioner set temperature Ts, the intra-vehicle refrigerating requirement is preferentially satisfied, and the controller increases the opening degree of the first expansion valve 32, and reduces the opening degree of the second expansion valve 42.

Moreover, layered processing is further performed on the temperature of the battery, and temperature control thresholds are respectively 40° C., 45° C., and 35° C. When the temperature of the battery is higher than 40° C., the battery cooling function is started; and when the temperature of the battery is reduced to 35° C., cooling of the battery is completed. When the temperature of the battery reaches 45° C., the battery cooling requirement is preferentially satisfied. Additionally, when the required power P1 is greater than the actual power P2, if the temperature of the battery does not exceed 45° C., the intra-vehicle refrigerating requirement is still preferentially satisfied; and if the intra-vehicle refrigerating power has been sufficient and balanced, the controller increases the opening degree of the battery cooling branch, to increase the cooling power of the battery. If the required power P1 is less than or equal to the actual power P2, the intra-vehicle refrigerating requirement may be preferentially satisfied.

In an embodiment of the present disclosure, the plurality of refrigerating branches respectively correspond to a plurality of air outlets, and the plurality of area temperatures are temperatures of the plurality of air outlets.

For example, as shown in FIG. 28, 4 air outlets may be disposed in the compartment, and are respectively an air outlet 1 to an air outlet 4. A corresponding area temperature Tq is detected by detecting an air outlet temperature Tc. It is assumed that the air outlet 1 and the air outlet 2 are provided with a refrigerating power by the first refrigerating branch 11, and the air outlet 3 and the air outlet 4 are provided with a refrigerating power by the second refrigerating branch 12.

According to an embodiment of the present disclosure, the controller is further configured to: obtain a temperature difference between the plurality of area temperatures; and when the temperature difference is greater than the fourth temperature threshold, increase the opening degree of the intra-vehicle cooling branch corresponding to the refrigerating branch in which the air outlet with a high temperature is located, and reduce the opening degree of the battery cooling branch corresponding to the refrigerating branch in which the air outlet with a high temperature is located. The fourth temperature threshold may be preset according to an actual situation, for example, may be 3° C.

Optionally, according to an embodiment of the present disclosure, the controller is further configured to reduce the opening degree of the intra-vehicle cooling branch corresponding to the refrigerating branch in which the air outlet with a low temperature is located, and increase the opening degree of the battery cooling branch corresponding to the refrigerating branch in which the air outlet with a low temperature is located.

Specifically, in a battery cooling process, if the air conditioner needs to be turned on in the vehicle, the ambient temperature in the compartment needs to be monitored and controlled, so that ambient temperatures at places in the vehicle are kept balanced, and moreover the battery cooling requirement can be satisfied. As shown in FIG. 28, when it is detected that the area temperature Tq at the air outlet 1 and the air outlet 2 is higher than the area temperature Tq at places near the air outlet 3 and the air outlet 4 by more than 3° C., the opening degree of the first expansion valve 32 in the first intra-vehicle cooling branch 301 is controlled to be increased, and moreover the opening degree of the second expansion valve 42 in the first battery cooling branch 401 is controlled to be reduced, so that the cooling power in the first intra-vehicle cooling branch 301 is increased. The controller further controls the opening degree of the first expansion valve 32 in the second intra-vehicle cooling branch 302 to be reduced, and the opening degree of the second expansion valve 42 in the second battery cooling branch 402 to be increased, so that the cooling power in the second intra-vehicle cooling branch 302 is relatively small. Therefore, the cooling power of the first battery cooling branch 301 and the cooling power of the second battery cooling branch 302 may be kept unchanged, and moreover area air temperatures near the air outlets in the vehicle are kept balanced. When the vehicle-mounted air conditioner detects that a difference between the area air temperature Tq near the air outlet 1 and the air outlet 2 and the area air temperature Tq near the air outlet 3 and the air outlet 4 is within 3° C., the controller controls the opening degrees of the first expansion valves 32 in the first intra-vehicle cooling branch 301 and the second intra-vehicle cooling branch 302 to be the same, to ensure that the cooling power of the first intra-vehicle cooling branch 301 and the cooling power of the second intra-vehicle cooling branch 302 are the same.

According to an embodiment of the present disclosure, in the heating mode, when the required power P1 of the battery is greater than the actual power P2 of the battery, the controller obtains a power difference between the required power P1 and the actual power P2 of the battery, and increase, according to the power difference, the power of the heater 53 used for heating the battery, or perform adjustment to increase the flow of the cooling liquid in the cycling branch of the battery, to increase the heating power of the battery; and when the required power P1 of the battery is less than or equal to the actual power P2 of the battery, the controller reduces the power of the heater 53 or keeps the power of the heater 53 unchanged, or performs adjustment to reduce the flow of the cooling liquid in the cycling branch of the battery, to reduce the heating power of the battery.

Specifically, when the temperature adjustment system enters the heating mode, the controller obtains P1 and P2 of the battery 6, and performs determining. If P1 is greater than P2, it indicates that temperature increase on the battery 6 cannot be completed within the target time according to the current heating power or flow of the cooling liquid. Therefore, the controller obtains a power difference between P1 and P2 of the battery 6, and increases, according to the power difference, the power of the heater 53 used for heating the battery 6, or performs adjustment to increase the rotational speed of the pump 51, to increase the flow of the cooling liquid of the cycling branch of the battery, so that temperature adjustment on the battery may be completed within the target time t. A larger difference between P1 and P2 indicates larger increase of the power of the heater 53. If P1 of the battery 6 is less than or equal to P2, the controller may properly reduce the power of the heater 53, to save electric energy, or perform adjustment to reduce the rotational speed of the pump 51 to reduce the flow of the cooling liquid of the cycling branch of the battery 6, to reduce the heating power, or keep the power of the heater 53 unchanged. When the temperature of the battery is higher than a preset temperature, for example, 10° C., heating on the battery 6 is completed, the controller sends information about turning off a temperature adjustment function to the vehicle-mounted air conditioner through CAN communication, and controls the heater 53 to be turned off. If the temperature of the battery 6 is still lower than 10° C. after the temperature adjustment system has entered the heating mode for a relatively long time, for example, 1 hour, the controller properly increases the power of the heater 53, so that the battery 6 completes temperature increase as soon as possible.

According to an embodiment of the present disclosure, the controller is further configured to reduce the rotational speed of the pump 51 when the required power P1 of a battery is less than the corresponding actual power P2, and increase the rotational speed of the pump 51 when the required power P1 of a battery is greater than the corresponding actual power P2.

Specifically, when the temperature adjustment system enters the heating mode or cooling mode, if P1 of the battery 6 is less than P2, the controller controls the rotational speed of the pump 51 to be reduced, to save electric energy. If P1 of the battery 6 is greater than P2, in addition to controlling the power of the corresponding heater 53 or compressor 1 to be increased or the flow of the cooling liquid in the loop in which the battery 6 is located to be increased, the controller further controls the rotational speed of the pump 51 to be increased, to increase a mass of the cooling liquid flowing through a cross section of the cooling flow path within a unit time, thereby increasing the actual power P2 of the battery 6, to implement temperature adjustment within the target time t.

It may be understood that, the adjustment manner of the battery temperature adjustment module 5 of the system shown in FIG. 33 is similar to those in FIG. 25 and FIG. 26, and a difference is that FIG. 33 shows a single battery pack, and FIG. 25 and FIG. 26 show two battery packs connected in series. For details not disclosed in the temperature adjustment process of the system shown in FIG. 33 in this embodiment of the present disclosure, reference may be specifically made to the foregoing embodiments. To avoid redundancy, details are not described herein again.

The temperature adjustment system for a vehicle-mounted battery according to this embodiment of the present disclosure obtains the required power for temperature adjustment and the actual power for temperature adjustment through the battery temperature adjustment module, and obtains the area temperatures of the plurality of areas in the vehicle and the air conditioner set temperature; and adjusts the opening degrees of the plurality of intra-vehicle cooling branches, the plurality of battery cooling branches and the plurality of refrigerating branches according to the required powers for temperature adjustment, the actual powers for temperature adjustment, the plurality of area temperatures and the air conditioner set temperature. Therefore, the system allocates refrigerating capacities to a battery and the areas in the compartment according to an actual status of the battery, the plurality of area temperatures in the compartment, and the air conditioner set temperature, thereby not only adjusting the temperature of the battery when the temperature is excessively high or excessively low, to maintain the temperature of the battery within a preset range, but also balancing the temperatures of the areas in the compartment.

Figure 36:
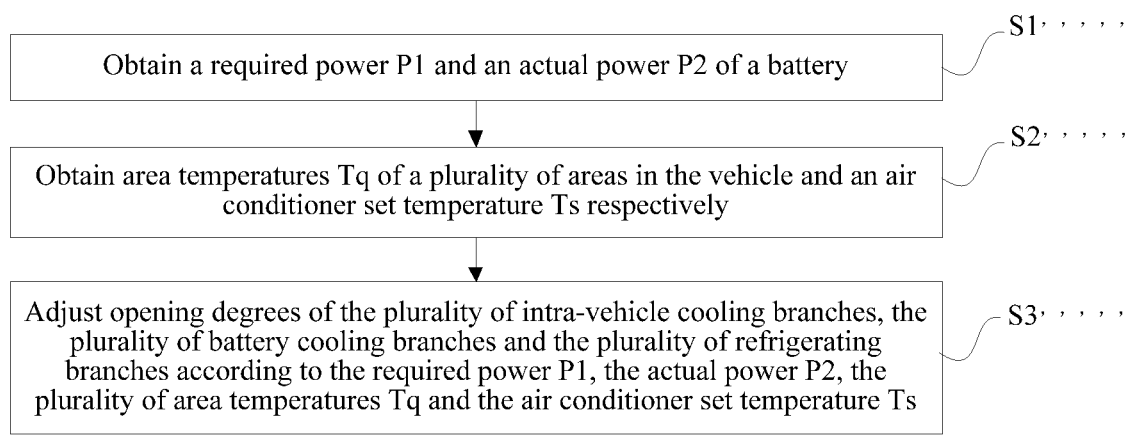
FIG. 36 is a flowchart of a temperature adjustment method for a vehicle-mounted battery according to a nineteenth embodiment of the present disclosure.

FIG. 36 is a flowchart of a temperature adjustment method for a vehicle-mounted battery according to a first embodiment of the present disclosure. As shown in FIG. 33, the temperature adjustment system for a vehicle-mounted battery includes a plurality of refrigerating branches, a plurality of battery cooling branches corresponding to the plurality of refrigerating branches, a plurality of intra-vehicle cooling branches, a battery and a battery temperature adjustment module connected between the battery and the plurality of battery cooling branches, and each battery cooling branch includes a heat exchanger. As shown in FIG. 36, the temperature adjustment method includes the following steps:

S1''''. Obtain a required power P1 and an actual power P2 of a battery.

According to an embodiment of the present disclosure, the obtaining a required power for temperature adjustment on a battery specifically includes: obtaining a first parameter when enabling temperature adjustment on the battery, and generating a first required power of the battery according to the first parameter; obtaining a second parameter when enabling temperature adjustment on the battery, and generate a second required power of the battery according to the second parameter; and generating a required power P1 of a battery cooling branch according to the first required power and the second required power.

Optionally, according to an embodiment of the present disclosure, the first parameter is an initial temperature when enabling temperature adjustment on the battery, the target temperature, and a target time t for reaching the target temperature from the initial temperature, and the generating a first required power according to the first parameter specifically includes: obtaining a first temperature difference $\Delta T_1$ between the initial temperature and the target temperature; and generating the first required power according to the first temperature difference $\Delta T_1$ and the target time t.

Optionally, according to an embodiment of the present disclosure, the first required power is generated through the following formula (1):

$$\Delta T_1 * C * M / t \quad (1)$$

where $\Delta T_1$ is the first temperature difference between the initial temperature and the target temperature, t is the target time, C is a specific heat capacity of the battery, and M is a mass of the battery.

According to an embodiment of the present disclosure, the second parameter is an average current I of the battery within a preset time, and the second required power is generated through the following formula (2):

$$I^2 * R \quad (2)$$

where I is the average current, and R is an internal resistance of the battery.

When the battery is cooled, $P1=\Delta T_1*C*M/t+I^2*R$; and when the battery is heated, $P1=\Delta T_1*C*M/t-I^2*R$.

According to an embodiment of the present disclosure, the obtaining an actual power P2 of a battery specifically includes: obtaining an inlet temperature and an outlet temperature of a flow path used for adjusting the temperature of the battery, and obtaining a flow velocity v at which a cooling liquid flows into the flow path; generating a second temperature difference $\Delta T_2$ of the battery according to the inlet temperature and the outlet temperature of the flow path of the battery; and generating the actual power P2 of the battery according to the second temperature difference $\Delta T_2$ of the battery and the flow velocity v.

Optionally, according to an embodiment of the present disclosure, the actual power P2 is generated through the following formula (3):

$$\Delta T_2 * c * m \quad (3)$$

where $\Delta T_2$ is the second temperature difference, c is a specific heat capacity of the cooling liquid in the flow path, and m is a mass of the cooling liquid flowing through a cross section of the flow path within a unit time, where $m=v*\rho*s$, v is a flow velocity of the cooling liquid, $\rho$ is a density of the cooling liquid, and s is a cross-sectional area of the flow path.

S2''''. Obtain area temperatures Tq of a plurality of areas in the vehicle and an air conditioner set temperature Ts respectively.

S3''''. Adjust opening degrees of the plurality of intra-vehicle cooling branches, the plurality of battery cooling branches and the plurality of refrigerating branches according to the required power P1, the actual power P2, the plurality of area temperatures Tq and the air conditioner set temperature Ts.

Optionally, according to an embodiment of the present disclosure, the opening degrees of the plurality of intra-vehicle cooling branches, the plurality of battery cooling branches and the plurality of refrigerating branches are adjusted within the target time t according to the required power P1, the actual power P2, the plurality of area temperatures Tq, and the air conditioner set temperature Ts, to reach the target temperature.

The battery may be a battery pack or a battery module.

Specifically, using two refrigerating branches, two battery cooling branches, two intra-vehicle cooling branches and two batteries as an example, the refrigerating branches are respectively a first refrigerating branch and a second refrigerating branch, the battery cooling branches are respectively a first battery cooling branch and a second battery cooling branch, and the intra-vehicle cooling branches are respectively a first intra-vehicle cooling branch and a second intra-vehicle cooling branch.

When the temperature of the battery is excessively high or excessively low, temperature adjustment on the battery needs to be performed. The required power P1 and the actual power P2 of the battery are obtained, and opening degrees of the plurality of battery cooling branches are adjusted according to P1 and P2, to adjust the cooling power of the battery; and the plurality of area temperatures Tq and the air conditioner set temperature Ts are obtained, and the opening degree of each battery cooling branch is controlled according to Tq and Ts. For example, if Tq of an area is relatively high and greatly different from Tq of another area, the opening degree of the intra-vehicle cooling branch for cooling the area is controlled to be increased, and moreover the opening degree of the corresponding battery cooling branch is controlled to be reduced. Moreover, to ensure that the cooling power of the battery is unchanged, the opening degree of another intra-vehicle cooling branch is controlled to be reduced, and moreover the opening degree of the corresponding battery cooling branch is controlled to be increased. Therefore, the method allocates refrigerating capacities to a battery and the areas in the compartment according to an actual status of the battery, the plurality of area temperatures in the compartment, and the air conditioner set temperature, thereby not only adjusting the temperature of the battery when the temperature is excessively high or excessively low, to maintain the temperature of the battery within a preset range, but also balancing the temperatures of the areas in the compartment.

How to adjust, based on FIG. 33, opening degrees of the plurality of intra-vehicle cooling branches, the plurality of battery cooling branches and the plurality of refrigerating branches according to the required power P1, the actual power P2, the plurality of area temperatures Tq and the air conditioner set temperature Ts is described below with reference to a specific embodiment.

According to an embodiment of the present disclosure, when there is one vehicle-mounted battery, and there are a plurality of intra-vehicle cooling branches, a plurality of battery cooling branches and a plurality of refrigerating branches, the foregoing temperature adjustment method for a vehicle-mounted battery may further include: generating a total maximum refrigerating power P5 of a plurality of compressors according to maximum refrigerating powers P of the plurality of compressors; determining whether the required power P1 is greater than the total maximum refrigerating power P5 of the plurality of compressors; if the required power P1 is greater than the total maximum refrigerating power P5 of the plurality of compressors, adjusting, to the maximum, opening degrees of refrigerating capacities provided by the plurality of compressors to the battery cooling branches; and if the required power P1 is less than or equal to the total maximum refrigerating power P5 of the plurality of compressors, adjusting the opening degrees of the refrigerating capacities of the battery cooling branches corresponding to the batteries according to a difference between the required power P1 and the total maximum refrigerating power P5.

Specifically, the total maximum refrigerating power P5 of the plurality of compressors may be calculated according to the maximum refrigerating power P of each compressor, that is, the total maximum refrigerating power P5 may be obtained by adding the maximum refrigerating power P of each compressor. Then, whether P1>P5 is determined, and if yes, the opening degree of the second expansion valve in each battery cooling branch is adjusted to the maximum, to adjust the flow of the cooling liquid provided by the plurality of compressors to the battery cooling branch corresponding to the battery to the maximum, so that the battery may complete temperature reduction within the target time t. If P1≤P5, the opening degree of the second expansion valve in the battery cooling branch is adjusted according to a difference between P1 and P5, where a larger absolute value of the difference between P1 and P5 indicates a smaller opening degree of the second expansion valve, to save energy sources.

According to an embodiment of the present disclosure, the battery temperature adjustment method may further include the following steps: detecting the temperature of the battery; entering a cooling mode when the temperature of the battery is greater than the first temperature threshold; and entering a heating mode when the temperature of the battery is less than a second temperature threshold. The first temperature threshold and the second temperature threshold may be preset according to an actual situation. For example, the first temperature threshold may be 40° C., and the second temperature threshold may be 0° C.

Specifically, after the vehicle is powered on, the temperature of the battery is detected in real time and determining is performed through the battery management controller. If the temperature of the battery is higher than 40° C., it indicates that the temperature of the battery is excessively high in this case. To prevent the high temperature from affecting performance of the battery, temperature reduction processing needs to be performed on the battery, the temperature adjustment system is controlled through the battery management controller to enter the cooling mode, and information about starting the battery cooling function is sent to the air conditioner system. If the temperature of the battery is less than 0° C., it indicates that the temperature of the battery is excessively low in this case. To prevent the low temperature from affecting performance of the battery, temperature increase processing needs to be performed on the battery, the temperature adjustment system is controlled to enter the heating mode, the battery cooling branch is controlled to be turned off, and the heater is controlled to be turned on, to provide the heating power to the battery.

According to an embodiment of the present disclosure, in the cooling mode, the adjusting opening degrees of the plurality of intra-vehicle cooling branches, the plurality of battery cooling branches and the plurality of refrigerating branches according to the required power P1, the actual power P2, the plurality of area temperatures Tq and the air conditioner set temperature Ts specifically includes: when the required power P1 of the battery cooling branch is greater than the actual power P2, determining whether the temperature of the battery is greater than a third temperature threshold. If the temperature of the battery is greater than the third temperature threshold, opening degrees of the plurality of intra-vehicle cooling branches are reduced, and opening degrees of the plurality of battery cooling branches are increased, where the opening degrees of the plurality of battery cooling branches are respectively controlled through corresponding valves (that is, the second expansion valves 42). The third temperature threshold is greater than the first temperature threshold. For example, the third temperature threshold may be 45° C.

Specifically, in the cooling mode, if P1 is greater than P2, whether the temperature of the battery is greater than 45° C. is determined. If the temperature of the battery is greater than 45° C., it indicates that the temperature of the current battery is excessively high, the opening degree of the first expansion valve is reduced, to reduce the flow of the cooling liquid of the intra-vehicle cooling branch, and moreover the opening degree of the second expansion valve 42 is increased, to increase the flow of the cooling liquid of the battery cooling branch. Therefore, by adjusting allocation of the refrigerating capacities of the intra-vehicle cooling branch and the battery cooling branch, temperature adjustment on the battery may be completed within the target time when the temperature of the battery is excessively high.

According to an embodiment of the present disclosure, the battery temperature adjustment method further includes: determining whether the required power P1 of the battery is greater than the actual power P2; if the required power P1 of the battery is greater than the actual power P2 of the battery, obtaining a power difference between the required power P1 and the actual power P2 of the battery, and increasing, according to the power difference, the power of the compressor used for cooling the battery, or performing adjustment to increase the flow of the cooling liquid of the cycling branch of the battery, to increase the cooling power of the battery; and if the required power P1 of the battery is less than or equal to the actual power P2 of the battery, reducing the power of the compressor or keeping the power of the compressor unchanged, or performing adjustment to reduce the flow of the cooling liquid of the cycling branch of the battery, to reduce the cooling power of the battery.

Specifically, when the temperature adjustment system enters the cooling mode, P1 and P2 of the battery are obtained, and determining is performed. If P1 is greater than P2, it indicates that the temperature reduction on the battery cannot be completed within the target time according to the current refrigerating power or flow of the cooling liquid. Therefore, the controller obtains a power difference between P1 and P2 of the battery, and increases the power of the compressor or increases the flow of the cooling liquid of the cycling branch of the battery according to the power difference, to increase the cooling power of the battery, where a larger power difference between P1 and P2 indicates larger increase of the power of the compressor and the flow of the cooling liquid of the battery, so that the temperature of the battery is reduced to the target temperature within the preset time t. If P1 of the battery is less than or equal to P2, the power of the compressor may be kept unchanged or the power of the compressor may be properly reduced, or the flow of the cooling liquid of the cycling branch of the battery is reduced, to reduce the cooling power of the battery. When the temperature of the battery is less than 35° C., cooling on the battery is completed, information about turning off a temperature adjustment function is sent to the vehicle-mounted air conditioner through CAN communication, and the second electronic valves is controlled to be turned off. If the temperature of a battery is still higher than 35° C. after the temperature adjustment system has entered the cooling mode for a relatively long time, for example, 1 hour, the power of the compressor is properly increased, so that the battery completes temperature reduction as soon as possible.

According to an embodiment of the present disclosure, if the temperature of the battery is less than the third temperature threshold, whether the intra-vehicle temperature is equal to the air conditioner set temperature Ts is further determined; and if the intra-vehicle temperature is equal to the air conditioner set temperature Ts, the opening degrees of the plurality of intra-vehicle cooling branches are reduced, and the opening degrees of the plurality of battery cooling branches are increased.

Specifically, when the temperature adjustment system enters the cooling mode, if the temperature of the battery is less than 45° C., the controller determines whether the intra-vehicle temperature reaches the air conditioner set temperature Ts. If yes, the flow of the cooling liquid of the battery cooling branch is increased, and the flow of the cooling liquid of the intra-vehicle cooling branch is reduced, to complete the temperature reduction of the battery as soon as possible. If the intra-vehicle temperature has not reached the air conditioner set temperature Ts, the intra-vehicle refrigerating requirement is preferentially satisfied, and the controller increases the flow of the cooling liquid of the intra-vehicle cooling branch, and reduces the flow of the cooling liquid of the battery cooling branch.

Moreover, layered processing is further performed on the temperature of the battery, and temperature control thresholds are respectively 40° C., 45° C., and 35° C. When the temperature of the battery is higher than 40° C., the battery cooling function is started; and when the temperature of the battery is reduced to 35° C., cooling of the battery is completed. When the temperature of the battery reaches 45° C., the battery cooling requirement is preferentially satisfied.

Additionally, when the required power P1 is greater than the actual power P2, if the temperature of the battery does not exceed 45° C., the intra-vehicle refrigerating requirement is still preferentially satisfied; and if the intra-vehicle refrigerating power has been sufficient and balanced, the opening degree of the battery cooling branch is increased, to increase the cooling power of the battery. If the required power P1 is less than or equal to the actual power P2, the intra-vehicle refrigerating requirement may be preferentially satisfied.

According to an embodiment of the present disclosure, the reducing opening degrees of the plurality of intra-vehicle cooling branches specifically includes: obtaining a temperature difference between the plurality of area temperatures; determining whether the temperature difference is greater than the fourth temperature threshold; and when the temperature difference is greater than the fourth temperature threshold, increasing the opening degree of the intra-vehicle cooling branch corresponding to the refrigerating branch in which the air outlet with a high temperature is located, and reducing the opening degree of the battery cooling branch corresponding to the refrigerating branch in which the air outlet with a high temperature is located. The fourth temperature threshold may be preset according to an actual situation, for example, may be 3° C.

In an embodiment of the present disclosure, the plurality of refrigerating branches respectively correspond to a plurality of air outlets, and the plurality of area temperatures are temperatures of the plurality of air outlets.

For example, as shown in FIG. 28, 4 air outlets may be disposed in the compartment, and are respectively an air outlet 1 to an air outlet 4. A corresponding area temperature Tq is detected by detecting an air outlet temperature Tc. It is assumed that the air outlet 1 and the air outlet 2 are provided with a refrigerating power by the first refrigerating branch 11, and the air outlet 3 and the air outlet 4 are provided with a refrigerating power by the second refrigerating branch 12.

Optionally, according to an embodiment of the present disclosure, the temperature adjustment method for a vehicle-mounted battery further includes: reducing the opening degree of the intra-vehicle cooling branch corresponding to the refrigerating branch in which the air outlet with a low temperature is located, and increasing the opening degree of the battery cooling branch corresponding to the refrigerating branch in which the air outlet with a low temperature is located.

Specifically, in a battery cooling process, if the air conditioner needs to be turned on in the vehicle, the ambient temperature in the compartment needs to be monitored and controlled, so that ambient temperatures at places in the vehicle are kept balanced, and moreover the battery cooling requirement can be satisfied. As shown in FIG. 28, when it is detected that the area temperature Tq at the air outlet 1 and the air outlet 2 is higher than the area temperature Tq at places near the air outlet 3 and the air outlet 4 by more than 3° C., the opening degree in the first intra-vehicle cooling branch is increased, and the opening degree in the first battery cooling branch is reduced, so that the cooling power in the first intra-vehicle cooling branch is relatively large. The cooling opening degree in the second intra-vehicle cooling branch is further reduced, and the opening degree of the second battery cooling branch is increased, so that the cooling power in the second intra-vehicle cooling branch is relatively small. Therefore, the cooling power of the first battery cooling branch and the cooling power of the second battery cooling branch may be kept unchanged, and moreover area air temperatures near the air outlets in the vehicle are kept balanced. When the vehicle-mounted air conditioner detects that a difference between the area air temperature Tq near the air outlet 1 and the air outlet 2 and the area air temperature Tq near the air outlet 3 and the air outlet 4 is within 3° C., the opening degrees of the first expansion valves in the first intra-vehicle cooling branch and the second intra-vehicle cooling branch are controlled to be the same, to ensure that the cooling power of the first intra-vehicle cooling branch and the cooling power of the second intra-vehicle cooling branch are the same.

According to an embodiment of the present disclosure, in the heating mode, the method further includes: determining whether the required power P1 of the battery is greater than the actual power P2; if the required power P1 of the battery is greater than the actual power P2, obtaining a power difference between the required power P1 and the actual power P2 of the battery, and increasing, according to the power difference, the power of the heater used for cooling the battery, or performing adjustment to increase the flow of the cooling liquid of the cycling branch of the battery, to increase the heating power of the battery; and if the required power P1 of the battery is less than or equal to the actual power P2, reducing the power of the heater or keeping the power of the heater unchanged, or performing adjustment to reduce the flow of the cooling liquid of the cycling branch of the battery, to reduce the heating power of the battery.

Specifically, when the temperature adjustment system enters the heating mode, the controller obtains P1 and P2 of the battery, and performs determining. If P1 is greater than P2, it indicates that temperature increase on the battery cannot be completed within the target time according to the current heating power or flow of the cooling liquid. Therefore, a power difference between P1 and P2 of the battery is obtained, and the power of the heater used for heating the battery is increased according to the power difference, or adjustment is performed to increase the rotational speed of the corresponding pump, to increase the flow of the cooling liquid of the cycling branch of the battery, so that temperature adjustment on the battery may be completed within the target time t. A larger difference between P1 and P2 indicates larger increase of the power of the heater. If P1 of the battery is less than or equal to P2, the power of the heater may be properly reduced, to save electric energy, or adjustment is performed to reduce the rotational speed of the corresponding pump to reduce the flow of the cooling liquid of the cycling branch of the battery, to reduce the heating power, or the power of the heater is kept unchanged. When the temperature of the battery is higher than a preset temperature, for example, 10° C., heating on the batteries is completed, information about turning off a temperature adjustment function is sent to the vehicle-mounted air conditioner through CAN communication, and the heater is controlled to be turned off. If the temperature of the battery is still lower than 10° C. after the temperature adjustment system has entered the heating mode for a relatively long time, for example, 1 hour, the power of the heater is properly increased, so that the battery completes temperature increase as soon as possible.

According to an embodiment of the present disclosure, the temperature adjustment method for a vehicle-mounted battery may further include: reducing, if the required power P1 of the battery is less than the actual power P2, the rotational speed of the pump in the flow path of the battery; and increasing, if the required power P1 of the battery is greater than the actual power P2, the rotational speed of the pump in the flow path of the battery; and Specifically, when the temperature adjustment system enters the heating mode or cooling mode, if P1 of the battery is less than P2, the rotational speed of the corresponding pump is controlled through the controller to be reduced, to save electric energy. If P1 of the battery is greater than P2, in addition to controlling the power of the corresponding heater or compressor to be increased or the flow of the cooling liquid in the cycling branch of the battery to be increased, the controller further controls the rotational speed of the pump to be increased, to increase a mass of the cooling liquid flowing through a cross section of the cooling flow path within a unit time, thereby increasing the actual power P2 of the battery, to implement temperature adjustment within the target time t.

To sum up, in the temperature adjustment method for a vehicle-mounted battery according to this embodiment of the present disclosure, first, the required powers for temperature adjustment and the actual powers for temperature adjustment on the battery are obtained respectively; then, the area temperatures of the plurality of areas in the vehicle and the air conditioner set temperature are obtained respectively; and then the opening degrees of the plurality of intra-vehicle cooling branches, the plurality of battery cooling branches and the plurality of refrigerating branches are adjusted according to the required powers for temperature adjustment, the actual powers for temperature adjustment, the plurality of area temperatures and the air conditioner set temperature. Therefore, the method allocates refrigerating capacities to a battery and the areas in the compartment according to an actual status of the battery, the plurality of area temperatures in the compartment, and the air conditioner set temperature, thereby not only adjusting the temperature of the battery when the temperature is excessively high or excessively low, to maintain the temperature of the battery within a preset range, but also balancing the temperatures of the areas in the compartment.

There may be a plurality of compressors 1 independent of each other for providing the refrigerant to the battery, and there may be one intra-vehicle cooling branch 3 and one battery cooling branch 4.

Figure 37:
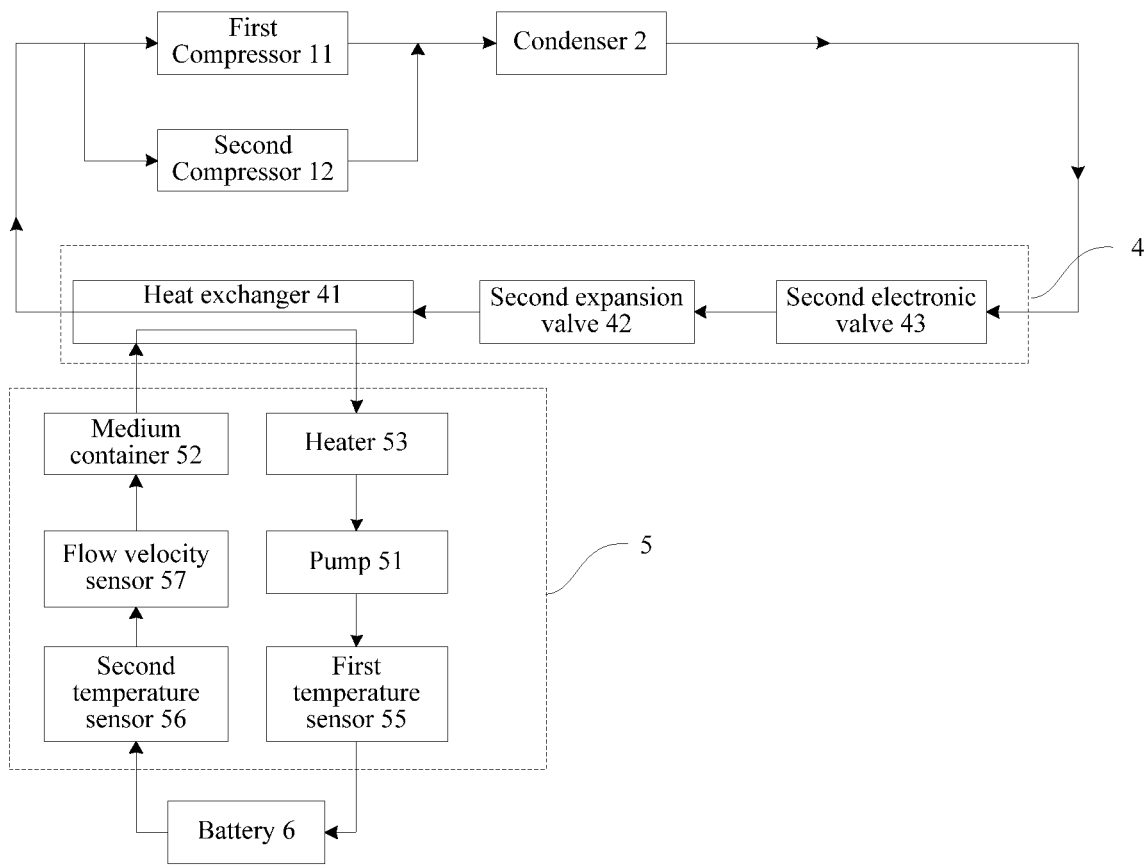
FIG. 37 is a schematic diagram of a flow path structure of a temperature adjustment system for a vehicle-mounted battery according to a twelfth embodiment of the present disclosure.

For example, as shown in FIG. 37, two compressors are used as an example, and include a first compressor 11 and a second compressor 12. The controller may control, according to the required power P1 and the actual power P2, a quantity of compressors to be started.

Specifically, when the battery 6 is cooled, if P1 is greater than P2, one compressor is controlled to be started; and if P1 is less than P2, the two compressors are both controlled to be started.

Figure 38:
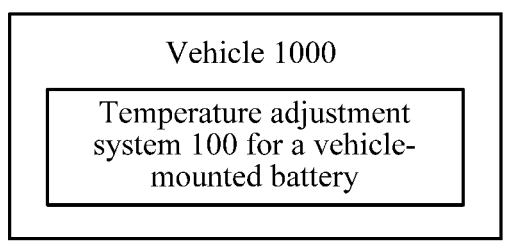
FIG. 38 is a schematic block diagram of a vehicle according to an embodiment of the present disclosure.

Additionally, an embodiment of the present disclosure further proposes a vehicle. As shown in FIG. 38, the vehicle 1000 of this embodiment of the present disclosure may include the foregoing temperature adjustment system 100 for a vehicle-mounted battery.

The vehicle according to this embodiment of the present disclosure may precisely control a temperature adjustment time of the battery, and the actual power of the battery is adjustable in real time, so that a heating power and a cooling power of the vehicle-mounted battery may be precisely controlled according to an actual status of the vehicle-mounted battery, thereby adjusting the temperature of the vehicle-mounted battery when the temperature is excessively high or excessively low, maintaining the temperature of the vehicle-mounted battery within a preset range, and avoiding a case of affecting performance of the vehicle-mounted battery because of the temperature.

In the description of the present disclosure, it should be understood that, orientations or position relationships indicated by terms such as "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure.

In addition, terms "first" and "second" are used only for description objectives, and shall not be construed as indicating or implying relative importance or implying a quantity of indicated technical features. Therefore, a feature restricted by "first" or "second" may explicitly indicate or implicitly include at least one such feature. In the description of the present disclosure, unless otherwise specifically limited, "multiple" means at least two, for example, two or three.

In the present disclosure, unless explicitly specified or limited otherwise, the terms "mounted", "connected", "connection", and "fixed" should be understood broadly, for example, which may be fixed connections, detachable connections or integral connections; may be mechanical connections or electrical connections; may be direct connections, indirectly connected with each other through an intermediate medium, or communications inside two elements or an interaction relationship of two elements, unless otherwise specifically limited. Those of ordinary skill in the art can understand specific meanings of the terms in the present disclosure according to specific situations.

In the present disclosure, unless explicitly specified or limited otherwise, a first characteristic "on" or "under" a second characteristic may be the first characteristic in direct contact with the second characteristic, or the first characteristic in indirect contact with the second characteristic by using an intermediate medium. Moreover, the first characteristic "on", "above" and "over" the second characteristic may be the first characteristic right above or obliquely above the second characteristic, or only indicates that a horizontal height of the first characteristic is greater than that of the second characteristic. The first characteristic "under", "below" and "beneath" the second characteristic may be the first characteristic right below or obliquely below the second characteristic, or only indicates that a horizontal height of the first characteristic is less than that of the second characteristic.

In the descriptions of this specification, descriptions such as reference terms "an embodiment", "some embodiments", "example", "specific example", or "some examples" intend to indicate that specific features, structures, materials, or characteristics described with reference to embodiments or examples are included in at least one embodiment or example of the present disclosure. In this specification, exemplary descriptions of the foregoing terms do not necessarily refer to a same embodiment or example. In addition, the described specific feature, structure, material, or characteristic may be combined in a proper manner in any one or more embodiments or examples. In addition, with no conflict, a person skilled in the art can integrate and combine different embodiments or examples and features of the different embodiments and examples described in this specification.

Although the embodiments of the present disclosure are shown and described above, it can be understood that the foregoing embodiments are exemplary, and should not be construed as limitations to the present disclosure. A person of ordinary skill in the art can make changes, modifications, replacements, and variations to the foregoing embodiments within the scope of the present disclosure.

What is claimed is:

1. A temperature adjustment method for a vehicle-mounted battery, comprising:
   obtaining a required power for performing temperature adjustment on the battery;
   obtaining an actual power for performing temperature adjustment on the battery; and
   adjusting a temperature of the battery within a target time according to the required power and the actual power, to reach a target temperature.

2. The temperature adjustment method for the vehicle-mounted battery according to claim 1, wherein the obtaining the required power for performing temperature adjustment on the battery specifically comprises:
   obtaining a first parameter when enabling temperature adjustment on the battery, and generating a first required power according to the first parameter;
   obtaining a second parameter when enabling temperature adjustment on the battery, and generating a second required power according to the second parameter; and
   generating the required power according to the first required power and the second required power.

3. The temperature adjustment method for the vehicle-mounted battery according to claim 2, wherein the first parameter is an initial temperature when enabling temperature adjustment on the battery, the target temperature, and the target time for reaching the target temperature from the initial temperature, and the generating the first required power according to the first parameter specifically comprises:
   obtaining a first temperature difference between the initial temperature and the target temperature; and
   generating the first required power according to the first temperature difference and the target time.

4. The temperature adjustment method for the vehicle-mounted battery according to claim 3, wherein the first required power is generated through the following formula:

$$\Delta T1 * C * M / t$$

wherein $\Delta T1$ is the first temperature difference between the initial temperature and the target temperature, t is the target time, C is a specific heat capacity of the battery, and M is a mass of the battery; and
the second parameter is an average current of the battery within a preset time, and the second required power is generated through the following formula:

$$I^2 * R$$

wherein I is the average current, and R is an internal resistance of the battery.

5. The temperature adjustment method for the vehicle-mounted battery according to claim 1, further comprising:
   detecting the temperature of the battery;
   entering a cooling mode when the temperature of the battery is greater than a first temperature threshold; and
   entering a heating mode when the temperature of the battery is less than a second temperature threshold.

6. The temperature adjustment method for the vehicle-mounted battery according to claim 5, wherein in the cooling mode, the step of adjusting the temperature of the battery according to the required power and the actual power specifically comprises:

determining whether the required power is greater than the actual power;
obtaining a power difference between the required power and the actual power if the required power is greater than the actual power, and increasing, according to the power difference, a power of a compressor used for cooling the battery; and
reducing the power of the compressor or keeping the power of the compressor unchanged if the required power is less than or equal to the actual power.

7. The temperature adjustment method for the vehicle-mounted battery according to claim 5, wherein in the heating mode, the step of adjusting t temperature of the battery according to the required power for temperature adjustment and the actual power for temperature adjustment specifically comprises:
determining whether the required power is greater than the actual power;
obtaining a power difference between the required power and the actual power if the required power is greater than the actual power, and increasing, according to the power difference, a power of a heater used for heating the battery; and
keeping the power of the heater unchanged if the required power is less than or equal to the actual power.

8. The temperature adjustment method for the vehicle-mounted battery according to claim 6, further comprising:
reducing a rotational speed of a water pump or keeping the rotational speed of the pump unchanged if the required power is less than or equal to the actual power; and
increasing the rotational speed of the water pump if the required power is greater than the actual power.

9. The temperature adjustment method for the vehicle-mounted battery according to claim 1, wherein the step of obtaining the actual power of the battery specifically comprises:
obtaining an inlet temperature and an outlet temperature of a flow path used for adjusting the temperature of the battery, and obtaining a flow velocity at which a cooling liquid flows into the flow path;
generating a second temperature difference according to the inlet temperature and the outlet temperature; and
generating the actual power according to the second temperature difference and the flow velocity.

10. The temperature adjustment method for the vehicle-mounted battery according to claim 1, further comprises:
determining, when there are a plurality of compressors used for providing a refrigerant to the battery, a quantity of to-be-started compressors according to the required power and a rated refrigerating power of each compressor; and
controlling, in a cooling mode, a corresponding quantity of the plurality of compressors to start.

11. The temperature adjustment method for the vehicle-mounted battery according to claim 10, wherein the determining the quantity of to-be-started compressors according to the required power and the rated refrigerating power of each compressor specifically comprises:
determining whether the required power of the battery is greater than a rated refrigerating power of a single compressor; and
controlling, if the required power is greater than the rated refrigerating power of the single compressor, the plurality of compressors to start simultaneously.

12. A temperature adjustment system for a vehicle-mounted battery, comprising:
a compressor;
a condenser connected to the compressor;
a battery cooling branch connected between the compressor and the condenser; and
a battery temperature adjustment module connected to the battery cooling branch, and configured to obtain a required power and an actual power for performing temperature adjustment on the battery, and adjust a temperature of the battery within a target time according to the required power and the actual power, to reach a target temperature.

13. The temperature adjustment system for be vehicle-mounted battery according to claim 12, wherein the battery cooling branch comprises a heat exchanger, and the heat exchanger is connected to the battery temperature adjustment module.

14. The temperature adjustment system for the vehicle-mounted battery according to claim 13, wherein the battery temperature adjustment module comprises:
a flow path for adjusting the temperature of the battery, wherein the flow path is disposed in the battery; and
a water pump, a medium container, a heater, and a controller that are connected between the flow path and the heat exchanger, wherein the controller obtains the required power and the actual power for performing temperature adjustment on the battery, and adjusts the temperature of the battery according to the required power and the actual power.

15. The temperature adjustment system for h vehicle-mounted battery according to claim 14, wherein the battery temperature adjustment module further comprises a first temperature sensor disposed on an inlet of the flow path, a second temperature sensor disposed on an outlet of the flow path, and a flow velocity sensor.

16. The temperature adjustment system for the vehicle-mounted battery according to claim 14, wherein the controller is configured to: obtain a first parameter when enabling temperature adjustment on the battery, and generate a first required power according to the first parameter; obtain a second parameter when enabling temperature adjustment on the battery, and generate a second required power according to the second parameter; and generate the required power according to the first required power and the second required power.

17. The temperature adjustment system for the vehicle-mounted battery according to claim 14, wherein the controller is further configured to: detect the temperature of the battery; control, when the temperature of the battery is greater than a first temperature threshold, the temperature adjustment system to enter a cooling mode; and control, when the temperature of the battery is less than a second temperature threshold, the temperature adjustment system to enter a heating mode.

18. The temperature adjustment system for the vehicle-mounted battery according to claim 15, wherein the controller generates a second temperature difference according to an inlet temperature detected by the first temperature sensor and an outlet temperature detected by the second temperature sensor, and generates the actual power according to the second temperature difference and a flow velocity that is detected by the flow velocity sensor.

19. The temperature adjustment system for the vehicle-mounted battery according to claim 4, wherein there are a plurality of compressors used for providing a refrigerant to the battery, there are a plurality of intra-vehicle cooling loops and a plurality of battery cooling branches, and the controller is further configured to:

determine a quantity of to-be-started compressors according to the required power and a rated refrigerating power of each compressor; and control, when the temperature adjustment system is in a cooling mode, a corresponding quantity of the plurality of compressors to start.

20. A vehicle, comprising the temperature adjustment system for the vehicle-mounted battery according to claim 12.

\* \* \* \* \*